US007809193B2

(12) United States Patent
Iwasaki et al.

(10) Patent No.: US 7,809,193 B2
(45) Date of Patent: Oct. 5, 2010

(54) IMAGE INPUT-AND-OUTPUT APPARATUS

(75) Inventors: Takeo Iwasaki, Nagoya (JP); Hiroyuki Sasaki, Chita (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1042 days.

(21) Appl. No.: 11/536,600

(22) Filed: Sep. 28, 2006

(65) Prior Publication Data

US 2007/0025612 A1 Feb. 1, 2007

Related U.S. Application Data

(63) Continuation-in-part of application No. PCT/JP2005/006089, filed on Mar. 30, 2005.

(30) Foreign Application Priority Data

Mar. 31, 2004 (JP) ............................ 2004-108148
Mar. 31, 2004 (JP) ............................ 2004-108149
Jun. 11, 2004 (JP) ............................ 2004-173779
Jun. 15, 2004 (JP) ............................ 2004-177469
Jul. 20, 2004 (JP) ............................ 2004-211063

(51) Int. Cl.
*G06K 9/00* (2006.01)

(52) U.S. Cl. ...................................................... 382/181

(58) Field of Classification Search .................. 382/181
See application file for complete search history.

(56) References Cited

U.S. PATENT DOCUMENTS 3,258,581 A * 6/1966 Buell ......................... 382/324
4,518,253 A 5/1985 Takahashi
4,767,212 A 8/1988 Kitahashi et al.
5,111,161 A 5/1992 Sato
5,307,153 A 4/1994 Maruyama et al.
5,509,090 A 4/1996 Maruyama et al.
5,511,148 A 4/1996 Wellner
6,075,605 A 6/2000 Futamura et al.
6,674,893 B1 1/2004 Abe et al.
2003/0128875 A1 7/2003 Pilu et al.
2006/0288284 A1* 12/2006 Peters et al. ................ 715/700

FOREIGN PATENT DOCUMENTS

JP S56-130608 A 10/1981
JP 58-060375 A 9/1983

(Continued)

OTHER PUBLICATIONS

Japan Patent Office, Notification of Reasons of Rejection in counterpart Patent Application No. 2004-108148, mailed Jan. 6, 2010.

(Continued)

*Primary Examiner*—Tom Y Lu
(74) *Attorney, Agent, or Firm*—Baker Botts L.L.P.

(57) ABSTRACT

There is provided an image input-and-output apparatus comprising an imaging unit that takes an image of an object to be photographed to obtain imaging data, a recognizing unit that recognizes object information from the imaging data obtained by the imaging unit, and a projecting unit that projects related information related to the object information recognized by the recognizing unit.

82 Claims, 81 Drawing Sheets

FOREIGN PATENT DOCUMENTS

| | | | |
|---|---|---|---|
| JP | S60-195585 | A | 10/1985 |
| JP | S61-091521 | A | 5/1986 |
| JP | 61-091521 | A | 9/1986 |
| JP | S62-284479 | A | 12/1987 |
| JP | 2864143 | B | 12/1991 |
| JP | H08-20232 | B | 2/1992 |
| JP | H07-168949 | A | 7/1995 |
| JP | H07-199794 | A | 8/1995 |
| JP | H09-319556 | A | 12/1997 |
| JP | H11-148810 | A | 6/1999 |
| JP | 2001-004338 | A | 1/2001 |
| JP | 2001-66158 | A | 3/2001 |
| JP | 2001-066158 | A | 3/2001 |
| JP | 2001-116526 | A | 4/2001 |
| JP | 2003-281297 | A | 3/2003 |
| JP | 2003-148935 | A | 5/2003 |
| JP | 2003-208604 | A | 7/2003 |
| JP | 2003-233294 | A | 8/2003 |
| JP | 2003-281297 | A | 10/2003 |
| JP | 2003-281672 | A | 10/2003 |

OTHER PUBLICATIONS

Japan Patent Office, Notification of Reasons of Rejection in counterpart Patent Application No. 2004-108149, mailed Jan. 6, 2010.

Kosuke Sato et al., "Distance Image Input by Space Code," Transactions of the Institute of Electronics and Communication Engineers of Japan, 85/3 vol. J68-D No. 3, pp. 369-375, Japan.

Kosuke Sato et al., "Three-Dimensional Image Measurement," Shokodo Co., Ltd., pp. 106-119.

* cited by examiner (a)

(b) (c)

(a)

(b)

(a)

(b)

(c)

(a)

(b)

(a)

(b)

(c)

(a)

(b)

(a)

(b)

(a)

(b)

IMAGE INPUT-AND-OUTPUT APPARATUS

BACKGROUND

1. Technical Field

The present invention relates to image input-and-output apparatuses that can take and project an image.

2. Related Art

Known three-dimensional measurement apparatuses take an image of pattern light on an object while projecting the pattern light onto the object, perform certain computations of the image signal obtained by imaging, and obtain the three-dimensional information of the object. One of those three-dimensional measurement apparatuses is disclosed in Japanese Unexamined Patent Application Publication No. Hei-8-20232 (document 1). The three-dimensional measurement apparatus disclosed in patent document 1 projects coded multi-slit pattern light onto an object to be measured, takes an image of the coded multi-slit pattern light projected onto the object by means of an imaging apparatus, and calculates the three-dimensional position of the contour of the object from the image signal obtained by imaging.

SUMMARY

Three-dimensional measurement apparatuses such as that disclosed in document 1 and other general image input-and-output apparatuses, including a projection apparatus and an imaging apparatus, just provide information of the appearance of the object to be measured and have limited applications.

The present invention has been made to solve the above-described problems. An object of the present invention is to provide an image input-and-output apparatus that can project information related to an object in accordance with imaging data obtained by imaging.

An image input-and-output apparatus provided from one aspect of the present invention includes an imaging unit that images an object and obtains imaging data, a recognizing unit that recognizes object information from the imaging data obtained from the imaging unit, and a projecting unit that projects information related to the object information recognized by the recognizing unit.

With this configuration, the information of the object is recognized, and the related information of the object information is projected.

BRIEF DESCRIPTION OF THE ACCOMPANYING DRAWINGS

Figure 4:
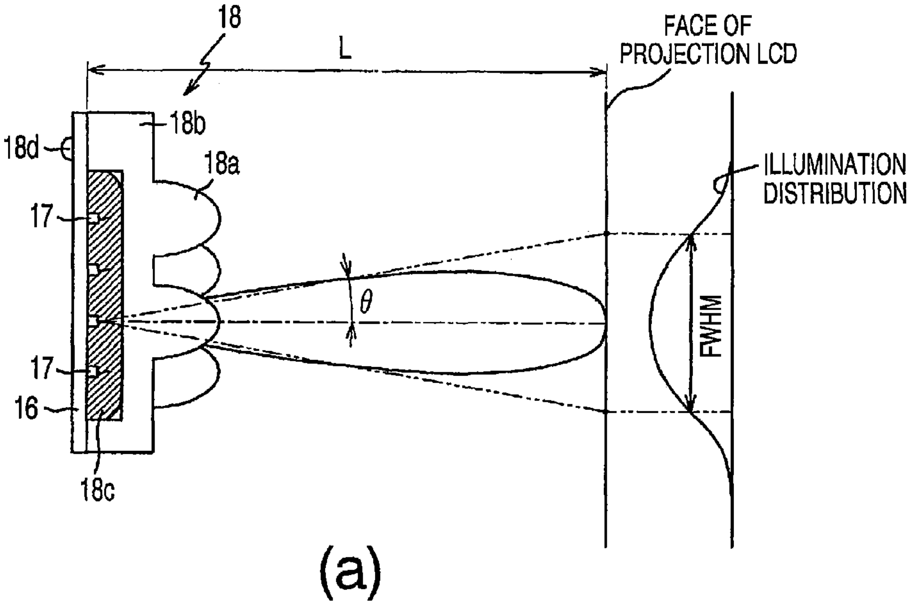
Figure 4:
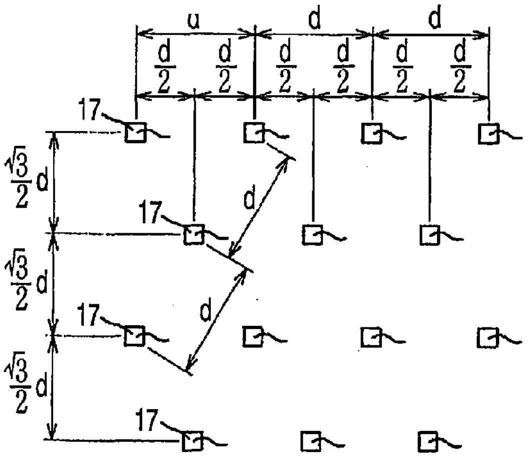
Figure 4:
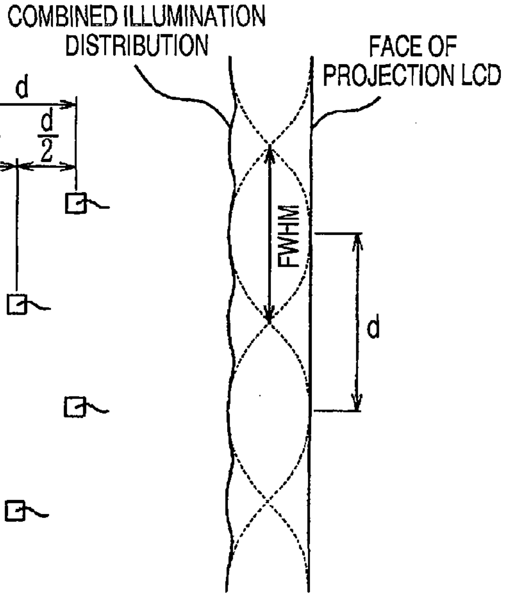

FIGS. 4(*a*) to 4(*c*) are views illustrating an arrangement in an LED array.

Figure 5:
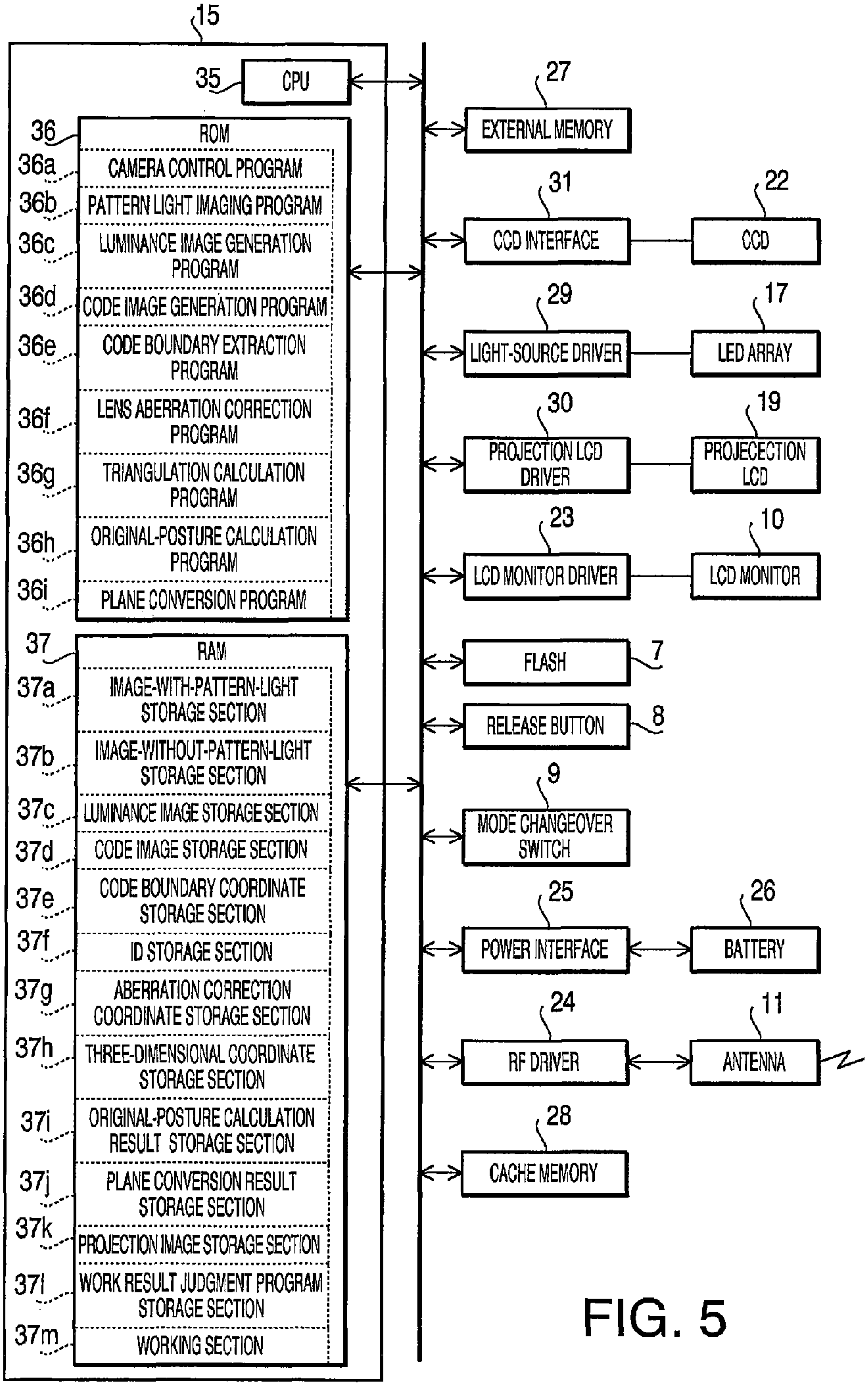

FIG. 5 is a block diagram showing an electric configuration of the image input-and-output apparatus.

Figure 6:
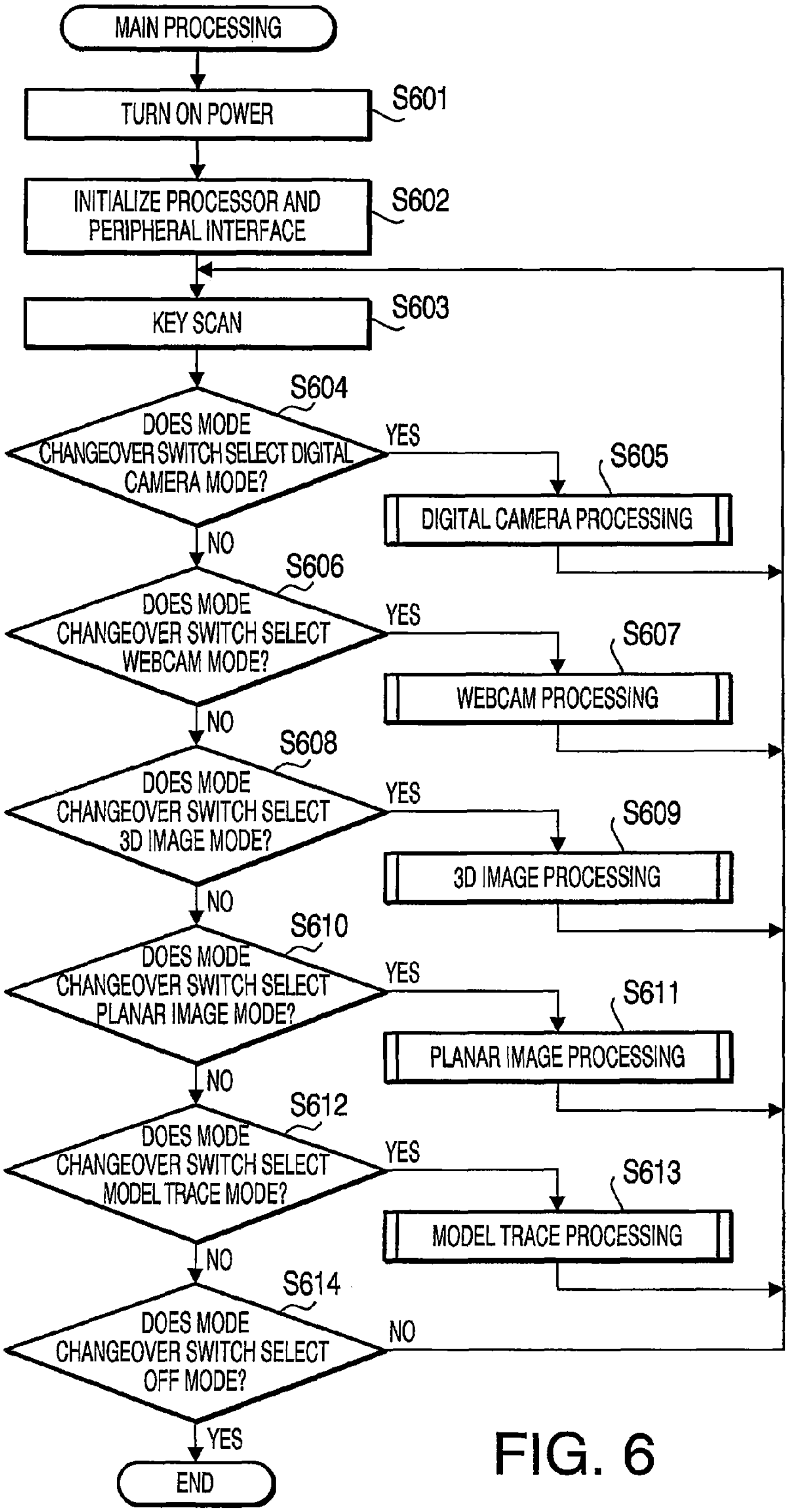

FIG. 6 is a flow chart of main processing.

Figure 7:
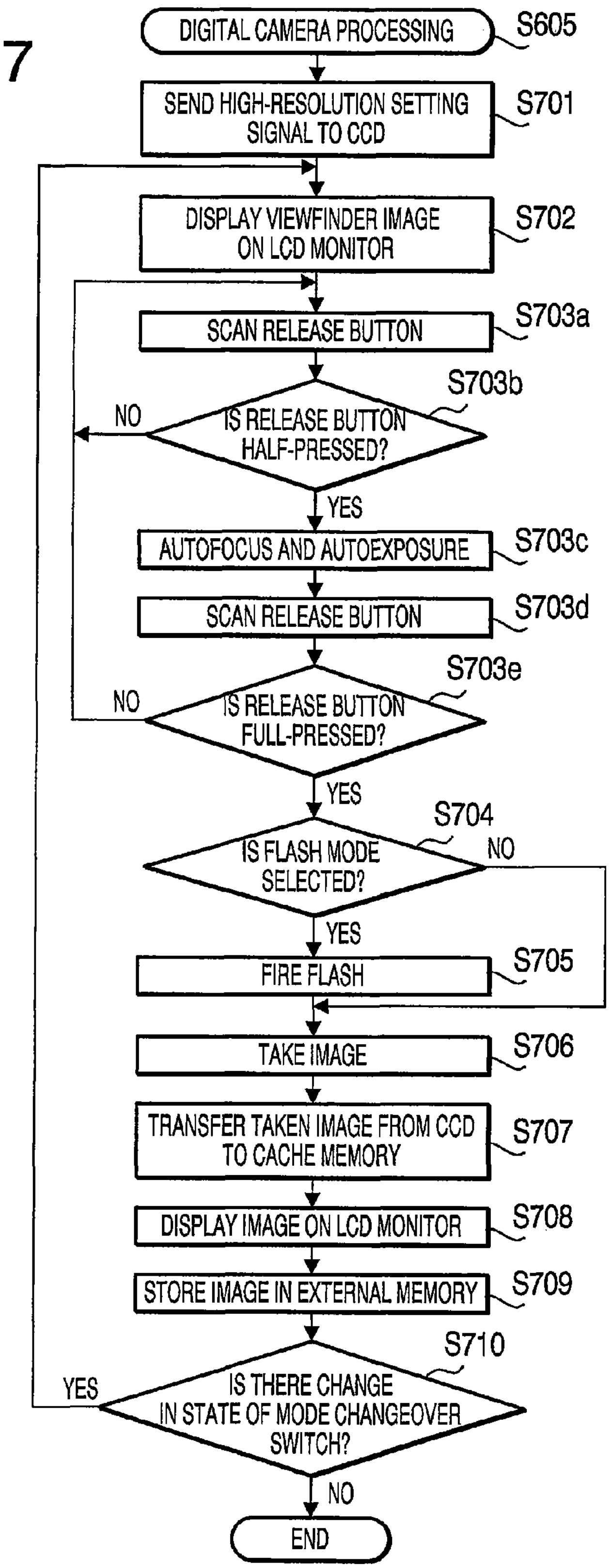

FIG. 7 is a flow chart of digital camera processing.

Figure 8:
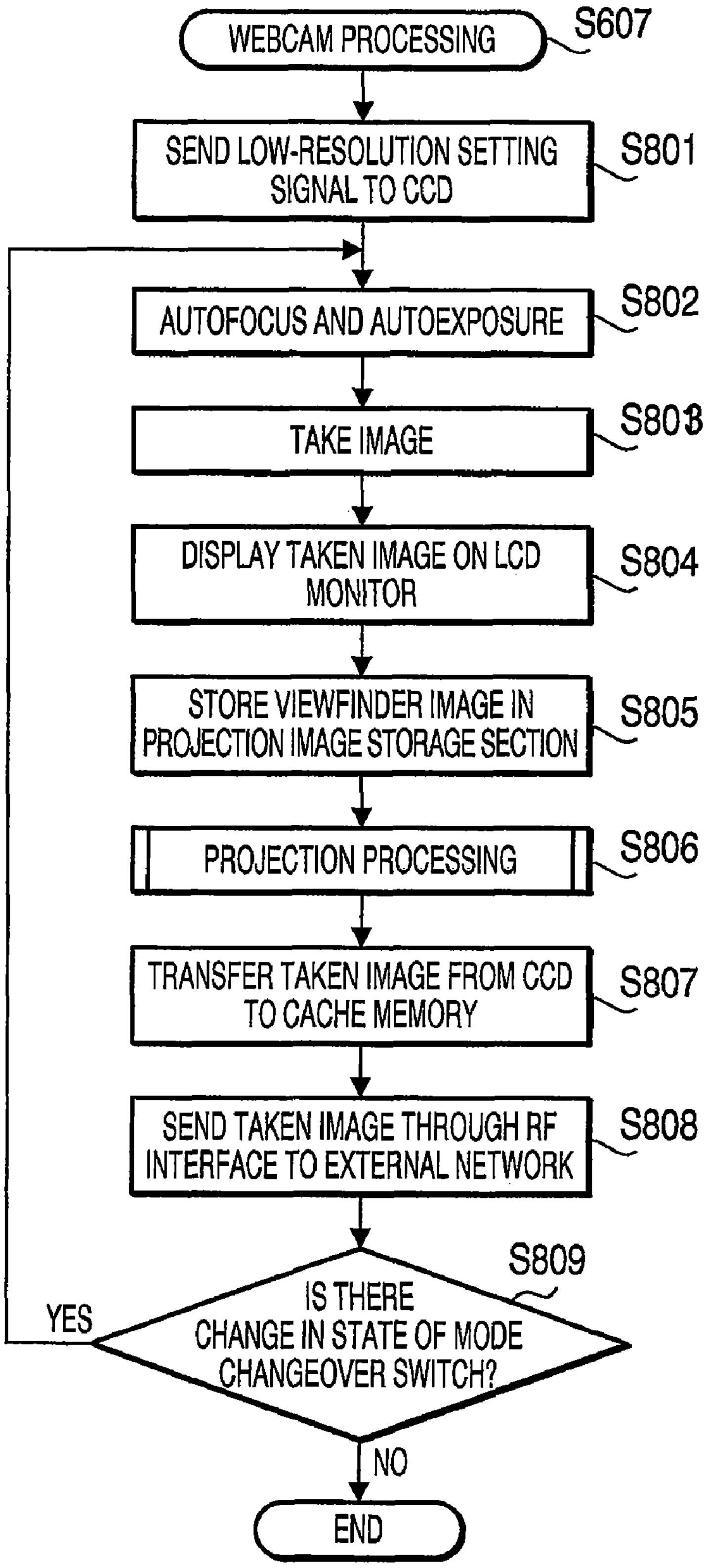

FIG. 8 is a flow chart of webcam processing.

Figure 9:
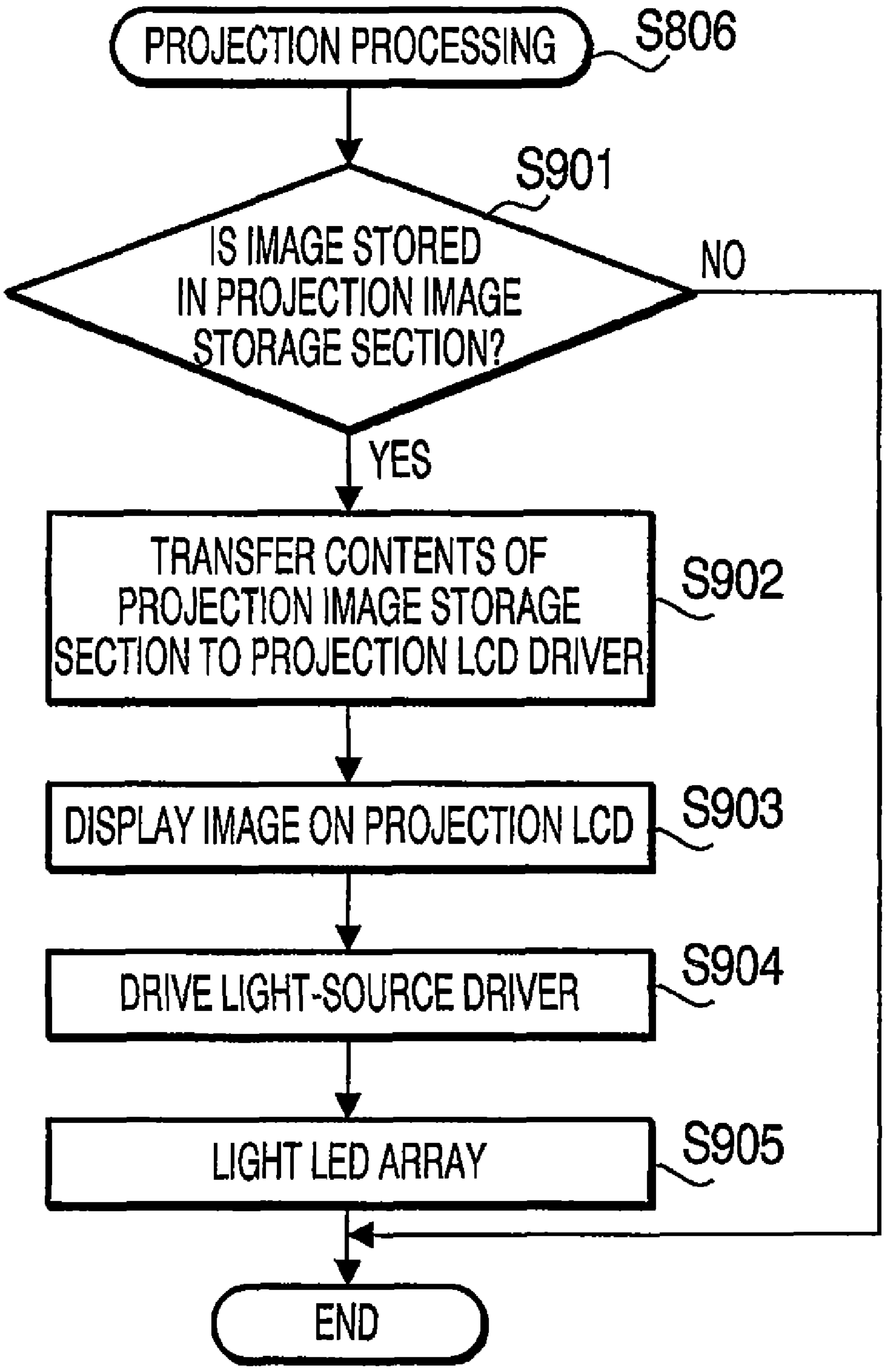

FIG. 9 is a flow chart of projection processing.

Figure 10:
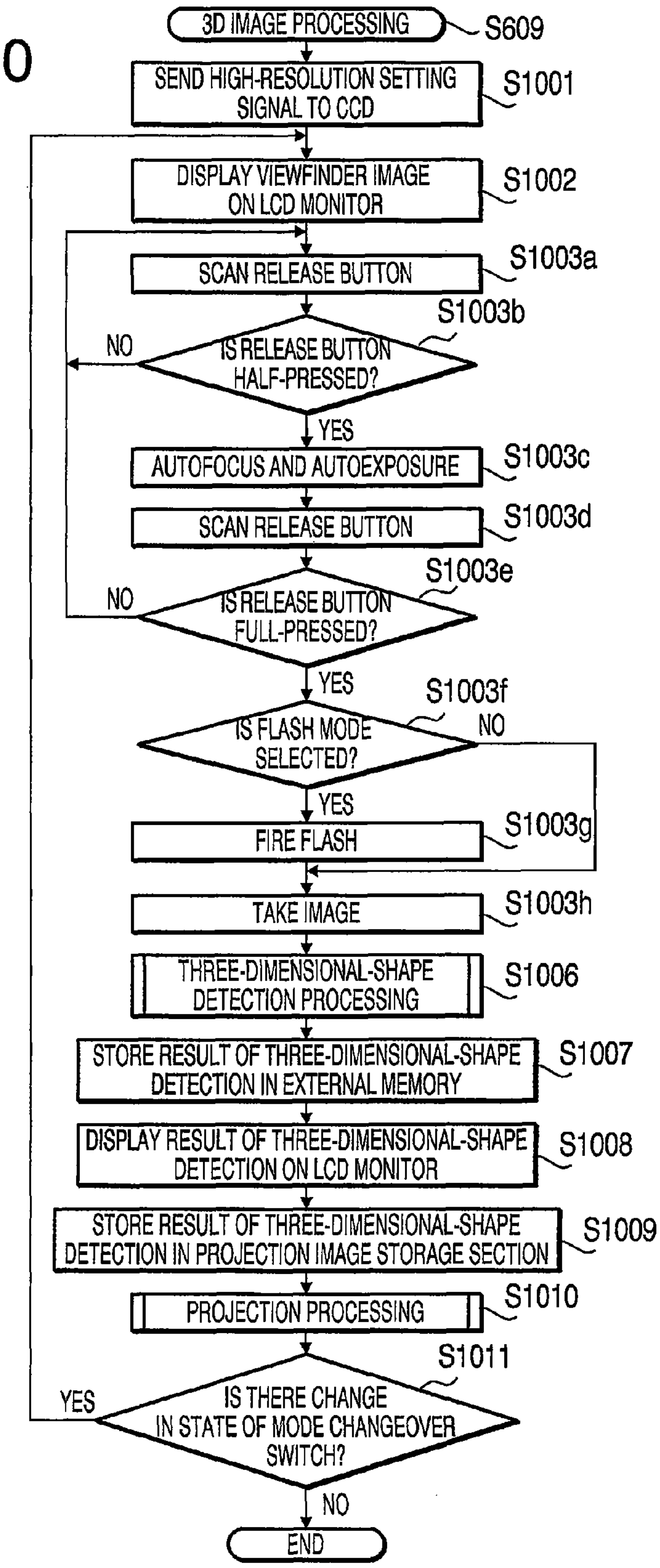

FIG. 10 is a flow chart of 3D image processing.

Figure 11:
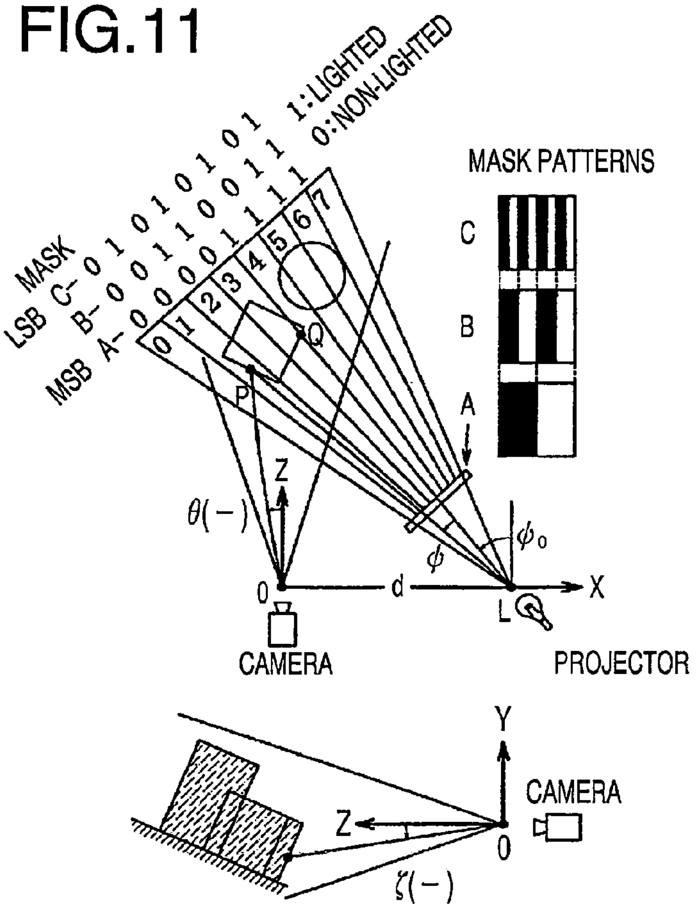
Figure 11:
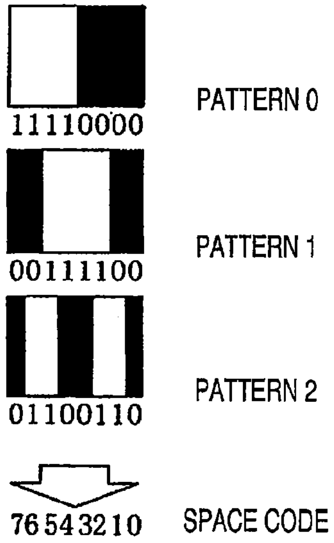

FIG. 11(*a*) is a view illustrating the principle of the space code method, and FIG. 11(*b*) is a view showing mask patterns (gray code) different from those shown in FIG. 11(*a*).

Figure 12:
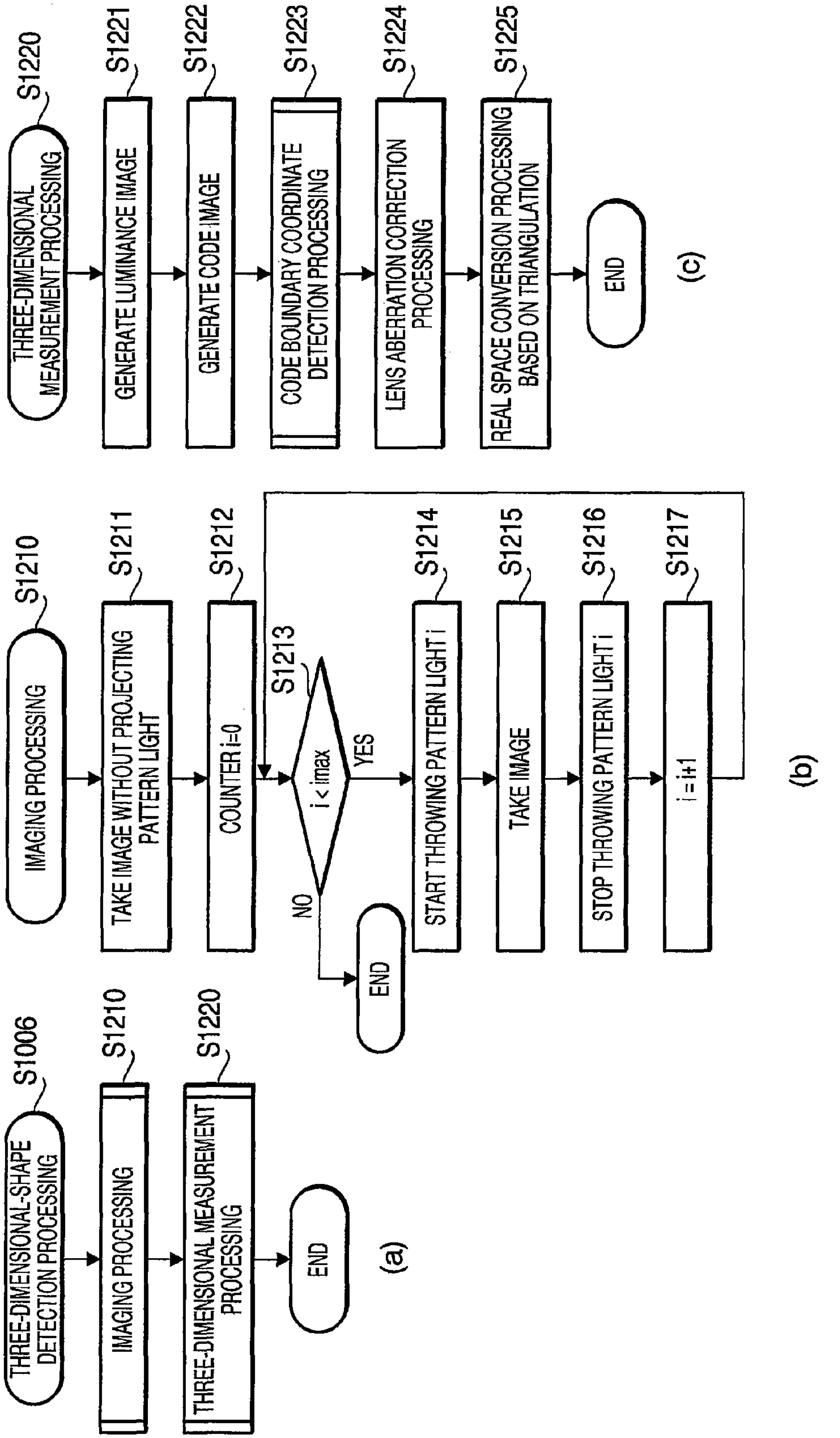

FIG. 12(*a*) is a flow chart of three-dimensional-shape detection processing. FIG. 12(*b*) is a flow chart of imaging processing. FIG. 12(*c*) is a flow chart of three-dimensional measurement processing.

Figure 13:
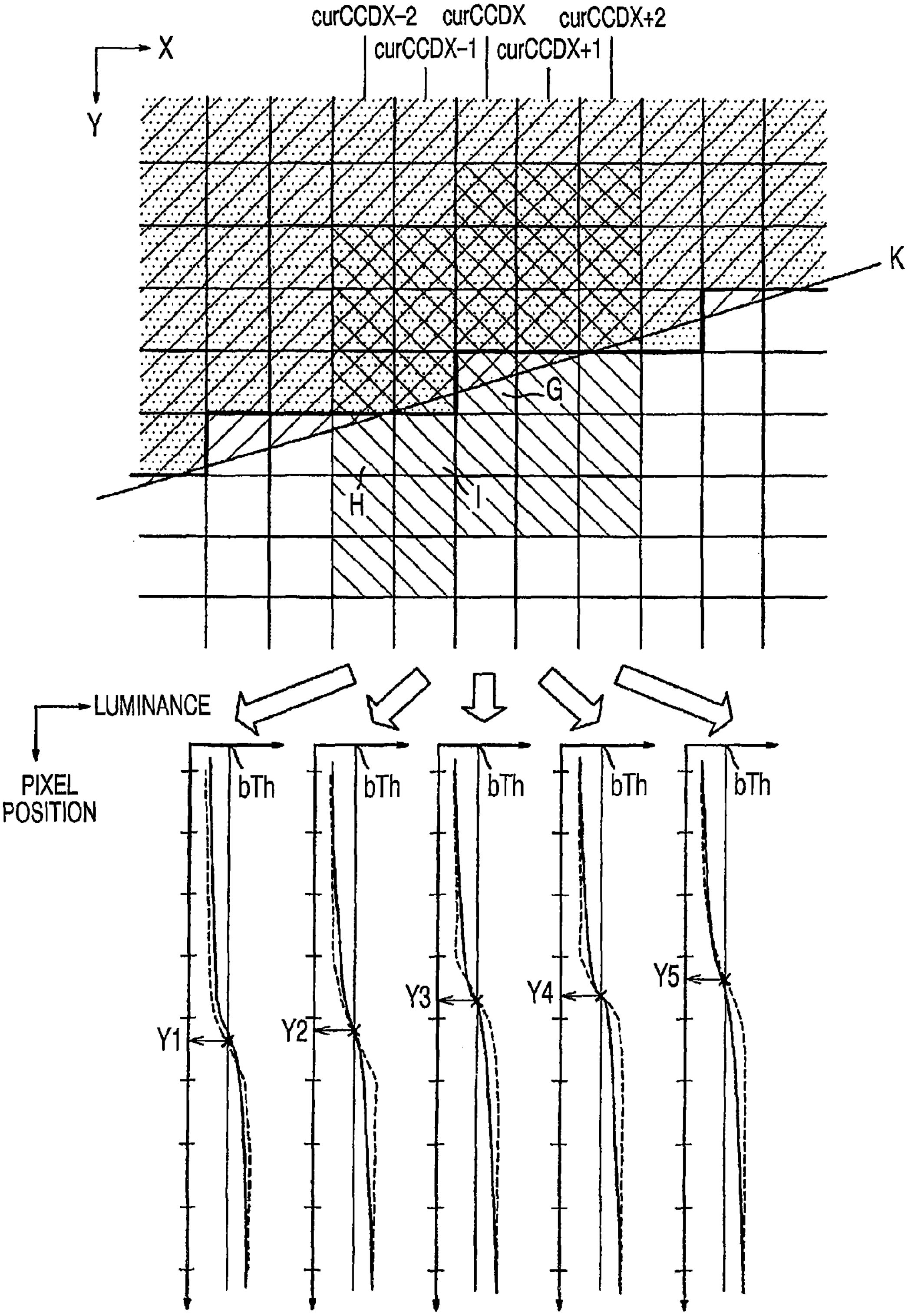

FIG. 13 is a view illustrating an overview of code boundary coordinate detection processing.

Figure 14:
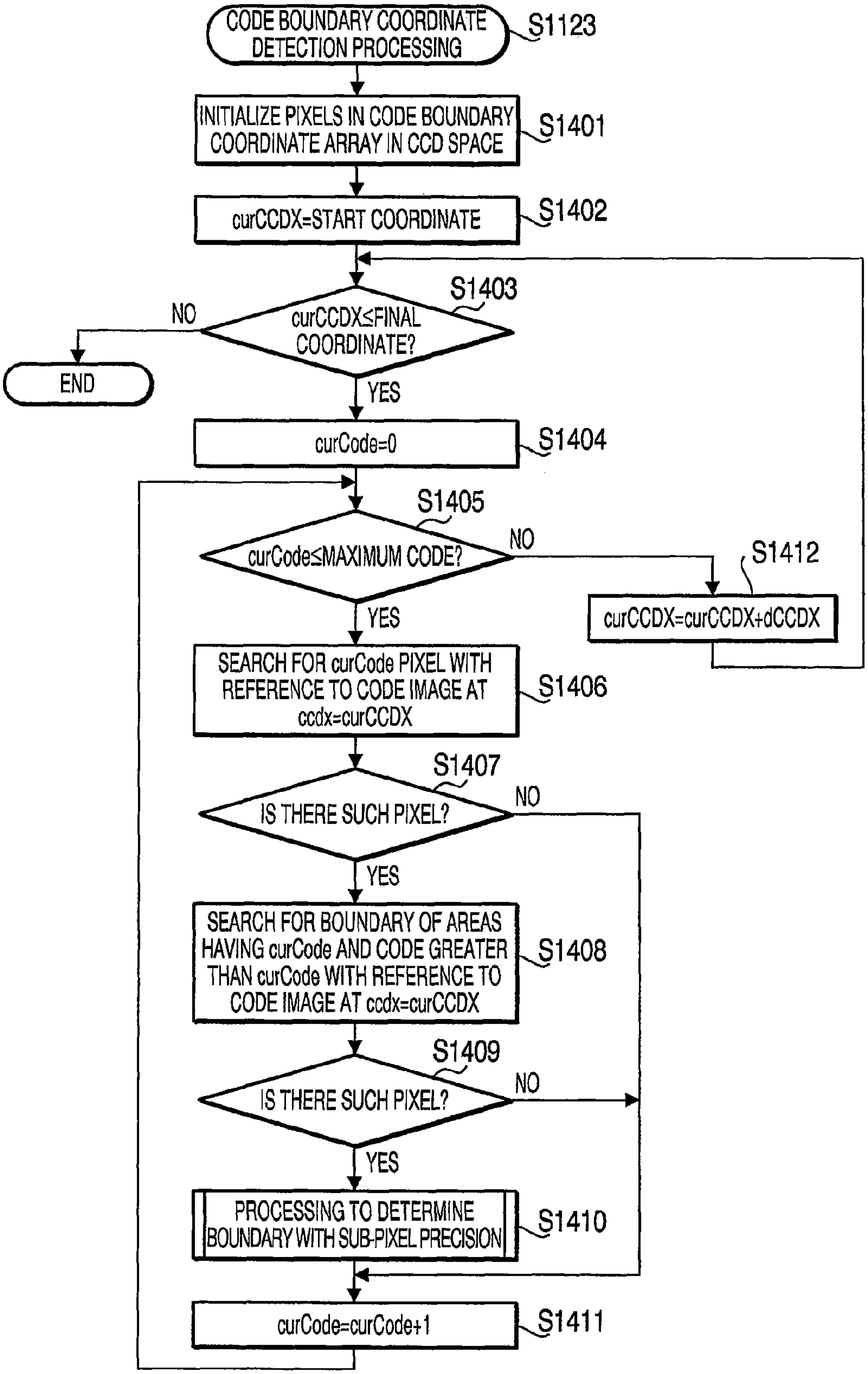

FIG. 14 is a flow chart of the code boundary coordinate detection processing.

Figure 15:
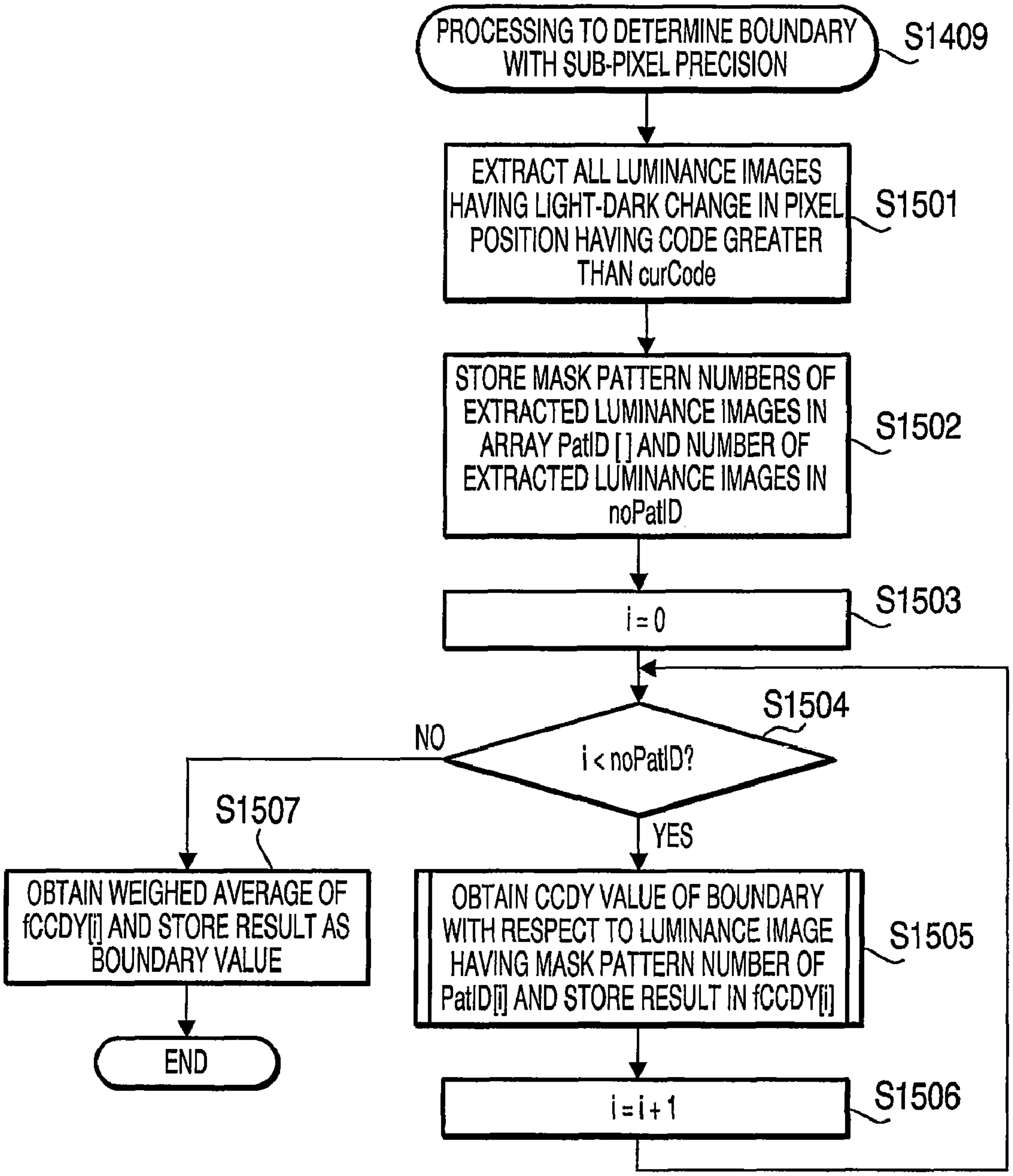

FIG. 15 is a flow chart of processing for obtaining a code boundary coordinate with sub-pixel precision.

Figure 16:
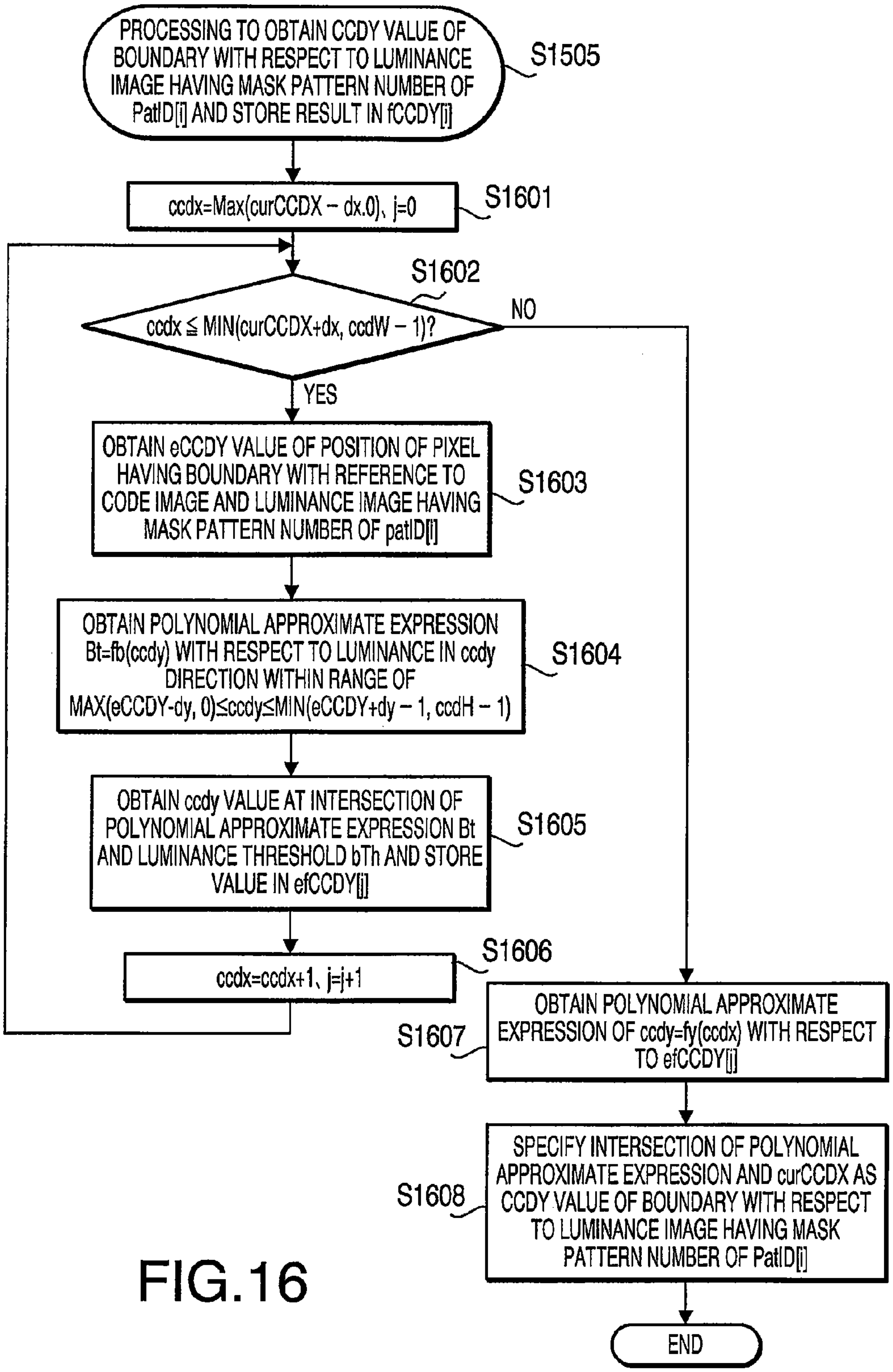

FIG. 16 is a flow chart of processing for obtaining the CCDY value of the boundary with respect to a luminance image having a mask pattern number of PatID[i].

Figure 17:
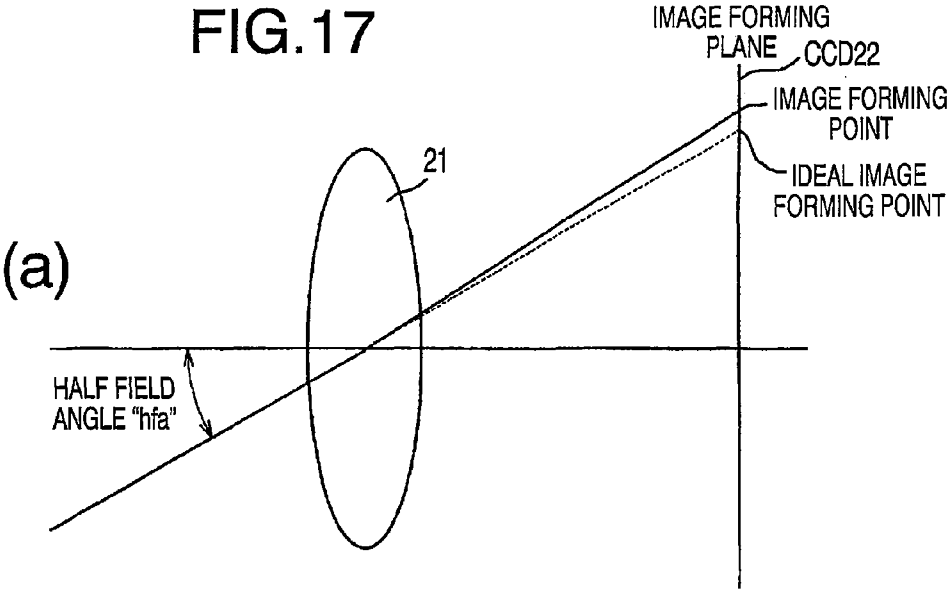
Figure 17:
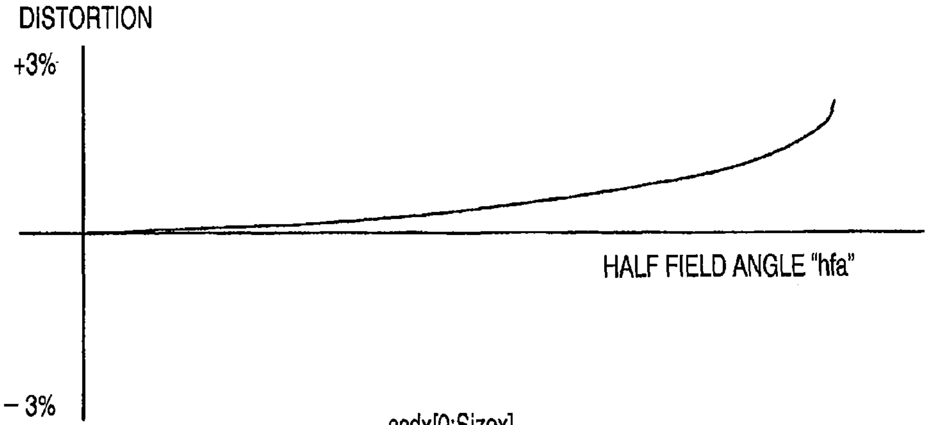
Figure 17:
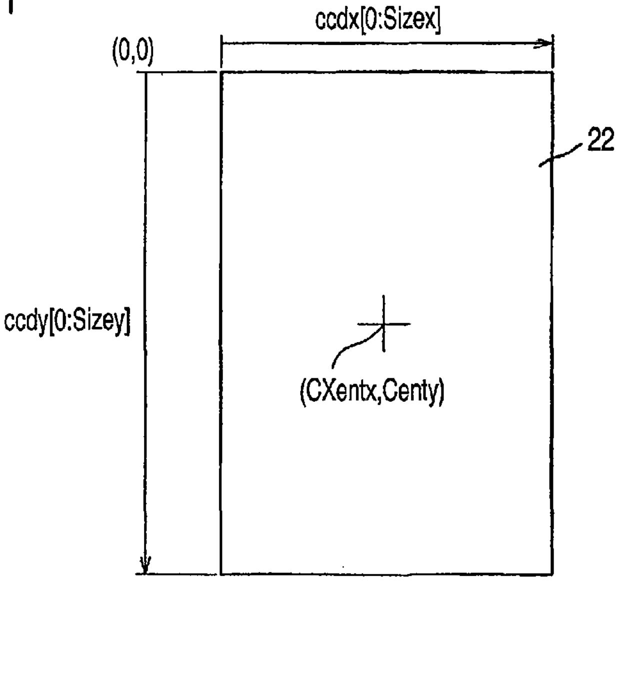

FIGS. 17(*a*) to 17(*c*) are views illustrating lens aberration correction processing.

Figure 18:
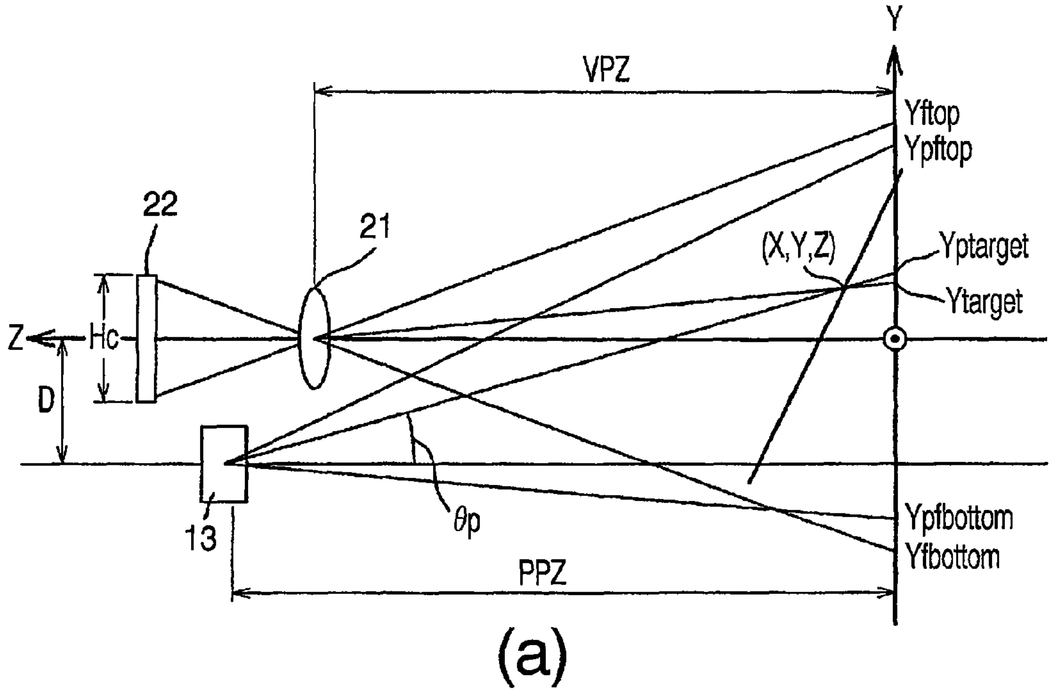
Figure 18:
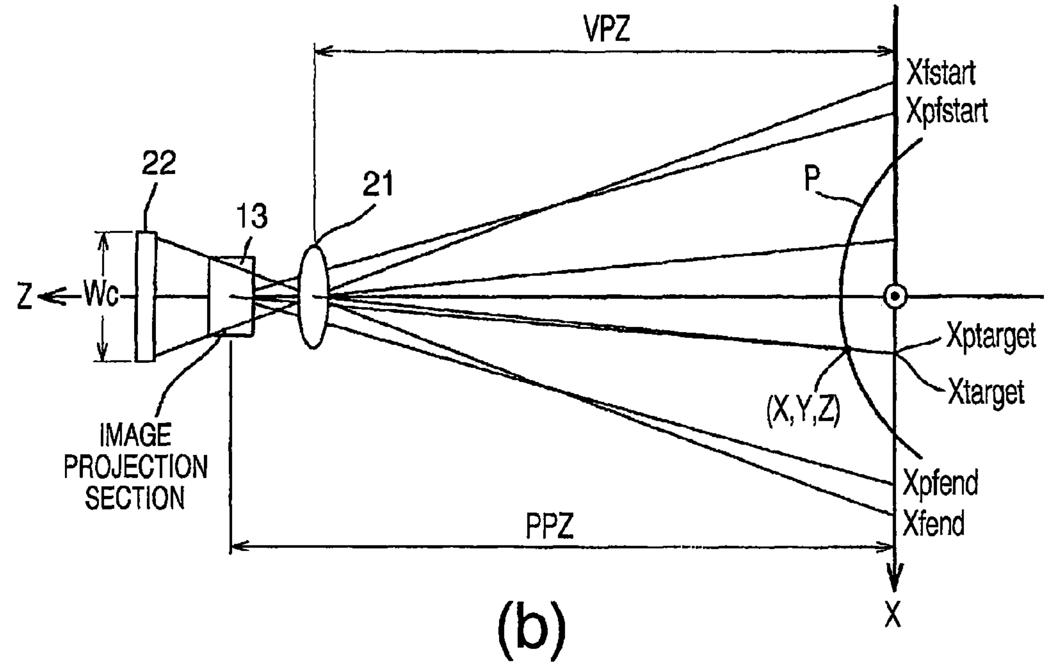

FIGS. 18(*a*) and 18(*b*) are views illustrating a method of calculating three-dimensional coordinates in a three-dimensional space from coordinates in the CCD space.

Figure 19:
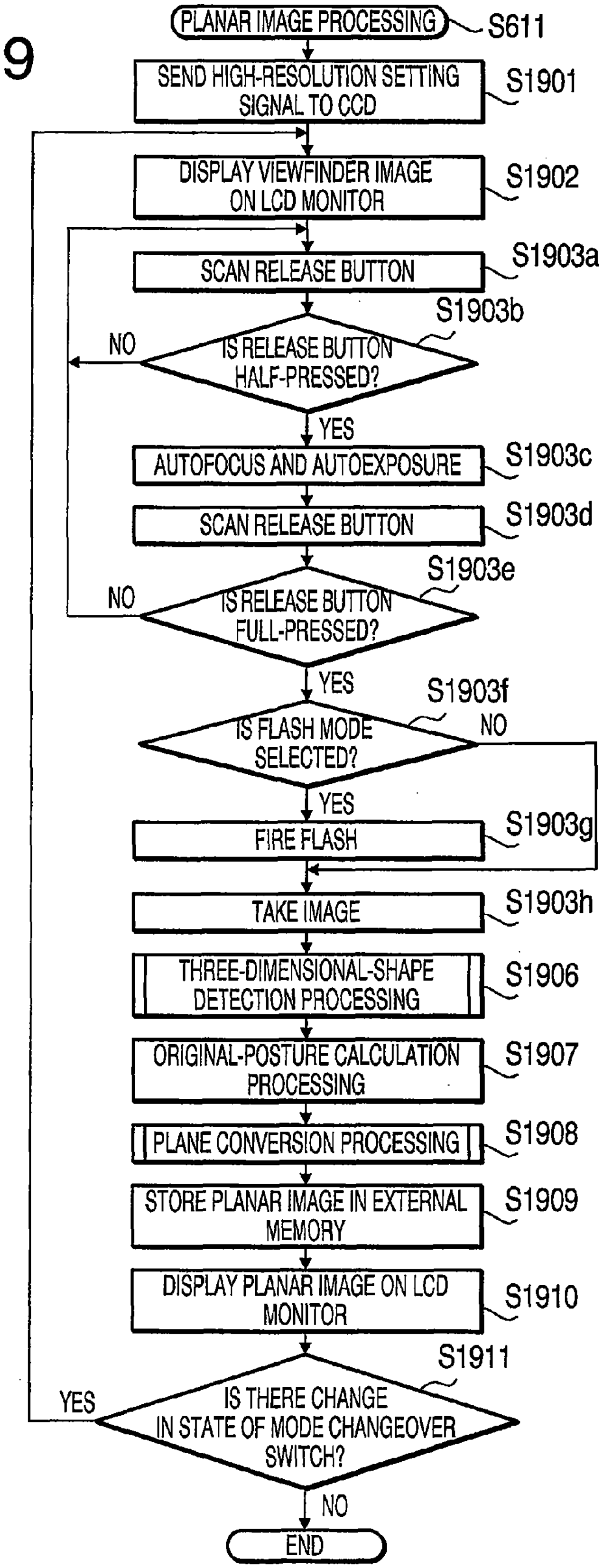

FIG. 19 is a flow chart of planar image processing.

Figure 20:
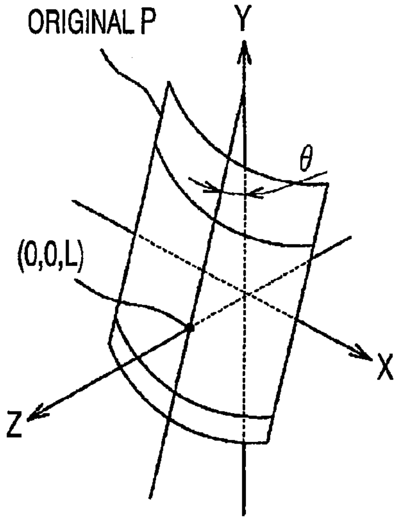
Figure 20:
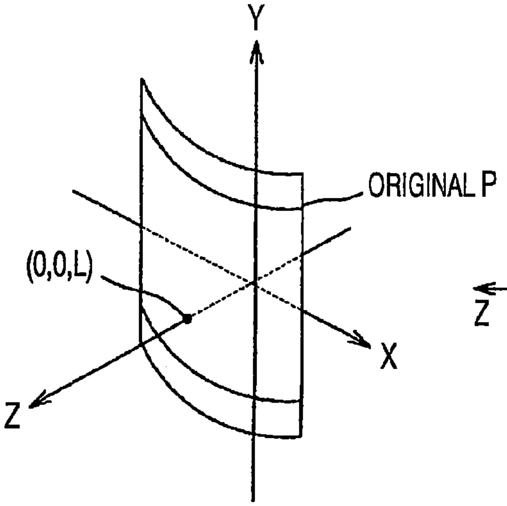
Figure 20:
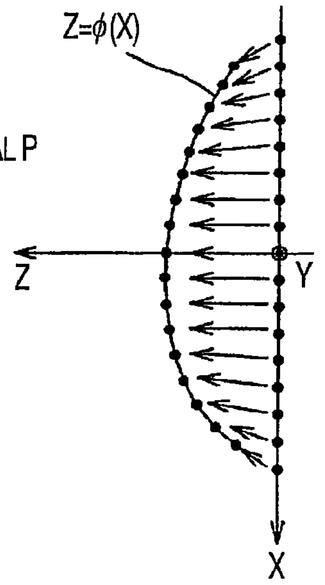

FIGS. 20(*a*) to 20(*c*) are views illustrating original-posture calculation processing.

Figure 21:
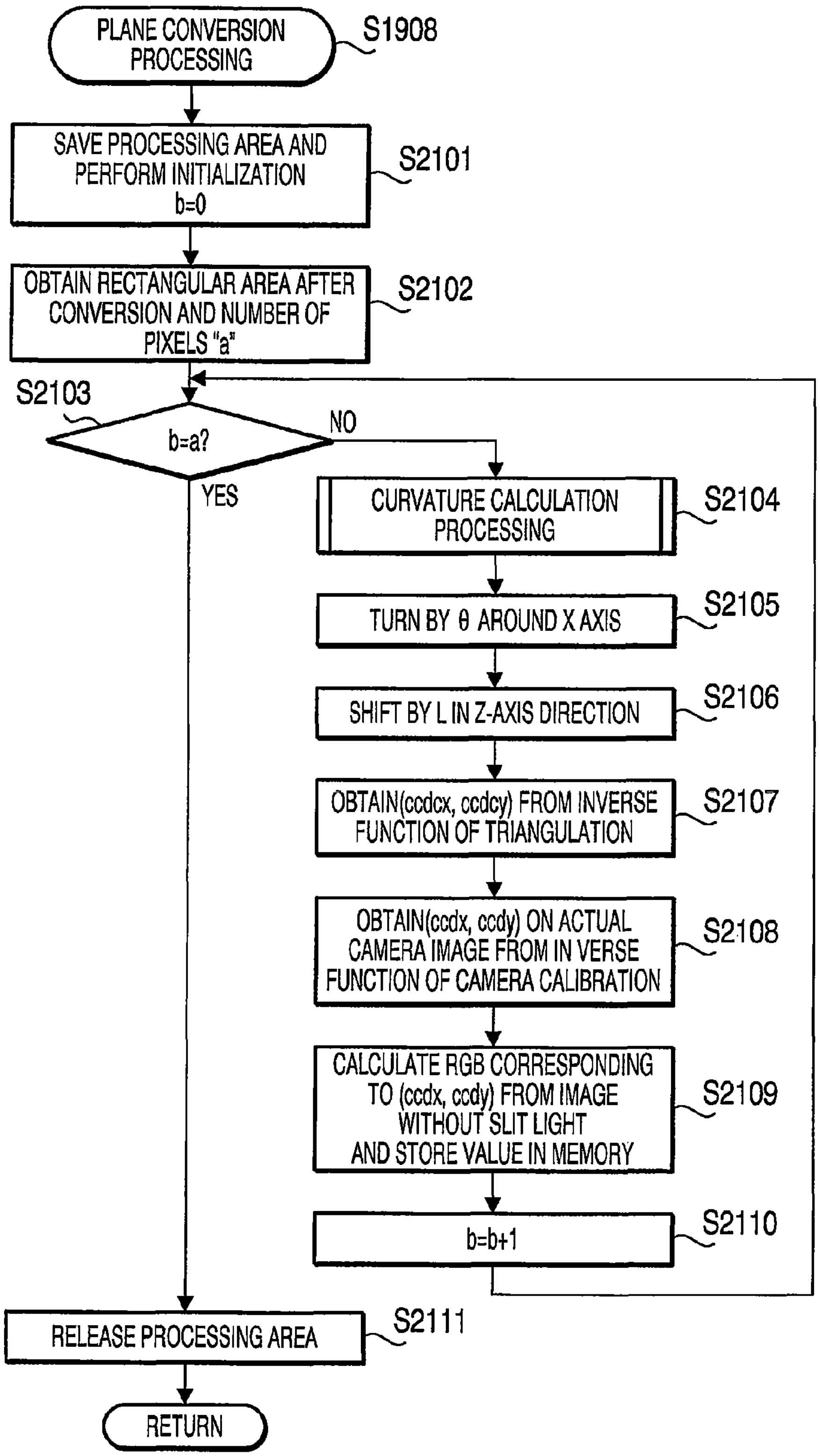

FIG. 21 is a flow chart of plane conversion processing.

Figure 22:
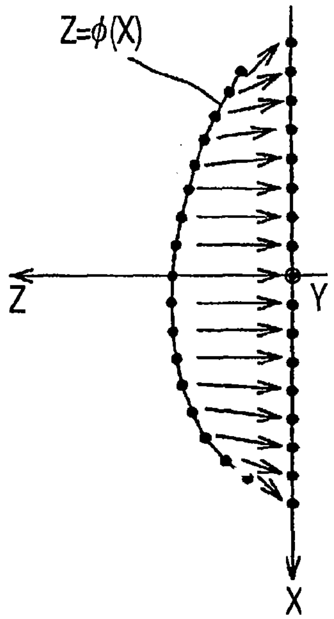
Figure 22:
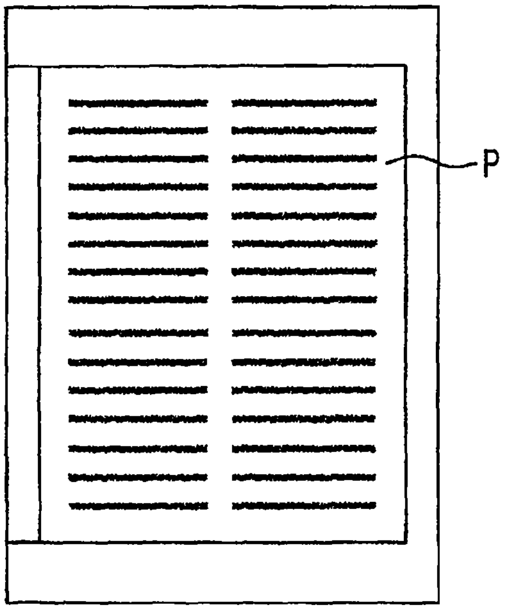

FIG. 22(*a*) is a view illustrating an overview of curvature calculation processing, and FIG. 22(*b*) is a view illustrating a planar image formed by the plane conversion processing.

Figure 23:
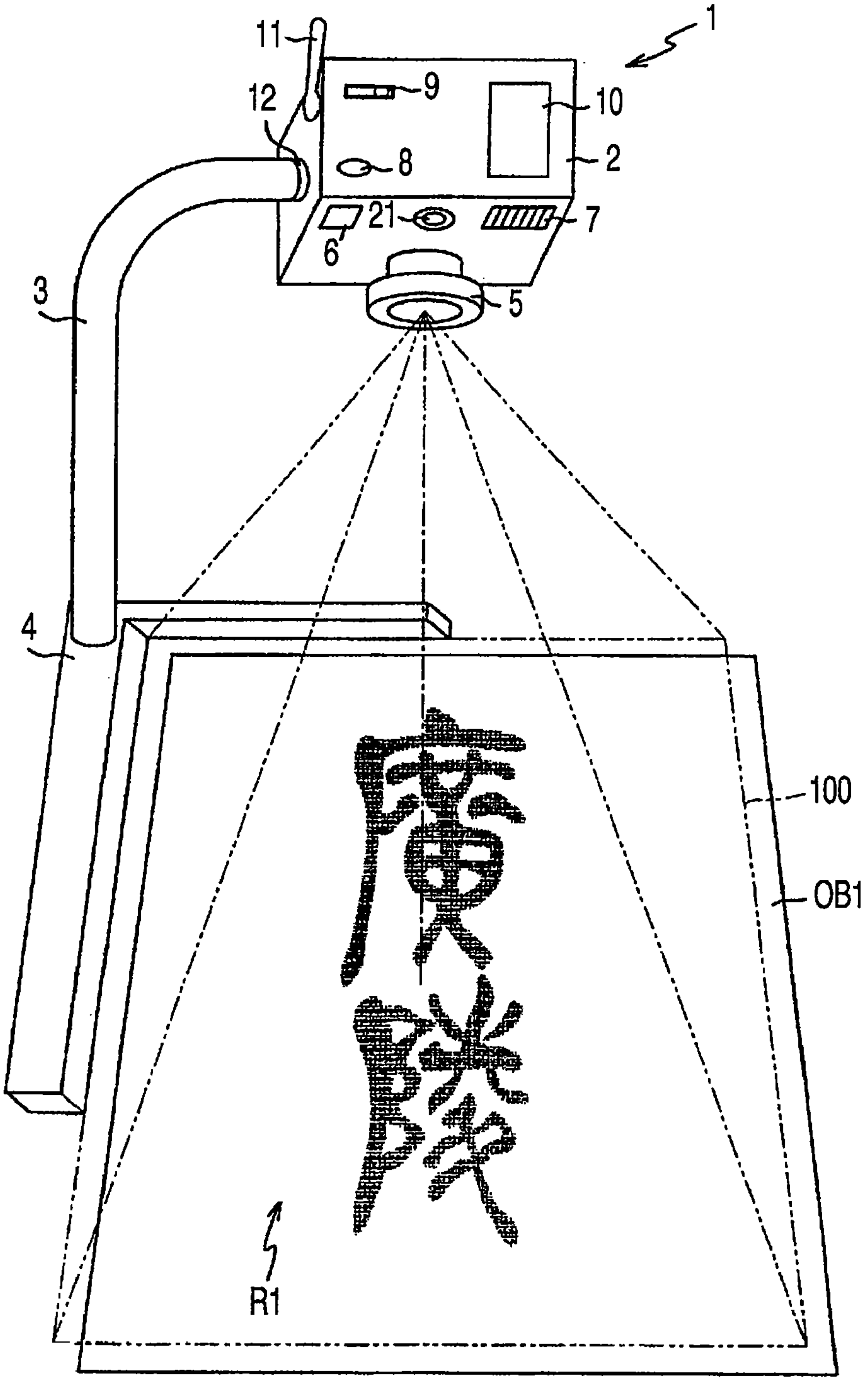

FIG. 23 is a view for explaining a first case in a model trace mode.

Figure 24:
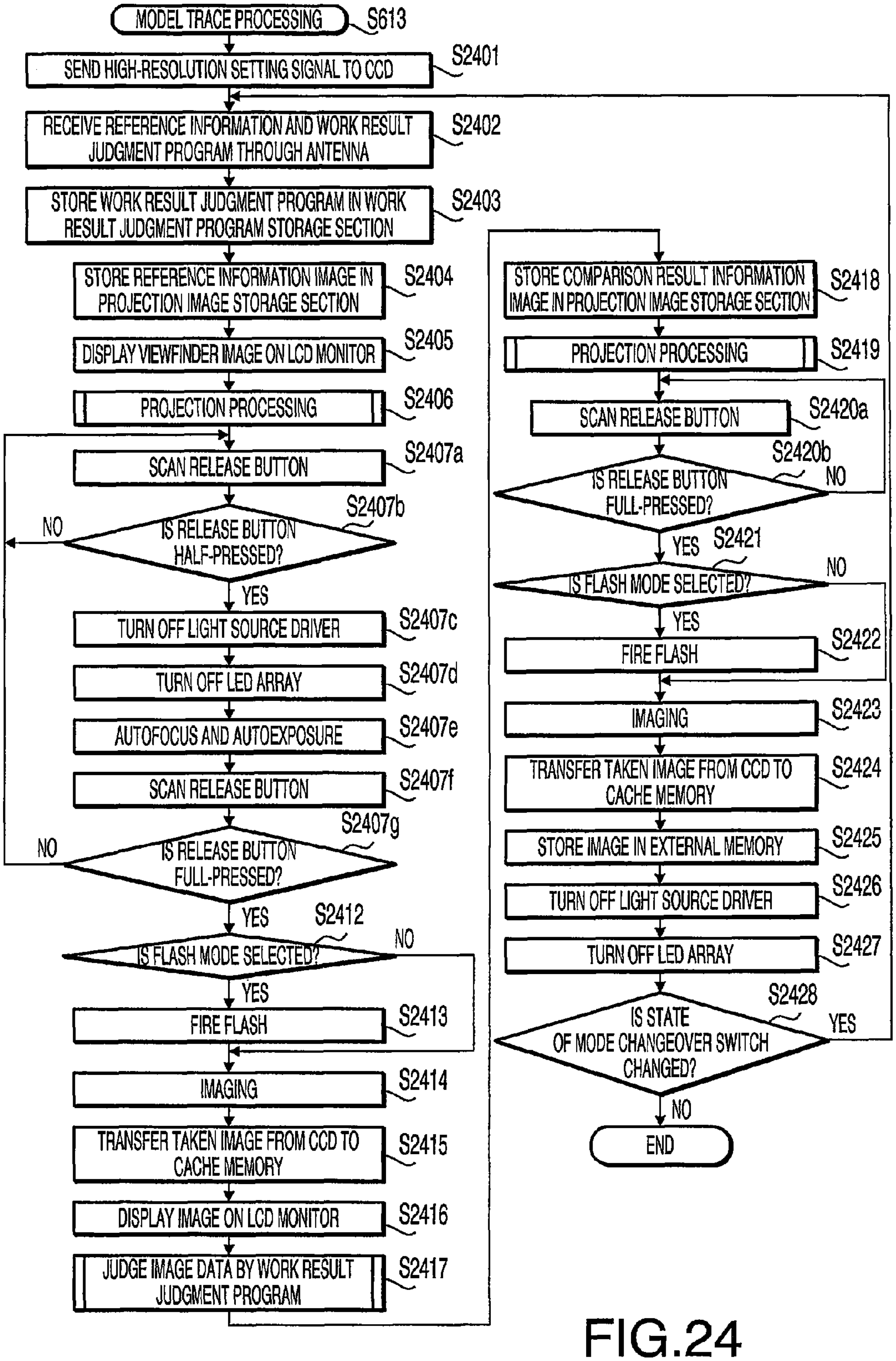

FIG. 24 is a flow chart of model trace processing.

Figure 25:
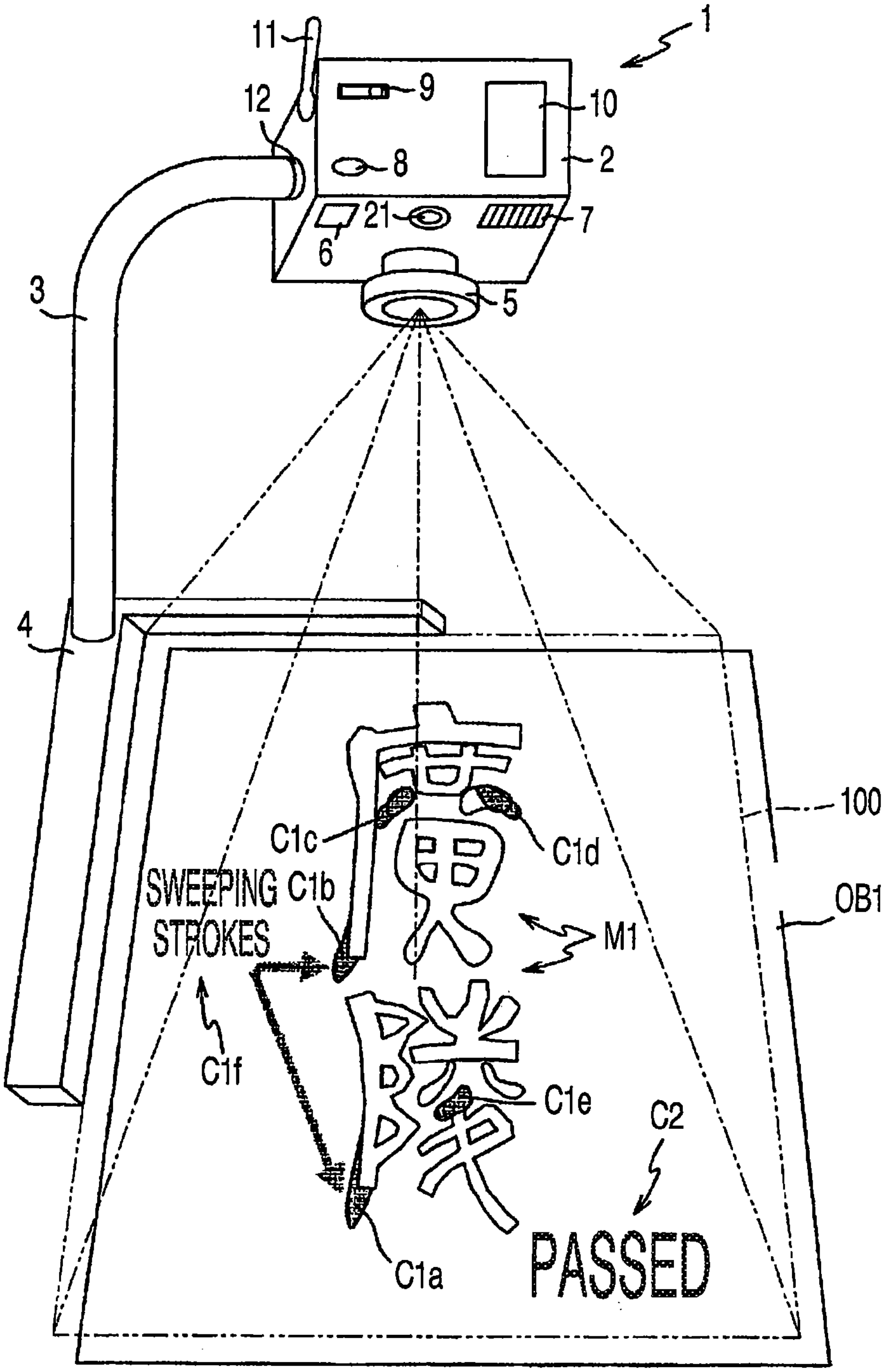

FIG. 25 is a view for explaining a state in which a comparison-result-information image is projected in the model trace processing.

Figure 26:
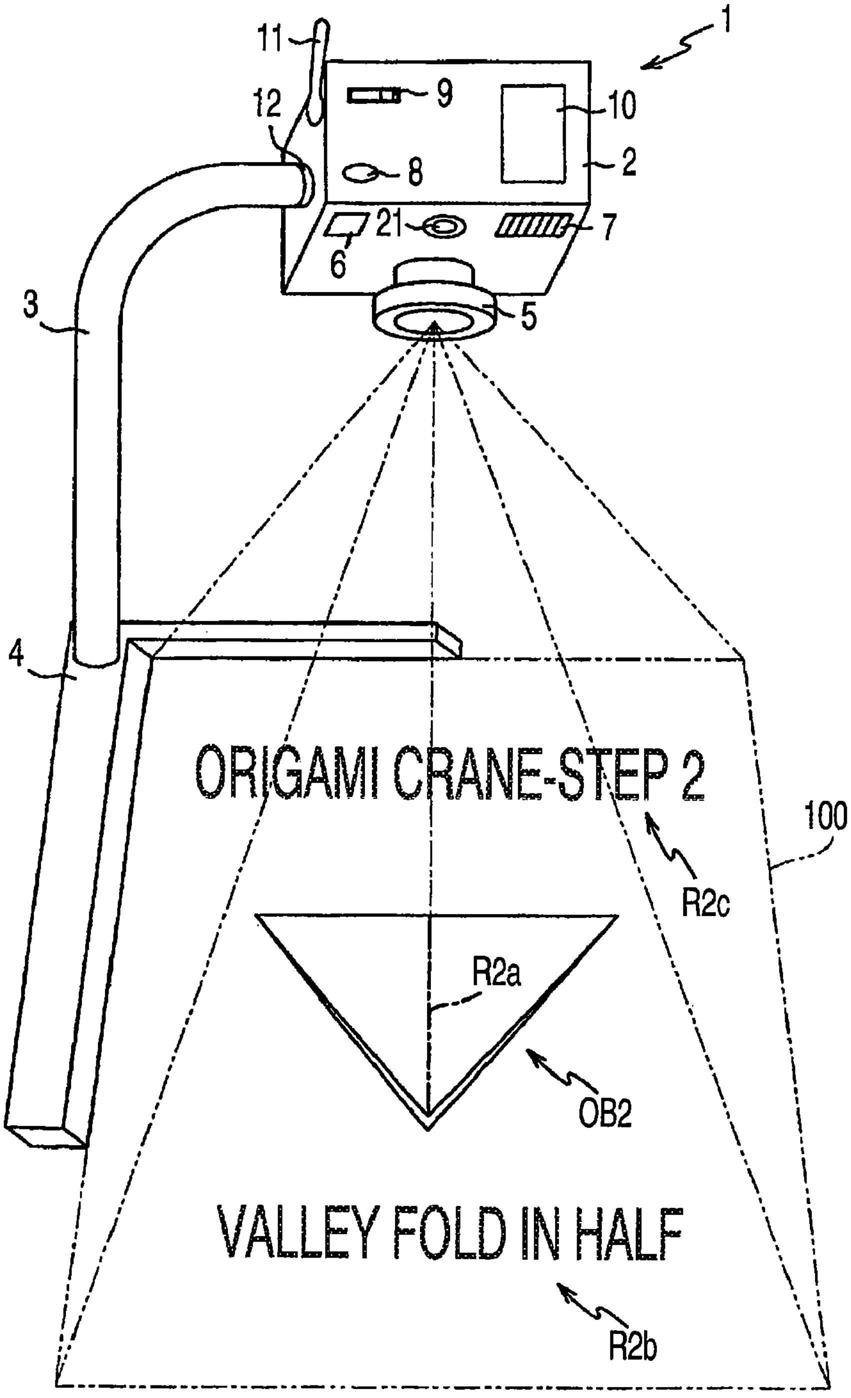

FIG. 26 is a view for explaining a second case in the model trace mode.

Figure 27:
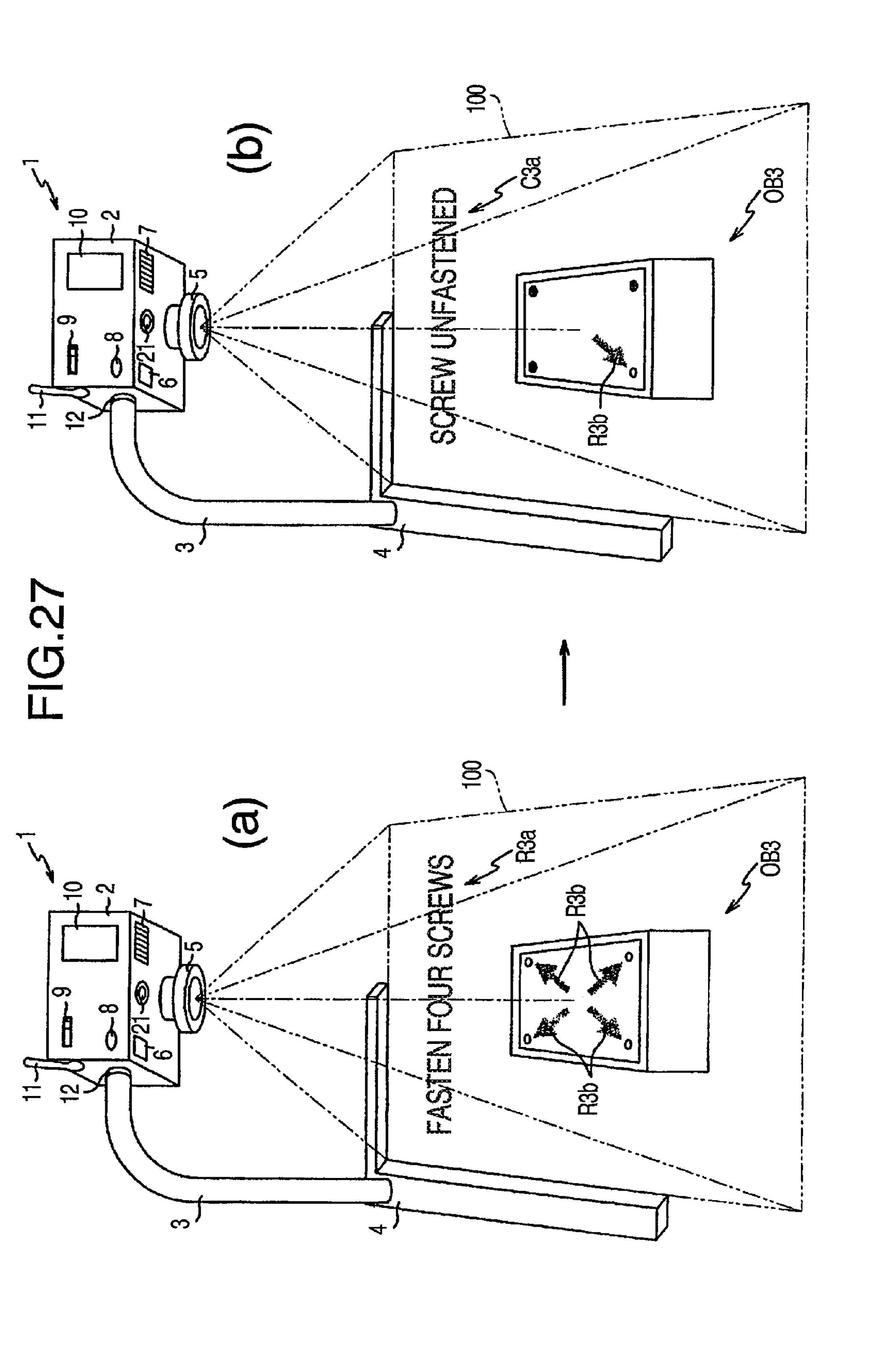

FIG. 27 is a view for explaining a third case in the model trace mode, and shows a state in which the model trace mode is applied to work of putting a lid on a box-shaped body and screwing the lid. FIG. 27(*a*) is a view in which a reference information image projected before the work, and FIG. 27(*b*) is a view in which a comparison-result-information image is projected after the work.

Figure 28:
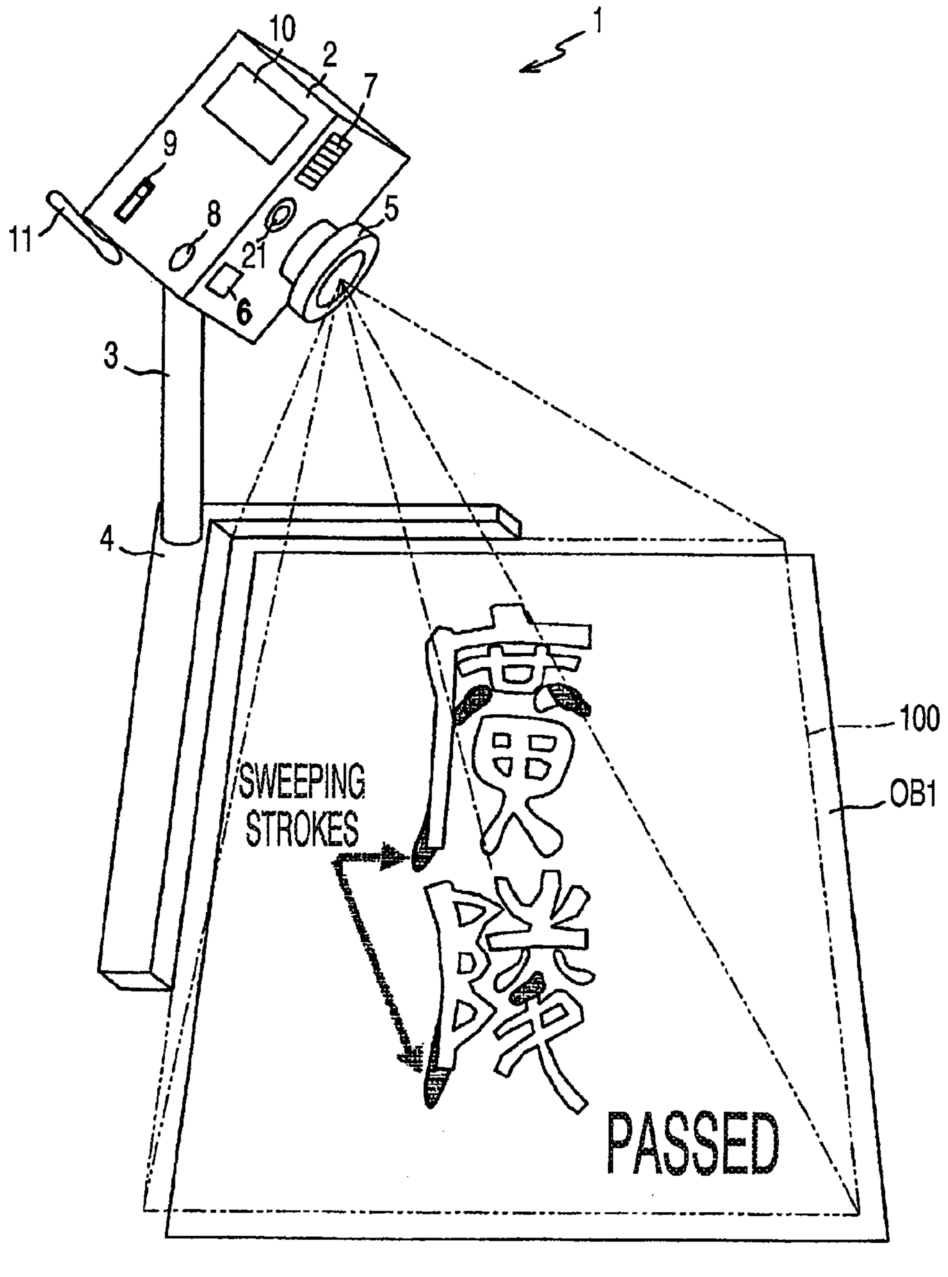

FIG. 28 is a view showing a state in which an arm member is bent so that the image input-and-output apparatus takes an image of an object from the left in the front, in the first case of the model trace mode.

Figure 29:
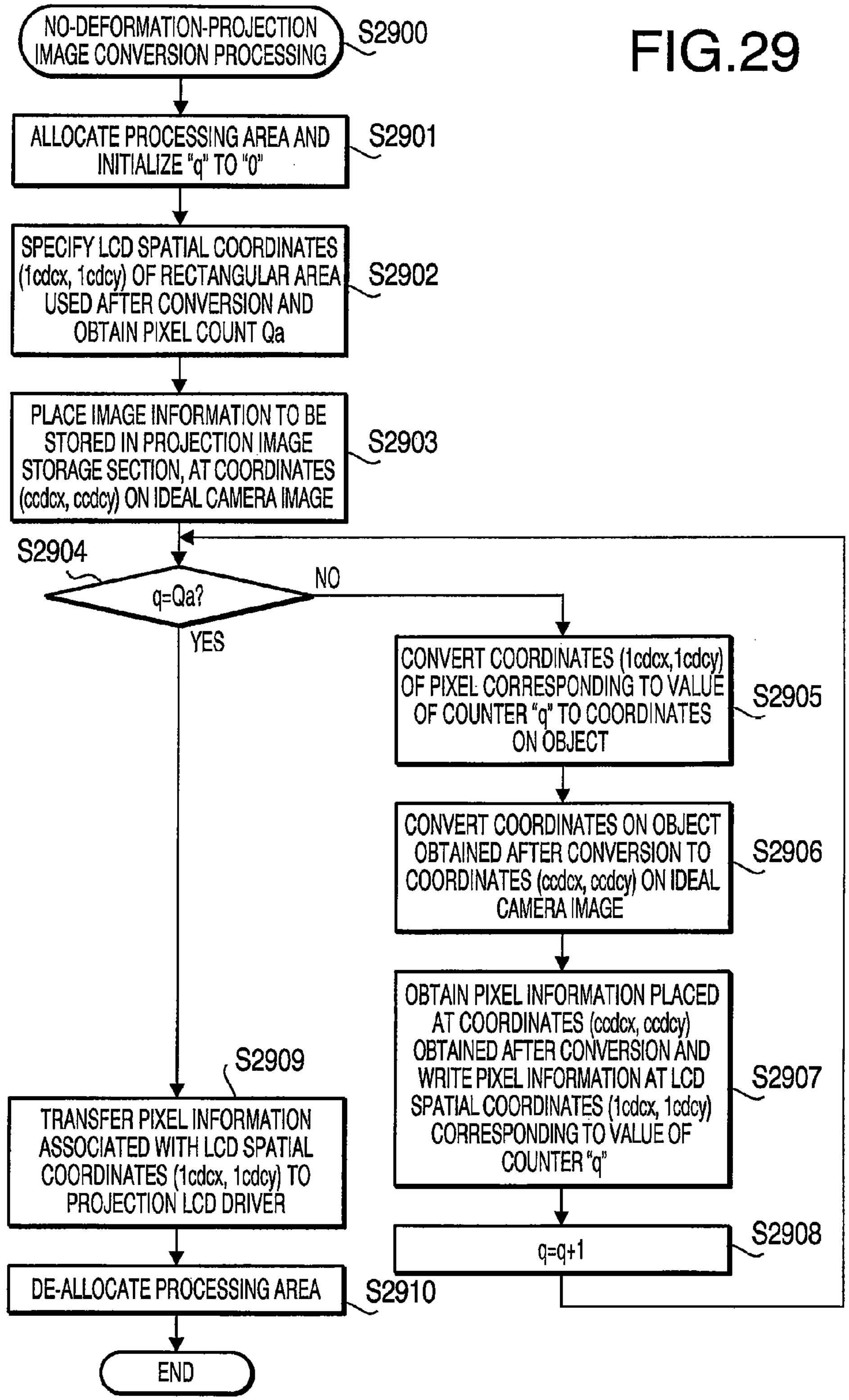

FIG. 29 is a flow chart of no-deformation-projection image conversion processing.

Figure 30:
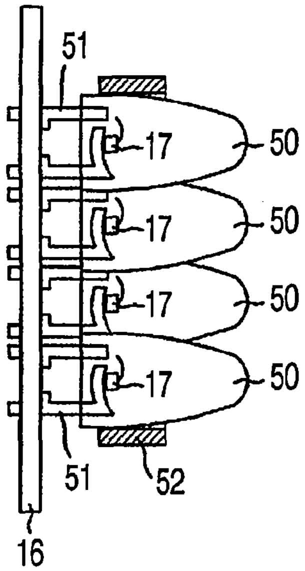
Figure 30:
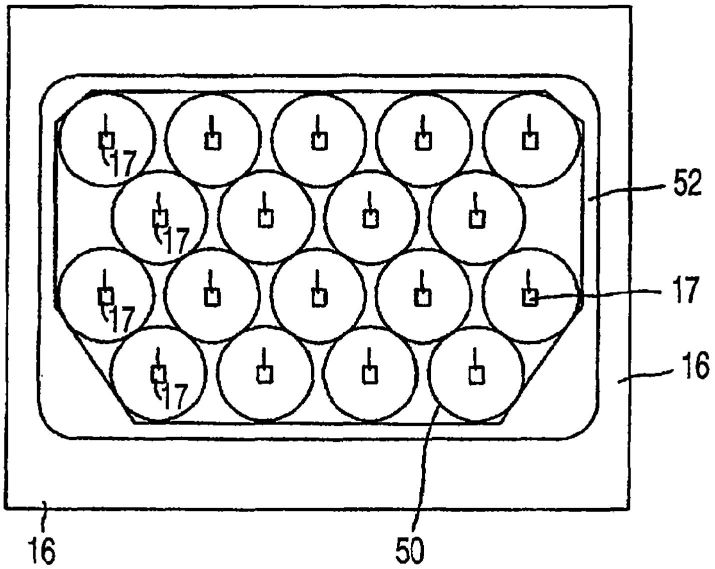

FIG. 30(*a*) is a side view showing light-source lenses 60 of a second example, and FIG. 30(*b*) is a plan view showing the light-source lenses 60 of the second example.

Figure 31:
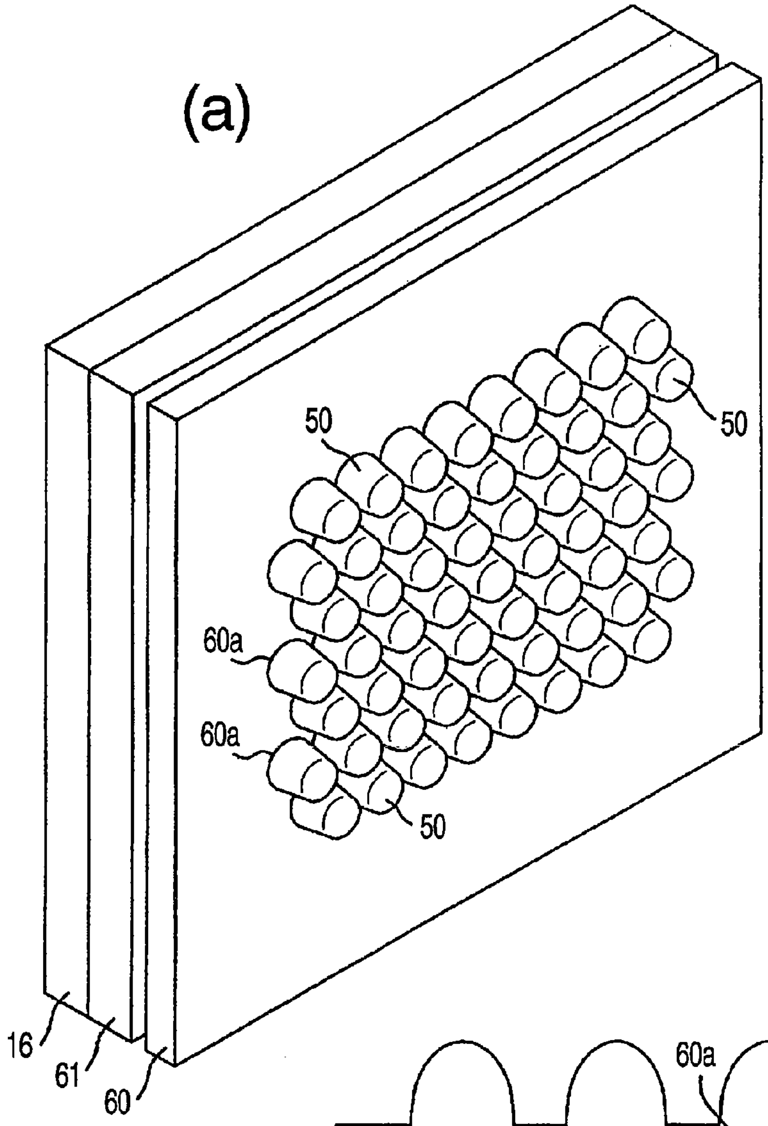
Figure 31:
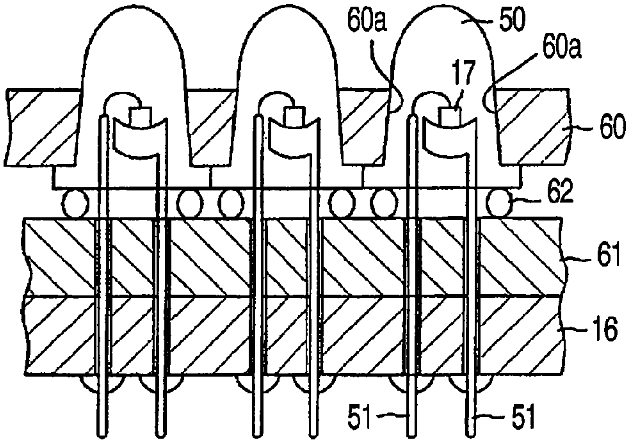

FIG. 31(*a*) is a perspective view showing a fixed state of light-source lenses 50, and FIG. 31(*b*) is a partial section view thereof.

Figure 32:
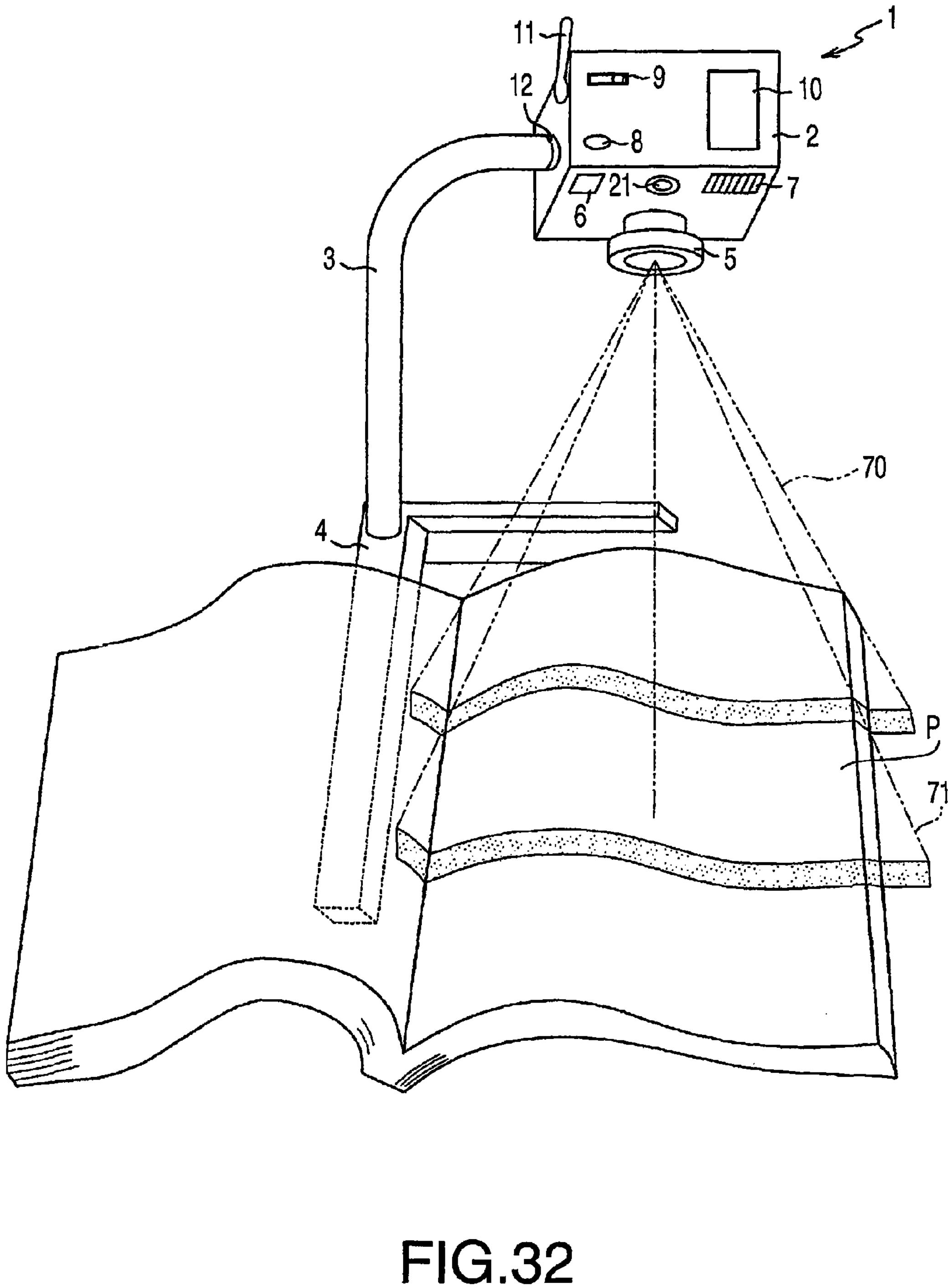

FIG. 32 is a view showing another example of pattern light projected to the object.

Figure 33:
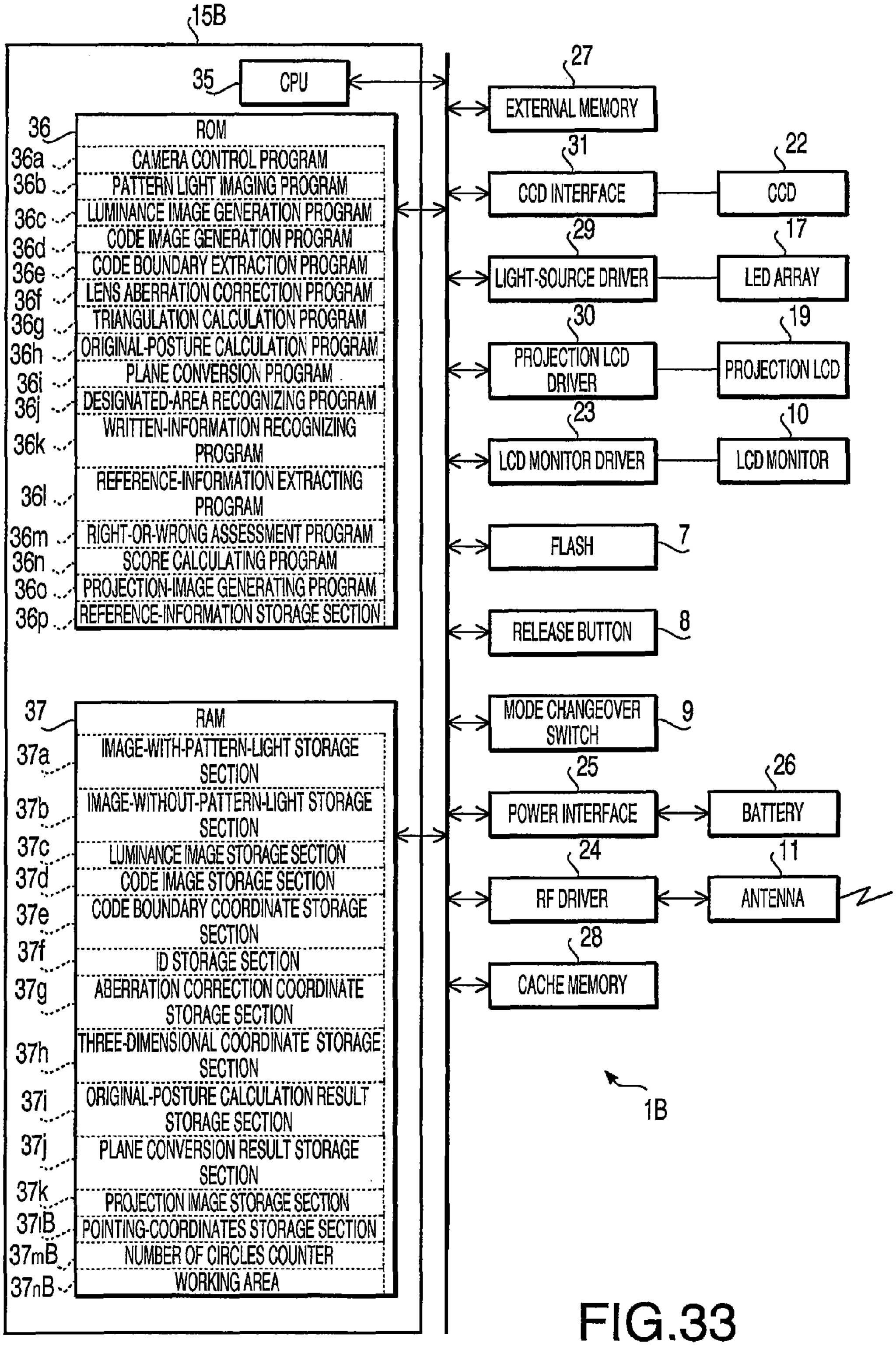

FIG. 33 is an electrical block diagram of an image input-and-output apparatus.

Figure 34:
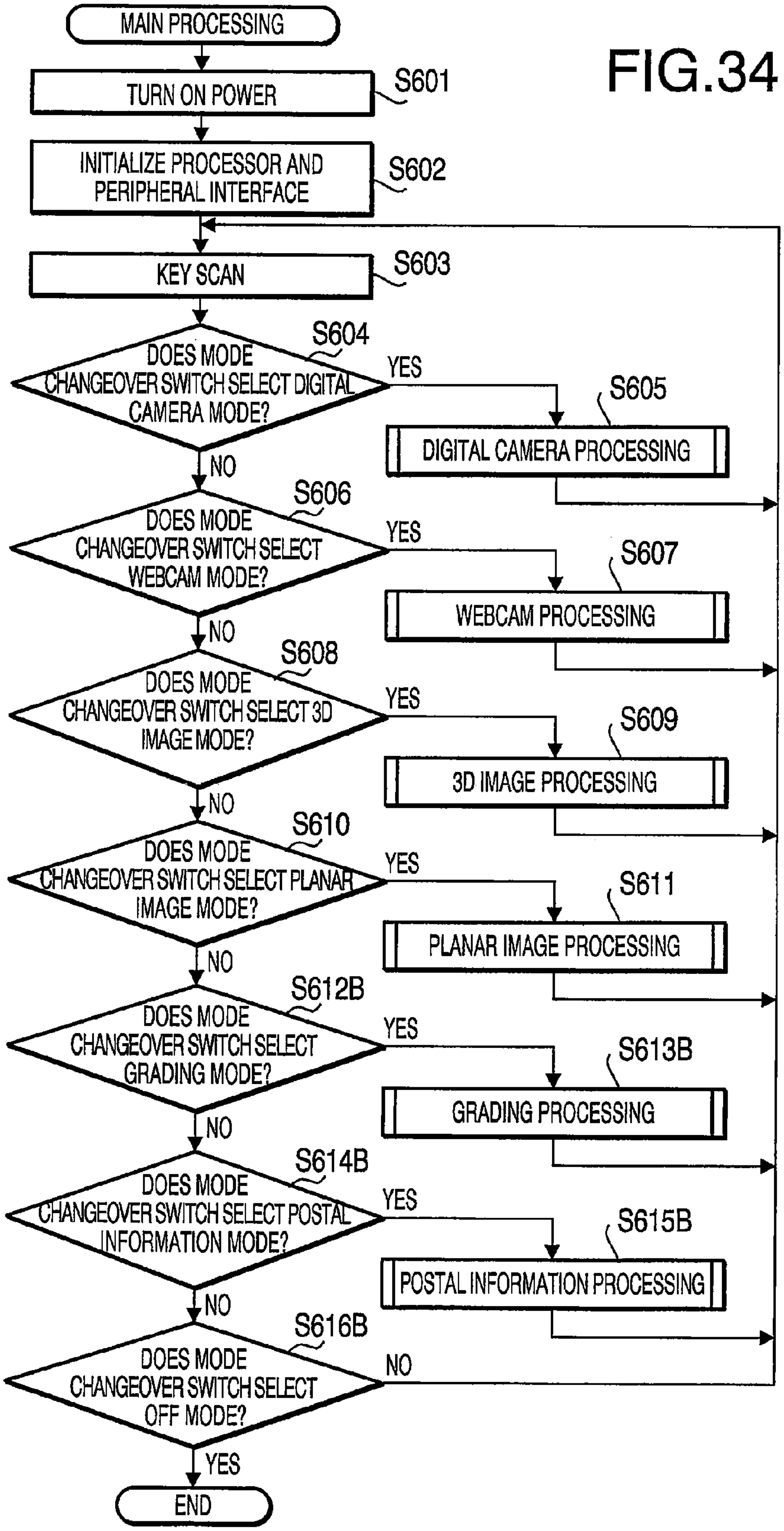

FIG. 34 is a flow chart of main processing.

Figure 35:
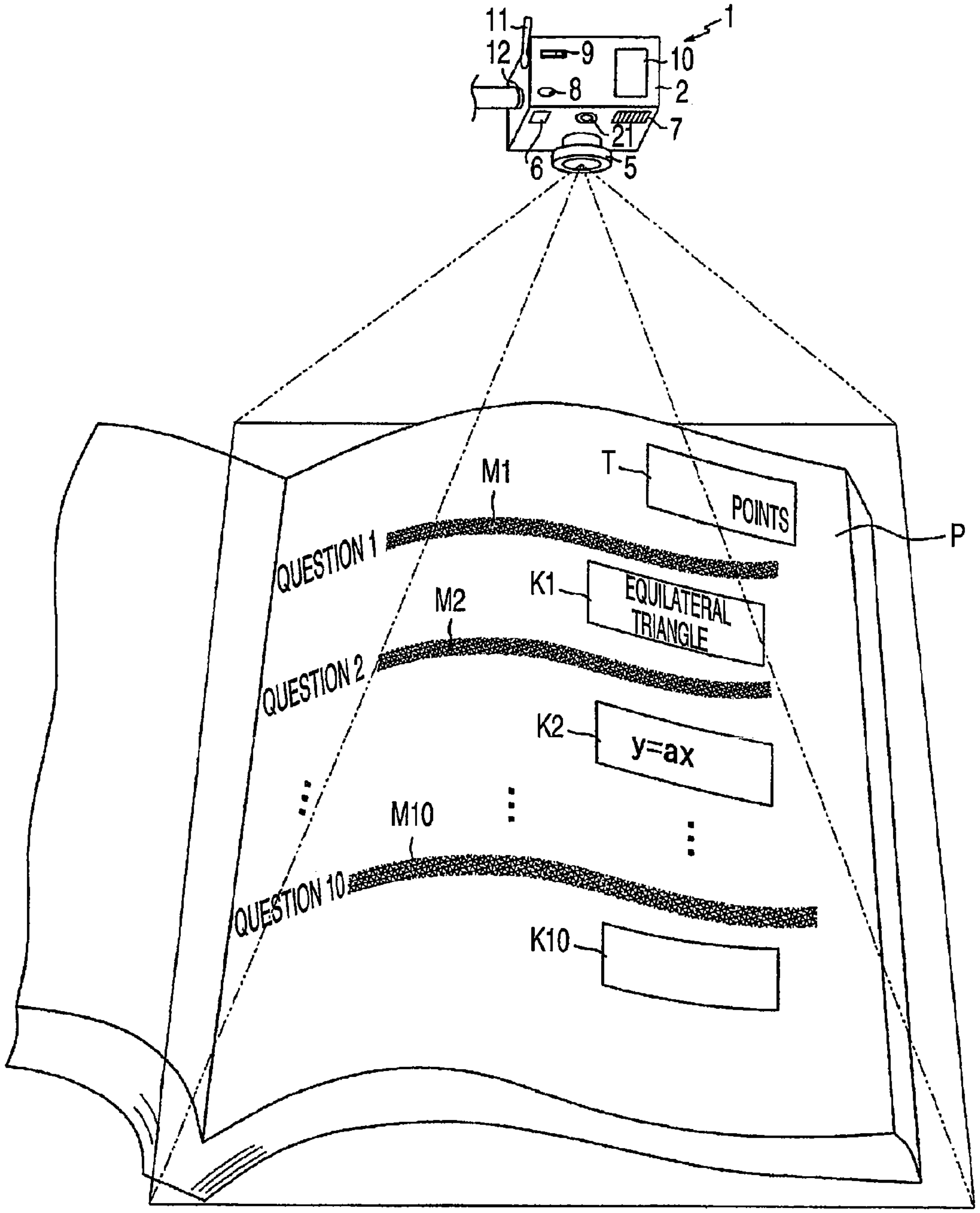

FIG. 35 is a view for explaining the layout of an answer sheet P.

Figure 36:
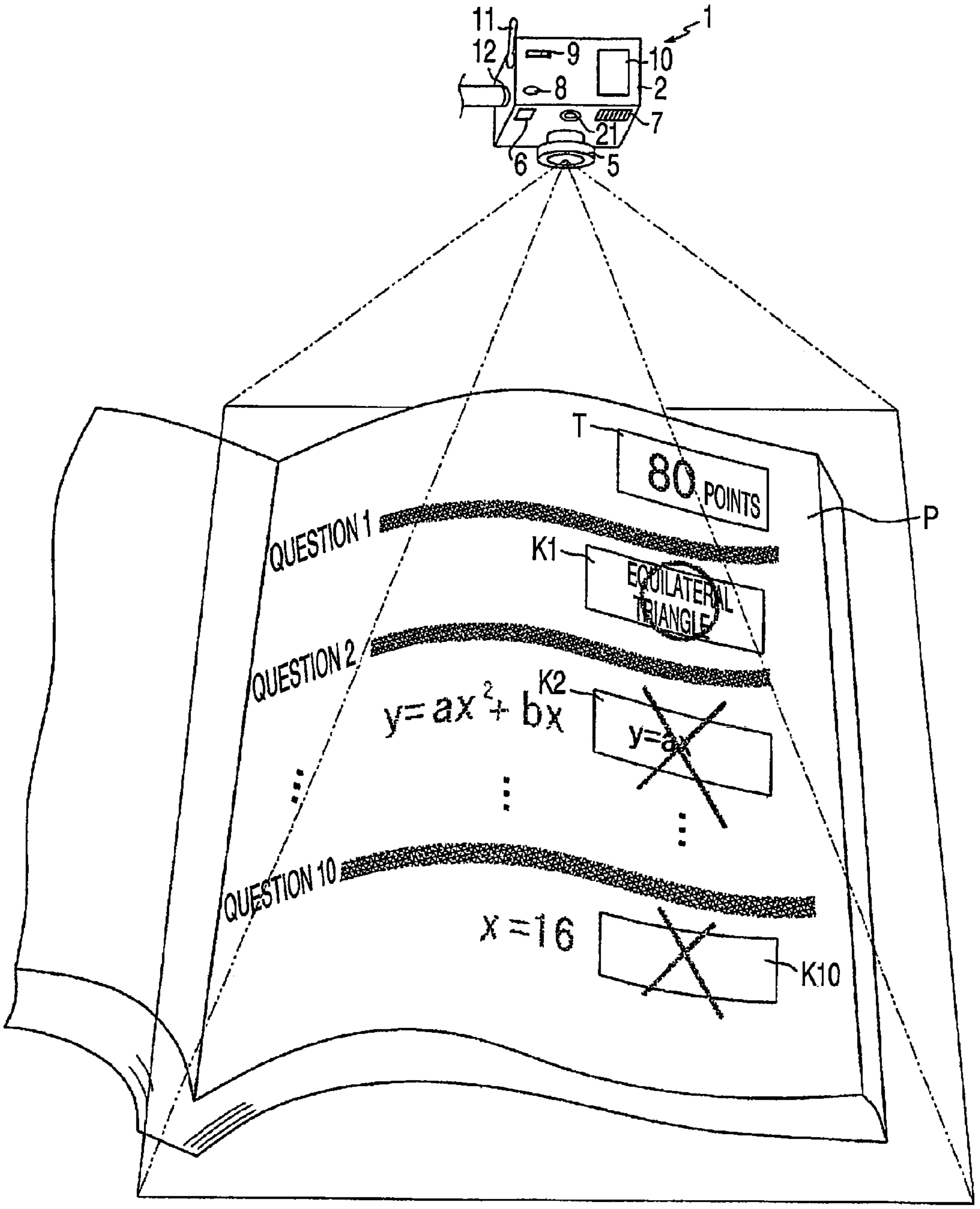

FIG. 36 is a view showing a state in which grading results and the like are projected in a grading mode.

Figure 37:
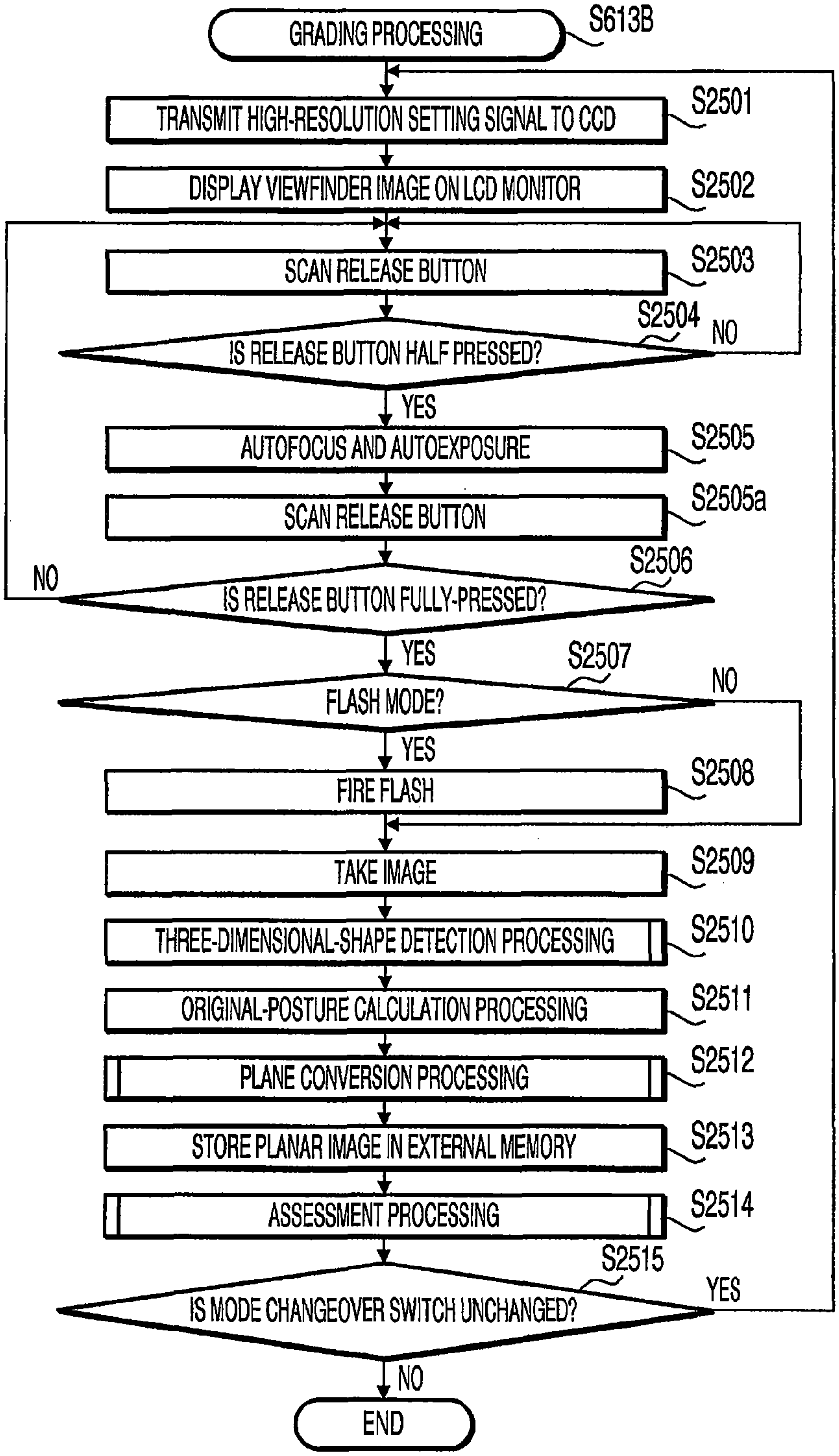

FIG. 37 is a flow chart of grading processing.

Figure 38:
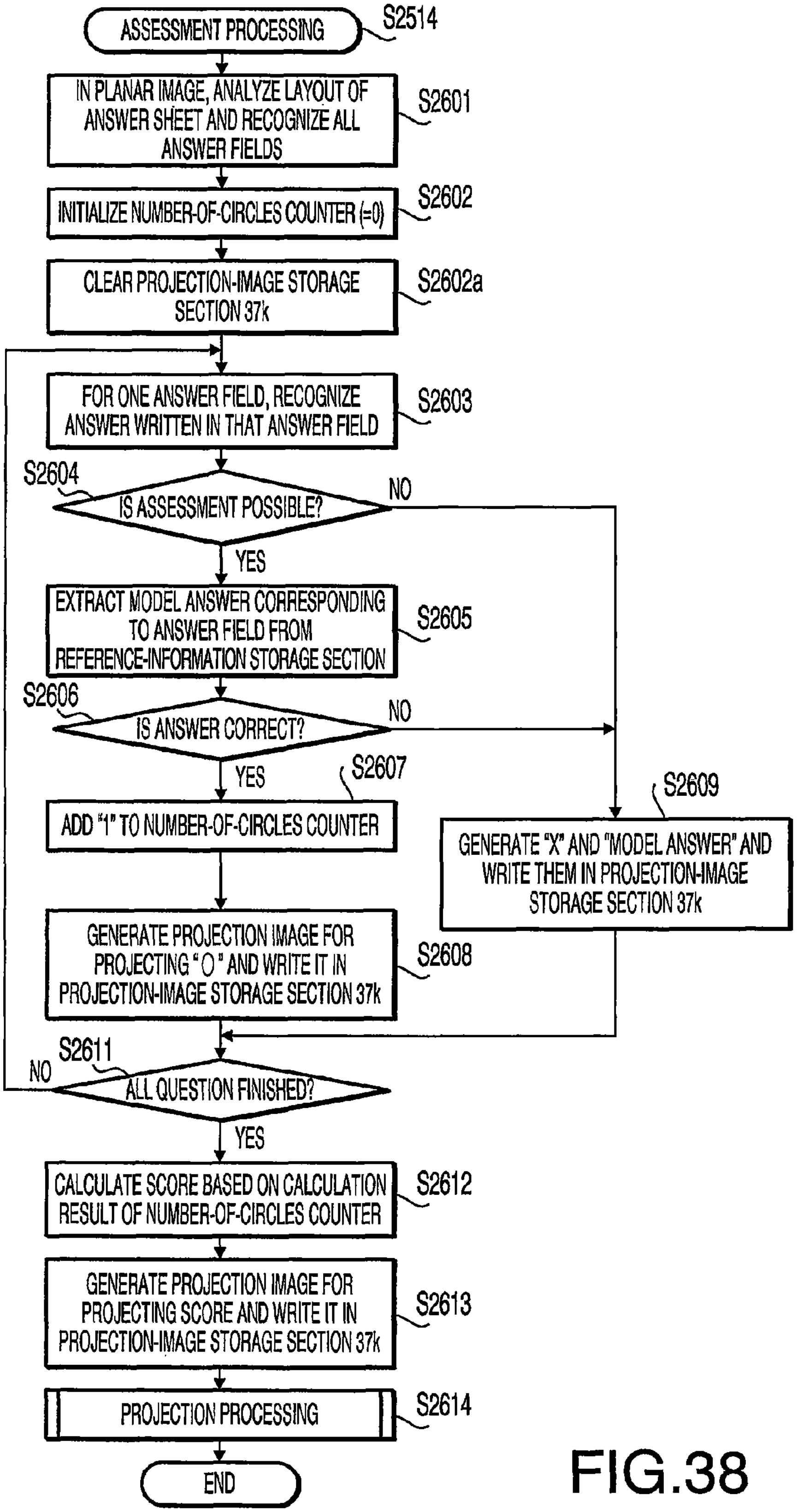

FIG. 38 is a flow chart of assessment processing.

Figure 39:
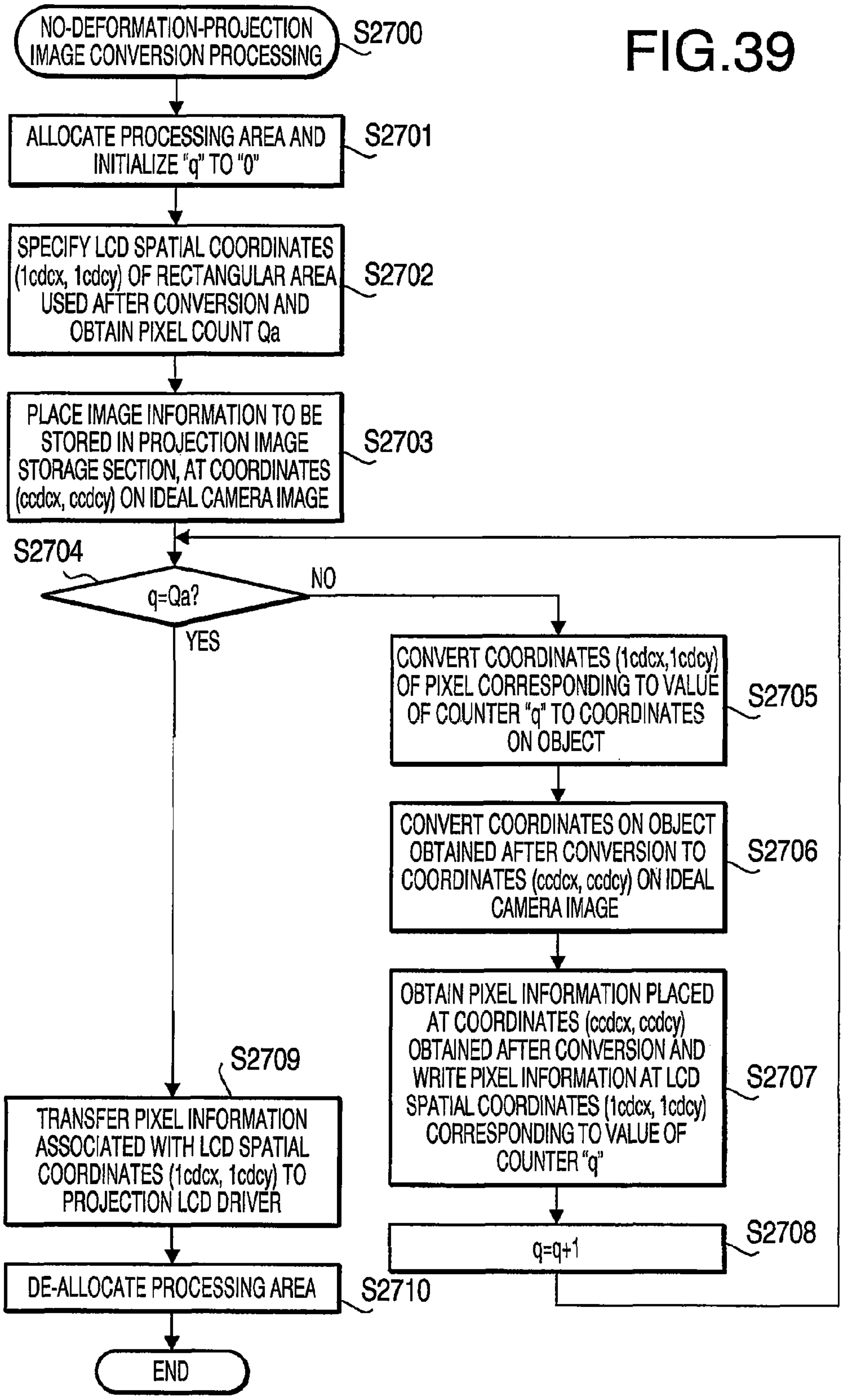

FIG. 39 is a flow chart of no-deformation-projection image conversion processing.

Figure 40:
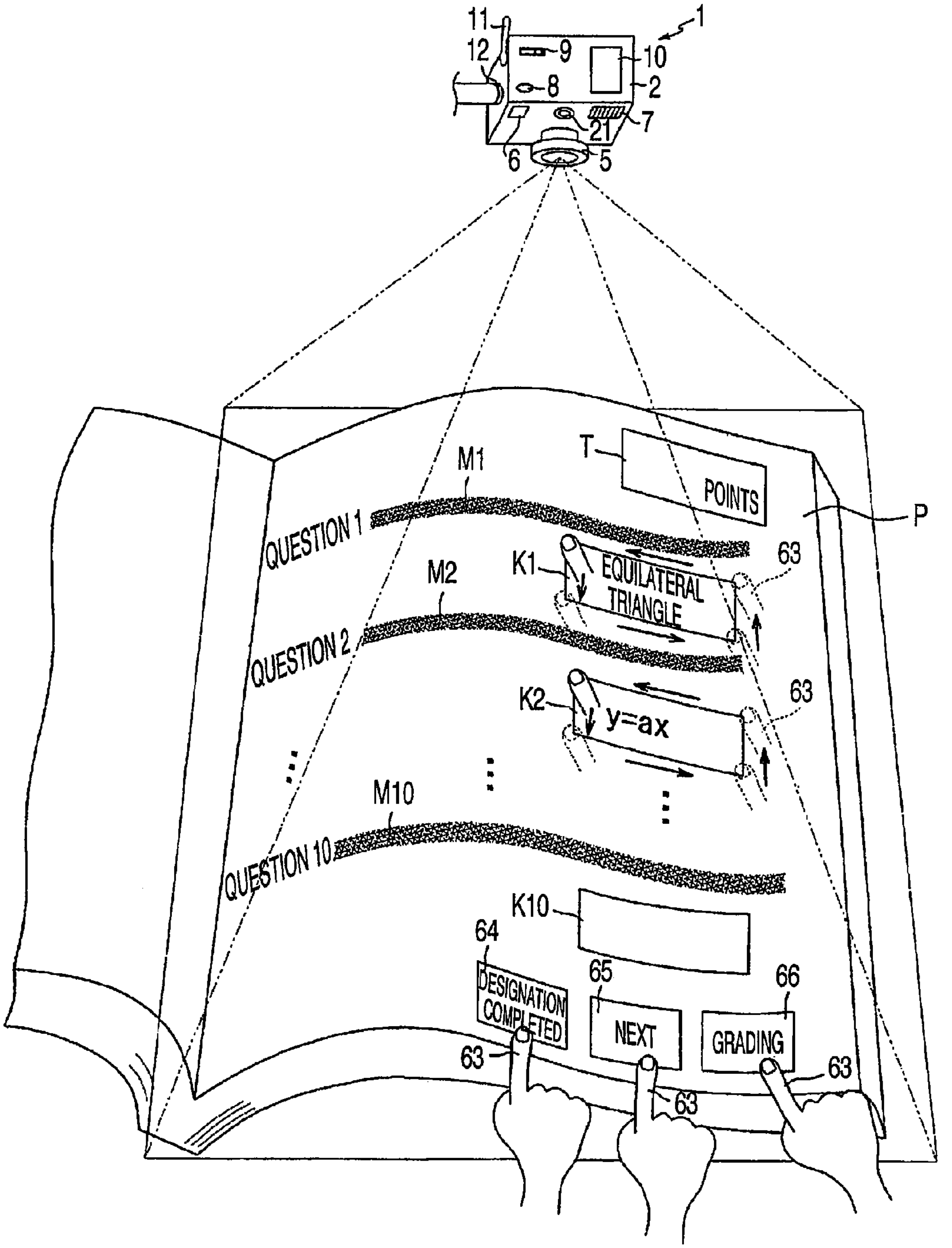

FIG. 40 is a view for explaining a user operation method in a postal information mode.

Figure 41:
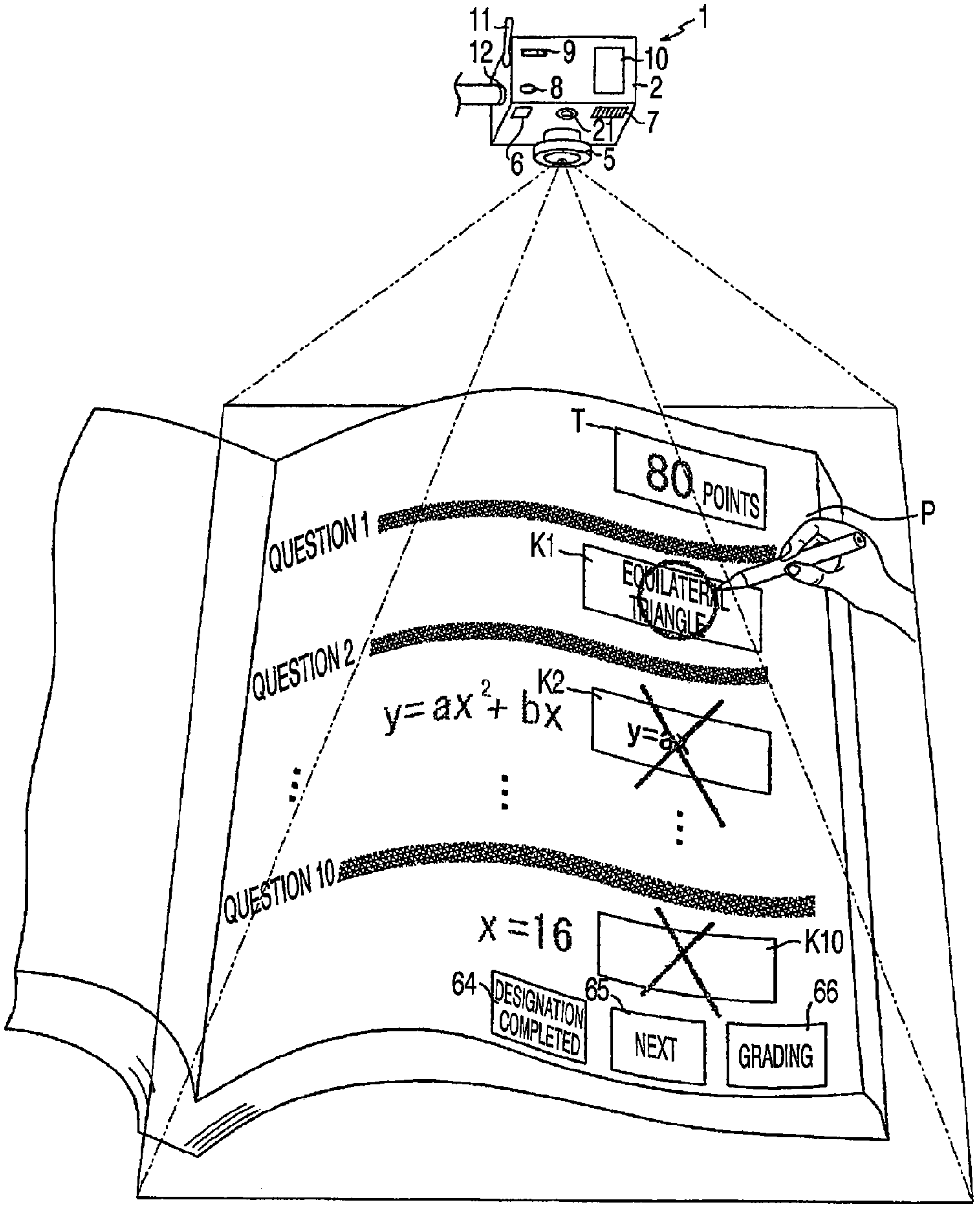

FIG. 41 is a view showing a state in which assessment results are projected in a second case of the grading mode.

Figure 42:
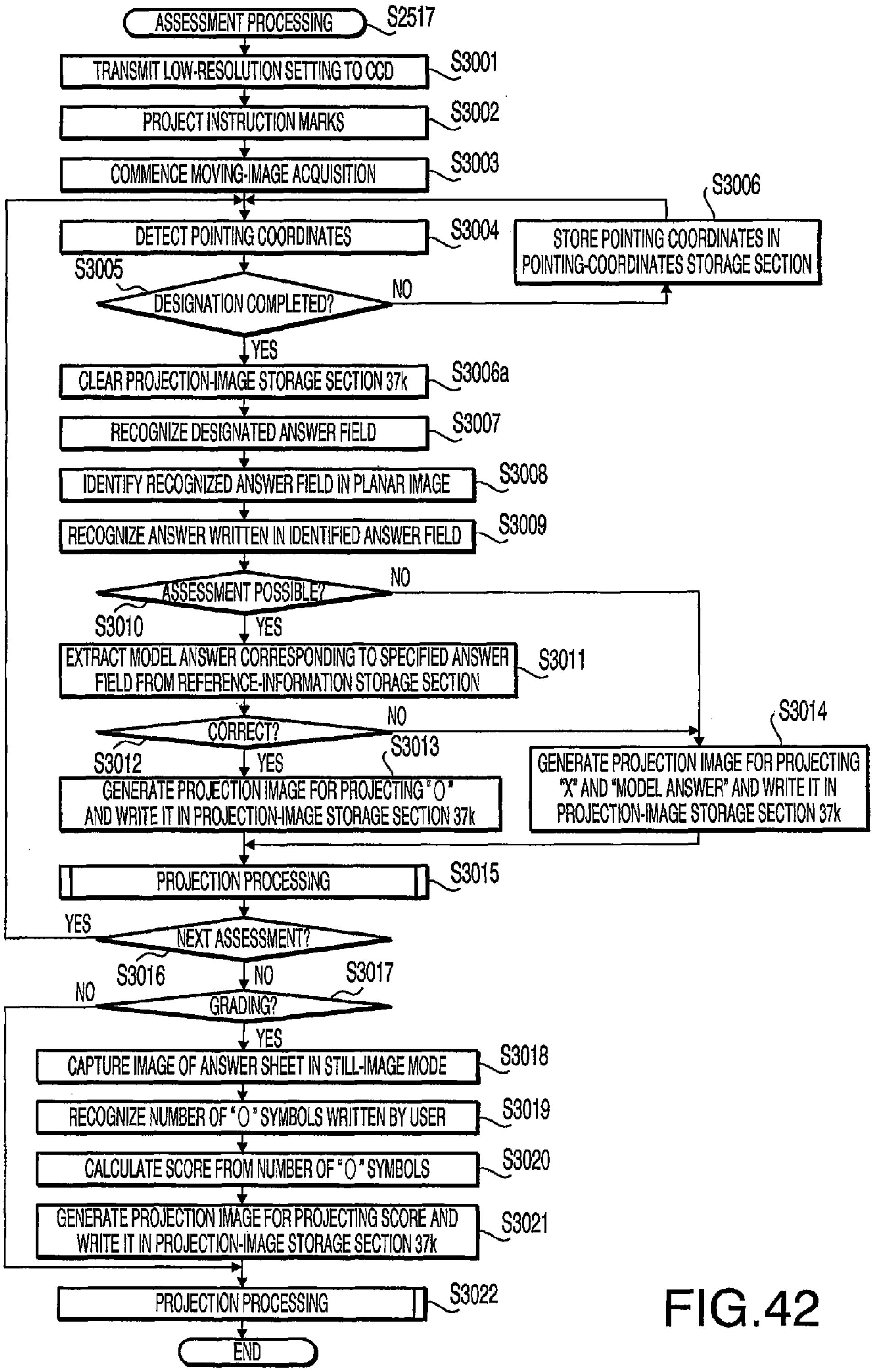

FIG. 42 is a flow chart of assessment processing in the second case of the grading mode.

Figure 43:
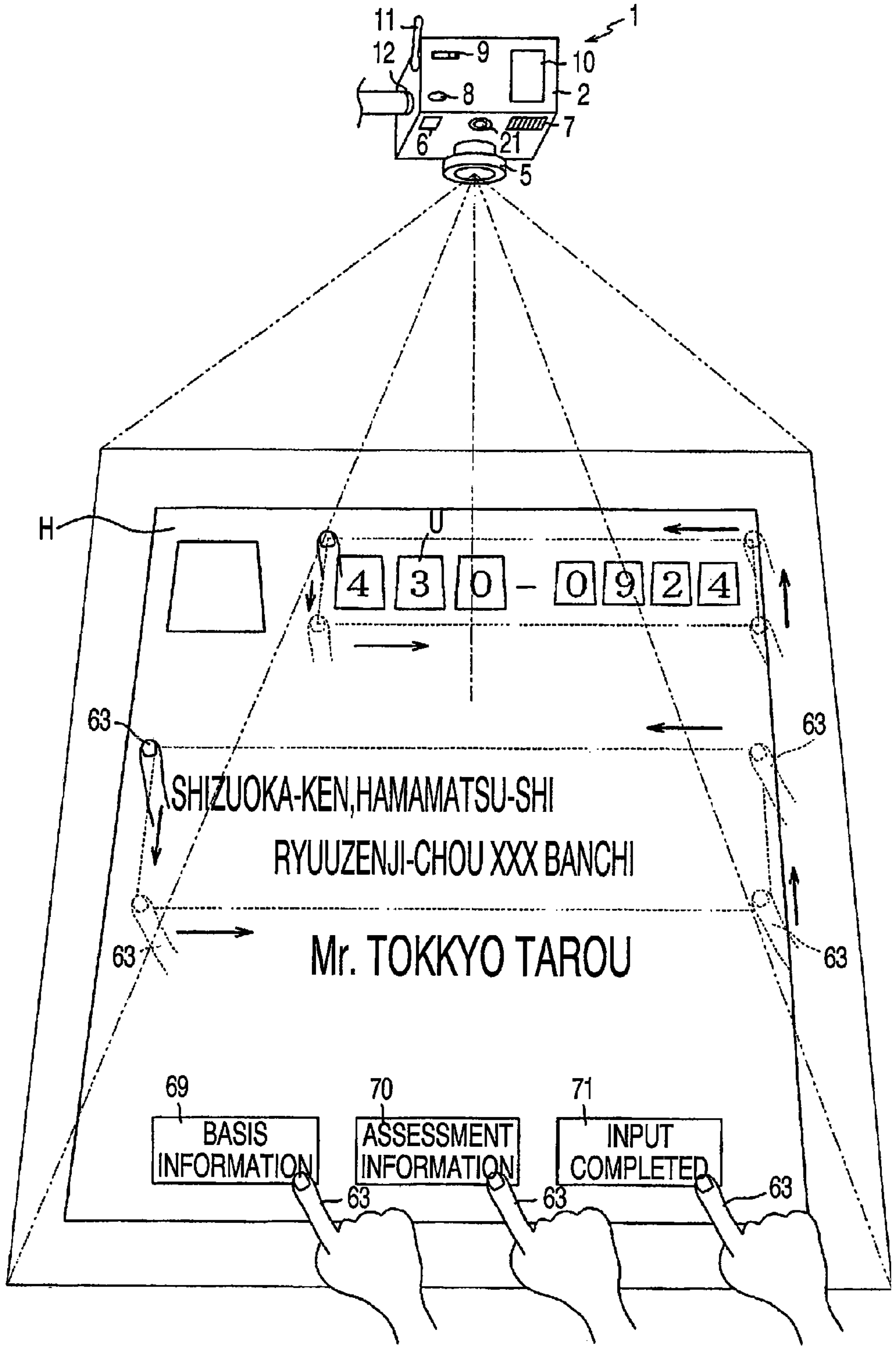

FIG. 43 is a view showing a user operation method in a postal information mode.

Figure 44:
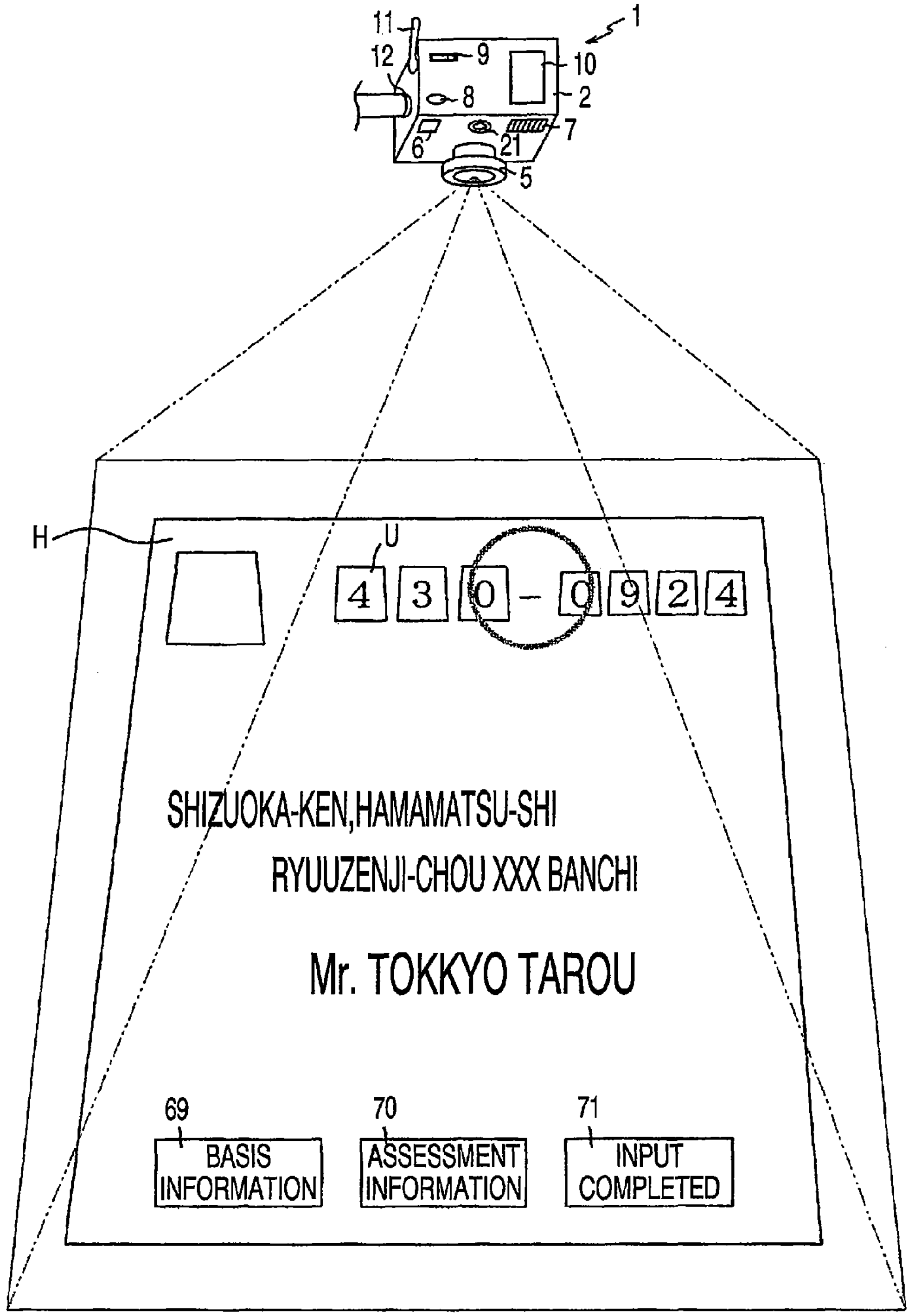

FIG. 44 is a view showing a state in which an assessment result is projected in the postal information mode.

Figure 45:
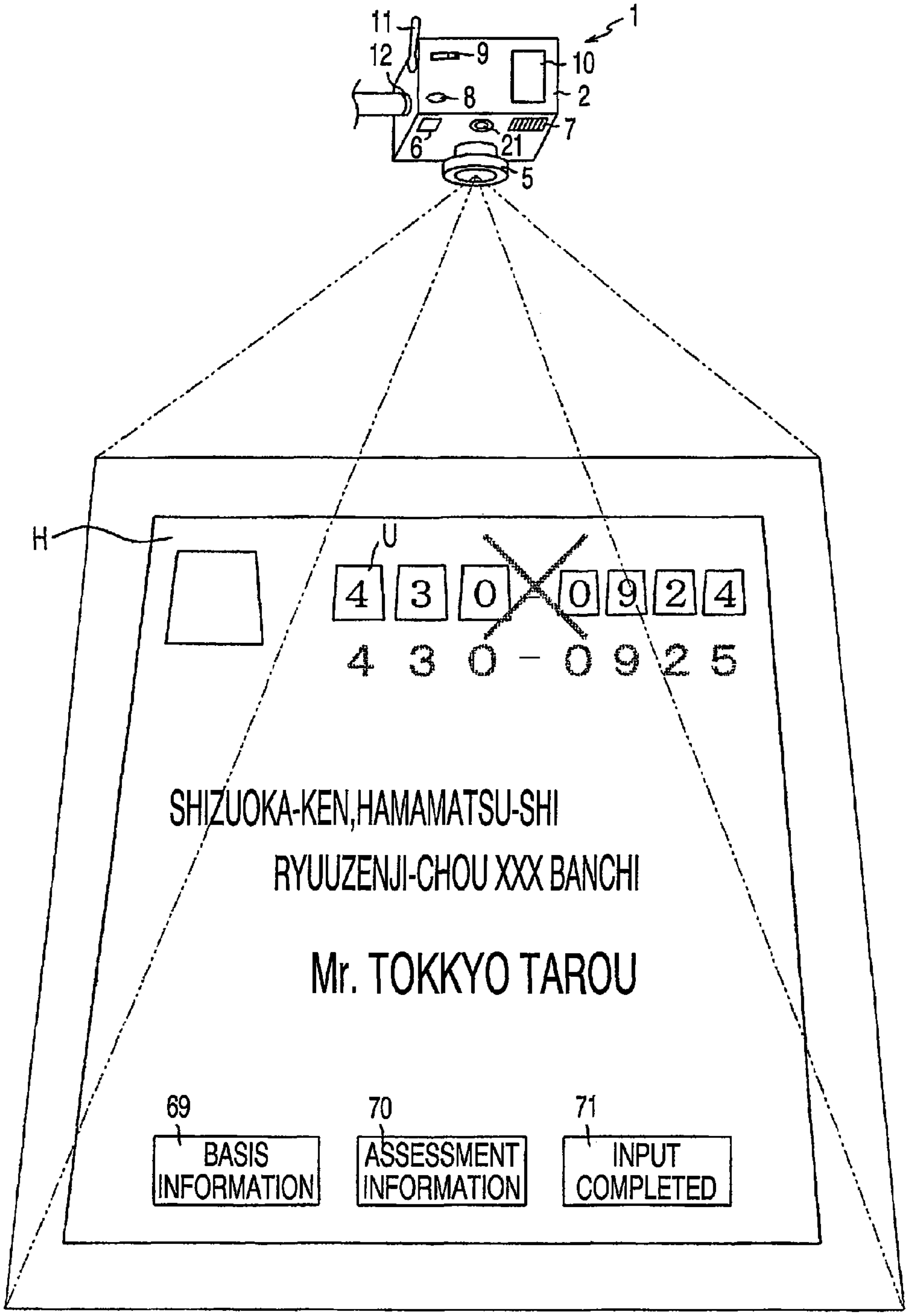

FIG. 45 is a view showing a state in which an assessment result is projected in the postal information mode.

Figure 46:
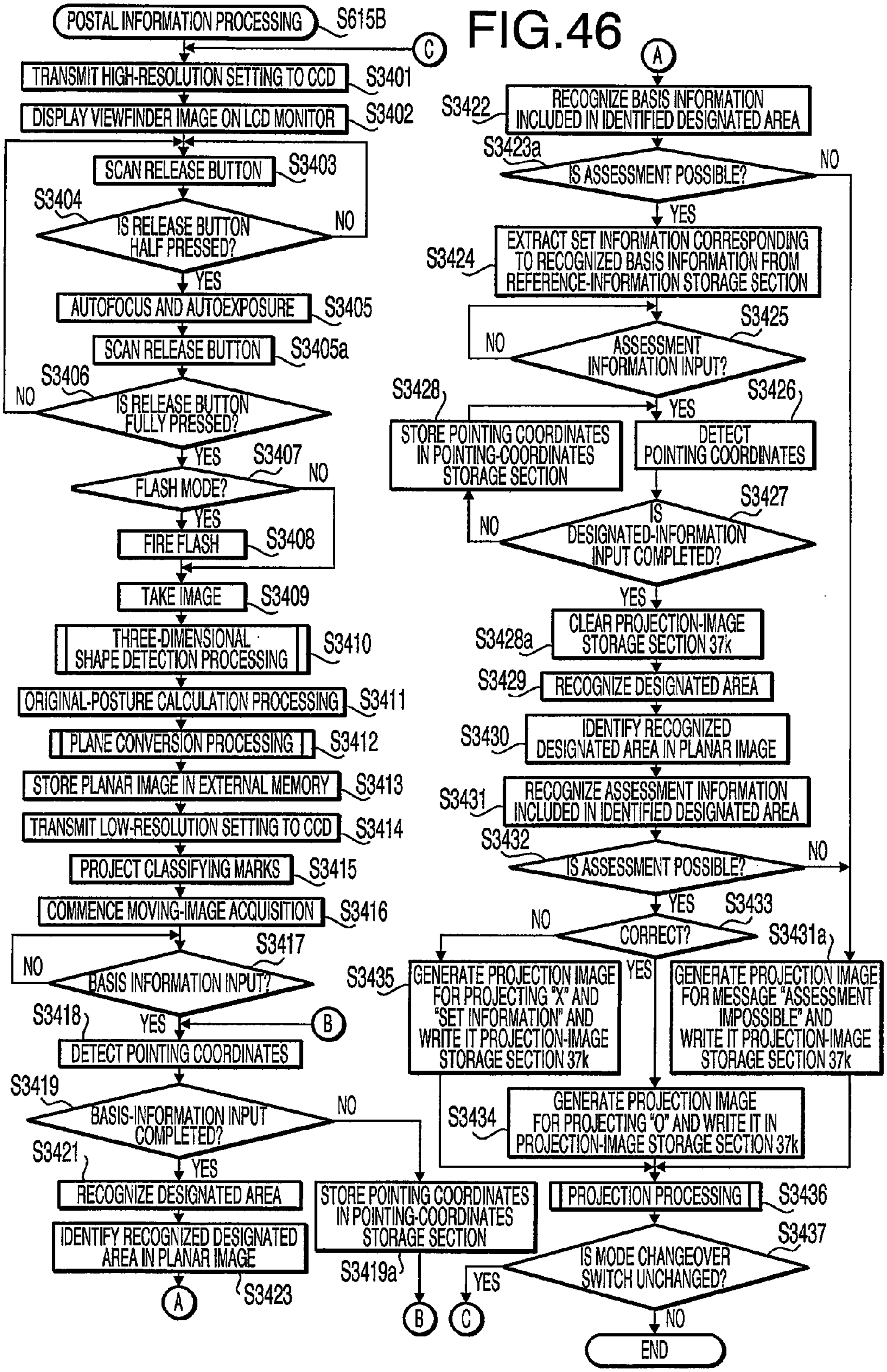

FIG. 46 is a flow chart of postal information processing.

Figure 47:
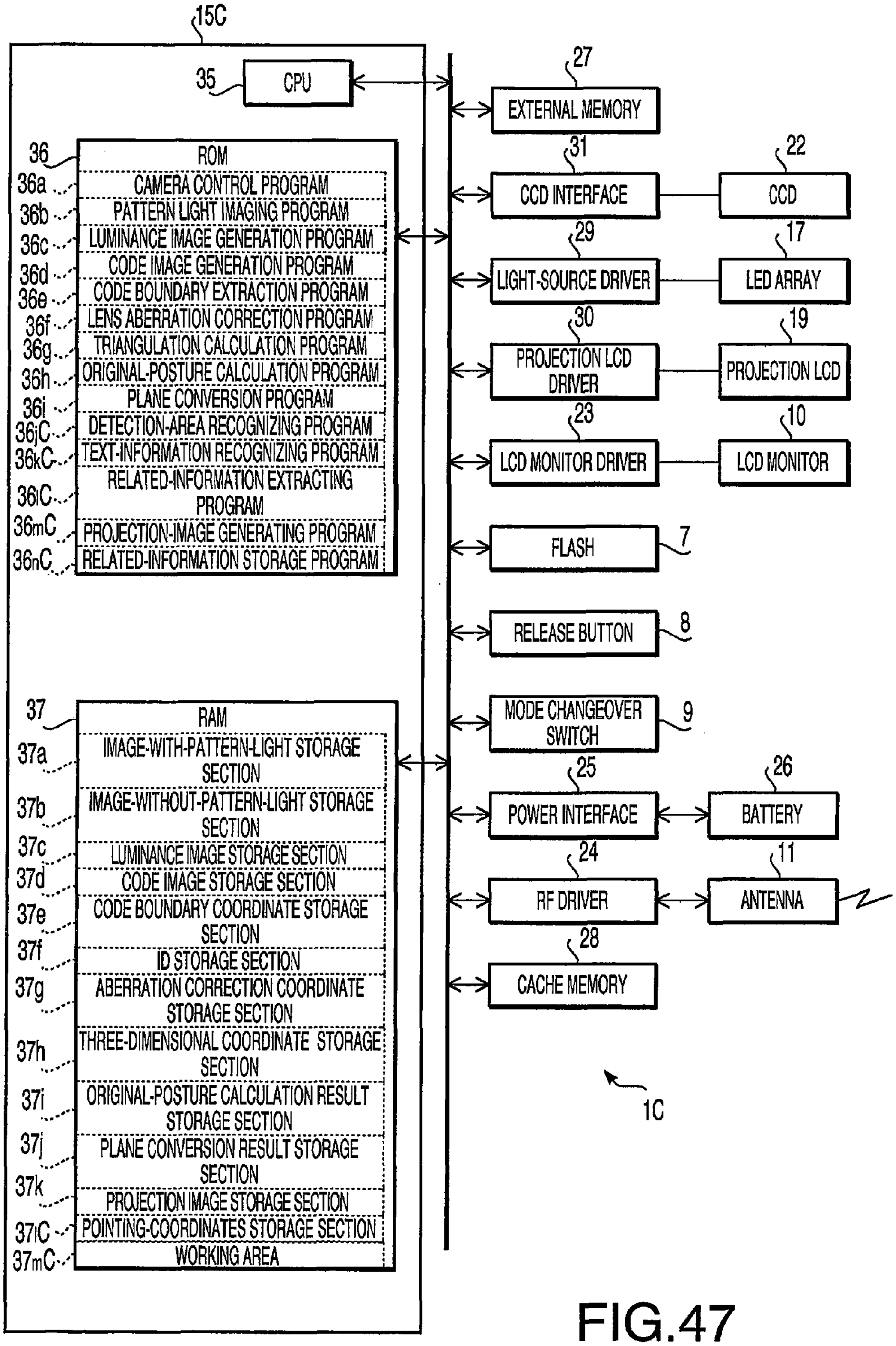

FIG. 47 is an electrical block diagram of an image input-and-output apparatus.

Figure 48:
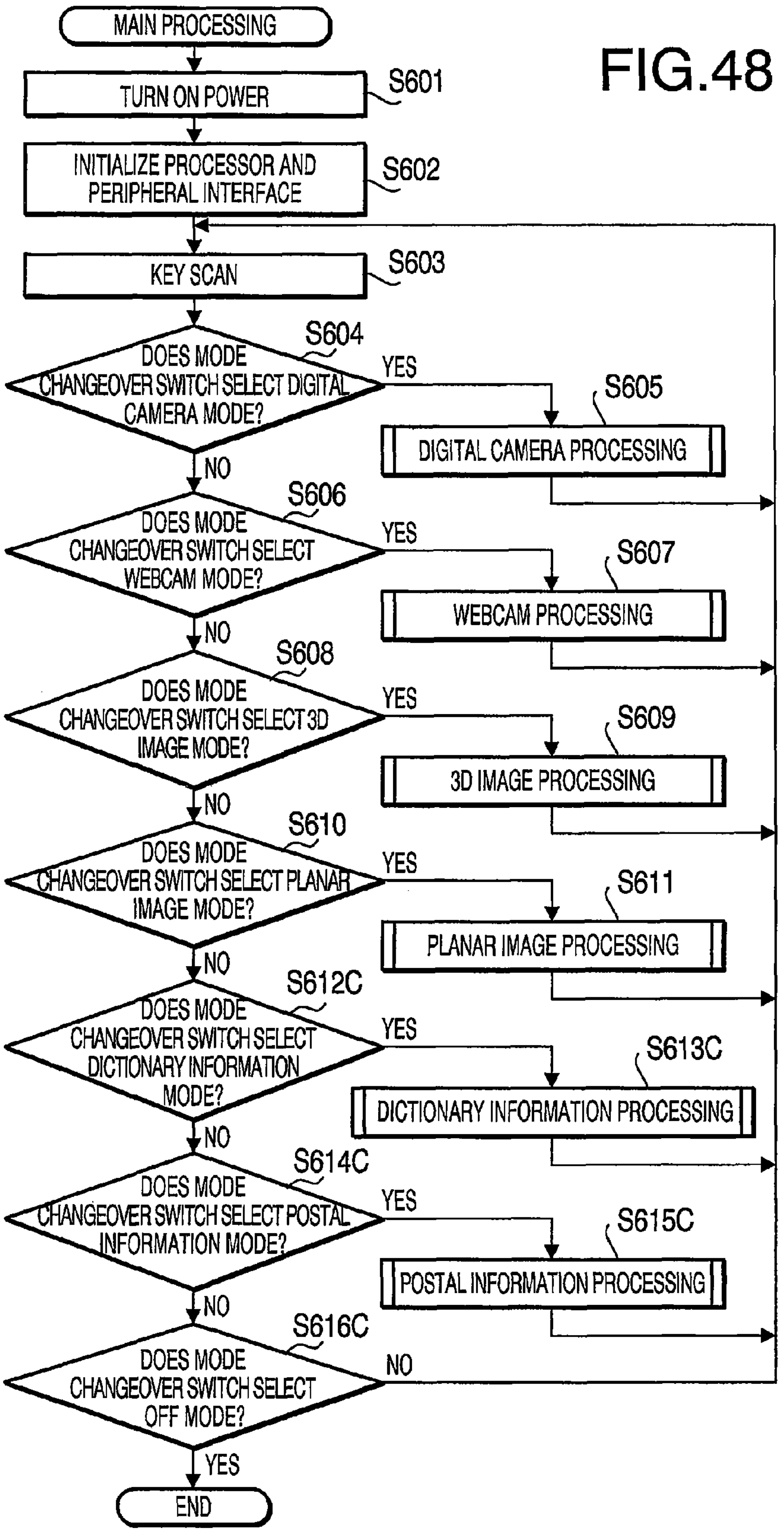

FIG. 48 is a flow chart of main processing.

Figure 49:
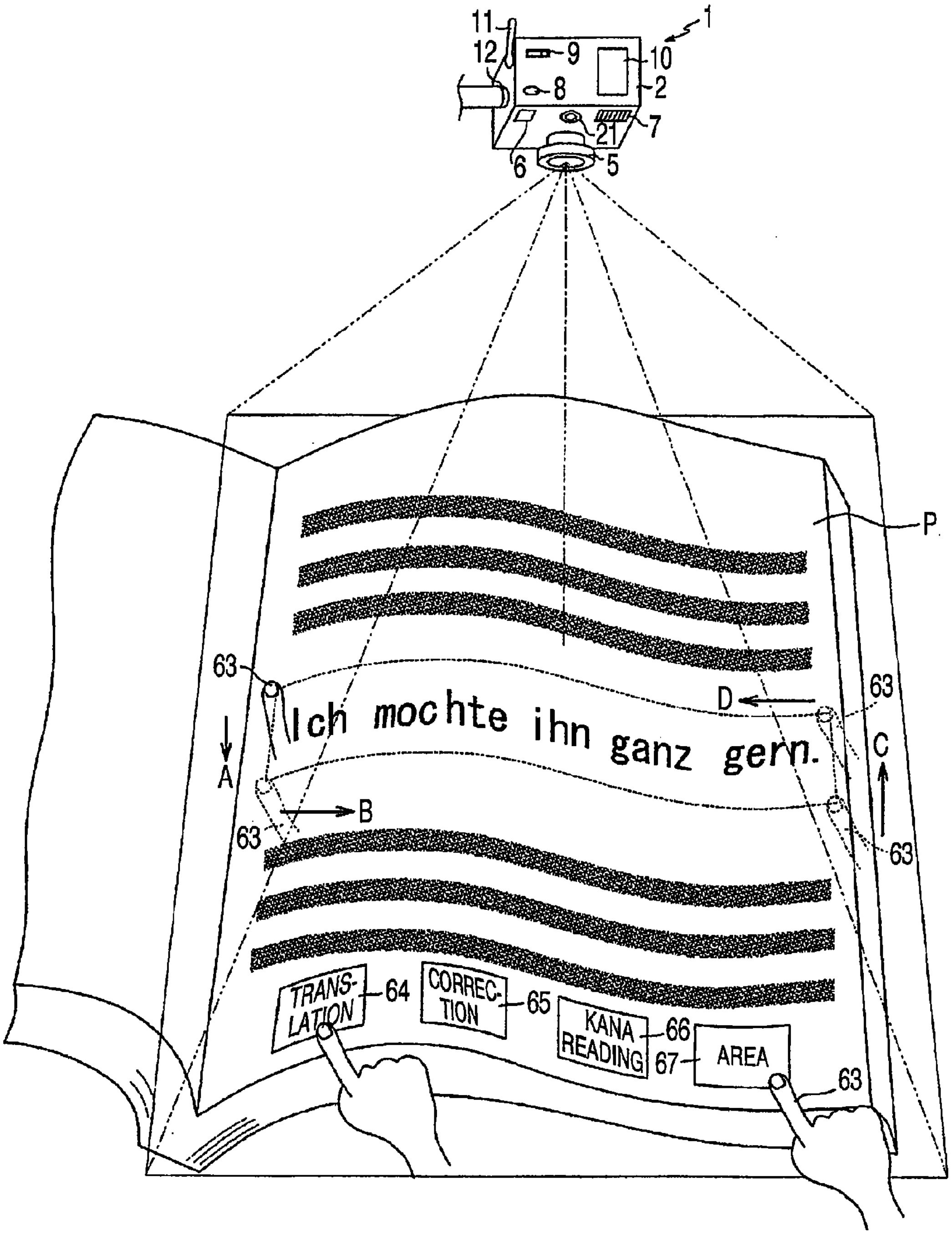

FIG. 49 is a view for explaining a user operation performed when translation information of text information specified by the user is projected in a dictionary information mode.

Figure 50:
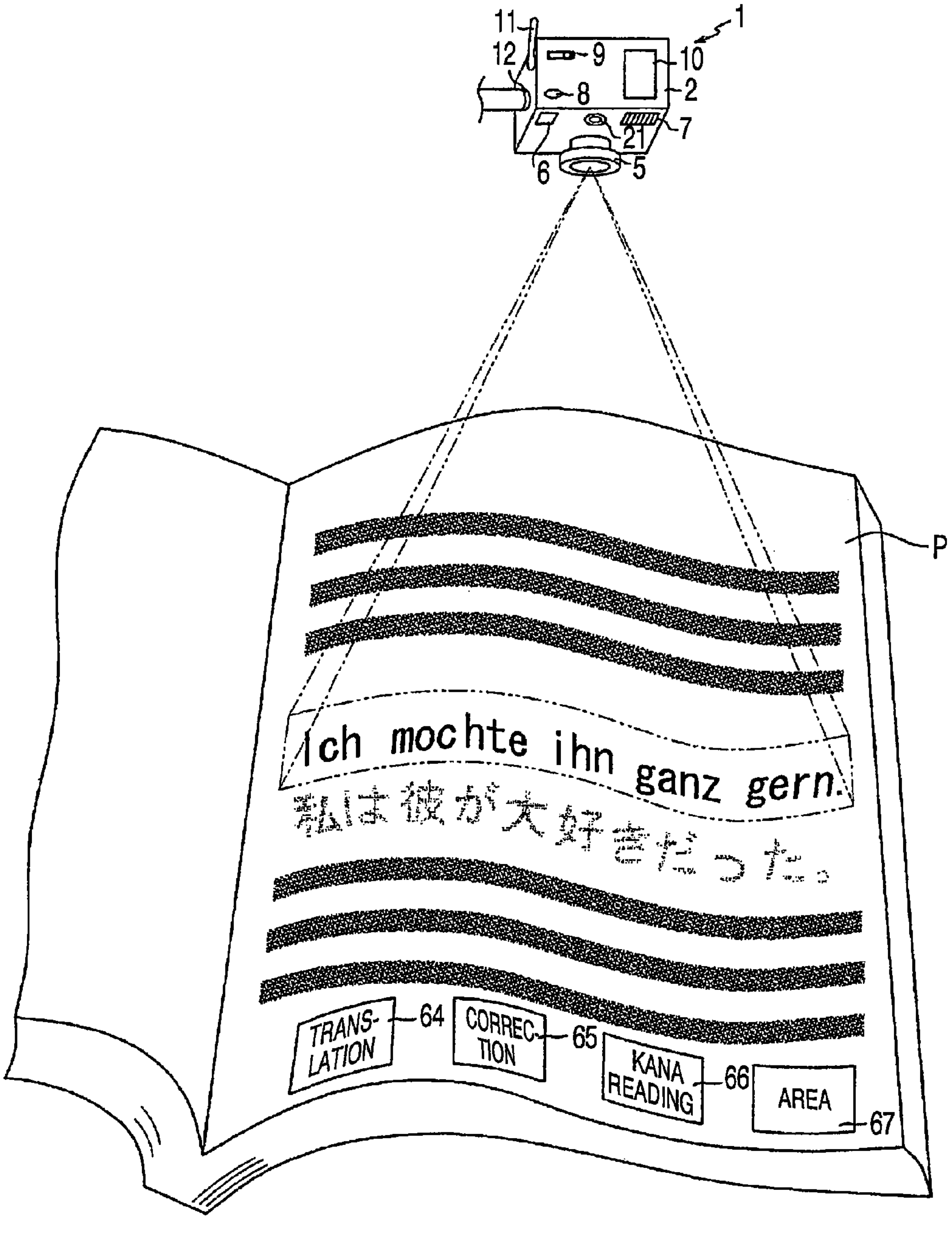

FIG. 50 is a view showing a state in which the image input-and-output apparatus projects the translation information.

Figure 51:
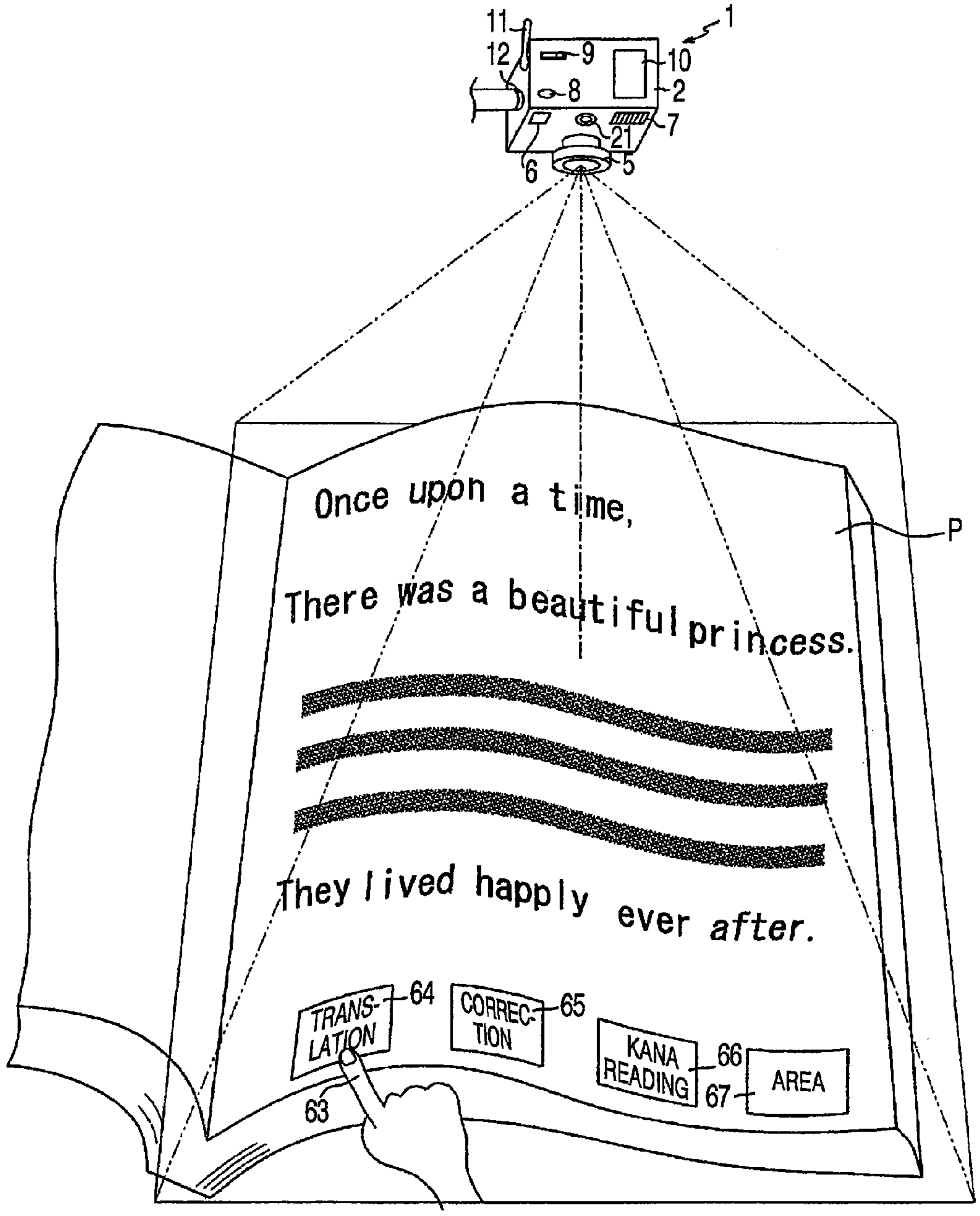

FIG. 51 is a view for explaining a user operation performed when translation information for all text information written in an original P is projected all together in the dictionary information mode.

Figure 52:
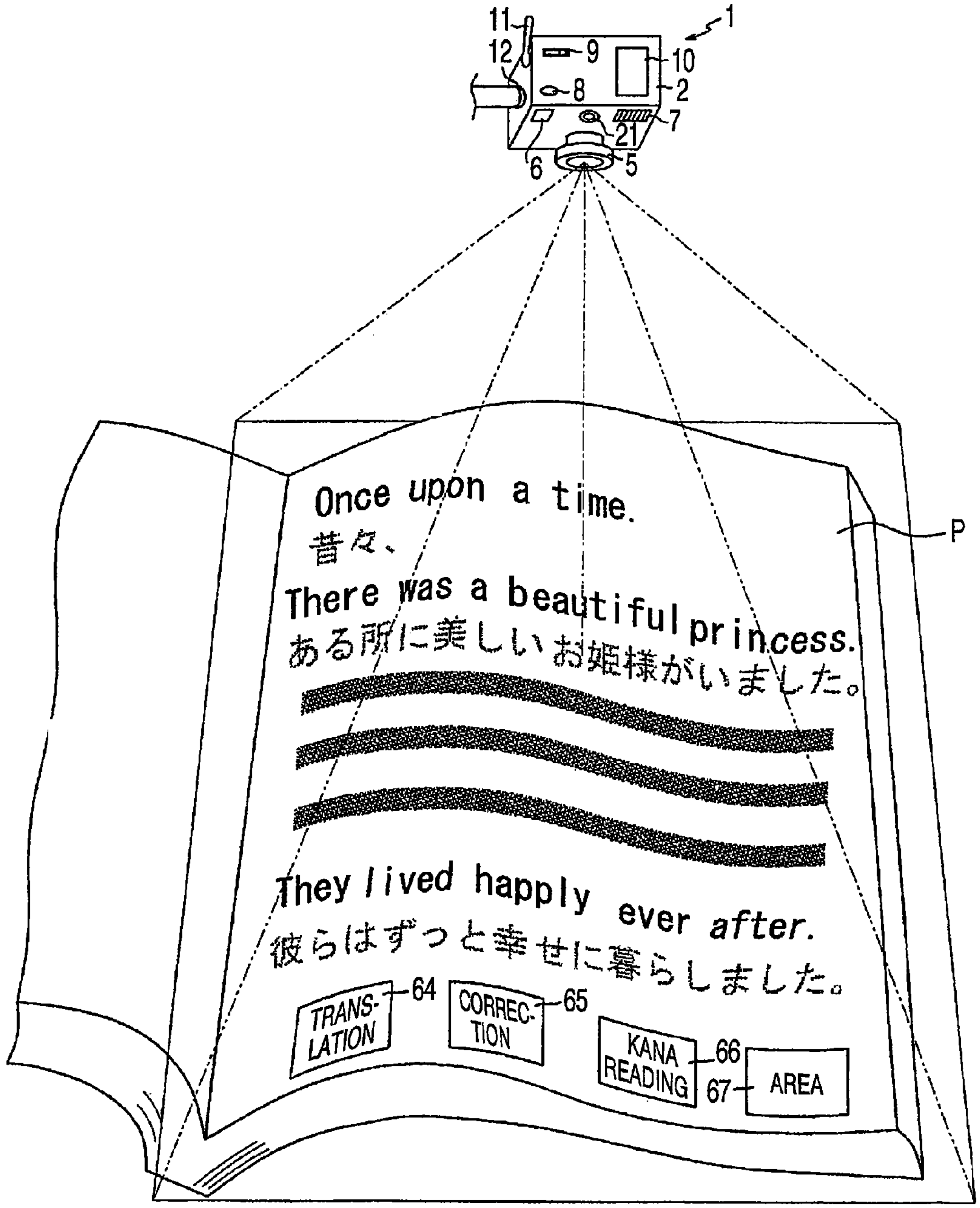

FIG. 52 is a view showing a state in which the image input-and-output apparatus projects the translation information all together.

Figure 53:
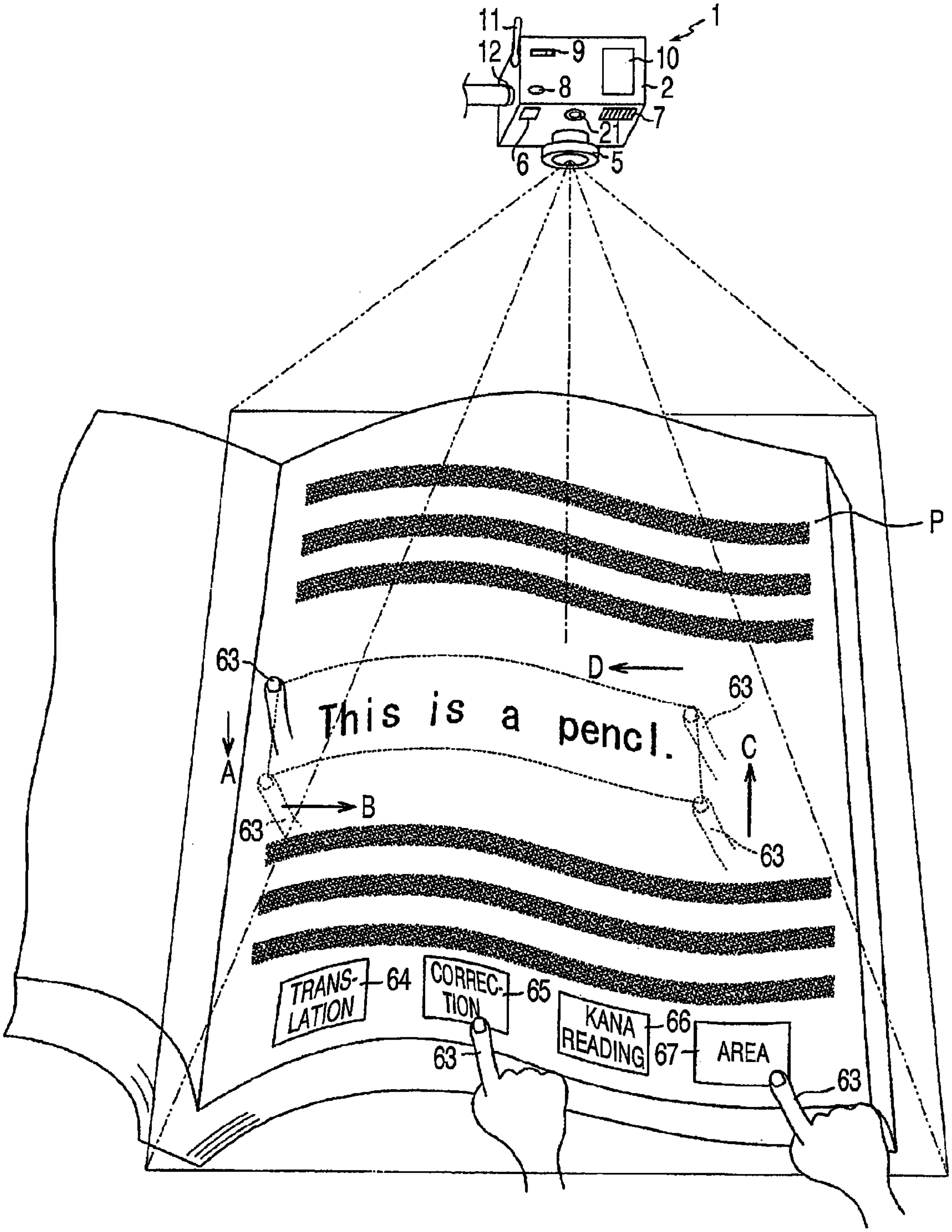

FIG. 53 is a view for explaining a user operation performed when correction information of text information specified by the user is projected in the dictionary information mode.

Figure 54:
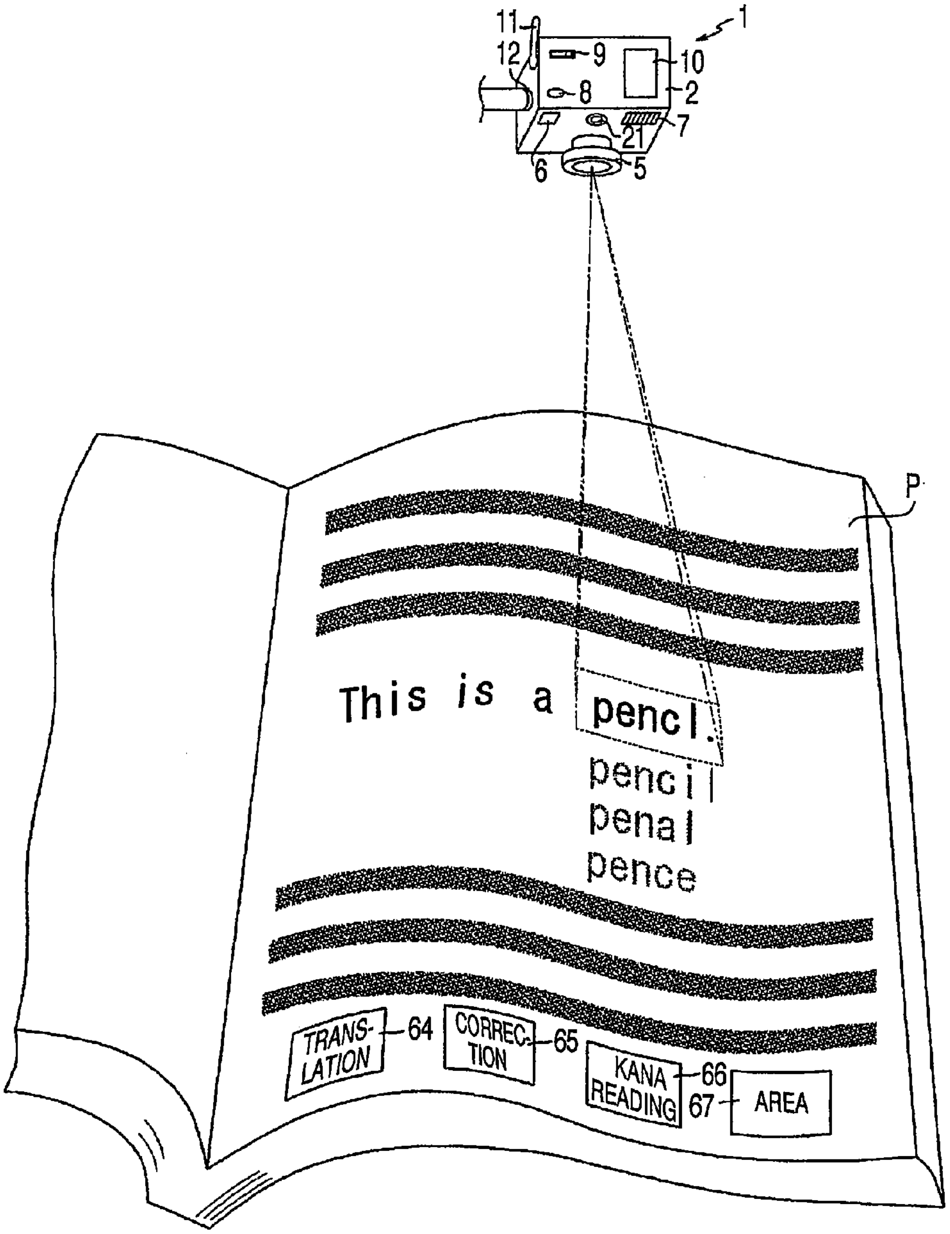

FIG. 54 is a view showing a state in which the image input-and-output apparatus projects the correction information.

Figure 55:
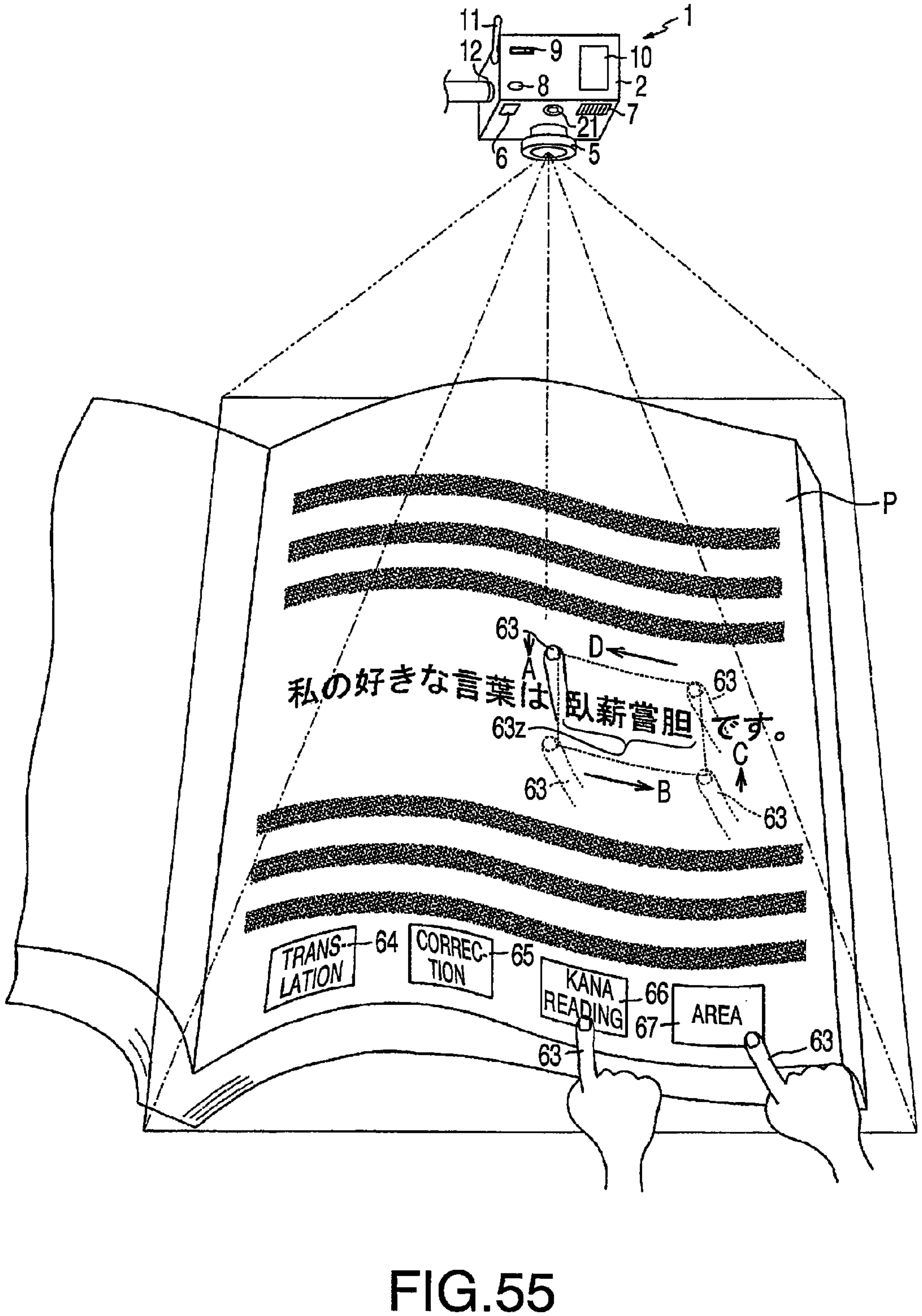

FIG. 55 is a view for explaining a user operation performed when kana-reading information of text information specified by the user is projected in the dictionary information mode.

Figure 56:
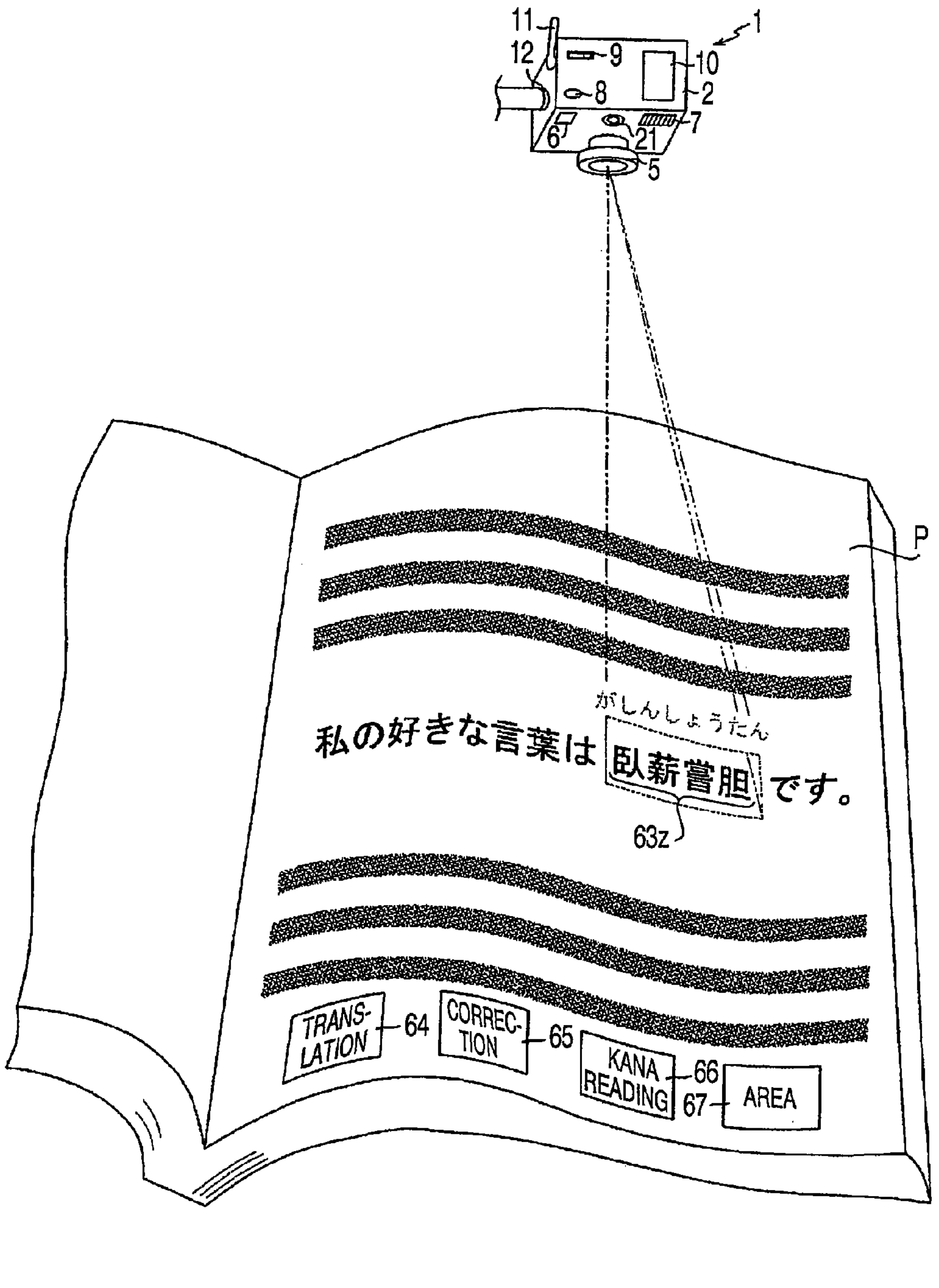

FIG. 56 is a view showing a state in which the image input-and-output apparatus projects the kana-reading information.

Figure 57:
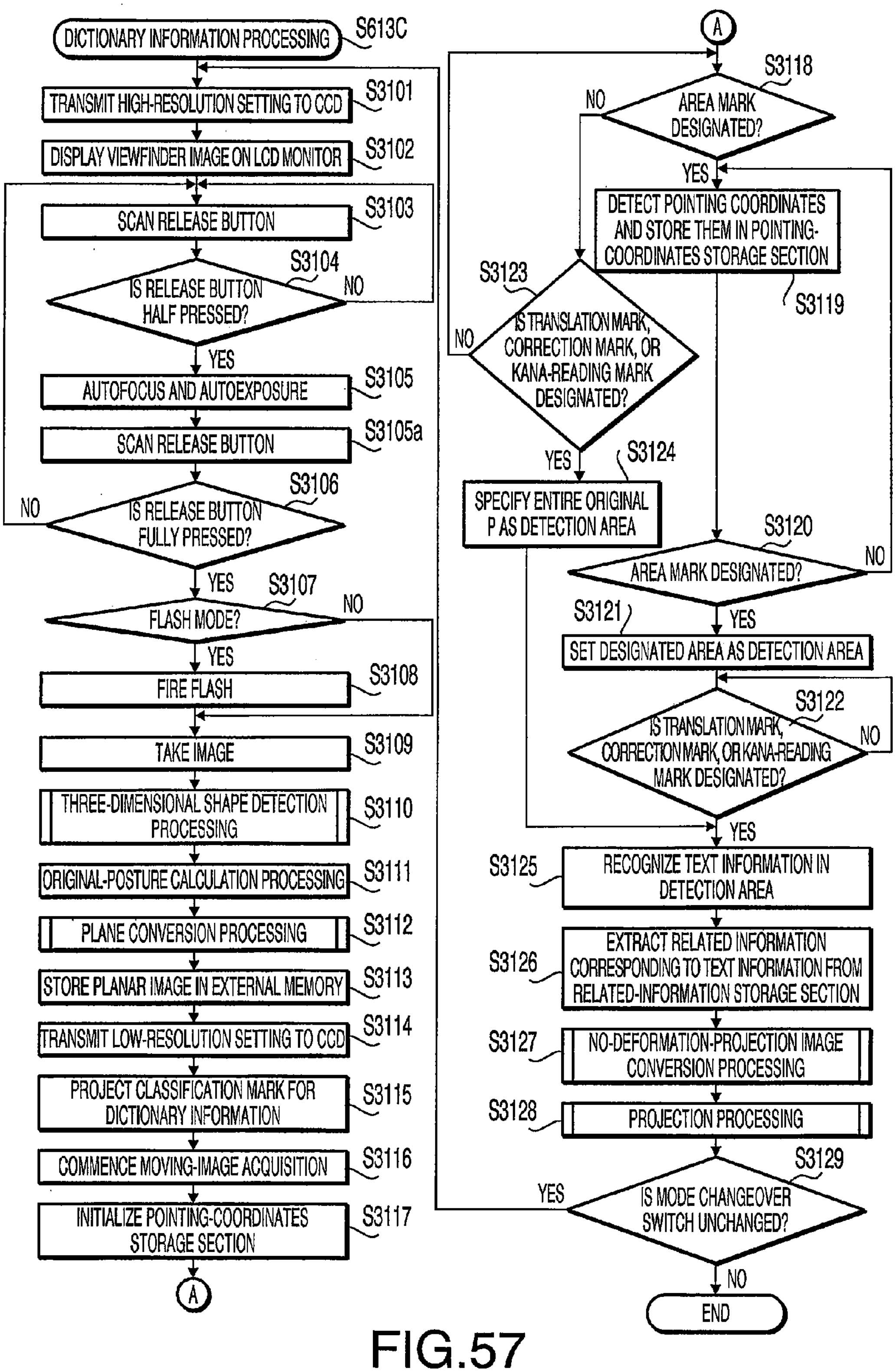

FIG. 57 is a flow chart of dictionary information processing.

Figure 58:
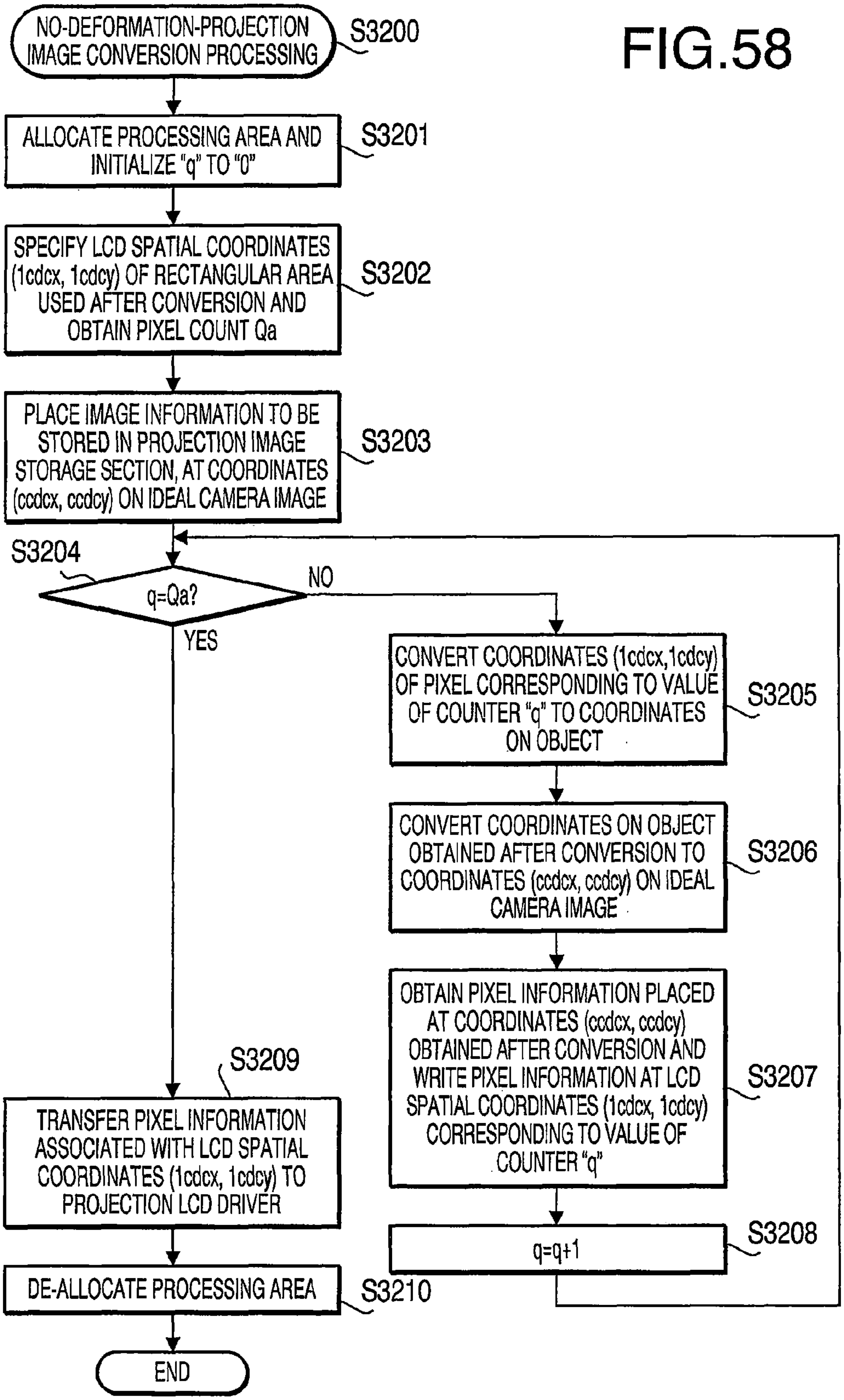

FIG. 58 is a flow chart of no-deformation-projection image conversion processing.

Figure 59:
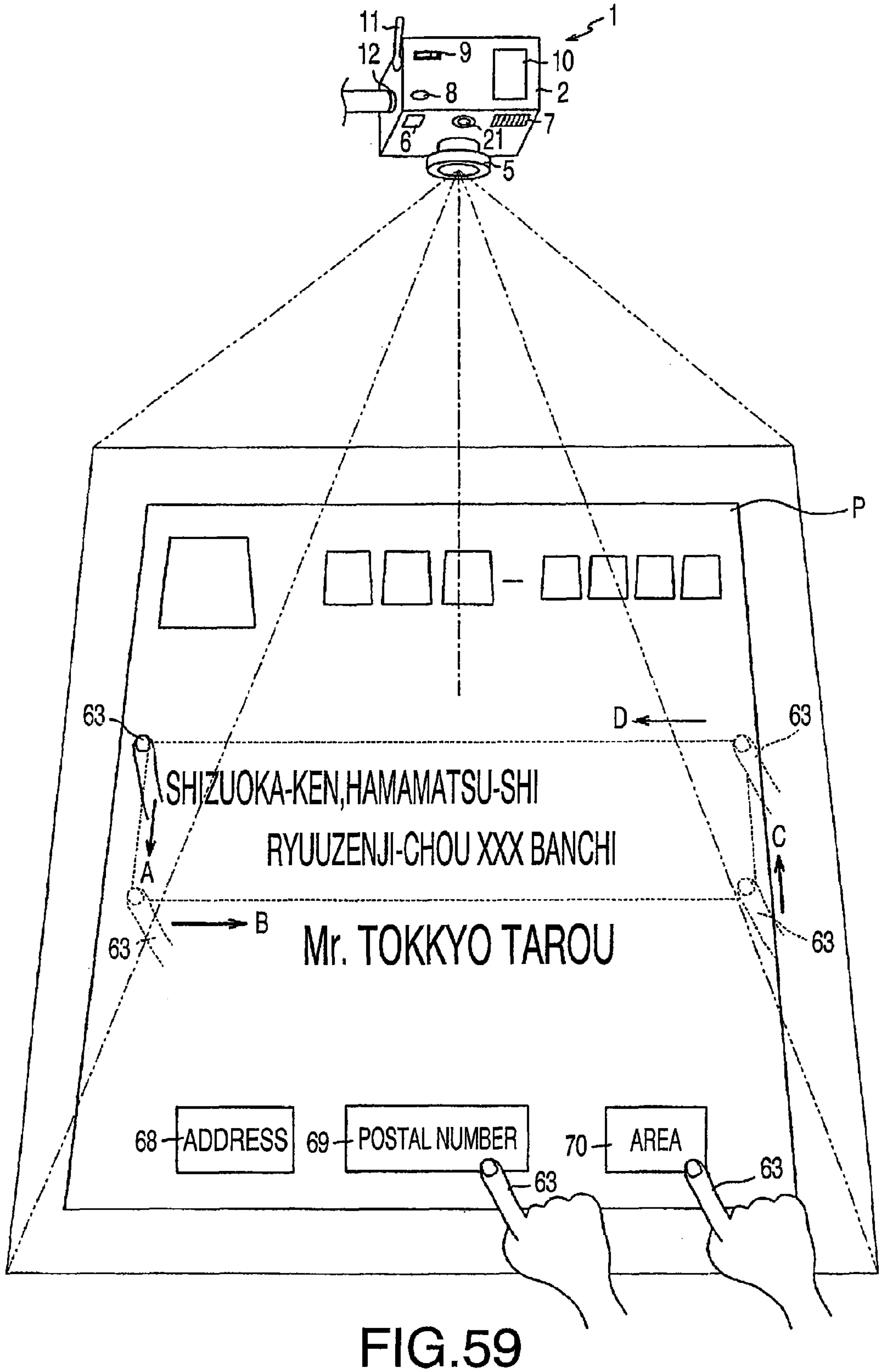

FIG. 59 is a view for explaining a user operation performed when a postal number related to an address specified by the user is projected in a postal information mode.

Figure 60:
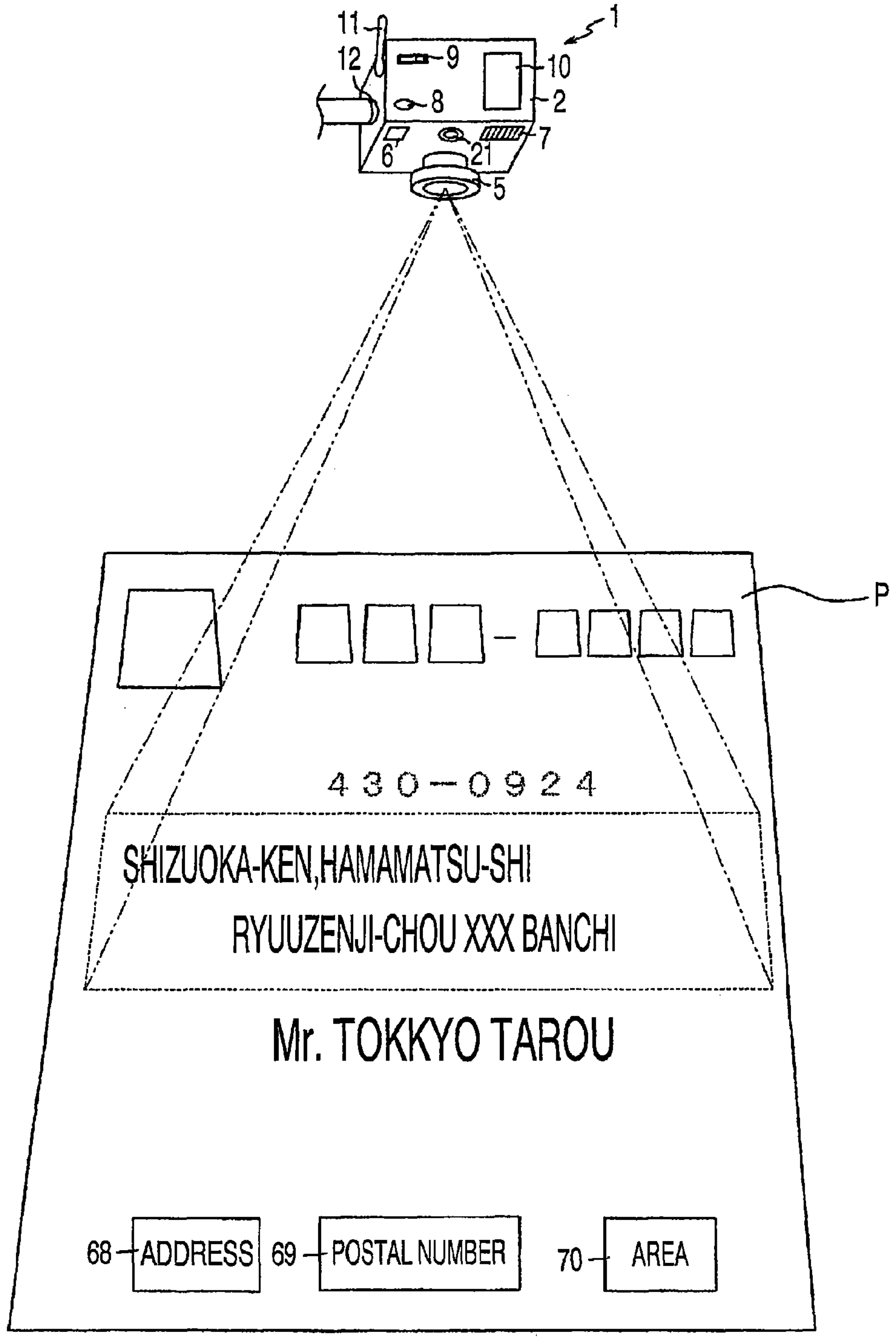

FIG. 60 is a view showing a state in which the image input-and-output apparatus projects the postal number.

Figure 61:
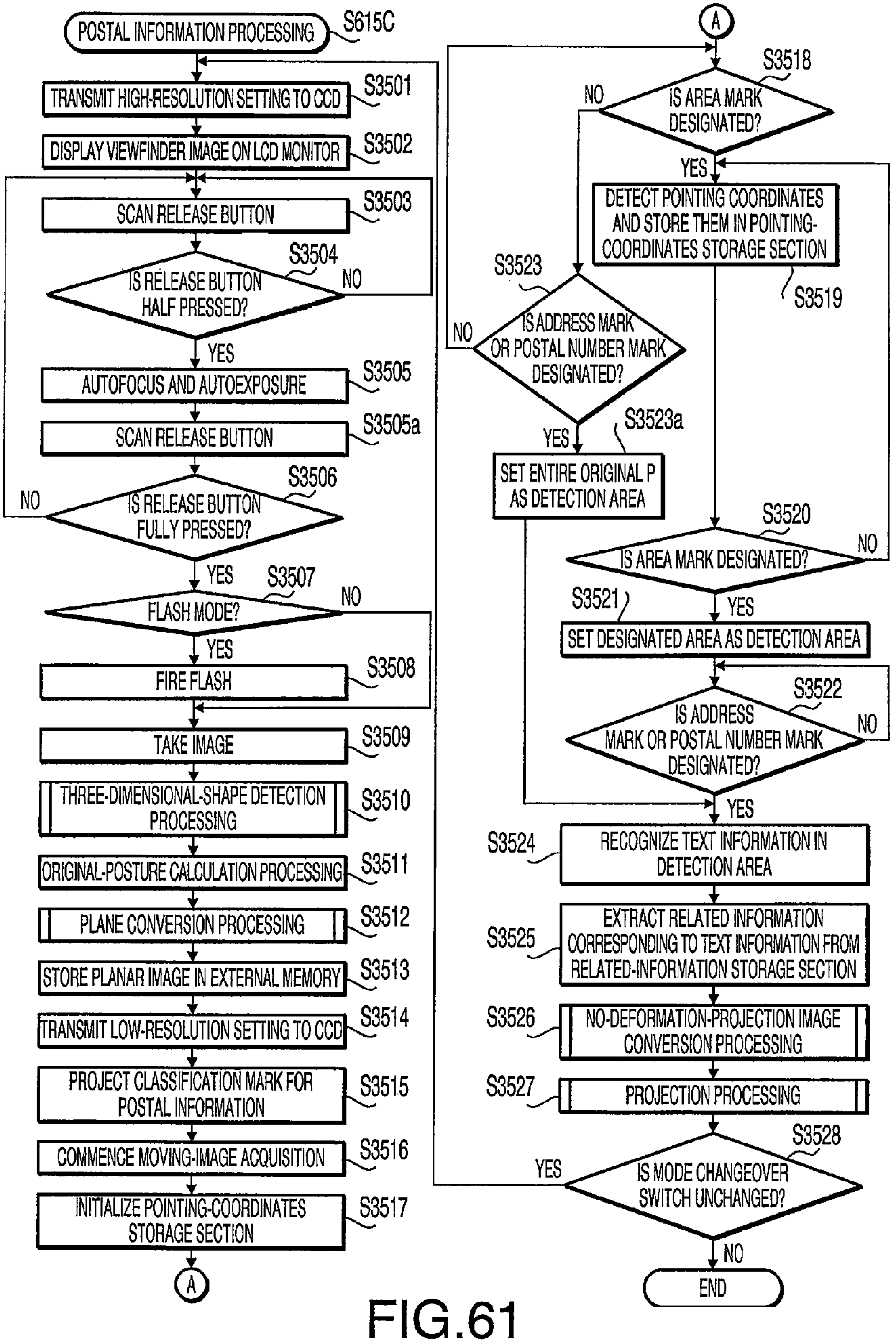

FIG. 61 is a flow chart of postal information processing.

Figure 62:
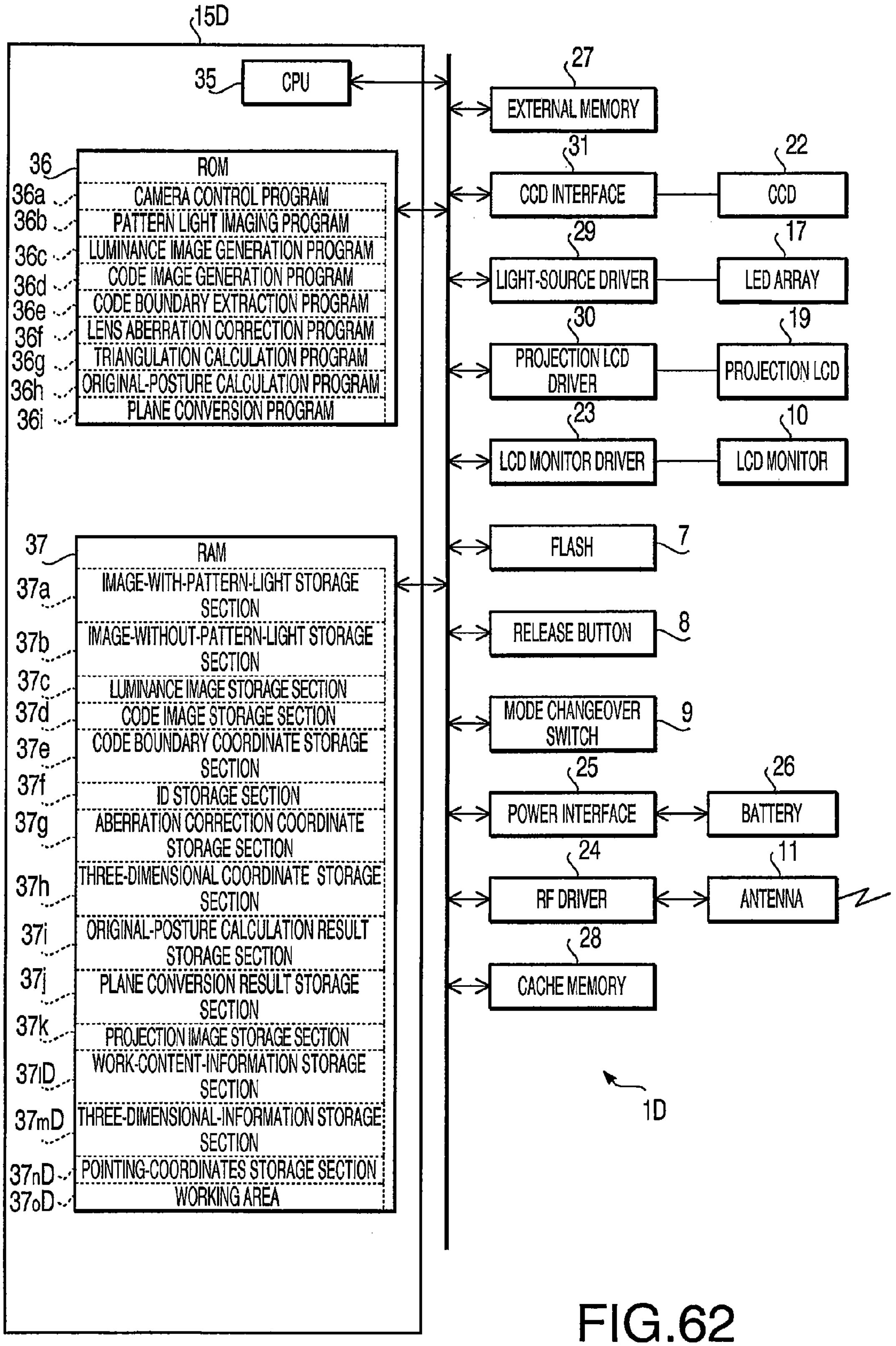

FIG. 62 is an electrical block diagram of an image input-and-output apparatus.

Figure 63:
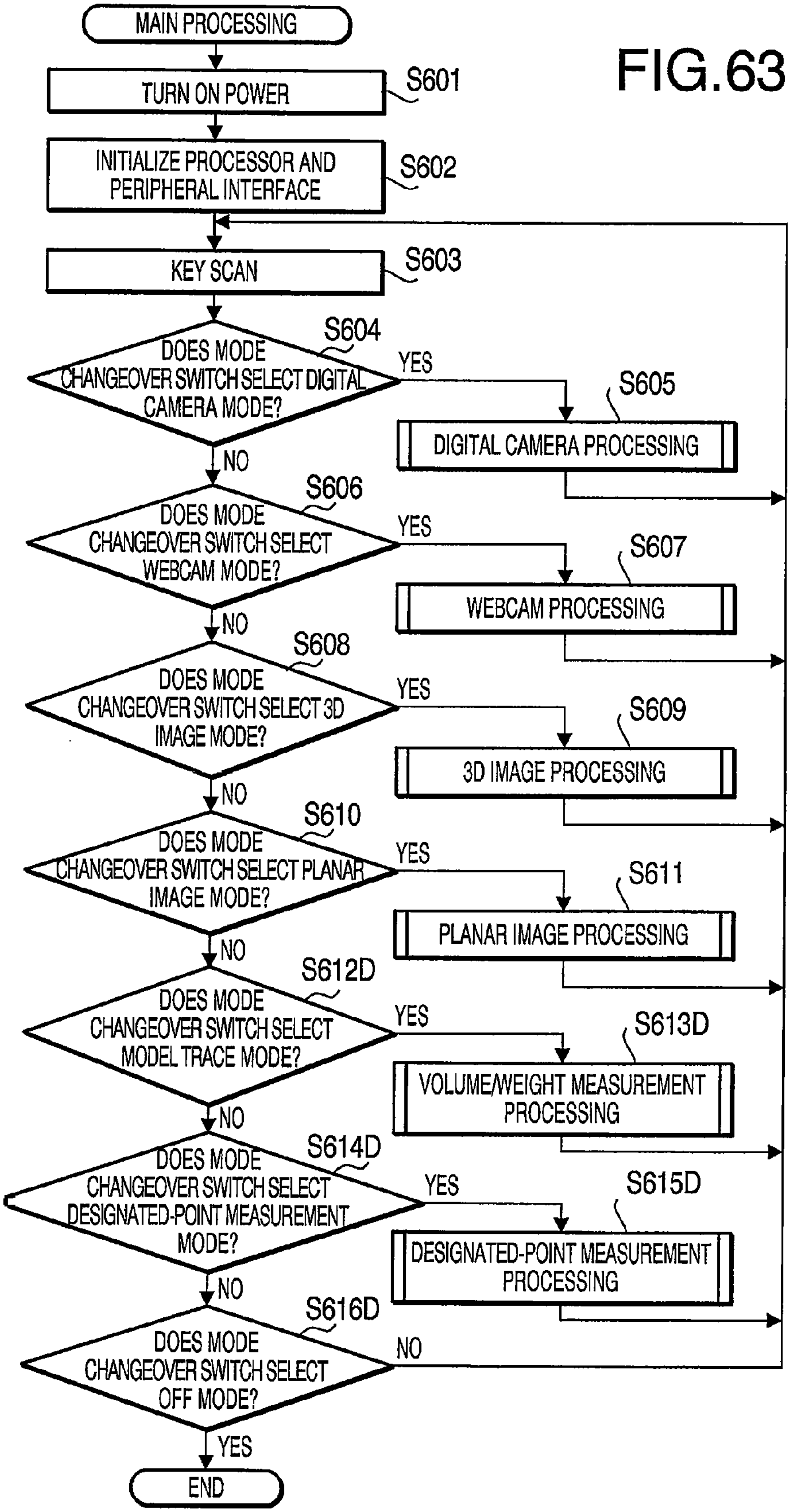

FIG. 63 is a flow chart of main processing.

Figure 64:
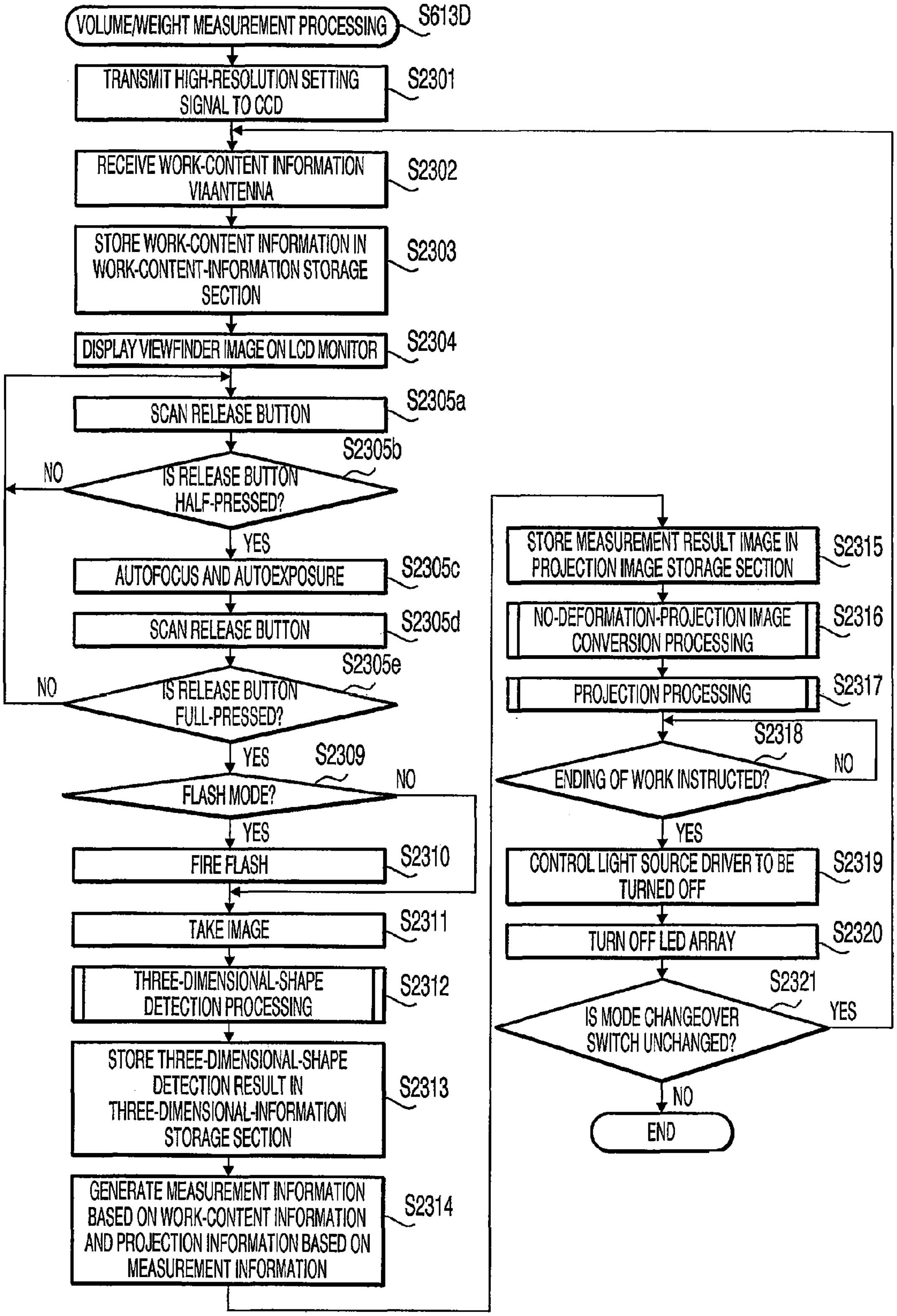

FIG. 64 is a flow chart of volume/weight measurement processing.

Figure 65:
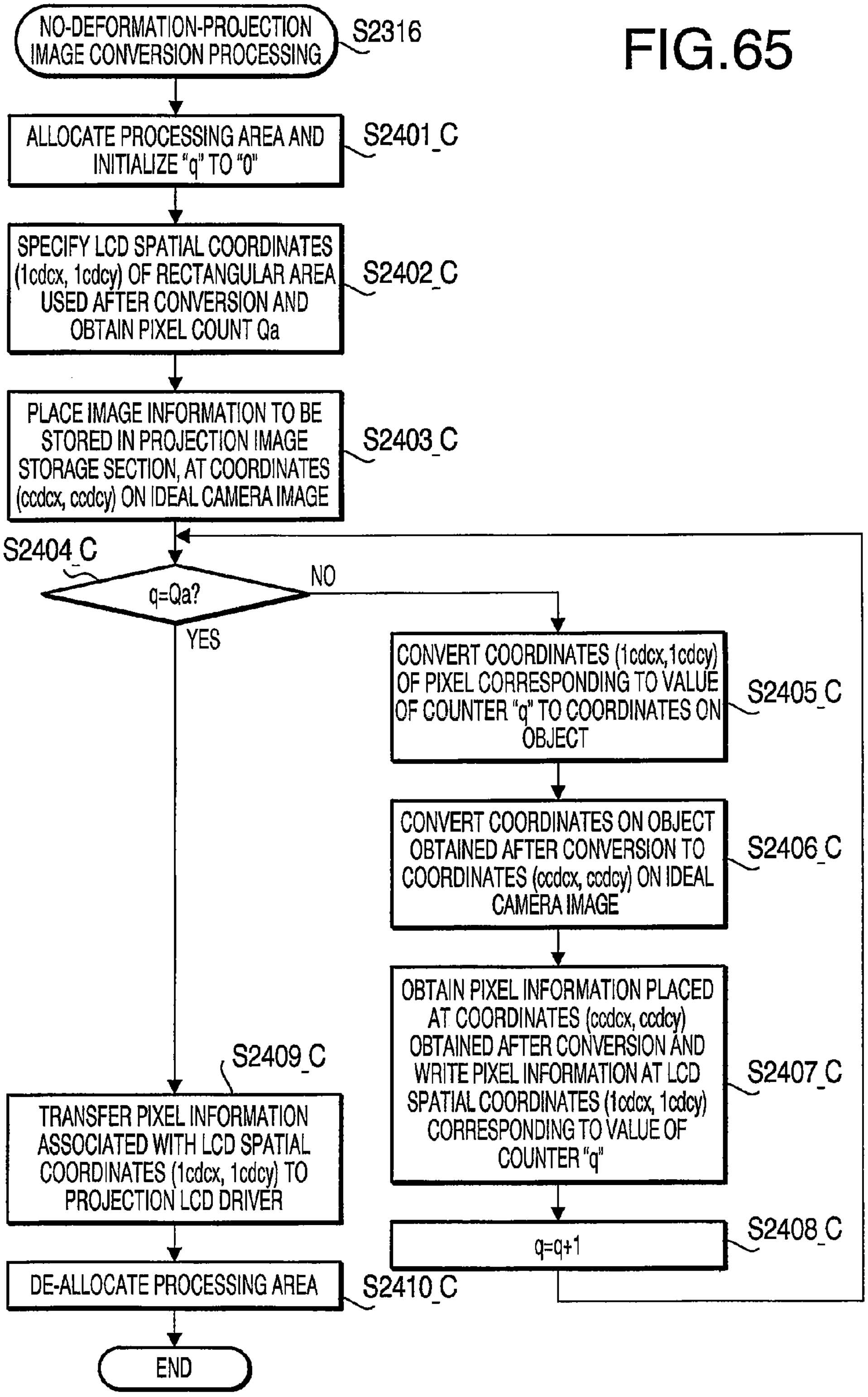

FIG. 65 is a flow chart of no-deformation-projection image conversion processing.

Figure 66:
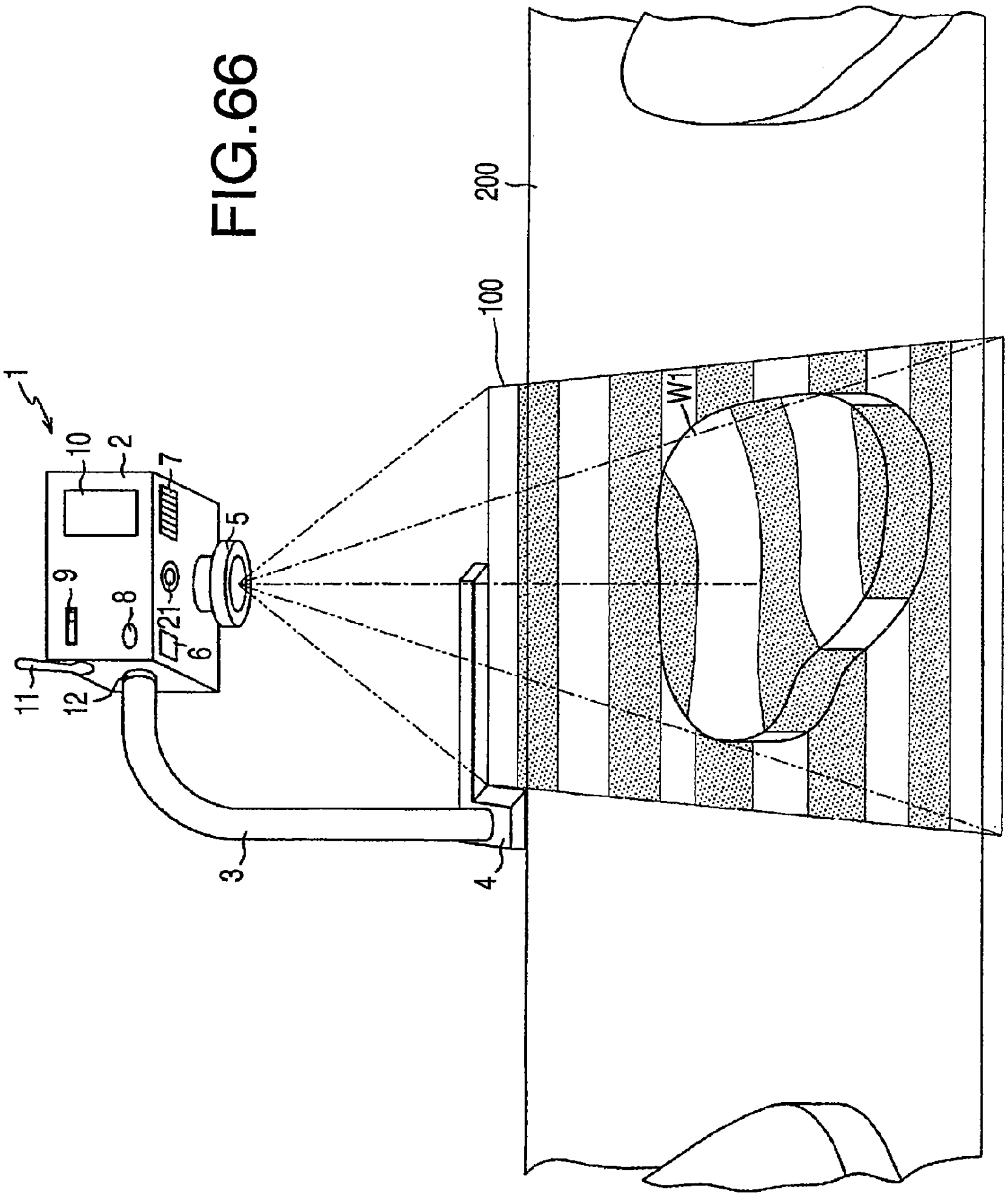

FIG. 66 is a view for explaining a first case in the volume/weight measurement processing.

Figure 67:
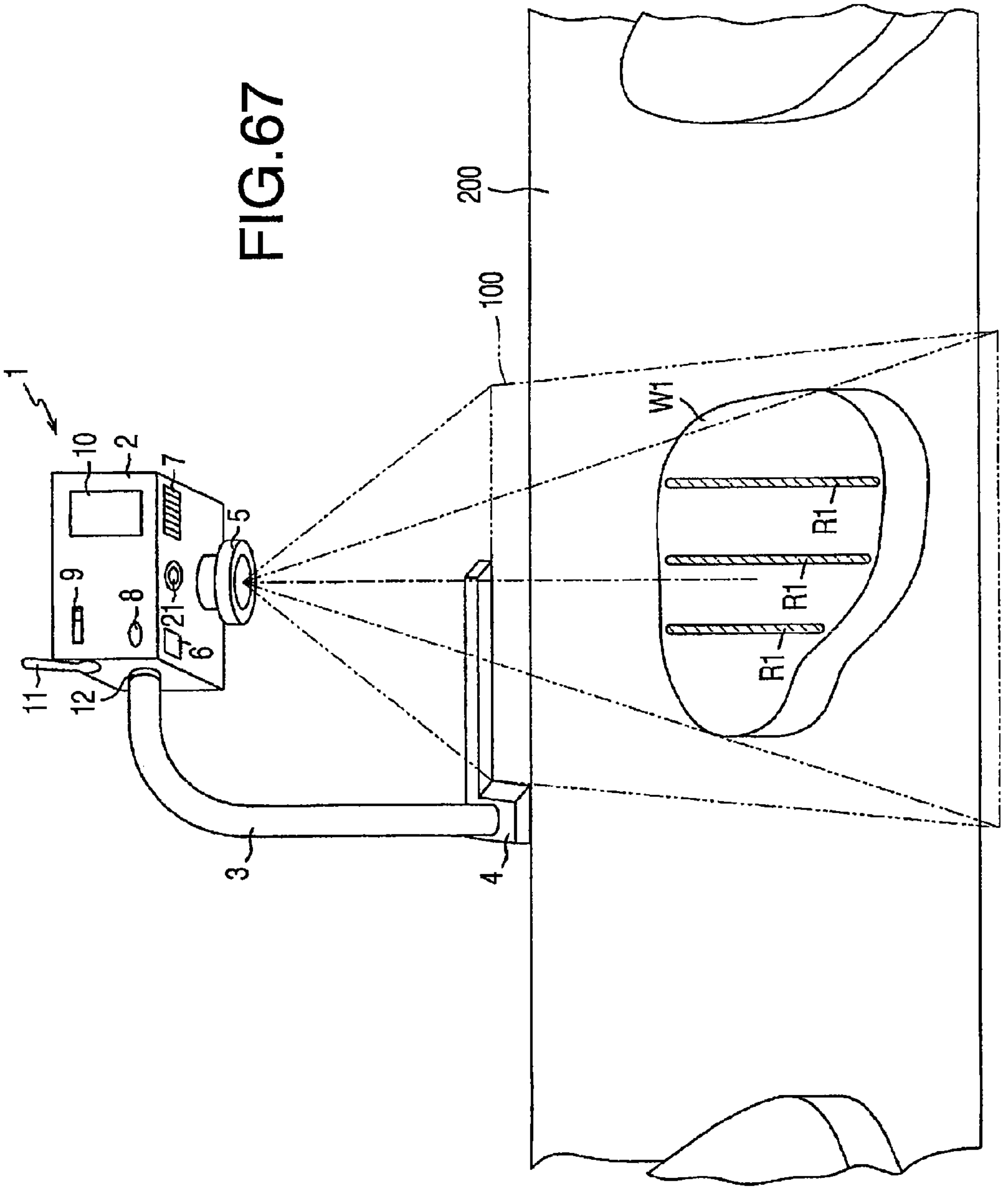

FIG. 67 is a view for explaining a state in which a measurement result image is projected as a result of the volume/weight measurement processing.

Figure 68:
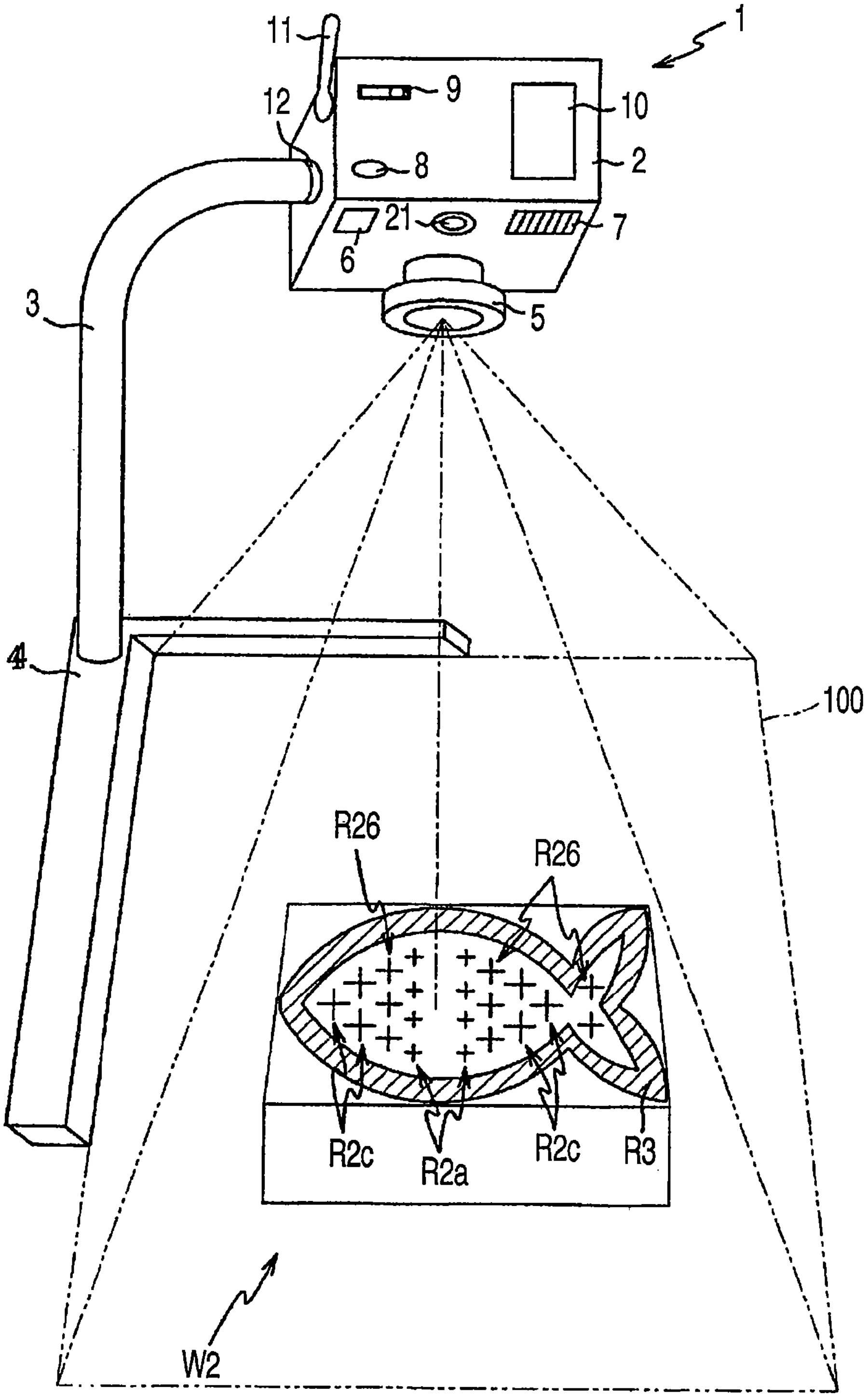

FIG. 68 is view for explaining a second case in the volume/weight measurement processing.

Figure 69:
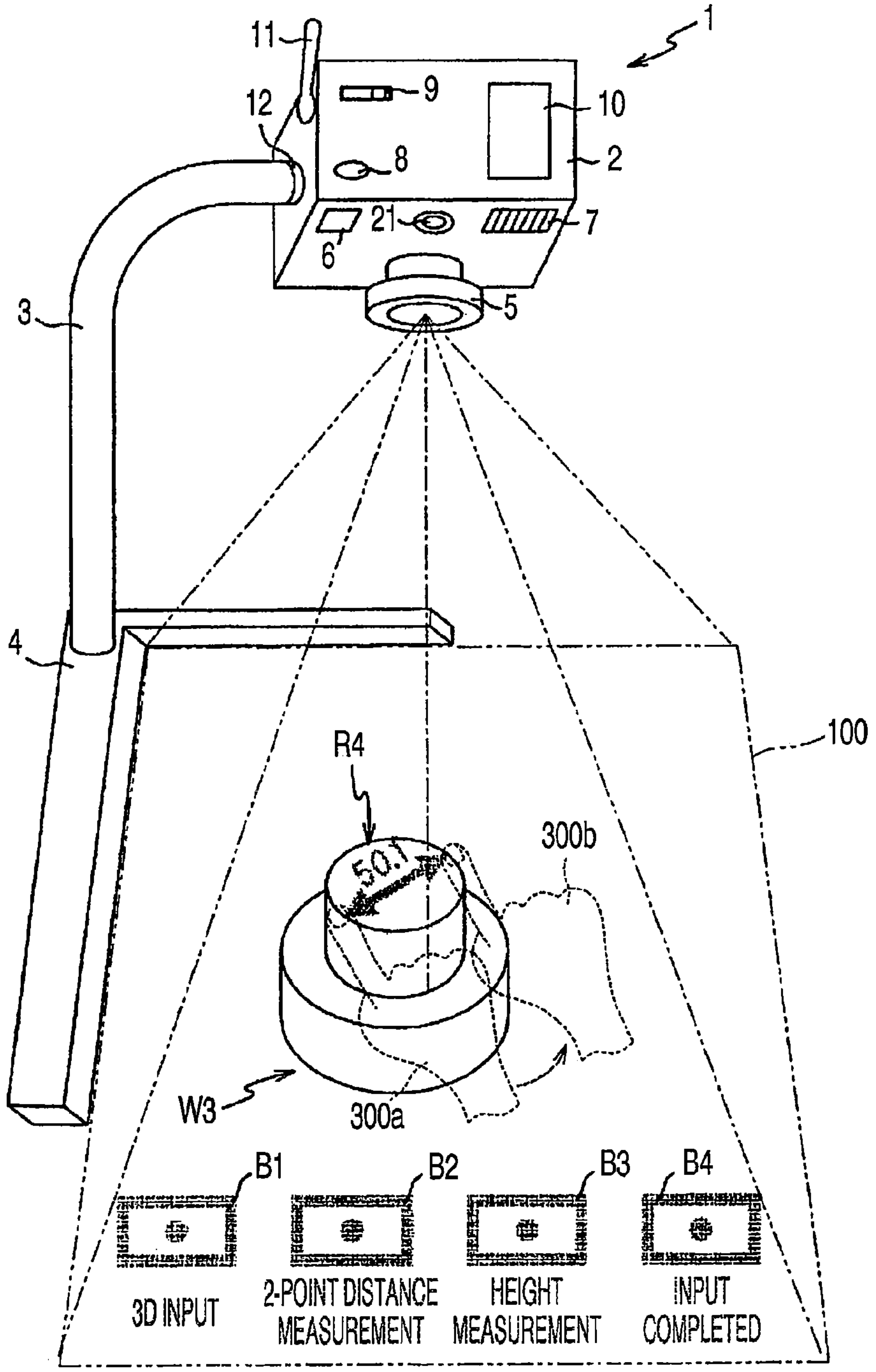

FIG. 69 is a view for explaining a designated-point measurement mode.

Figure 70:
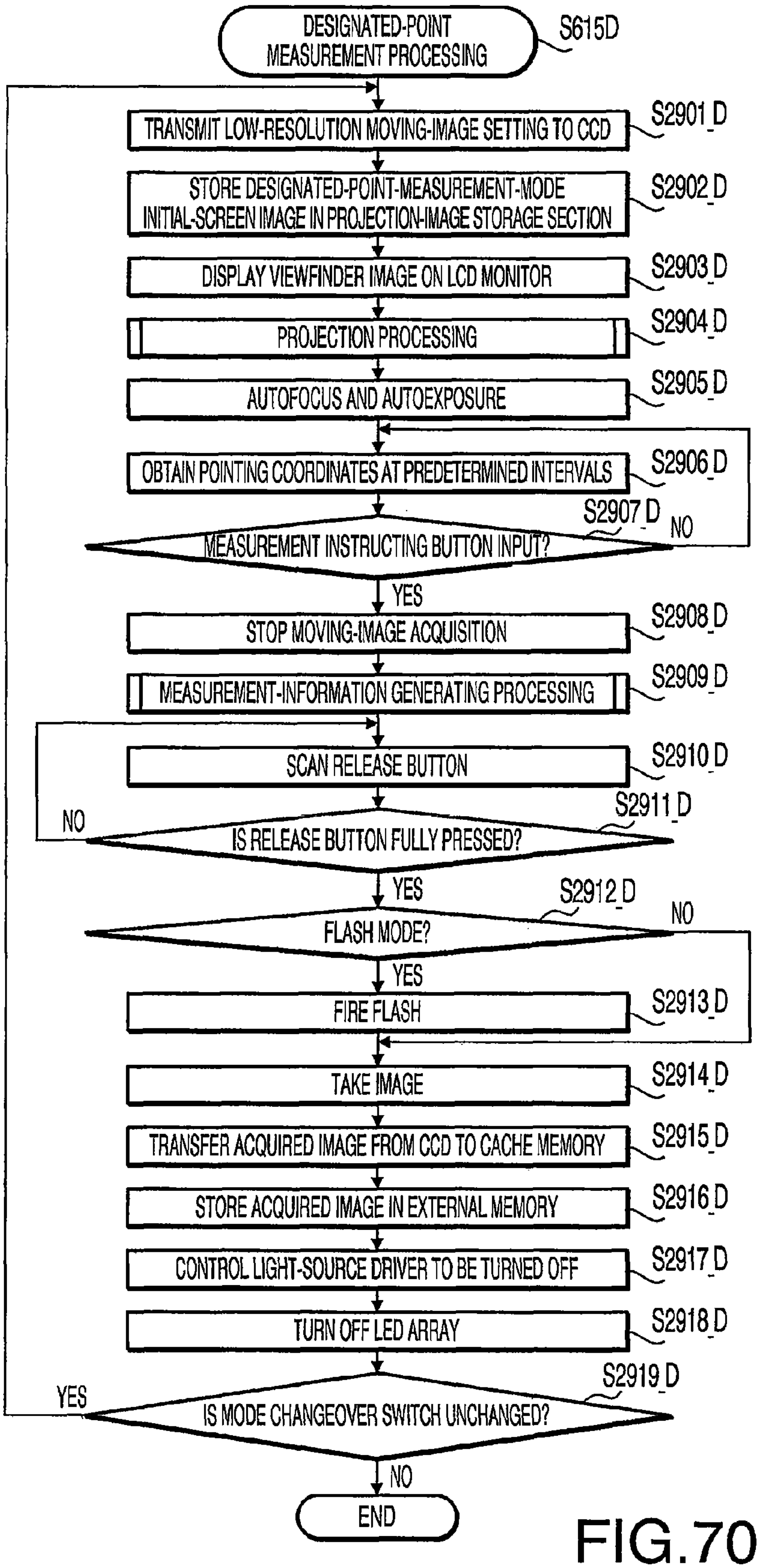

FIG. 70 is a flow chart of designated-point measurement processing.

Figure 71:
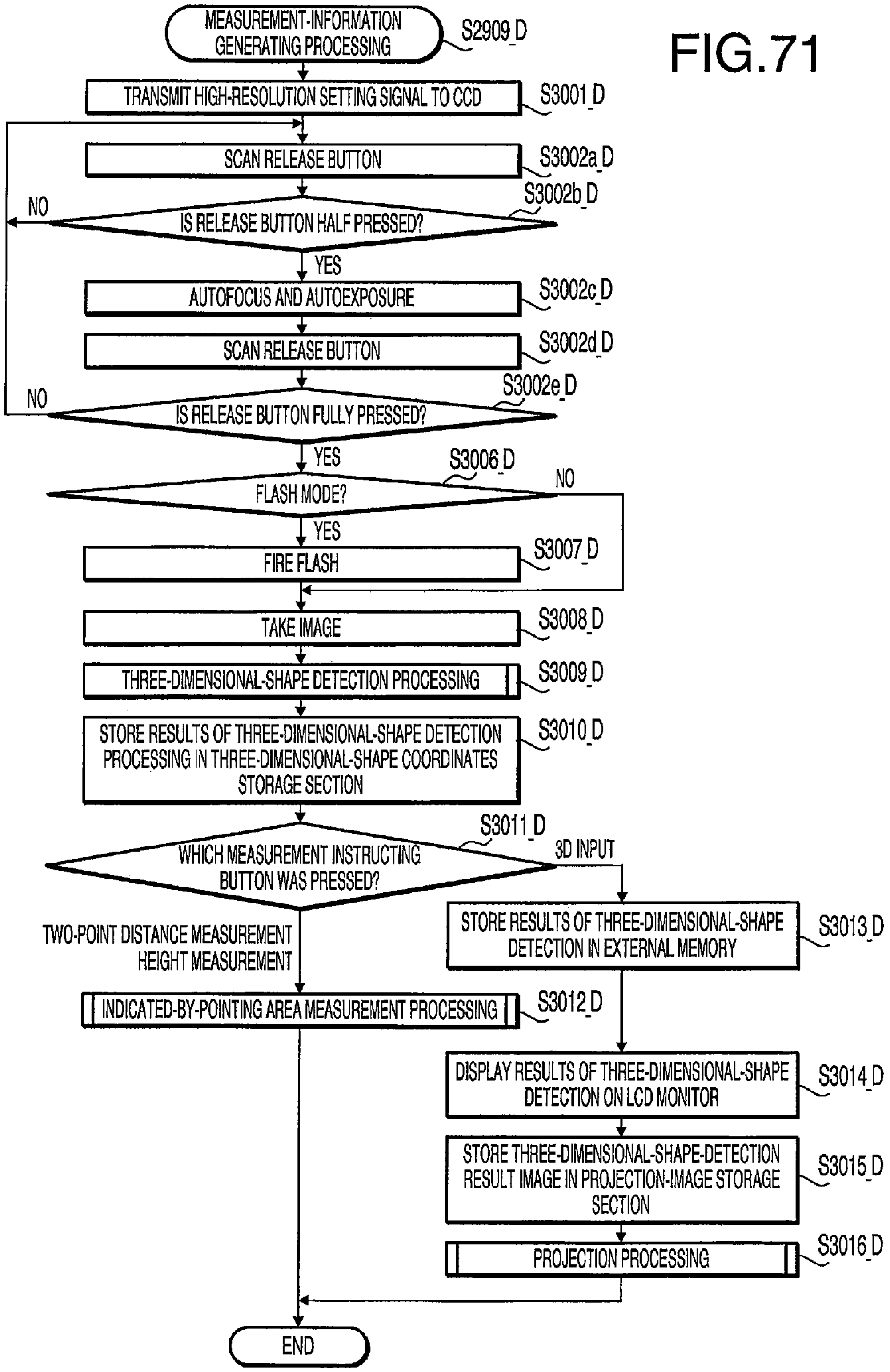

FIG. 71 is a flow chart of measurement-information generation processing.

Figure 72:
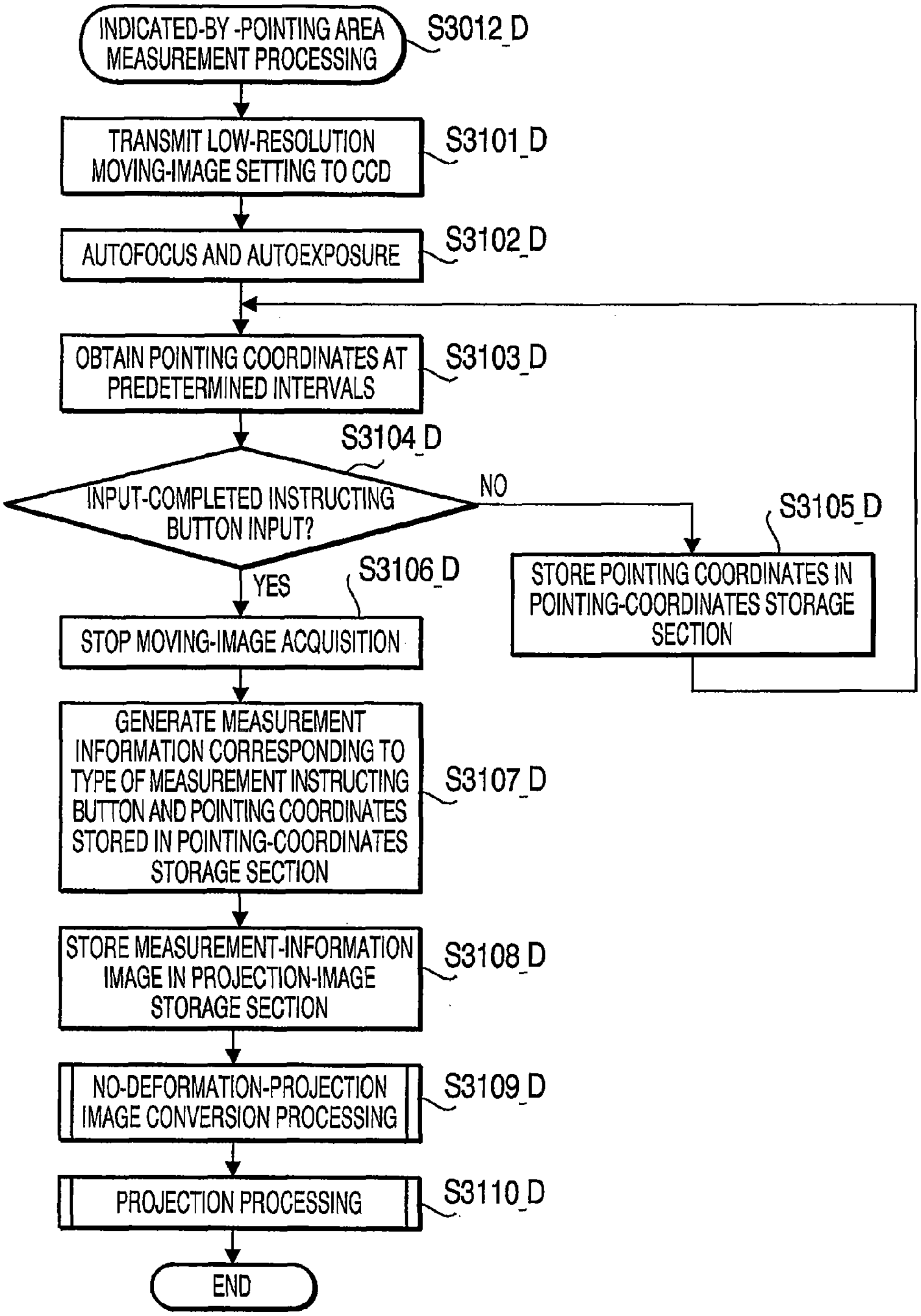

FIG. 72 is a flow chart of indicated-by-pointing area measurement processing.

Figure 73:
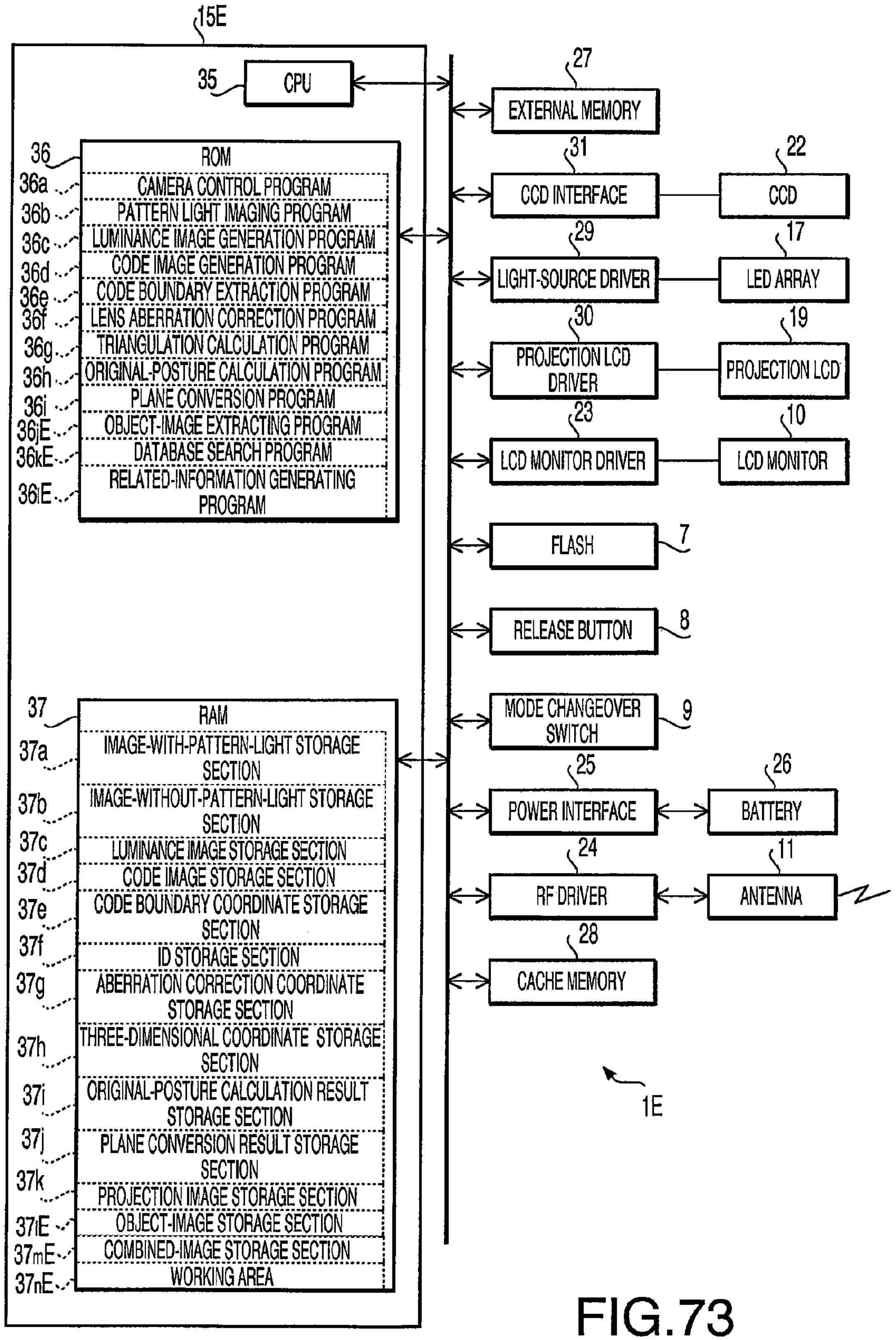

FIG. 73 is an electrical block diagram of an image input-and-output apparatus.

Figure 74:
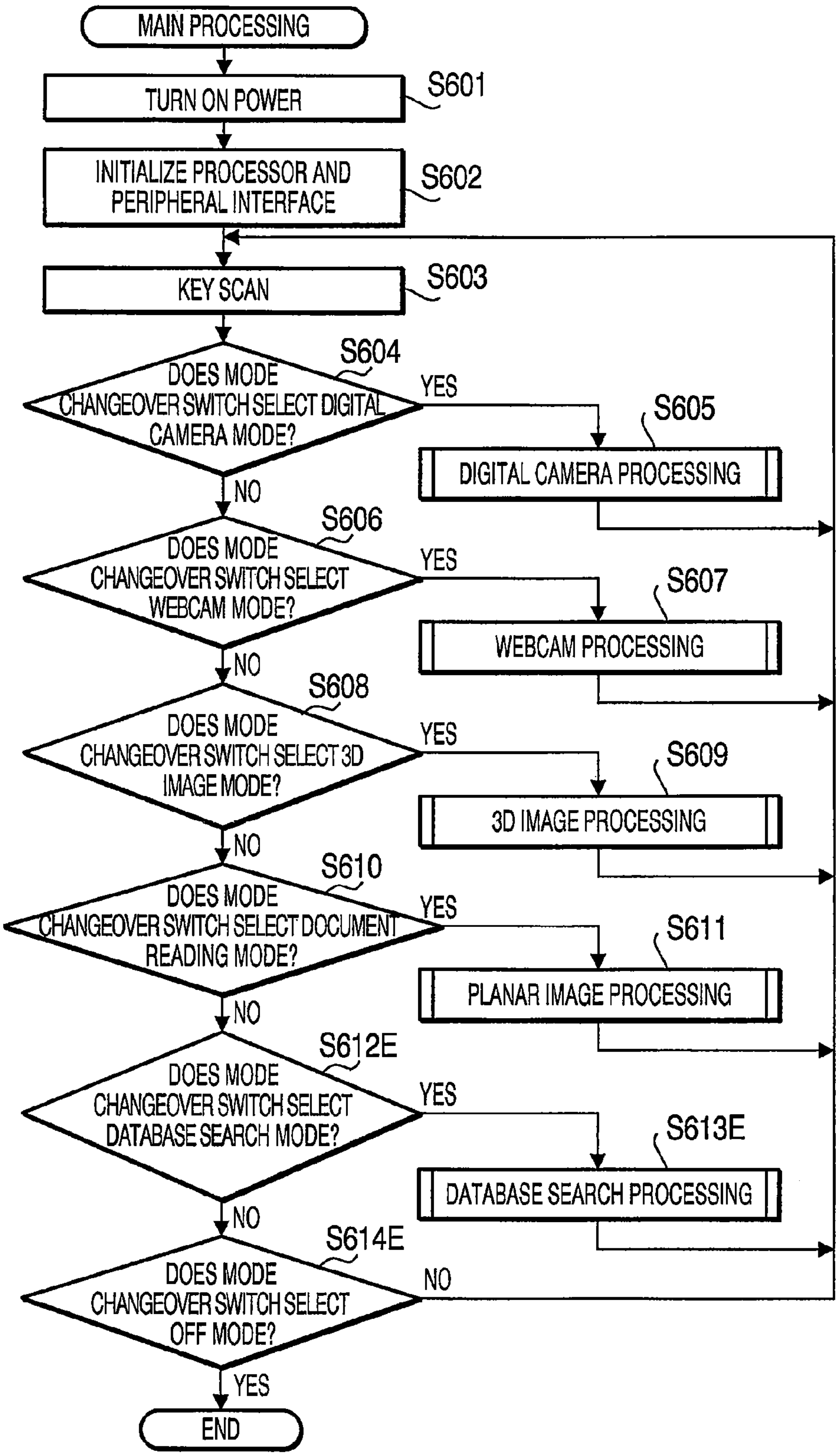

FIG. 74 is a flow chart of main processing.

Figure 75:
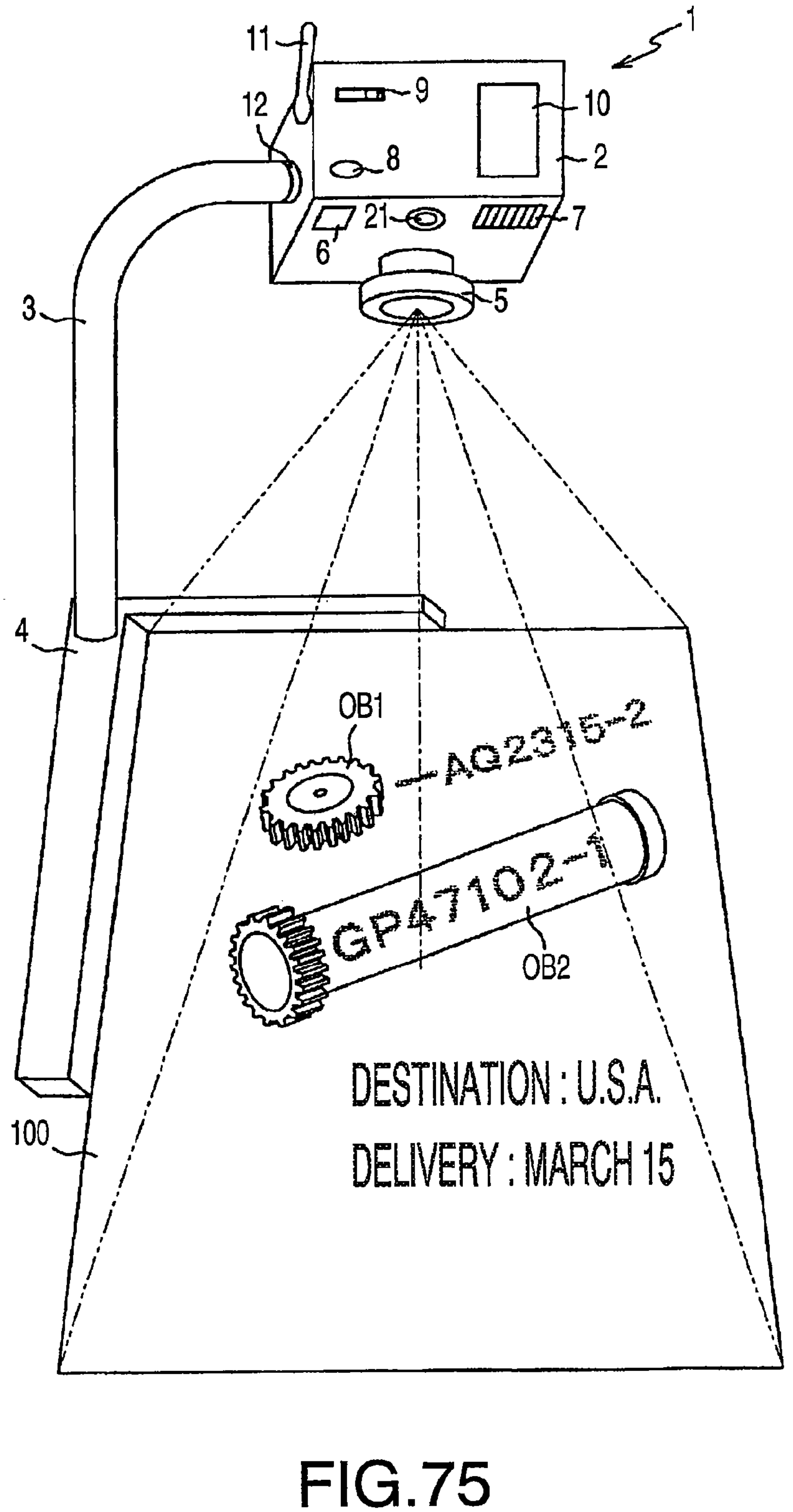

FIG. 75 is a view showing a state in which projection-image information indicating related information of the object, serving as a search result, is projected on the object or close to the object in a database search mode.

Figure 76:
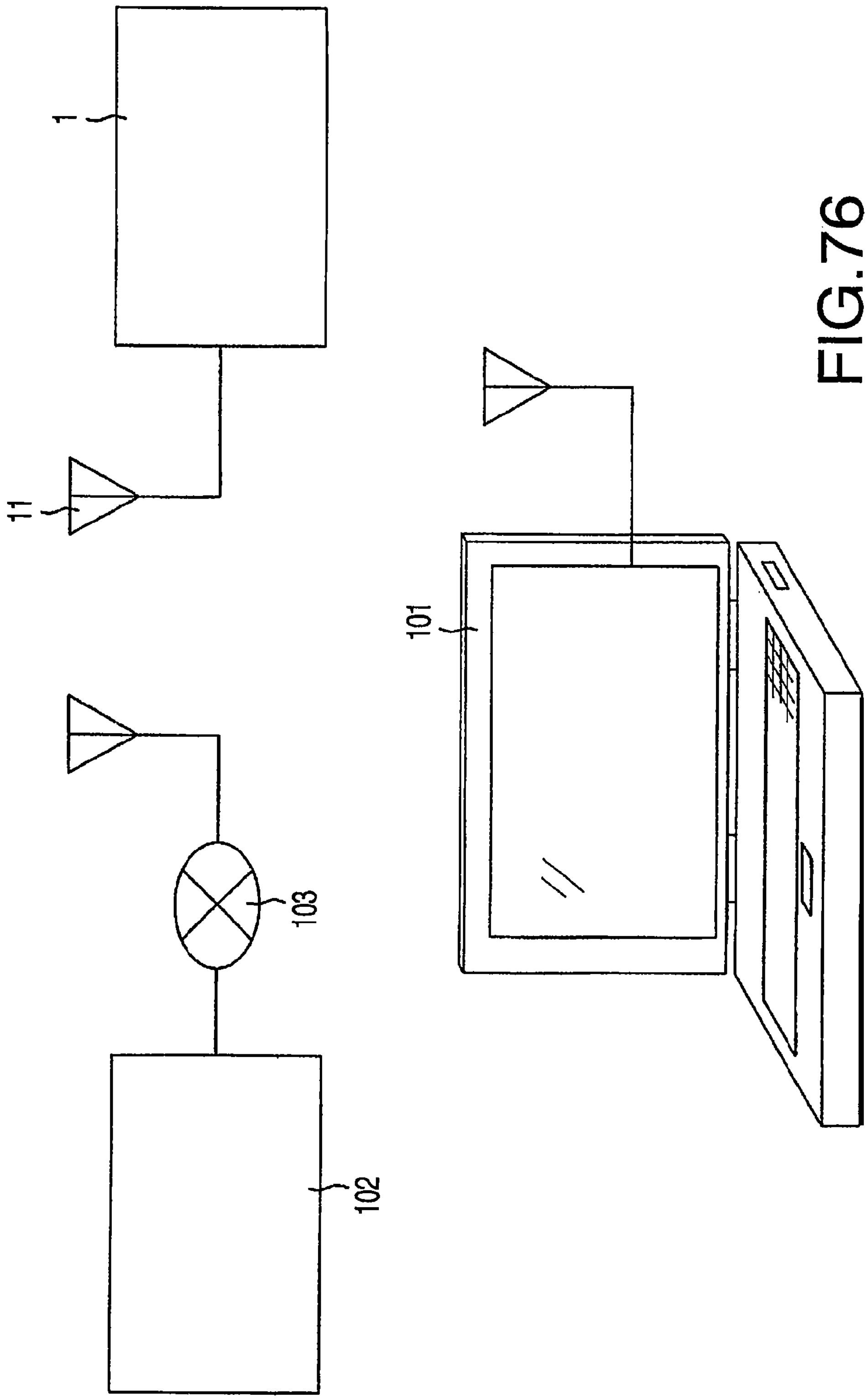

FIG. 76 is a system block diagram showing the relationship between a database accumulating apparatus and the image input-and-output apparatus in the database search mode.

Figure 77:
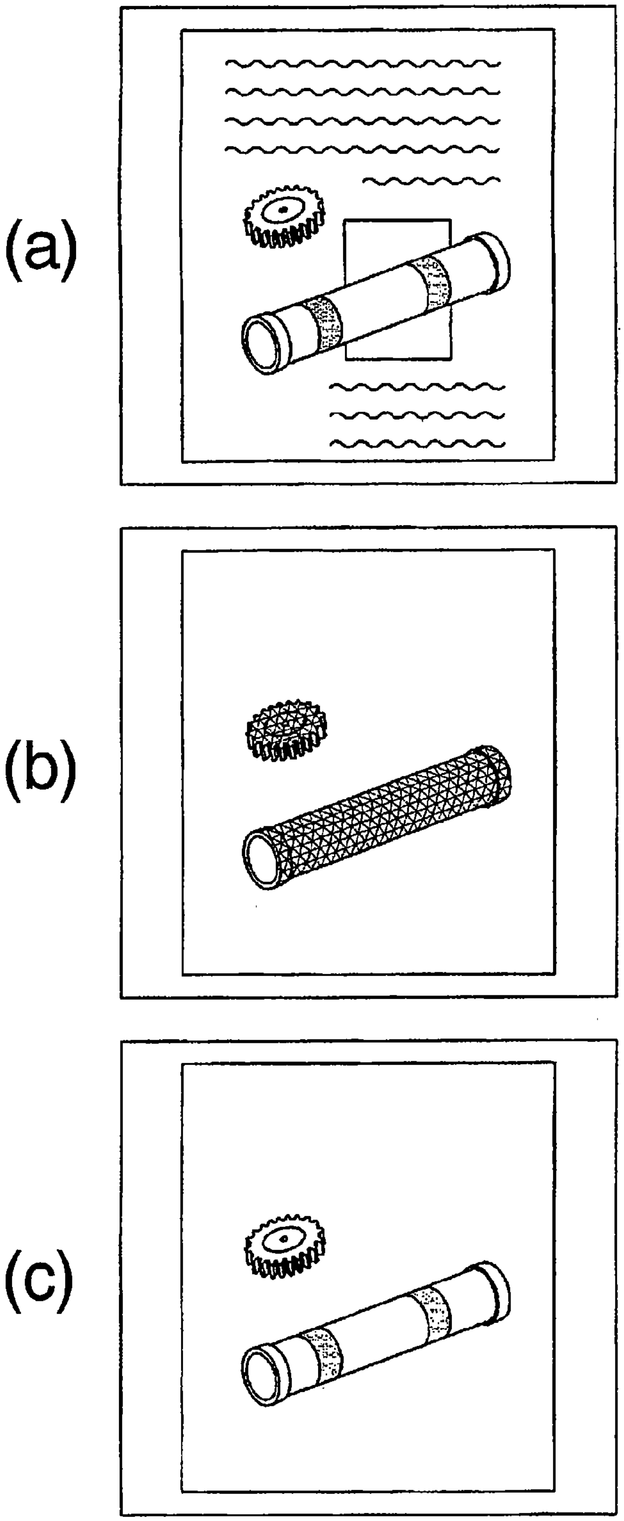

FIG. 77(*a*) is a view showing two-dimensional taken image of objects. FIG. 77(*b*) is a view showing polygon images where measurement vertexes serving as three-dimensional-shape detection results are connected to make polygons and their surfaces are display. FIG. 77(*c*) is a view showing an object image obtained when only areas included in the contours of images determined to be solid in accordance with the three-dimensional-shape detection results are taken out of the two-dimensional taken image shown in FIG. 77(*a*).

Figure 78:
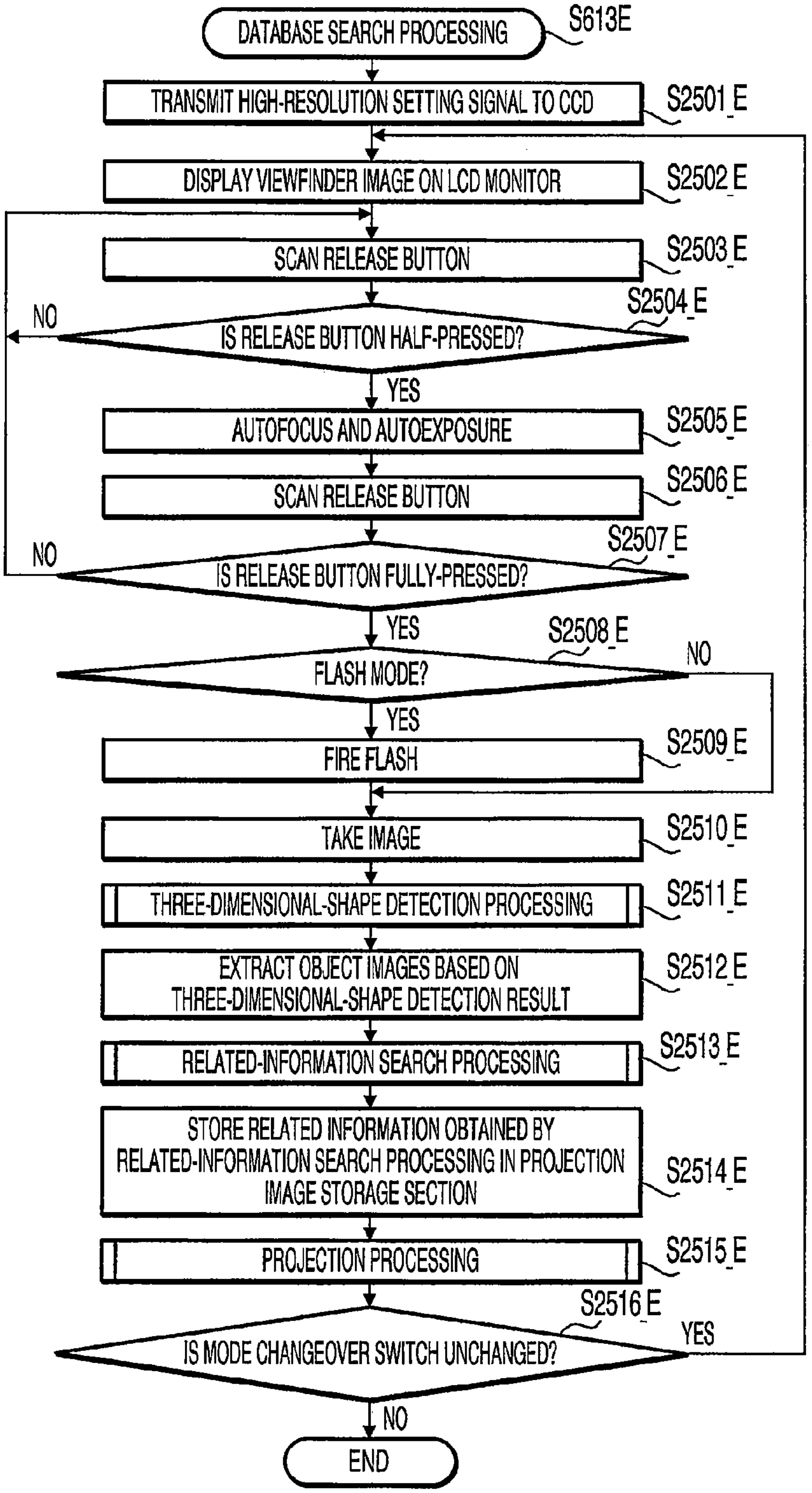

FIG. 78 is a flow chart showing a first case in the database search processing executed in the database search mode.

Figure 79:
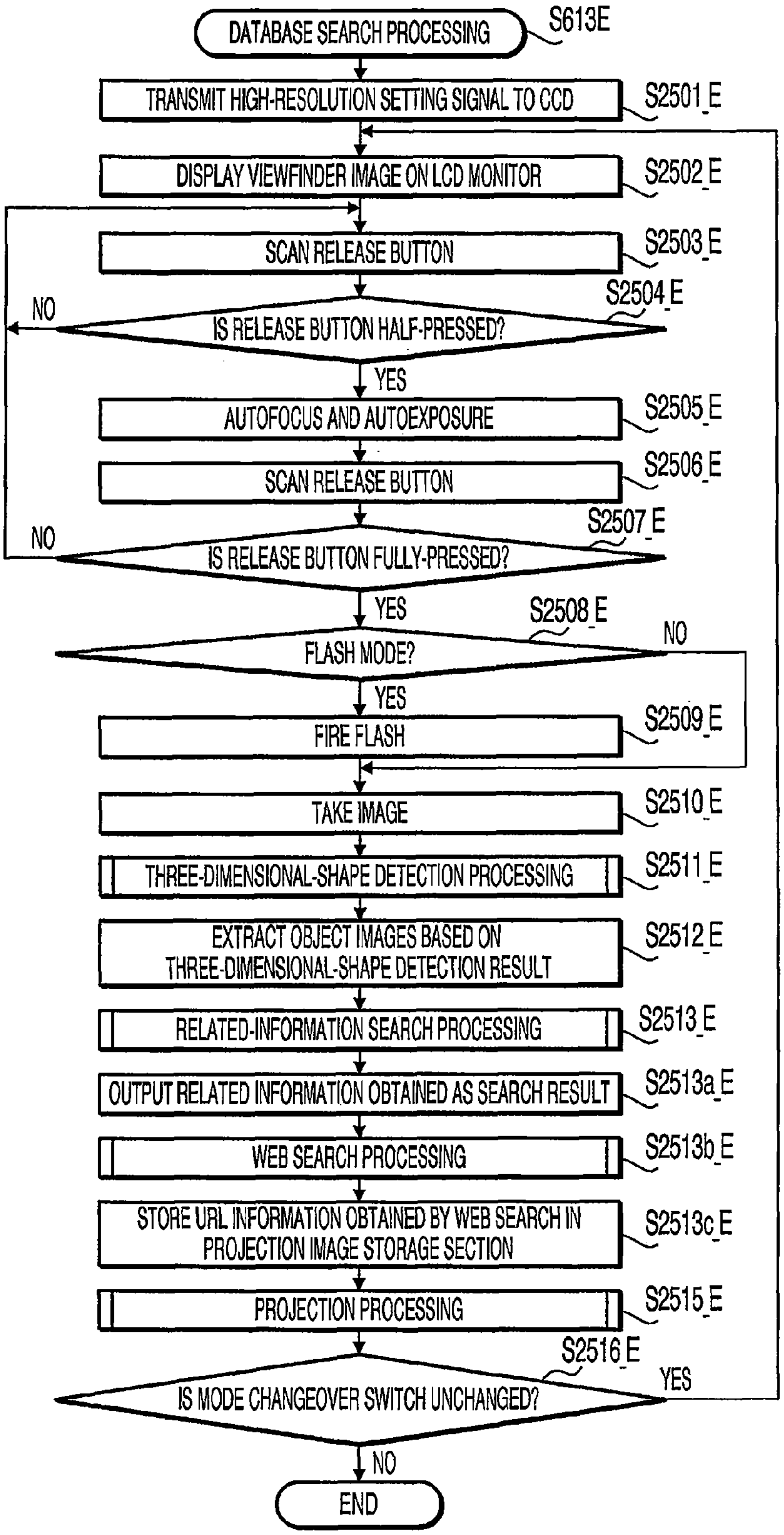

FIG. 79 is a flow chart showing a second case in the database search processing executed in the database search mode.

Figure 80:
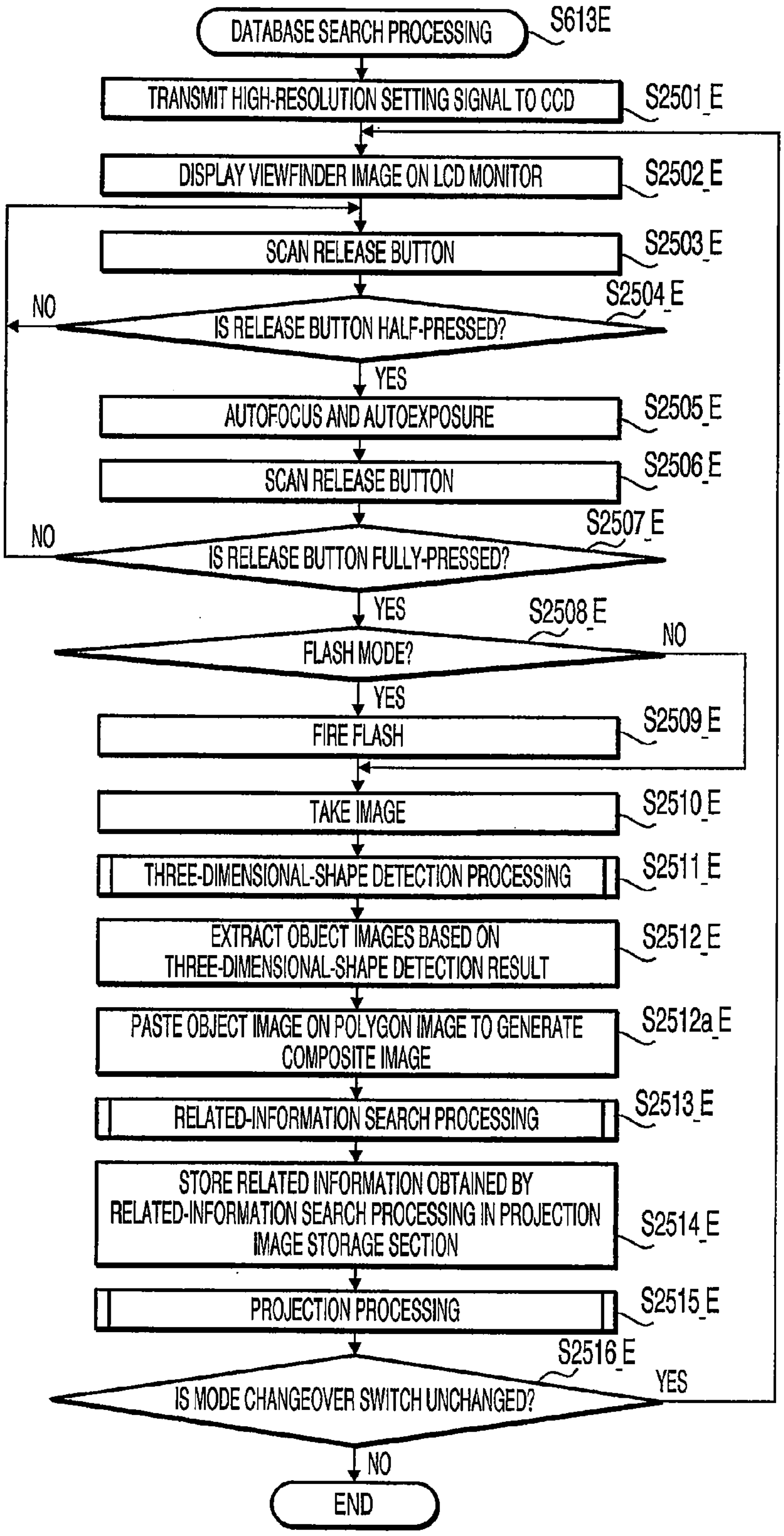

FIG. 80 is a flow chart showing a third case in the database search processing executed in the database search mode.

Figure 81:
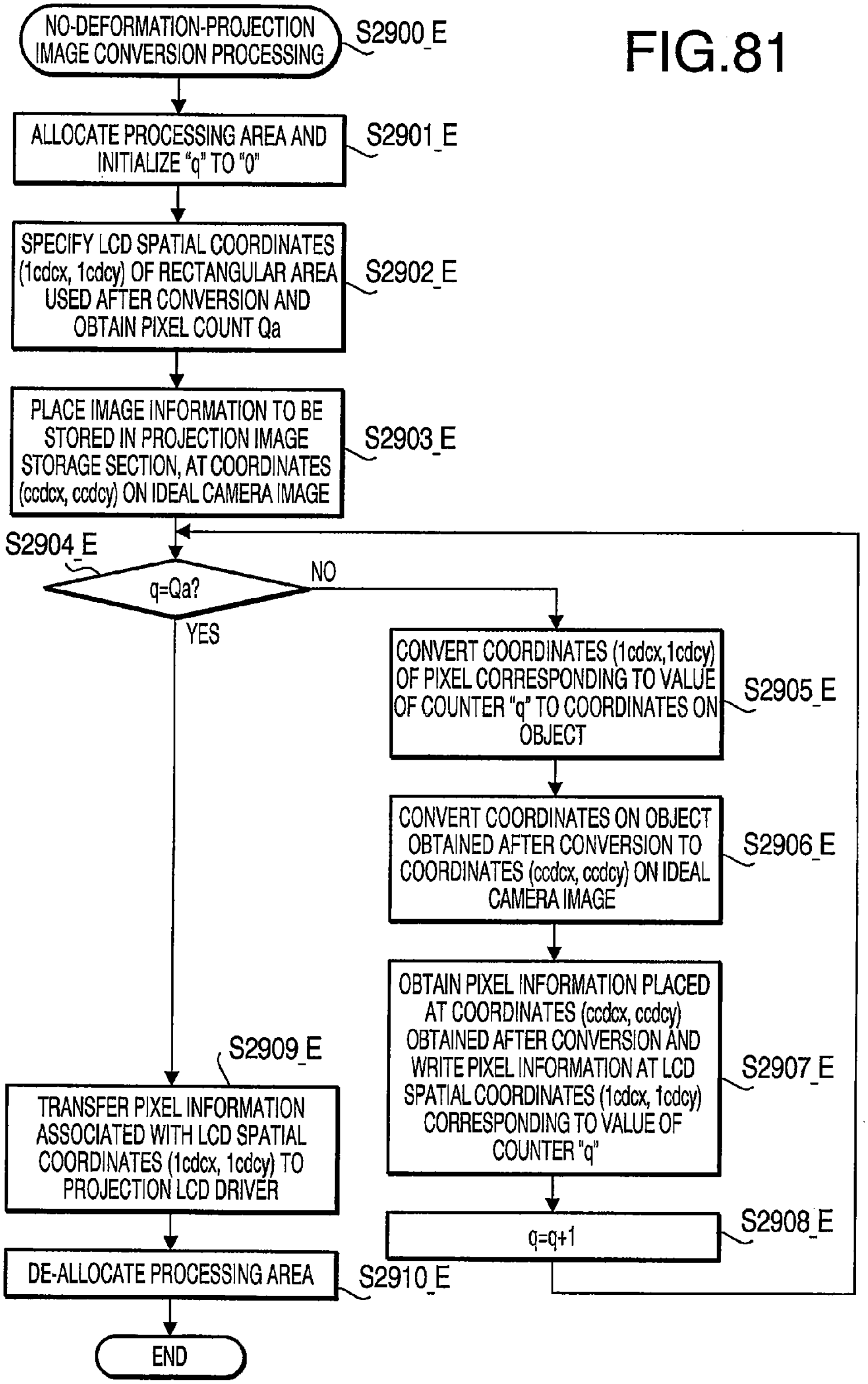

FIG. 81 is a flow chart of no-deformation-projection image conversion processing.

DETAILED DESCRIPTION

Embodiments of the present invention will be described below with reference to the drawings.

First Embodiment

Figure 1:
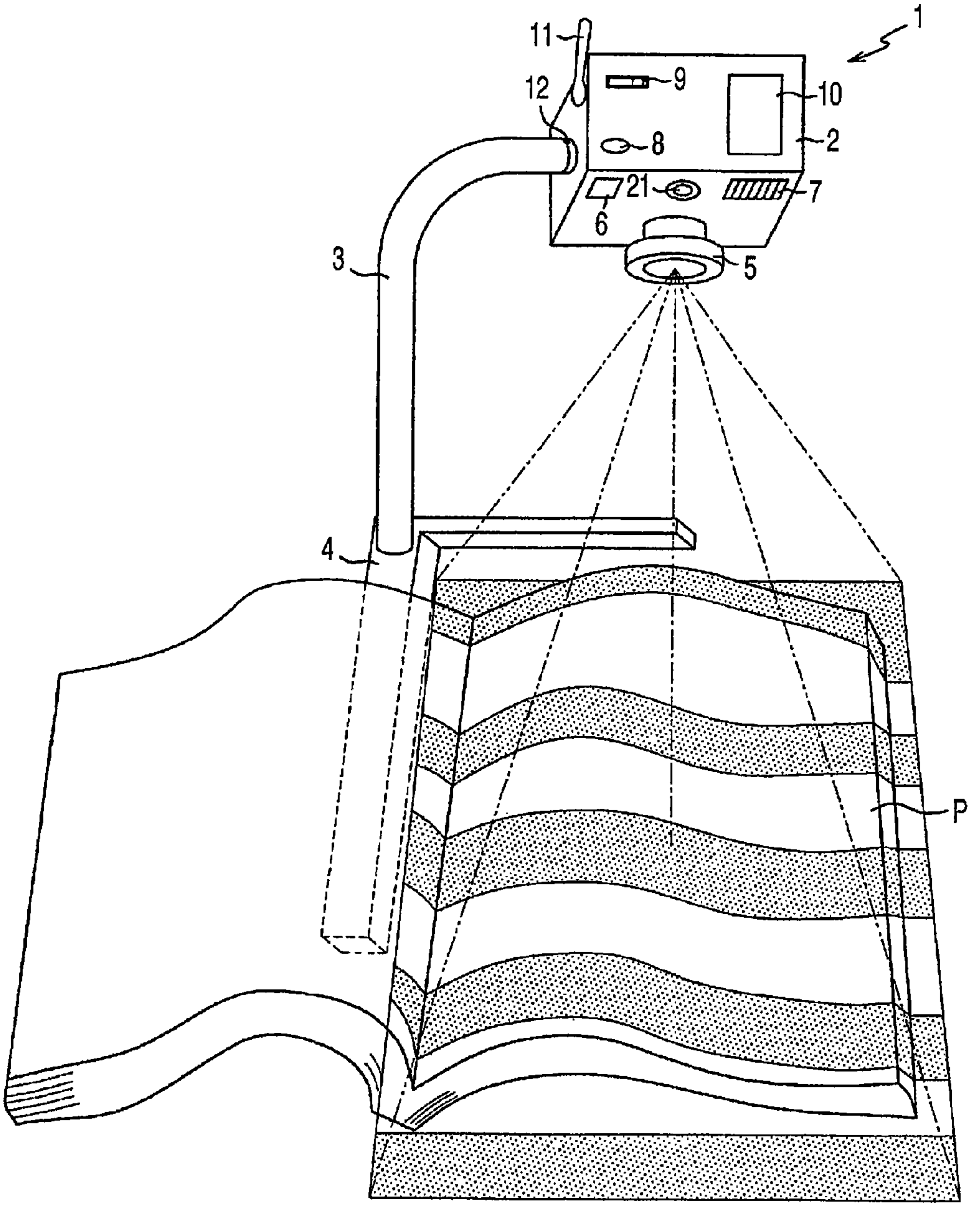
FIG. 1 is an external perspective view of an image input-and-output apparatus.

FIG. 1 is an external perspective view of an image input-and-output apparatus 1. The image input-and-output apparatus 1 includes a projection apparatus and a three-dimensional-shape detection apparatus according to the embodiment of the present invention.

The image input-and-output apparatus 1 has a variety of modes such as a digital camera mode for implementing a digital camera function, a webcam mode for implementing a web camera function, a 3D image mode for obtaining a 3D image by detecting a three-dimensional shape, a planar image mode for obtaining a planar image of a curved original, and the like.

FIG. 1 shows that an image projection section 13, which will be described later, projects a striped pattern light including a series of alternate light and dark patterns for three-dimensional-shape detection of original P serving as an object in the 3D image mode or the planar image mode.

The image input-and-output apparatus 1 includes an imaging head 2 shaped like a box, an arm member 3 shaped like a pipe, with one end connected to the imaging head 2, and a base 4 shaped like a letter L in a plan view, connected to the other end of the arm member 3.

The imaging head 2 is a case containing the image projection section 13 and an image pickup section 14, which will be described later. A cylindrical lens barrel 5 is disposed at the center in front of the imaging head 2. A viewfinder 6 is disposed diagonally above the lens barrel 5. A flash 7 is disposed in an opposite corner of the viewfinder 6. A part of a lens of an imaging optical system 21 of the image pickup section 14, described later, is exposed between the viewfinder 6 and the flash 7 in the front of the imaging head 2. An image of the object is input through the exposed part of the imaging optical system.

The lens barrel 5 is formed to protrude from the front of the imaging head 2 and becomes a cover around a projection optical system 20 of the image projection section 13. The lens barrel 5 holds the projection optical system 20, allows the entire projection optical system 20 to be moved for focusing, and prevents the projection optical system 20 from being damaged. A part of the lens of the projection optical system 20 of the image projection section 13 is exposed from an end face of the lens barrel 5, and image signal light is projected from the exposed part to a projection plane.

The viewfinder 6 includes an optical lens provided from the rear face to the front face of the imaging head 2. The user looking into the viewfinder 6 from the rear of the imaging head 2 can see a range almost identical to a range in which the imaging optical system 21 forms an image on a CCD 22.

The flash 7 is a light source providing an additional amount of light required in the digital camera mode, for instance, and has a discharge tube filled with a xenon gas. The flash 7 can be used repeatedly when an internal capacitor (not shown) of the imaging head 2 discharges.

A release button 8 is disposed in the top face of the imaging head 2 near the front face. A mode changeover switch 9 is disposed behind the release button 8. An LCD monitor 10 is disposed at a side opposite to the mode changeover switch 9.

The release button 8 includes a two-position pushbutton switch which can be half-pressed or full-pressed. The state of the release button 8 is managed by a processor 15, which will be described later. When the release button 8 is half-pressed, a commonly-known autofocus (AF) function and autoexposure (AF) function are activated under the control of the processor 15, and the focus, aperture, and shutter speed are adjusted. When the release button 8 is full-pressed, an image is taken, or the like.

The mode changeover switch 9 is a switch for setting the digital camera mode, webcam mode, 3D image mode, planar image mode, model trace mode, off mode, or any other mode. The state of the mode changeover switch 9 is managed by the processor 15. When the processor 15 detects the state of the mode changeover switch 9, corresponding mode processing is executed.

The LCD monitor 10 includes a liquid crystal display and shows an image of an image signal received from the processor 15 to the user. The LCD monitor 10 can display an image taken in the digital camera mode or the webcam mode, an image obtained as a result of three-dimensional-shape detection in the 3D image mode, or a planar image in the planar image mode, and the like.

On a side face of the imaging head 2, an antenna 11 used as a radio frequency (RF) interface is provided in an upper part, and a coupling member 12 for coupling the imaging head 2 and the arm member 3 is also disposed.

The antenna 11 is used to send an image data taken in the digital camera mode, a 3D image data taken in the 3D image mode, or the like through an RF driver 24, which will be described later, to an external interface by radio communication.

The coupling member 12 is shaped like a ring, and a female thread is formed on its inner face. The coupling member 12 is rotatably secured to a side face of the imaging head 2. A male thread is formed on one end of the arm member 3. The imaging head 2 and the arm member 3 can be detachably coupled by fitting the female thread of the coupling member 12 and the male thread of the arm member 3, and the imaging head 2 can be fixed at a certain angle. The imaging head 2 can be used as a usual digital camera when it is detached from the arm member 3.

The arm member 3 holds the imaging head 2 in a certain variable imaging position and has a pleated flexible pipe that can be bent into a desired shape. The arm member 3 can direct the imaging head 2 into a desired position.

The base 4 is placed on a desk or a table and supports the imaging head 2 and the arm member 3. The base 4 is shaped like a letter L in a plan view and can support the imaging head 2 and the like with stability. The base 4 and the arm member 3 are detachably coupled. This makes it easy to carry the image input-and-output apparatus 1 and to house the image input-and-output apparatus 1 in a small space.

Figure 2:
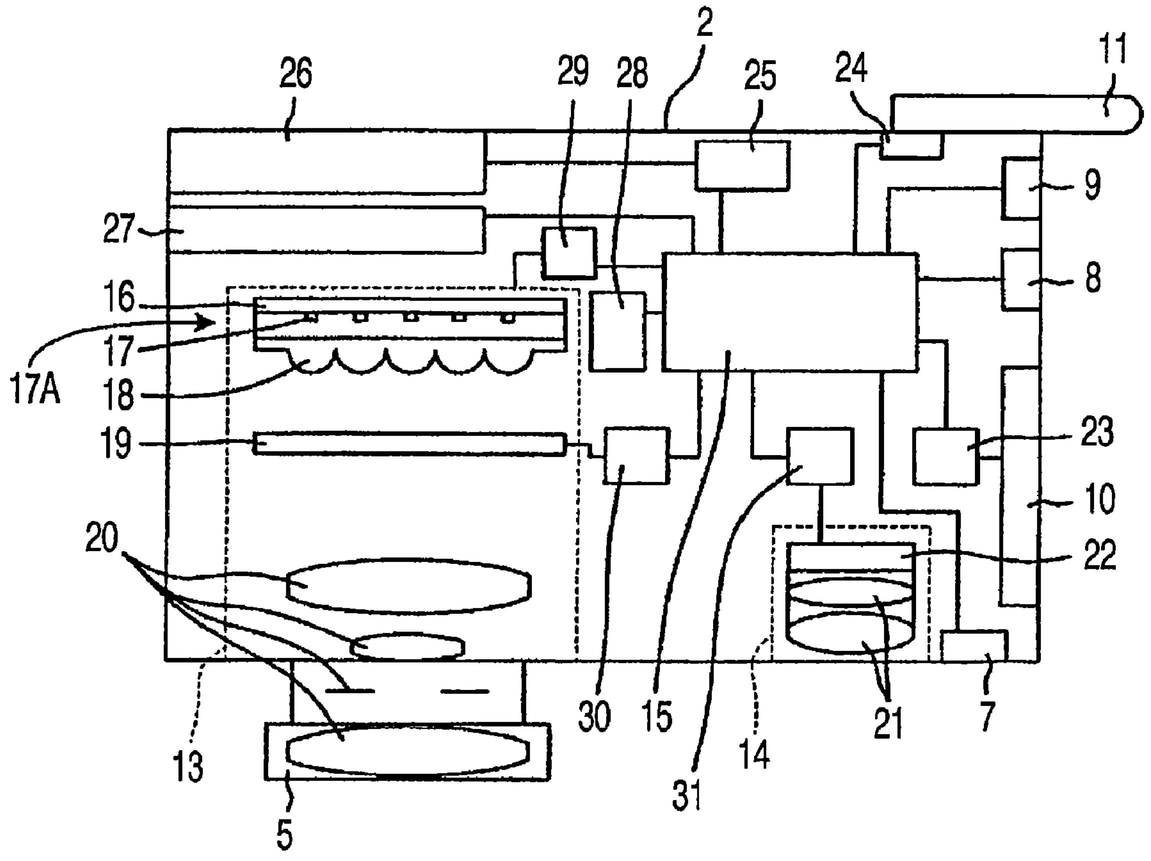
FIG. 2 is a view showing an internal configuration of an imaging head.

FIG. 2 is an outline diagram showing an internal configuration of the imaging head 2. The imaging head 2 contains the image projection section 13, the image pickup section 14, and the processor 15.

The image projection section 13 is a unit for projecting a certain image onto the projection plane. The image projection section 13 includes a substrate 16, a plurality of LEDs 17 (hereafter collectively referred to as an LED array 17A), a light-source lens 18, a projection LCD 19, and the projection optical system 20, in that order in the projecting direction. The image projection section 13 will be described in further detail later with reference to FIGS. 3(*a*) to 3(*c*).

The image pickup section 14 is a unit for taking an image of original P serving as the object. The image pickup section 14 includes the imaging optical system 21 and the CCD 22 along the light input direction.

The imaging optical system 21 has a plurality of lenses. The imaging optical system 21 has a commonly-known autofocus function, automatically adjusts the focal length and aperture, and forms external light into an image on the CCD 22.

The CCD 22 has photoelectric transducers such as a matrix of charge coupled devices (CCDs). The CCD 22 generates a signal depending on the color and intensity of light of the image formed on the surface of the CCD 22 through the imaging optical system 21, converts the signal to digital data, and outputs the data to the processor 15.

The processor 15 is electrically connected to the flash 7, the release button 8, the mode changeover switch 9, an external memory 27, and a cache memory 28. The LCD monitor 10 is connected through a LCD monitor driver 23, the antenna 11 is connected through an RF driver 24, a battery 26 is connected through a power interface 25, the LED array 17A is connected through a light-source driver 29, the projection LCD 19 is connected through a projection LCD driver 30, and the CCD 22 is connected through a CCD interface 31, to the processor 15. These components connected to the processor 15 are managed by the processor 15.

The external memory 27 is a detachable flash ROM and stores three-dimensional information and an image taken in the digital camera mode, webcam mode, or 3D image mode. An SD card, compact flash (registered trademark) card, and the like can be used as the external memory 27, for instance.

The cache memory 28 is a high-speed storage device. For instance, an image taken in the digital camera mode is transferred to the cache memory 28 at a high speed, and the image is stored in the external memory 27 after the processor 15 finishes image processing. More specifically, an SDRAM, DDRRAM, and the like can be used.

The power interface 25, the light-source driver 29, the projection LCD driver 30, and the CCD interface 31 are integrated circuits (ICs). The power interface 25, the light-source driver 29, the projection LCD driver 30, and the CCD interface 31 control the battery 26, the LED array 17A, the projection LCD 19, and the CCD 22, respectively.

Figure 3:
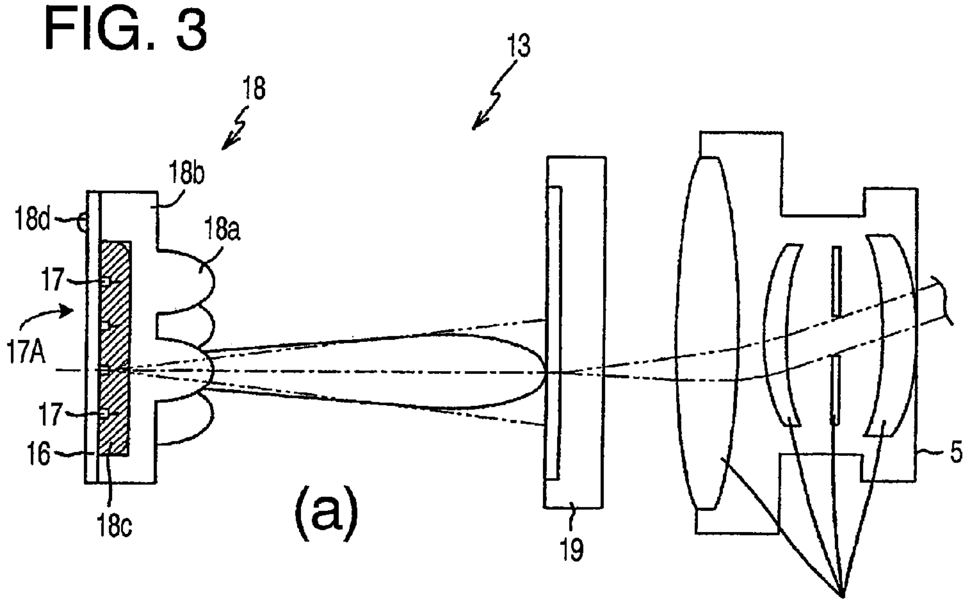
FIG. 3(*a*) is a magnified view of an image projection section, FIG. 3(*b*) is a plan view of a light-source lens, and FIG. 3(*c*) is a front view of a projection LCD 19.
Figure 3:
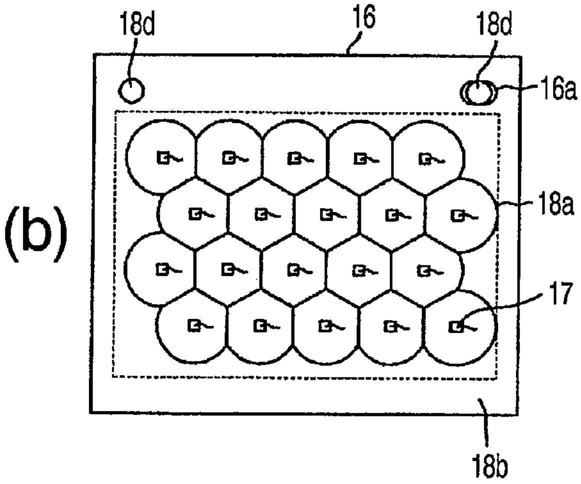
Figure 3:
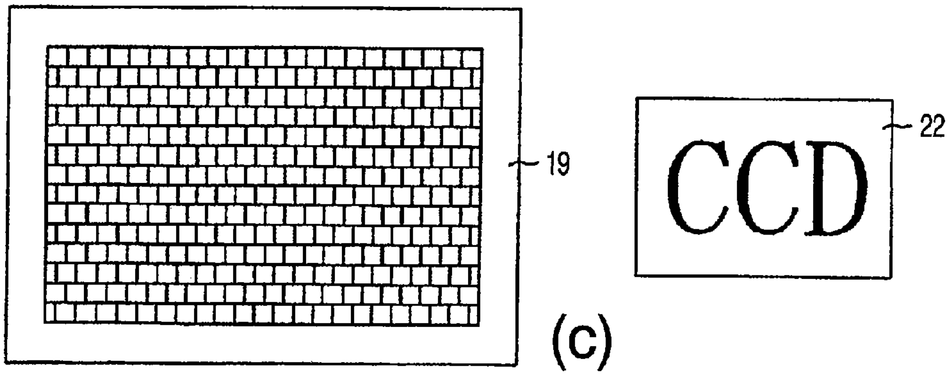

FIG. 3(*a*) is a magnified view of the image projection section 13, FIG. 3(*b*) is a plan view of the light-source lens 18, and FIG. 3(*c*) is a view showing a positional relationship of the projection LCD 19 and the CCD 22. As has been described earlier, the image projection section 13 includes the substrate 16, the LED array 17A, the light-source lens 18, the projection LCD 19, and the projection optical system 20, along the direction of projection.

The LED array 17A is mounted to, and electrical wiring for the LED array 17A is installed in, the substrate 16. More specifically, the substrate 16 can be an aluminum substrate coated with an insulating resin and a pattern formed by a nonelectrolytic plating on the coating or an epoxy-glass-rigid-core substrate with a single-layer or multilayer structure.

The LED array 17A is a light source emitting radial light toward the projection LCD 19. The LED array 17A includes rows of staggered light emitting diodes (LEDs) 17 provided on the substrate 16. The LEDs 17 are pasted to the substrate 16 by a silver paste and electrically connected to the substrate 16 through bonding wire.

The plurality of LEDs 17 used as a light source can convert electricity to light with higher efficiency (higher electrooptic conversion efficiency) than an incandescent lamp, a halogen lamp, or the like used as the light source, and can suppress the generation of infrared rays and ultraviolet rays. According to the embodiment, the light source can be driven with reduced power requirements, and a power saving and a longer life can be achieved. A rise in temperature of the apparatus can also be reduced.

Because the LEDs 17 generates greatly fewer heat rays than the halogen lamp and the like, the light-source lens 18 and the projection optical system 20 can use a plastic lens, which will be described later. Consequently, the cost and weight of the light-source lens 18 and the projection optical system 20 can be reduced in comparison with when a glass lens is used.

The LEDs 17 constituting the LED array 17A emit light in the same color, or amber light. The LEDs 17 are made of a material of four elements: Al, In, Ga, and P. Accordingly, chromatic aberration correction which would be required when light is emitted in different colors is not necessary, and an achromatic lens for correcting chromatic aberration is not required in the projection optical system 20. A projection means of an inexpensive material with a simple surface structure can be provided.

Because the amber LED of the four-element material having an electrooptic conversion efficiency of about 80 lumen/W higher than the LED of another color is used, a higher luminance, power saving, and a lower life can be achieved. The effect of the staggered arrangement of the LEDs 17 will be described with reference to FIGS. 4(*a*) to 4(*c*).

To be more specific, the LED array 17A has fifty-nine LEDs 17, and each LED 17 is driven at 20 mA and 2.5 V (50 mW). The fifty-nine LEDs 17 consume about 3 watts of power. When the projection optical system 20 projects light emitted from the LED 17 through the light-source lens 18 and the projection LCD 19, the luminance of the ray bundle is about 25 ANSI lumen even in full projection.

When a three-dimensional shape of an object such as a human or animal face is detected in the 3D image mode, for instance, this level of luminance does not give glare to the person or animal, enabling the three-dimensional shape to be detected while the person or animal is opening their eyes.

The light-source lens 18 is a lens as a light collecting optical system for collecting light radially emitted from the LED array 17A. The material of the lens is made of optical plastics such as an acrylic resin.

To be more specific, the light-source lens 18 includes a convex lens section 18*a* provided to jut out toward the side of the projection LCD 19 in a position facing each LED 17 of the LED array 17A, a base section 18*b* supporting the convex lens section 18*a*, an epoxy sealing agent 18*c* for filling an opening containing the LED array 17A in the internal space of the base section 18*b* for sealing the LED 17 and gluing the substrate 16 and the light-source lens 18, and a positioning pin 18*d* protruding from the base section 18*b* to the side of the substrate 16 for connecting the light-source lens 18 and the substrate 16.

The light-source lens 18 is fixed on the substrate 16 by inserting the positioning pin 18*d* into an oval hole 16*a* made in the substrate 16 while holding the LED array 17A in the internal opening.

Therefore, the light-source lens 18 can be provided in a reduced space. The substrate 16 has a function to hold the LED array 17A and also a function to support the light-source lens 18, eliminating the need for providing a separate support of the light-source lens 18, so that the number of components can be reduced.

The lens sections 18*a* are disposed in positions facing the LEDs 17 of the LED array 17A in a one-to-one relationship.

The radial light emitted from the LEDs 17 is efficiently collected by the lens sections 18*a* facing the LEDs 17, and the light is applied to the projection LCD 19 as high-directivity radial light, as shown in FIG. 3(*a*). One reason of the high directivity is that variations in transmittance in the plane can be suppressed by applying light almost perpendicular to the projection LCD 19. Another reason of the high directivity is that light which can pass an internal aperture is limited to a range of +5% to −5% of the normal because the projection optical system 20 has telecentric characteristics with an incident NA of about 0.1. Accordingly, important factors to improve the image quality are that the angle of outgoing light from the LEDs 17 is adjusted to be normal to the projection LCD 19 and that most of the ray bundles fall in the range of +5% to −5%. If light beyond the normal range is applied to the projection LCD 19, the optical rotation of the liquid crystal changes the transmittance in accordance with the incident angle, resulting in variations in transmittance.

The projection LCD 19 is a spatial modulation element which performs spatial modulation of light collected through the light-source lens 18 and outputs image signal light to the projection optical system 20. To be more specific, the projection LCD 19 includes a flat liquid crystal display having a height and width different from each other in length.

As shown in FIG. 3(*c*), the pixels of the projection LCD 19 are arranged in parallel rows, alternating between one linear pixel row along the longitudinal direction of the projection LCD 19 and another pixel row with pixel positions shifted by a predetermined distance along the longitudinal direction of the projection LCD 19 from those in the one linear pixel row.

FIG. 3(*c*) shows the face on the side of the front of the imaging head 2, and light is emitted toward the projection LCD 19 from the other face. The light returned from the object is sent from the face shown in FIG. 3(*c*) to the other face, and the image of the object is formed on the CCD 22.

Since the pixels of the projection LCD 19 are arranged in rows in the longitudinal direction in a staggered configuration, light subjected to spatial modulation by the projection LCD 19 can be controlled at a ½ pitch in a direction perpendicular to the longitudinal direction (in a transverse direction). Accordingly, the projection pattern can be controlled at a small pitch, and a high-precision three-dimensional shape can be detected with a high resolution.

When striped pattern light including a series of alternate light and dark patterns is thrown onto the object to detect the three-dimensional shape of the object in the 3D image mode or planar image mode, which will be described later, the boundaries between the light and dark patterns can be controlled at a ½ pitch by aligning the stripe with the transverse direction of the projection LCD 19. Accordingly, a three-dimensional shape can be detected with high precision.

The projection LCD 19 and the CCD 22 are placed inside the imaging head 2 as shown in FIG. 3(*c*). To be more specific, because the projection LCD 19 and the CCD 22 are disposed with their wide faces directed almost in the same direction, the image projected from the projection LCD 19 onto the projection plane can be formed directly on the CCD 22 without deflecting the projection image by a half mirror or the like.

The CCD 22 is disposed in the longitudinal direction of the projection LCD 19 (in the direction of rows of pixels). When the three-dimensional shape of an object is detected by triangulation in the 3D image mode or planar image mode, the angle formed by the CCD 22 and the object can be controlled at a ½ pitch. Accordingly, the three-dimensional shape can be detected with high precision.

The projection optical system 20 includes a plurality of lenses for projecting image signal light which has passed the projection LCD 19 onto the projection plane. The projection optical system 20 includes telecentric lenses made by a combination of glass and plastic. In the telecentric configuration, a main beam passing the projection optical system 20 is parallel to the optical axis in the incoming space, and the exit pupil is at infinity. The telecentric configuration allows light passing the projection LCD 19 within the range of +5% to −5% of the normal to be projected, and the image quality can be improved.

FIGS. 4(*a*) to 4(*c*) are views illustrating an arrangement in the LED array 17A. FIG. 4(*a*) shows an illumination distribution of light passing the light-source lens 18. FIG. 4(*b*) is a plan view showing the arrangement in the LED array 17A. FIG. 14(*c*) is a view showing combined illumination distribution in the face of the projection LCD 19.

As shown in FIG. 4(*a*), light passing the light-source lens 18 is designed to reach the surface of the projection LCD 19 as light having the illumination distribution shown in the right part of FIG. 4(*a*) with half angle θ (about 5 degrees) at half maximum.

As shown in FIG. 4(*b*), the plurality of LEDs 17 are arranged in a staggered configuration on the substrate 16. To be more specific, a plurality of straight rows of LEDs 17 disposed at a pitch of “d” are arranged in parallel at a pitch of √3/2d, and every other row is slid by 1/2d in the same direction with reference to the previous row.

In other words, the distance between one LED 17 and an adjacent LED becomes d (a triangular grid of LEDs is formed).

The length of “d” is determined to be equal to or smaller than the full width at half maximum (FWHM) of the illumination distribution formed on the projection LCD 19 by light emitted from one LED 17.

The combined illumination distribution of light passing the light-source lens 18 and reaching the surface of the projection LCD 19 becomes a straight line with small ripples as shown in FIG. 4(*c*). Light can be applied to the face of the projection LCD 19 almost uniformly. Accordingly, variations in illumination on the projection LCD 19 can be suppressed, and a high-quality image can be projected as a result.

FIG. 5 is a block diagram showing an electric configuration of the image input-and-output apparatus 1. The components described earlier will not be explained again. The processor 15 has a CPU 35, a ROM 36, and a RAM 37.

The CPU 35 executes various processing in accordance with programs stored in the ROM 36, using the RAM 37. Processing executed under the control of the CPU 35 includes the sensing of the pressing of the release button 8, the capturing of image data from the CCD 22, the transfer and storage of the image data, and sensing of the state of the mode changeover switch 9.

The ROM 36 stores a camera control program 36*a*, a pattern light imaging program 36*b*, a luminance image generation program 36*c*, a code image generation program 36*d*, a code boundary extraction program 36*e*, a lens aberration correction program 36*f*, a triangulation calculation program 36*g*, an original-posture calculation program 36*h*, and a plane conversion program 36*i*.

The camera control program 36*a* is a program related to control of the entire image input-and-output apparatus 1 including main processing shown in FIG. 6.

The pattern light imaging program 36*b* is a program for imaging the object with and without pattern light projected in order to detect the three-dimensional shape of original P.

The luminance image generation program 36*c* is a program for taking a difference between the image taken with pattern light projected by the pattern light imaging program 36*b* and the image taken without pattern light projected and generating a luminance image of the projected pattern light.

Pattern light of a plurality of types is projected in a time series, and images are taken with each type of pattern light. A plurality of types of luminance images are formed by taking the difference between the images taken with pattern light projected and corresponding images taken without pattern light projected.

The code image generation program 36*d* is a program for generating a code image having a certain code assigned to each pixel by superposing a plurality of luminance images generated by the luminance image generation program 36*c*.

The code boundary extraction program 36*e* is a program for obtaining code boundary coordinates with sub-pixel precision by using the code image generated by the code image generation program 36*d* and the luminance image generated by the luminance image generation program 36*c*.

The lens aberration correction program 36*f* is a program for correcting the aberration of the imaging optical system 21 with respect to the code boundary coordinates obtained with sub-pixel precision by the code boundary extraction program 36*e*.

The triangulation calculation program 36*g* is a program for calculating the three-dimensional coordinates of a real space with respect to the boundary coordinates from the boundary coordinates of the code after aberration correction by the lens aberration correction program 36*f*.

The original-posture calculation program 36*h* is a program for inferring the three-dimensional shape of original P from the three-dimensional coordinates calculated by the triangulation calculation program 36*g*.

The plane conversion program 36*i* is a program for generating a planar image appeared to be taken in front of original P, on the basis of the three-dimensional shape of original P calculated by the original-posture calculation program 36*h*.

The RAM 37 includes an image-with-pattern-light storage section 37*a*, an image-without-pattern-light storage section 37*b*, a luminance image storage section 37*c*, a code image storage section 37*d*, a code boundary coordinate storage section 37*e*, an ID storage section 37*f*, an aberration correction coordinate storage section 37*g*, a three-dimensional coordinate storage section 37*h*, an original-posture calculation result storage section 37*i*, a plane conversion result storage section 37*j*, a projection image storage section 37*k*, a work result judgment program storage section 37*l*, and a working area 37*m*, assigned as storage areas.

The image-with-pattern-light storage section 37*a* stores an image with pattern light taken with pattern light projected onto original P, by the pattern light imaging program 36*b*. The image-without-pattern-light storage section 37*b* stores an image without pattern light taken without pattern light projected onto original P, by the pattern light imaging program 36*b*.

The luminance image storage section 37*c* stores a luminance image generated by the luminance image generation program 36*c*. The code image storage section 37*d* stores a code image generated by the code image generation program 36*d*. The code boundary coordinate storage section 37*e* stores the boundary coordinates of each code obtained with sub-pixel precision extracted by the code boundary extraction program 36*e*. The ID storage section 37*f* stores an ID and the like assigned to a luminance image having a change in brightness in the position of a pixel having a boundary. The aberration correction coordinate storage section 37*g* stores the boundary coordinates of a code after aberration correction by the lens aberration correction program 36*f*. The three-dimensional coordinate storage section 37*h* stores the three-dimensional coordinates of the real space calculated by the triangulation calculation program 36*g*.

The original-posture calculation result storage section 37*i* stores parameters of the three-dimensional shape of original P calculated by the original-posture calculation program 36*h*. The plane conversion result storage section 37*j* stores the result of plane conversion by the plane conversion program 36*i*. The projection image storage section 37*k* stores image information projected by the image projection section 13. The working area 37*m* holds data temporarily used for calculation by the CPU 15. The work result judgment program storage section 37*l* stores a work result judgment program received via the antenna 11. The work result judgment program is a program configured, when executed in a model trace processing, to compare imaging data of an object and reference information concerning the object, and to generate a result of the comparison as evaluation information.

FIG. 6 is a flow chart of the main processing executed under the control of the CPU 35. Digital camera processing S605, webcam processing S607, 3D image processing S607, planar image processing S611, and the model trace processing S613 of the main processing will be described later in further detail.

First, in the main processing, power is turned on (S601), and the processor 15, interfaces, and the like are initialized (S602).

A key scan (S603) is carried out to determine the state of the mode changeover switch 9. It is determined whether the mode changeover switch 9 selects the digital camera mode (S604). If the digital camera mode is selected (S604: Yes), the digital camera processing, which will be described later, starts (S605).

If the digital camera mode is not selected (S604: No), it is determined whether the mode changeover switch 9 selects the webcam mode (S606). If the webcam mode is selected (S606: Yes), the webcam processing, which will be described later, starts (S607).

If the webcam mode is not selected (S605: No), it is determined whether the mode changeover switch 9 selects the 3D image mode (S608). If the 3D image mode is selected (S608: Yes), the 3D image processing, which will be described later, starts (S609).

If the 3D image mode is not selected (S608: No), it is determined whether the mode changeover switch 9 selects the planar image mode (S610). If the planar image mode is selected (S610: Yes), the planar image processing, which will be described later, starts (S611).

If the planar image mode is not selected (S610: No), it is determined whether the mode changeover switch 9 selects the model trace mode (S612). If the model trace mode is selected (S612: YES), the model trace processing, which will be described later, starts (S613). If the model trace mode is not selected (S612: NO), it is determined whether the mode changeover switch 9 selects the off mode (S614). If the off mode is not selected (S614: No), processing from step S603 is repeated. If it is determined in step S614 that the off mode is selected (S614: Yes), the processing ends.

FIG. 7 is a flow chart of the digital camera processing (S605 in FIG. 6). The digital camera processing is performed to obtain an image taken by the image pickup section 14.

First, in this processing, a high-resolution setting signal is sent to the CCD 22 (S701). With this signal, a high-quality image can be provided to the user.

A viewfinder image (image in the range seen through the viewfinder 6) is displayed on the LCD monitor 10 (S702). The user can see the image to be taken (imaging range), before taking an actual image, by seeing the image displayed on the LCD monitor 10 without looking into the viewfinder 6.

The release button 8 is scanned (S703*a*) to check whether the release button 8 is half-pressed (S703*b*). If the button is half-pressed (S703*b*: Yes), the autofocus (AF) function and the autoexposure (AE) function are activated to adjust the focus, aperture, and shutter speed (S703*c*). If the button is not half-pressed (S703*b*: No), the processing from step S703*a* is repeated.

The release button 8 is scanned again (S703*d*) to check whether the release button 8 is full-pressed (S703*e*). If the release button 8 is full-pressed (S703*e*: Yes), it is checked whether the flash mode is selected (S704).

If the flash mode is selected (S704: Yes), the flash 7 is fired (S705), and the image is taken (S706). If the flash mode is not selected (S704: No), the image is taken without firing the flash 7 (S706). If it is determined that the button is not full-pressed (S703*e*: No), the processing from step S703*a* is repeated.

The taken image is transferred from the CCD 22 to the cache memory 28 (S707), and the image stored in the cache memory 28 is displayed on the LCD monitor 10 (S708). By transferring the image to the cache memory 28 instead of a main memory, the image can be displayed on the LCD monitor 10 quickly. Then, the image is stored in the external memory 27 (S709).

It is determined whether the mode selected by the mode changeover switch 9 has been changed (S710). If no change is found (S710: Yes), the processing from S702 is repeated. If a change is found (S710: No), the processing ends.

FIG. 8 is a flow chart of the webcam processing (S607 in FIG. 6). The webcam processing is performed to send an image (still image or moving image) taken by the image pickup section 14 to an external network. In this embodiment, a moving image is taken and sent to the external network.

First, in the processing, a low-resolution setting signal is sent to the CCD 22 (S801). The commonly-known autofocus function and autoexposure function are activated to adjust the focus, aperture, and shutter speed (S802), and an image taking process starts (S803).

The taken image is displayed on the LCD monitor 10 (S804). The viewfinder image is stored in the projection image storage section 37*k* (S805). Projection processing, which will be described later, is performed (S806). The image stored in the projection image storage section 37*k* is projected onto the projection plane.

The taken image is transferred from the CCD 22 to the cache memory 28 (S807). The image transferred to the cache memory 28 is sent through the RF interface to an external network (S808).

It is determined whether the mode selected by the mode changeover switch 9 has been changed (S809). If no change is found (S809: Yes), the processing from S802 is repeated. If a change is found (S809: No), the processing ends.

FIG. 9 is a flow chart of the projection processing (S806 in FIG. 8). The processing is performed to project the image stored in the projection image storage section 37*k* onto the projection plane by the image projection section 13. First, in the processing, it is checked whether an image is stored in the projection image storage section 37*k* (S901). If a image is stored (S901: Yes), the image stored in the projection image storage section 37*k* is transferred to the projection LCD driver 30 (S902). The projection LCD driver 30 sends an image signal corresponding to the image to the projection LCD 19, and the image is displayed on the projection LCD (S903).

The light-source driver 29 is driven (S904). An electric signal from the light-source driver 29 turns on the LED array 17A (S905), and the processing ends.

When the LED array 17A is turned on, light emitted from the LED array 17A passes the light-source lens 18 and reaches the projection LCD 19. The projection LCD 19 performs spatial modulation corresponding to the image signal sent from the projection LCD driver 30, and image signal light is output. The image signal light output from the projection LCD 19 passes the projection optical system 20 and projects an image onto the projection plane.

FIG. 10 is a flow chart of the 3D image processing (S609 in FIG. 6). The 3D image processing is performed to detect the three-dimensional shape of the object, obtain the detected three-dimensional shape as a 3D image, and display and project the 3D image.

First, in the processing, a high-resolution setting signal is sent to the CCD 22 (S1001). A viewfinder image is displayed on the LCD monitor 10 (S1002).

The release button 8 is scanned (S1003*a*) to check whether the release button 8 is half-pressed (S1003*b*). If the button is half-pressed (S1003*b*: Yes), the autofocus (AF) function and autoexposure (AE) function are activated to adjust the focus, aperture, and shutter speed (S1003*c*). If the button is not half-pressed (S1003*b*: No), the processing from step S1003*a* is repeated.

The release button 8 is scanned again (S1003*d*) to check whether the release button 8 is full-pressed (S1003*e*). If the release button 8 is full-pressed (S1003*e*: Yes), it is checked whether the flash mode is selected (S1003*f*).

If the flash mode is selected (S1003*f*: Yes), the flash 7 is fired (S1003*g*), and the image is taken (S1003*h*). If the flash mode is not selected (S1003*f*: No), the image is taken without firing the flash 7 (S1003*h*). If it is determined in step S1003*e* that the button is not full-pressed (S1003*e*: No), the processing from step S1003*a* is repeated.

Three-dimensional-shape detection processing, which will be described later, is performed, and the three-dimensional shape of the object is detected (S1006).

The three-dimensional shape detected in the three-dimensional-shape detection processing (S1006) is stored in the external memory 27 (S1007), and the result of three-dimensional-shape detection is displayed on the LCD monitor 10 (S1008). The result of three-dimensional-shape detection is displayed as a group of three-dimensional coordinates (XYZ) of vertices measured in the real space.

The vertices obtained as a result of three-dimensional shape detection are connected to form a polygon, and a 3D image (3D CG image) displaying the surfaces is stored in the projection image storage section 37*k* as a result image of three-dimensional-shape detection (S1009). Projection processing is performed (S1010), in the same way as the projection processing of step S806 in FIG. 8. When an inverse function of an equation for converting coordinates on the projection LCD 19 to three-dimensional coordinates, which will be described with reference to FIGS. 18(*a*) and 18(*b*), is used to calculate the coordinates on the projection LCD 19 corresponding to the obtained three-dimensional coordinates, the resultant three-dimensional coordinates can be projected onto the projection plane.

It is determined whether the mode selected by the mode changeover switch 9 has been changed (S1011). If no change is found (S1011: Yes), the processing from step S702 is repeated. If a change is found (S1011: No), the processing ends.

FIG. 11(*a*) is a view illustrating the principle of the space code method used to detect a three-dimensional shape in the three-dimensional-shape detection processing (S1006 in FIG. 110). FIG. 11(*b*) is a view showing pattern light different from that shown in FIG. 11(*a*). Either of the pattern lights shown in FIG. 11(*a*) and FIG. 11(*b*) can be used. A gray level code, which is a multiple-tone code, can also be used.

The space code method is described in detail in Kosuke Sato, et al. "Distance Image Input by Space Code," Transactions of the Institute of Electronics and Communication Engineers of Japan, 85/3 Vol. J68-D No. 3, pp. 369-375.

The space code method is one method of detecting the three-dimensional shape of an object by triangulation between projection light and observed images. As shown in FIG. 11(*a*), projection light source L and observing instrument O are disposed with a distance D left between them, and the space is divided into narrow fan-shaped areas and coded.

When three mask patterns A, B, and C shown in the figure are projected in sequence from the MSB, each fan-shaped area is coded to "1" of light or "0" of dark according to the mask pattern. For instance, an area including point P is dark with mask patterns A and B and is light with mask pattern C, and is coded as 001 (A=0, B=0, C=1).

Each fan-shaped area is assigned a code corresponding to the direction $\phi$, and the boundary of codes can be considered as one slit light. An image of a scene is taken through each mask by the observing instrument, or a camera, and the light and dark patterns are binarized to configure a bit plane of memory.

The horizontal position (address) of the obtained multiple-bit-plane image corresponds the observing direction $\theta$, and the contents of memory at the address give projection light code $\phi$. The coordinates of a point of interest are determined by $\theta$ and $\phi$.

Mask patterns A, B, and C shown in FIG. 11(*a*) use pure binary codes. If a mask is misaligned, there is a danger that a great error occurs on the boundary of areas.

Point Q in FIG. 11(*a*) is on the boundary of area 3 (011) and area 4 (100). If mask A is misaligned, the code of area 7 (111) can be given. In other words, a great error can occur if the Hamming distance between adjacent areas is 2 or greater.

It is considered that the coding error can be avoided by using mask patterns where the Hamming distance between adjacent areas is always 1, as shown in FIG. 11(*b*).

FIG. 12(*a*) is a flow chart of the three-dimensional-shape detection processing (S1006 in FIG. 10). First, in the processing, imaging processing is performed (S1210). In the imaging processing, striped pattern light (see FIG. 1) including a series of alternate light and dark patterns is projected onto the object in a time series from the image projection section 13 by using the plurality of pure-binary-code mask patterns shown in FIG. 11(*a*), and an image taken with each pattern light projected and an image taken without the pattern light are obtained.

When the imaging processing ends (S1210), three-dimensional measurement processing is performed (S1220). In the three-dimensional measurement processing, the image with pattern light and the image without pattern light obtained in the imaging processing are used to measure the actual three-dimensional shape of the object. When the three-dimensional measurement processing ends (S1220), the processing ends.

FIG. 12(*b*) is a flow chart of the imaging processing (S1210 in FIG. 12(*a*)). The processing is executed in accordance with the pattern light imaging program 36*a*. First, an image of the object is taken by the image pickup section 14 without projecting pattern light from the image projection section 13, and the image without pattern light is obtained (S1211). The image without pattern light is stored in the image-without-pattern-light storage section 37*b*.

Counter "i" is initialized (S1212), and it is determined whether the value of counter "i" is the maximum value imax (S1213). The maximum value imax is determined in accordance with the number of mask patterns used. If eight types of mask patterns are used, the maximum value imax is set to 8.

If the value of counter "i" is smaller than the maximum value imax (S1213: Yes), mask pattern "i" is displayed on the projection LCD 19, and pattern light "i" projected through mask pattern "i" is projected onto the projection plane (S1214). The image of the state in which the pattern light is projected is taken by the image pickup section 14 (S1215).

An image with pattern light taken by projecting pattern light "i" onto the object is obtained in this way. The obtained image with pattern light is stored in the image-with-pattern-light storage section 37*a*.

After the image is taken, projection of pattern light "i" ends (S1216), and counter "i" is incremented by "1" (S1217) to project the next pattern light. The processing from step S1213 is repeated.

When it is determined that the value of counter "i" exceeds the maximum value imax (S1213: No), the processing ends. In the imaging processing, one image without pattern light and the same number of images with pattern light as the maximum value imax are obtained.

FIG. 12(*c*) is a flow chart of the three-dimensional measurement processing (S1220 in FIG. 12(*a*)). The processing is executed in accordance with the luminance image generation program 36*c*. First, in the processing, a luminance image is generated (S1221). The luminance here is a Y value in a YCbCr space and is calculated from the RGB values of each pixel as $$Y=0.2989\times R+0.5866\times G+0.1145\times B$$

By obtaining the Y value of each pixel, a luminance image of each image with pattern light or without pattern light is generated. The generated luminance image is stored in the luminance image storage section 37*c*. A number corresponding to the pattern light number is assigned to each luminance image.

Generated luminance images are combined by using the space code method described above in accordance with the code image generation program 36*d*, and a code image of coded pixels is generated (S1222).

The code image can be generated by combining results of comparison between each pixel of the luminance image of an image with pattern light stored in the luminance image storage section 37*c* and a predetermined luminance threshold. The generated code image is stored in the code image storage section 37*d*.

The code boundary coordinate detection processing, which will be described later, is performed in accordance with the code boundary extraction program 36*e* (S1223) to detect the coordinates of the boundary of codes assigned to pixels with sub-pixel precision.

Lens aberration correction processing is performed in accordance with the lens aberration correction program 36*f* (S1224). Through this processing, an error due to distortion of the imaging optical system 21 in the code boundary coordinates detected in step S1223 can be corrected.

Real space conversion processing based on triangulation is performed in accordance with the triangulation calculation program 36*g* (S1225). The code boundary coordinates on the CCD space after aberration correction is converted to three-dimensional coordinates in the real space by this processing, and the three-dimensional coordinates are obtained as a result of three-dimensional-shape detection.

FIG. 13 is a view illustrating an overview of the code boundary coordinate detection processing (S1223 in FIG. 12). An upper diagram shows borderline K serving as a boundary between the actual light and dark patterns in the CCD space. A thick line in the figure indicates the boundary between code "1" and other codes given by coding the pattern light in the space code method.

Coding by the space code method is performed in units of pixels. There is a sub-pixel difference between actual borderline K of pattern light and the coded boundary (thick line in the figure). The code boundary coordinate detection processing is intended for the detection of the coordinates of the code boundary with sub-pixel precision.

First, in the processing, first pixel G where code of interest (hereafter referred to as curCode) is changed to another code in a certain detection position (hereafter referred to as curCCDX) is detected (first-pixel detection process).

For instance, check pixels detected in curCCDX in the direction from top to bottom. The pixels above the boundary (thick line) have curCode, and the code of the pixel immediately below the boundary is changed from curCode. This pixel is detected as first pixel G.

All the luminance images having a change in brightness in the position of first pixel G are extracted from the luminance images stored in the luminance image storage section 37*c* in step S1221 of FIG. 12 (luminance image extraction process).

To identify a pixel area used for approximation, the code image is referenced in the position of curCCDX−2, a position moved to the left of the detection position, to find a pixel where the code changes from the code of interest, curCode, to another, or a boundary pixel (pixel H in detection position of curCCDX−2). A predetermined pixel range extending from the pixel (range of −3 pixels and +2 pixels in the Y-axis direction, in the shown example) is determined (part of pixel range determination means).

An approximate expression (indicated by a thick line in the figure) concerning the pixel position and luminance in the Y direction is obtained in the predetermined range, as expressed in the bottom left graph in the figure. Y coordinate Y1 of a point of intersection with luminance threshold "bTh" given by the approximate expression is obtained (part of boundary coordinate detection process).

Luminance threshold "bTh" may also be calculated from a predetermined range (half of the average luminance of the pixels) or may be a predetermined fixed value. Now, the light-dark boundary can be detected with sub-pixel precision.

Detection position curCCDX−2 is moved to the right by "1", and the same processing as described above is performed in position curCCDX−1 to obtain a representative value in curCCDX−1 (part of boundary coordinate detection process).

The representative value in each detection position is obtained in the pixel area (hatched by parallel lines sloping to the right) determined by the predetermined range in the Y-axis direction about each boundary pixel and the range of curCCDX−2 to curCCDX+2 in the X-axis direction.

The processing is performed for all luminance images having a pixel changing from curCode to another code, and the weighed average of the representative values of the luminance images is used as the boundary coordinate of curCode (part of boundary coordinate detection process).

Now, the code boundary coordinates can be detected with sub-pixel precision, and the three-dimensional shape of the object can be detected with high precision by performing the real space conversion processing (S1225 in FIG. 12) based on triangulation, using the boundary coordinates.

Because the boundary coordinates can be detected with sub-pixel precision by using the approximate expressions calculated on the basis of the luminance images, the number of images to be taken should not be increased. The pattern light of light and dark patterns of pure binary codes can be used, and special pattern light of gray code does not need to be used.

In this embodiment, the pixel area for approximation is described as an area determined by the range of −3 pixels and +2 pixels in the Y-axis direction around the boundary pixel in each detection position and the range of cur CCDX−2 to curCCDX+2 of the detection positions in the X-axis direction, but the pixel area is not limited to that determined by those Y-axis range and the X-axis range. For instance, the pixel range can be just a predetermined Y-axis range around the boundary pixel in detection position curCCDX.

FIG. 14 is a flow chart of the code boundary coordinate detection processing (S1223 in FIG. 12(*c*)). This processing is executed in accordance with the code boundary extraction program 36*e*. First, in the processing, the pixels in a code boundary coordinate array in the CCD space are initialized (S1401), and curCCDX is set to the initial coordinate (S1402).

It is determined whether curCCDX is lower than or equal to the final coordinate (S1403). If curCCDX is lower than or equal to the final coordinate (S1403: Yes), curCode is set to 0 (S1404). curCode is set to the minimum value at the beginning.

It is determined whether curCode is smaller than the maximum code (S1405). If curCode is smaller than the maximum code (S1405: Yes), a curCode pixel is searched for with reference to the code image at curCCDX (S1406). It is checked whether a curCode pixel is present (S1407).

If a curCode pixel is present (S1407: Yes), a pixel having a code greater than curCode is searched for with reference to the code image at curCCDX (S1408). It is determined whether a pixel having a code greater than curCode is present (S1409).

If a pixel having a code greater than curCode is present (S1409: Yes), processing to determine the boundary with sub-pixel precision, which will be described later, is performed (S1410). curCode is incremented by "1" to obtain the boundary coordinates of the next curCode (S1411), and the processing from S1405 is repeated.

The boundary is present in the position of s pixel having curCode or the position of a pixel having a greater code. In the present embodiment, it is provisionally assumed that the boundary is in the position of a pixel having a code greater than curCode.

If curCode is not present (S1407: No), or if there is no pixel having a code greater than curCode (S1409: No), curCode is incremented by "1" to obtain the boundary coordinate with respect to the next curCode (S1411), and the processing from step S1405 is repeated.

The processes of steps S1405 to S1411 are repeated to each code of 0 to the maximum code. When curCode exceeds the maximum code (S1405: No), the detection position is changed by adding dCCDX to curCCDX (S1412). The processing from step S1403 is repeated for the new detection position.

When curCCDX exceeds the final coordinate (S1403), that is, when the detection with respect to each position from the initial coordinate to the final coordinate ends, the processing ends.

FIG. 15 is a flow chart of the processing for obtaining the code boundary coordinate with sub-pixel precision (S1410 in FIG. 14).

First, in this processing, all the luminance images having a change in brightness in the position of a pixel having a code greater than curCode detected in step S1409 in FIG. 14 are extracted (S1501) from the luminance images stored in the luminance image storage section 37*c* in step S1221 of FIG. 12.

The mask pattern numbers of the extracted luminance images are stored in array PatID[ ], and the number of extracted luminance images is stored in noPatID (S1502). Array PatID[ ] and noPatID are stored in the ID storage section 37*f*.

Counter "i" is initialized (S1503). It is checked whether the value of counter "i" is smaller than noPatID (S1504). If the value is smaller (S1504: Yes), a CCDY value of the boundary is obtained with respect to the luminance image having the mask pattern number of PatID[i] corresponding to counter "i", and the value is stored in fCCDY[i] (S1505).

When the process of step S1505 ends, counter "i" is incremented by "1" (S1506), and the processing from step S1504 is repeated. If it is determined that the value of counter "i" is greater than noPatID (S1504: No), that is, when the process of step S1505 is completed for all the luminance images extracted in step S1501, the weighed average of fCCDY[i] obtained in the process of step S1505 is calculated, and the result is set as the boundary value (S1507).

Instead of the weighted average, the median value of fCCDY[i] obtained in the process of step S1505 may be calculated and set as the boundary value. The boundary value may also be calculated statistically.

The boundary coordinates are expressed by the coordinate of curCCDX and the weighed average obtained in step S1507.

The boundary coordinates are stored in the code boundary coordinate storage section 37*e*, and the processing ends.

FIG. 16 is a flow chart of processing for obtaining the CCDY value of the boundary with respect to the luminance image having a mask pattern number of PatID[i] (S1505 in FIG. 15).

First, the process expressed as ccdx=MAX(curCCDX−dx, 0), that is, the process for setting a greater value of "curCCDX−dx" and "0" as ccdx, is performed, and counter "j" is initialized (S1601).

To be more specific, "0" in step S1601 means the minimum CCDX value. If the curCCDX value of the current detection position is "1" and if a predetermined dx value is "2", curCCDX−dx=−1 is smaller than the minimum CCDX value of "0". The ccdx value is set to "0" for subsequent processes.

In other words, smaller positions below the minimum CCDX value are eliminated from the subsequent processes.

The dx value can be predetermined to any integer, including "0". In the case shown in FIG. 13, dx is set to "2", and the ccdx value is set to "curCCDX−2" according to the case shown in FIG. 13.

It is determined whether ccdx≦MIN(curCCDX+dx, ccdW−1) (S1602). The left side, MIN(curCCDX+dx, ccdW−1), means the smaller value of curCCDX+dx and the maximum value ccdW of the CCDX value minus 1. The value and the ccdx value are compared.

Positions greater than the maximum CCDX value are eliminated from the subsequent processes.

If ccdx is smaller than MIN(curCCDX+dx, ccdW−1) (S1602: Yes), the eCCDY value in the position of a pixel having a boundary is obtained with reference to the code image and the luminance image to which PatID[i] is assigned (S1603).

If the detection position is curCCDX−1 as shown in FIG. 13, pixel I is detected as a pixel that can have the boundary, and the eCCDY value is obtained in the position of pixel I.

Polynomial approximate expression Bt=fb(ccdy) with respect to luminance in the ccdy direction is obtained within the range of MAX(eCCDY−dy, 0)≦ccdy≦MIN(eCCDY+dy−1, ccdH−1), from the luminance image having a mask patter number of PatID[i] (S1604).

The ccdy value at the intersection of polynomial approximate expression Bt and luminance threshold bTh is obtained, and the value is stored in efCCDY[i] (S1605). The boundary coordinates can be detected with sub-pixel precision through steps S1604 and S1605.

Next, ccdx and counter "j" each are incremented by "1" (S1605), and the processing from step S1602 is repeated. The boundary is detected in each detection position with sub-pixel precision in the predetermined range about curCCDX to the right and left.

If it is determined that ccdx is greater than MIN(curCCDX+dx, ccdW−1) (S1602: No), polynomial approximate expression of ccdy=fy(ccdx) is obtained for efCCDY[i] calculated in the range of curCCDX−dx to CCDX+dx (S1606). This processing uses each value detected in step S1605, and the boundary coordinate detection can be performed with a higher precision than boundary coordinate detection in one detection position.

The intersection of the obtained polynomial approximate expression and curCCDX is specified as the CCDY value of the boundary with respect to the luminance image having a mask pattern number of PatID[i] (S1607), and the processing ends. As shown in the flow chart of FIG. 15, all the processing described above is carried out for each of the extracted luminance images, and the weighed average of the obtained boundary coordinates is obtained, and the result is used as the final boundary coordinate (S1507). Therefore, the precision of boundary coordinate detection can be improved further.

FIGS. 17(*a*) to 17(*c*) are views illustrating the lens aberration correction processing (S1224 in FIG. 12(*c*)). Because aberration of the imaging optical system 21 causes the incoming ray bundle to be deviated from a correct image formation position by an ideal lens, the lens aberration correction processing corrects the pixel position of the taken image to the correct position.

The aberration correction is on the basis of data obtained by calculating the aberration of the optical system, using half field angle "hfa", which is an incident angle of light, as a parameter in the image taking range of the imaging optical system 21, as shown in FIG. 17(*b*).

The aberration correction processing is executed in accordance with the lens aberration correction program 36*f*, with respect to the code boundary coordinates stored in the code boundary coordinate storage section 37*e*, and the aberration-corrected data is stored in the aberration correction coordinate storage section 37*g*.

To be more specific, the correction is made by using camera calibration functions (approximate expressions) of (1) to (3) below for converting coordinates (ccdx, ccdy) of a certain point in the real image to coordinates (ccdcx, ccdcy) in an ideal camera image.

In this case, aberration amount "dist" (%) is expressed by using half field angle "hfa" (deg) as dist=f(hfa). The focal length of the imaging optical system 21 is denoted as focallength (mm), the CCD pixel length is denoted as pixellength (mm), and the coordinates of the center of lens in the CCD 22 are denoted as (Centx, Centy).

$$ccdcx=(ccdx-Centx)/(1+dist/100)+Centx \quad (1)$$

$$ccdcy=(ccdy-Centy)/(1+dist/100)+Centy \quad (2)$$

$$hfa=\arctan[(((ccdx-Centx)^2+(ccdy-Centy)^2)^{0.5})\times pixellength/focallength] \quad (3)$$

FIGS. 18(*a*) and 18(*b*) are views illustrating a method of calculating three-dimensional coordinates in a three-dimensional space from coordinates in the CCD space in the real space conversion processing based on triangulation (S1225 in FIG. 12(*c*)).

The real space conversion processing based on triangulation is executed in accordance with the triangulation calculation program 36*g*, and the three-dimensional coordinates in the three-dimensional space of the aberration-corrected code boundary coordinates stored in the aberration correction coordinate storage section 37*g* are obtained. The calculated three-dimensional coordinates are stored in the three-dimensional coordinate storage section 37*h*.

In this embodiment, the coordinate system of the image input-and-output apparatus 1 with respect to original P curved in the horizontal image taking direction is formed by using the direction of the optical axis of the imaging optical system 21 as the Z axis, a point of VPZ away from the principal point of the imaging optical system 21 along the Z axis direction as the origin point, the horizontal direction with respect to the image input-and-output apparatus 1 as the X axis, and the vertical direction as the Y axis.

The angle of projection from the image projection section 13 to the three-dimensional space (X, Y, Z) is expressed as θp. The distance between the optical axis of the imaging optical system 21 and the optical axis of the image projection section 13 is expressed as D. The field of view of the imaging optical system 21 in the Y direction is from Yftop to Yfbottom. The field of view in the X direction is from Xfstart to Xfend. The length (height) of the CCD 22 in the Y-axis direction is expressed as Hc, and the length (width) in the X-axis direction is expressed as Wc. The angle of projection θp is given in accordance with the code assigned to each pixel.

The three-dimensional space position (X, Y, Z) corresponding to certain coordinates (ccdx, ccdy) in the CCD 22 can be obtained by solving five equations about a triangle formed by a point on the image forming plane of the CCD 22, the point of projection of pattern light, and a point intersecting the X-Y plane.

$$Y=-(\tan\theta p)Z+PPZ+\tan\theta p-D+cmp(X\text{target}) \quad (1)$$

$$Y=-(Y\text{target}/VPZ)Z+Y\text{target} \quad (2)$$

$$X=-(X\text{target}/VP)Z+X\text{target} \quad (3)$$

$$Y\text{target}=Yf\text{top}-(ccdcy/Hc)\times(Yf\text{top}-Yf\text{bottom}) \quad (4)$$

$$X\text{target}=Xf\text{start}+(ccdcx/Wc)\times(Xf\text{end}-Xf\text{start}) \quad (5)$$

In equation (1) above, cmp(Xtarget) is a function for correcting the difference between the imaging optical system 21 and the image projection section 13. In an ideal condition, without no difference, cmp(Xtarget) is assumed to be zero.

In the same way as described above, the relationship between certain coordinates (lcdcx, lcdcy) on the projection LCD 19 included in the image projection section 13 and three-dimensional coordinates (X, Y, Z) in the three-dimensional space can be expressed by equations (1) to (4) below.

In this case, the principal position of the image projection section 13 is expressed as (0, 0, PPZ). The field of view of the image projection section 13 in the Y direction is from Ypftop to Ypfbottom, and the field of view in the X direction is from Xpfstart to Xpfend. The length (height) of the projection LCD 19 in the Y-axis direction is expressed as Hp, and the length (width) in the X-axis direction is expressed as Wp.

$$Y=-(Yp\text{target}/PPZ)Z+Yp\text{target} \quad (1)$$

$$X=-(Xp\text{target}/PPZ)Z+Xp\text{target} \quad (2)$$

$$Yp\text{target}=Ypf\text{top}-(lcdcy/Hp)\times(Xpf\text{top}-Xpf\text{bottom}) \quad (3)$$

$$Xp\text{target}=Xpf\text{start}+(lcdcx/Wp)\times(Xpf\text{end}-Xpf\text{start}) \quad (4)$$

By giving three-dimensional space coordinates (X, Y, Z) to the equations (1) to (4), LCD space coordinates (lcdcx, lcdcy) can be obtained from the equations. Therefore, for instance, an LCD device pattern for projecting a certain shape or letter into the three-dimensional space can be calculated.

FIG. 19 is a flow chart of the planar image processing (S611 in FIG. 6). When an image of curved original P as shown in FIG. 1 is taken or when an image of rectangular original is taken diagonally (the image becomes trapezoidal), for instance, the planer image processing obtains and displays a planar image as if taken from straight original P or taken perpendicularly.

First, in the processing, a high-resolution setting signal is sent to the CCD 22 (S1901), and a viewfinder image is displayed on the LCD monitor 10 (S1902).

The release button 8 is scanned (S1903*a*) and it is determined whether the release button 8 is half-pressed (S1903*b*). If the button is half-pressed (S1903*b*: Yes), the autofocus (AF) function and the autoexposure (AE) function are activated to adjust the focus, aperture, and shutter speed (S1903*c*). If the button is not half-pressed (S1903*b*: No), the processing from step S1903*a* is repeated.

The release button 8 is scanned again (S1903*d*) to check whether the release button 8 is full-pressed (S1903*e*). If the release button 8 is full-pressed (S1903*e*: Yes), it is checked whether the flash mode is selected (S1903*f*).

If the flash mode is selected (S1903: Yes), the flash 7 is fired (S1903*g*), and the image is taken (S1903*h*). If the flash mode is not selected (S1903*f*: No), the image is taken without firing the flash 7 (S1903*h*). If it is determined that the button is not full-pressed (S1903*e*: No), the processing from step S1903*a* is repeated.

Three-dimensional-shape detection processing which is the same as the three-dimensional-shape detection processing (S1006 in FIG. 10) is carried out, and the three-dimensional shape of the object is detected (S1906).

Original-posture calculation processing for obtaining the posture of original P is carried out (S1907), on the basis of the result of the three-dimensional shape detection obtained by the three-dimensional-shape detection processing (S1906). Through the processing, position L, angle θ, and curvature φ(x) of original P with respect to the image input-and-output apparatus 1 are calculated as posture parameters of original P.

On the basis of the calculated results, plane conversion processing, which will be described later, is performed (S1908), and a planar image of straight original P is generated even if the original is curved.

The planar image obtained by the plane conversion processing (S1908) is stored in the external memory 27 (S1909), and the planar image is displayed on the monitor LCD 10 (S1910).

It is checked whether the mode selected by the mode changeover switch 9 has been changed (S1911). If no change is found (S1911: Yes), the processing from step S702 is repeated. If a change is found (S1911: No), the processing ends.

FIGS. 20(*a*) to 20(*c*) are views illustrating the original-posture calculation processing (S1907 of FIG. 19). Suppose that the curvature of original P is uniform in the y direction. First, in the original-posture calculation processing, two curves are obtained by regression curve approximation of two rows of points in the three-dimensional space position, from the coordinate data concerning the code boundary stored in the three-dimensional coordinate storage section 37*h*, as shown in FIG. 20(*a*).

The curves can be obtained from the positional information of an upper quarter and a lower quarter of the projection range of pattern light (boundary between codes 63 and 64 and boundary between codes 191 and 192), for instance.

Suppose there is a straight line connecting points of "0" of the two curves in the X-axis direction and that the point of intersection of the straight line and the Z-axis, that is the point of intersection of the optical axis and original P is expressed as position (0, 0, L) of original P in the three-dimensional space. The angel formed by the straight line and the X-Y plane is expressed as inclination θ of original P about the X-axis.

As shown in FIG. 20(*b*), rotational transform of original P is carried out by inclination θ about the X-axis in the reverse direction. That is, original P brought to be parallel to the X—Y plane is assumed.

As shown in FIG. 20(*c*), a displacement in the Z-axis direction in the cross section of original P in the X-Z plane can be expressed as a function of X, or curvature φ(X). Position L, angle θ, and curvature φ(X) of original P are calculated as the parameters of the original posture, and the processing ends.

FIG. 21 is a flow chart of the plane conversion processing (S1908 in FIG. 19). In this processing, first, the area of the processing is assigned to the working area 37*l* of the RAM 37, and the variable of counter "b" used in this processing is set to the initial value (b=0) (S2101).

Based on position L, inclination θ, and curvature $\phi(x)$ of original P calculated by the original-posture calculation program 36*h*, a rectangular area is formed by points obtained by turning points of four corners of the image without pattern light stored in the image-without-pattern-light storage section 37*b* by −L in the Z-axis direction and by −θ about the X-axis and carrying out inverse transform of transforming into curvature $\phi(x)$ (processing equivalent to curvature processing, which will be described later) (rectangular area of an image of the text side of original P observed in an approximately perpendicular direction), and the number of pixels included in the rectangular area is obtained (S2102).

The coordinates on the image without pattern light corresponding to each pixel forming the specified rectangular area are obtained, and the pixel information of each pixel of a planar image is specified from the pixel information around the coordinates.

First, it is determined whether counter "b" reaches the number of pixels "a" (S2103). If counter "b" does not reach the number of pixels "a" (S2103: No), the curvature calculation processing is performed to rotational-transfer one pixel in the rectangular area by curvature $\phi(x)$ about the Y-axis (S2104). Rotational transfer of inclination θ about the X-axis is performed (S2105), and a movement is made in the Z-axis direction by distance L (S2106).

From the obtained position in the three-dimensional space, coordinates (ccdcx, ccdcy) on the CCD image taken by an ideal camera are obtained by an inverse function of triangulation (S2107). Coordinates (ccdx, ccdy) on the CCD image taken by a real camera are obtained by an inverse function of the camera calibration in accordance with the aberration characteristics of the imaging optical system 21 used (S2108). The state of the pixel in the corresponding position of the image without pattern light is obtained and stored in the working area 37*l* of the RAM 37 (S2109).

Counter "b" is incremented by "1" (S2110) to execute the processing from step S2103 to step S2109 with respect to the next pixel.

The processing of from step S2104 to step S2110 is repeated until counter "b" reaches the number of pixels "a" (S2103: Yes). The processing area assigned to the working area 37*l* for the processing is released (S2111), and the processing ends.

FIG. 22(*a*) is a view illustrating an overview of the curvature processing (S2104 in FIG. 21), and FIG. 22(*b*) is a view illustrating a planar image of original P formed by the plane conversion processing (S1908 in FIG. 19). The curvature processing is described in detail in "Imaging a Curved Document by Eye Scanner," Transactions DII of the Institute of Electronics, Information and Communication Engineers, Vol. J86-D2 No. 3, p. 409.

Curvature $Z=\phi(x)$ is expressed as a polynomial approximate expression obtained when the method of least squares is applied to the sectional shape of the three-dimensional shape formed by obtained code boundary coordinate array (real space), cut by a plane of certain Y value parallel to the XZ plane.

When a curved face is converted to a flat face, a point in the flat face corresponding to a point on $Z=\phi(x)$ is associated with the length of the curve from $Z=\phi(0)$ to $Z=\phi(x)$.

When the image of curved original P as shown in FIG. 1 is taken, a planar image as shown in FIG. 22(*b*) can be obtained with the plane conversion processing, including the curvature processing. With the planar image, precision of OCR processing can be improved. Text and graphics on the original can be clearly recognized through the image.

The model trace mode, which is one of operation modes of the image input-and-output apparatus 1, will be described next with reference to FIGS. 23 to 28. When the user performs work such as calligraphy or handwriting in accordance with reference information showing the standard of the work, the result of the work and the reference information are compared, and the result of comparison is projected as an image in the model trace mode.

FIG. 23 is a view explaining a first case in the model trace mode. FIG. 23 shows that a model of handwriting or reference information image R1 is projected by the image pickup section 14 of the image input-and-output apparatus 1, onto common Japanese writing paper OB1, which is an object placed in an imaging area 100 on the projection plane, that can be imaged by the image projection section 13 of the image input-and-output apparatus 1, as the reference information of handwriting to be performed by the user. After the user works, following reference information image R1, the work is imaged, and the image is compared with reference information image R1. The imaging area 100 is a plane on which an image can be projected in the projection direction by the image pickup section 14 of the image input-and-output apparatus 1, that is, an image projection plane. A frame showing the border of the imaging area 100 may also be projected as a part of an projection image from the projection LCD 19. With the displayed border of the imaging area 100, the user can clearly know the area that can be imaged.

FIG. 24 is a flow chart showing the model trace processing (S613 in FIG. 6) performed in the model trace mode. The model trace processing compares the imaging data of the object and the reference information such as a model and projects the image of the result.

First in this processing, a high-resolution setting signal is sent to the CCD 22 (S2401). This allows a high-quality image to be provided to the user.

The reference information and the work result judgment program are received through the antenna 11 (S2402). The received work result judgment program is stored in the work result judgment program storage section 37*l* (S2403). A reference information image corresponding to the received reference information is stored in the projection image storage section 37*k* (S2404).

A viewfinder image (an image of a range that can be viewed through the viewfinder 6) is displayed on the LCD monitor 10 (S2405). The user can confirm the image to be taken (imaging area) without looking into the viewfinder 6, by the image displayed on the LCD monitor 10 before an actual image is taken.

Projection processing identical to the projection processing of step S806 in FIG. 8 is performed (S2406). In the projection processing of step S2406, the reference information image is stored in the projection image storage section 37*k*. The reference information image is projected into the imaging area 100. The user works, following the projected reference information image.

In the first case shown in FIG. 23, for instance, when the model of handwriting is projected as reference information image R1 onto common Japanese writing paper OB1 placed in the imaging area 100, the user writes a hand with a brush soaked with ink, following reference information image R1 projected as the model on writing paper OB1.

The release button 8 is scanned (S2407*a*). It is judged whether the user who has worked, following the reference information image, has half-pressed the release button 8 (S2407*b*). If the button is half-pressed (S2407*b*: Yes), the power source driver 29 is turned off (S2407*c*), and the electric signal from the power-source driver 29 turns off the LED array 17A (S2407*d*). Accordingly, in the first case shown in FIG. 23, for instance, reference image R1 projected onto writing paper OB1 disappears.

The autofocus (AF) function and autoexposure (AE) function are activated to adjust the focus, aperture, and shutter speed (S2407*e*). If the button is not half-pressed (S2407*b*: No), the processing from S2407*a* is repeated.

The release button 8 is scanned again (S2407*f*) to check whether the release button 8 is full-pressed (S2407*g*). If the button is full-pressed (S2407*g*: Yes), it is checked whether the flash mode is selected (S2412).

If the flash mode is selected (S2412: Yes), the flash 7 is fired (S2413), and an image of the object in the imaging area 100 is taken (S2414). If the flash mode is not selected (S2412: No), an image is taken without firing the flash 7 (S2414). If the button is not full-pressed (S2407*g*: No), the processing from S2407*a* is repeated.

The image is transferred from the CCD 22 to the cache memory 28 (S2415). The image stored in the cache memory 28 is displayed on the LCD monitor 10 (S2416). The image can be displayed on the LCD monitor 10 faster by transferring the image to the cache memory 28 than by transferring the image to the main memory.

The image data of the object taken in step S2414 is judged by the work result judgment program stored in the work result judgment program storage section 37*l* (S2417). In step S2417, the image data of the object is compared with the reference information, the result of comparison is obtained, and comparison result information such as correction information and evaluation information is generated from the result of comparison, in accordance with the work result judgment program.

The correction information is information of a correction to be made on the object, based on a difference from the reference information found as a result of comparison between the reference information and the image data of the object. The evaluation information represents an evaluation of the object with reference to the reference information, as a result of comparison between the reference information and the image data of the object.

A comparison result information image corresponding to the generated comparison result information is stored in the projection image storage section 37*k* (S2418). In step S2418, the comparison result information image may overwrite the reference information image stored in the projection image storage section 37*k* in step S2404 or may be stored in association with the reference information image stored in the projection image storage section 37*k* in step S2404.

Projection processing identical to the projection processing of step S806 in FIG. 8 is performed (S2419). In the projection processing of step S2419, the comparison result information image at least stored in the projection image storage section 37*k* is projected into the imaging area 100 at least. For instance, if the comparison result information image is a correction information image corresponding to the correction information, the correction information image is projected. If the comparison result information image is an evaluation information image corresponding to the evaluation information, the evaluation information image is projected. The user can recognize clearly an imperfection of his or her own work, a degree of perfection, and a skill level by seeing the projected comparison result information image such as the correction information image or evaluation information image. The image projected from the image pickup section 14 onto writing paper OB1 can be displayed in a correct form without deformation by calculating the posture information of writing information OB1 such as an angle θ and curvature ϕ(x) beforehand. At the same time, the model information displayed on writing paper OB1 can be projected and displayed in a correct form without deformation, and the image of hand M written by following the model can also be taken in a correct form without deformation. Through the three-dimensional-shape measurement of writing paper OB1, the model can be clearly recognized, and images can be projected and taken without deformation.

If the comparison result information image is stored in the projection image storage section 37*k* together with the reference information image in step S2419, the reference information image is projected together with the comparison result information image. When both the reference information image and the comparison result information image are projected, the reference information of the standard from which the comparison result information is obtained and the work done by the user can be clearly compared.

The release button 8 is scanned again (S2420*a*) to check whether the user has full-pressed the release button 8 (S2420*b*). If the release button 8 is not full-pressed (S2420*b*: No), step S2420*a* is repeated. If the release button 8 is full-pressed (S2420*b*: Yes), it is determined whether the flash mode is selected (S2421). If the flash mode is selected (S2421: Yes), the flash 7 is fired (S2422), and the image of the object in the imaging area 100 is taken (S2423). If the flash mode is not selected (S2421: No), the image is taken without firing the flash 7 (S2423). It is supposed that before it is determined in step S2420*b* that the release button 8 is full-pressed, the half-pressed state of the release button was detected, and the autofocus (AF) function and the autoexposure (AE) function were activated to adjust the focus, aperture, and shutter speed.

The image taken in step S2423 is transferred from the CCD 22 to the cache memory 28 (S2424), and the image transferred to the cache memory 28 is stored in the external memory 27 (S2425). Now, the comparison result information can be stored as an image.

The power-source driver 29 is turned off (S2426), and the LED array 17A is turned off by an electric signal from the power-source driver 29 (S2427). The comparison result information image and the like projected in the imaging area 100 disappear.

It is checked whether the state of the mode changeover switch 9 has changed (S2428). If no change is found (S2428: Yes), the processing from step S2402 is repeated. If the reference information is of individual stages of a process of work containing one or more stages, such as an operating instruction, the user can know the comparison result information of his or her own work and the reference information in each stage, through the repetition of steps S2402 to S2428 for each stage. Alternatively, the work corrected in accordance with the correction information can be judged again by the work result judgment program, and steps S2402 to S2428 can be repeated until all necessary corrections are made.

If a change is found in the state of the mode changeover switch 9 in step S2428 (S2428: No), the processing ends.

FIG. 25 is a view illustrating a state in which a comparison result information image is projected as a result of step S2419 in the model trace processing. FIG. 25 shows the result of model trace processing performed on two-letter hand M1 written by the user, in accordance with the calligraphy model projected as reference information image R1 shown in FIG. 23. For ease of recognition of the image, hand M1 written on writing paper OB1 is shown in white in FIG. 25.

When an image of writing paper OB1 carrying hand M1 is taken and when the image data is judged by the work result judgment program, the result is projected as shown in FIG. 25, where six necessary corrections found in comparison with the reference information are projected as correction information images C1*a* to C1*f*. The user can recognize imperfections in his or her own hand and can obtain necessary information for correcting the imperfections from projected correction information images C1*a* to C1*f*.

In addition to correction information images C1*a* to C1*f*, FIG. 25 shows evaluation information image C2 representing the result of evaluation in accordance with the reference information, projected as a comparison result information image obtained from the work result judgment program. Letters "Passed" projected in the case shown in FIG. 25 means that hand M1 has reached a satisfactory level with respect to the reference information given as the model. The user can obtain information of a degree of perfection of his or her own hand and his or her skill level from projected evaluation information image C2.

FIG. 26 is a view illustrating a second case in the model trace mode. The figure shows a step of making a crane by origami, or the art of paper folding, in the model trace mode. The reference information in the second case is of a plurality of stages (steps) in a process of folding an origami crane according to its folding sequence.

In FIG. 26, an origami paper folded in two diagonally is shown as object OB2 disposed in the imaging area 100 in a first stage. Reference information image R2*a* showing a valley folding line is projected onto object OB2 as the reference information of the next stage. Also projected in the imaging area 100 are reference information image R2*b* showing text information telling the valley folding along projected reference information image R2*a* and reference information image R2*c* showing text information telling that reference information image R2*a* illustrates a second stage of folding an origami crane.

By visually confirming reference information images R2*a* to R2*c*, the user can recognize what he or she should do next in the process of folding an origami crane, without looking up a manual or the like during the work. This can lessen the trouble of the user. The image projected from the image pickup section 14 onto object OB2 can be displayed correctly without deformation because the three-dimensional-shape information of object OB2 is calculated each time. The three-dimensional-shape measurement of object OB2 enables the model to be recognized clearly and also enables an image to be projected without deformation.

After the user works in accordance with reference information images R2*a* to R2*c*, an image of object OB2, for which the work has been performed and which serves as the next object, is taken, which is not shown, the image data is judged by the work result judgment program, and the comparison result information image is displayed in a predetermined position within the imaging area 100. In this case, information is given such that only when the paper is folded correctly, the reference information image for a subsequent stage is projected; and if the paper is not folded correctly, a correction information image is projected to prompt the user to Perform the work again in accordance with the correction information represented by the correction information image. The user can recognize the degree of perfection of his or her work and any correction that should be made in each stage by seeing the projected comparison result information image of each stage, and consequently can complete the whole process of work, formed of the plurality of stages, correctly. When the comparison result information image is projected in each stage, the corresponding reference information image of the stage may be projected together, if necessary. This will allow the user to recognize more clearly the degree of perfection of his or her work and any correction that should be made in each stage.

FIGS. 27(*a*) and 27(*b*) are views illustrating a third case in the model trace mode. The figures show a process of putting a lid on a box-shaped body and screwing down the lid, performed in the model trace mode. A reference information image of the work to be done is projected in FIG. 27(*a*), and a comparison result information image of the work done is projected in FIG. 27(*b*).

In FIG. 27(*a*), the box-shaped body to be screwed is disposed as object OB3 in the imaging area 100. Text information telling that four screws should be fastened in the next stage is also projected in the imaging area 100 as reference information image R3*a*. Arrows indicating the positions to be screwed are also projected onto object OB3 as reference information image R3*b*.

The user works following reference information images R3*a* and R3*b*, and the image input-and-output apparatus 1 takes an image of object OB3 after the work. The image data is judged by the work result judgment program in accordance with the model trace processing, and a comparison result information image is displayed in a predetermined position in the imaging area 100, as shown in FIG. 27(*b*).

FIG. 27(*b*) shows the comparison result information image to be projected if one position is left unscrewed. Text information telling that a screw is left unfastened is projected in the imaging area 100 as correction information image C3*a*, and an arrow pointing at the position to be screwed is also projected onto object OB3 as correction information image C3*b*.

With correction information images C3*a* and C3*b*, shown in FIG. 27(*b*), the user can appropriately recognize the defect and can work correctly by correcting the defect. The image projected onto object OB3 from the image pickup section 14 can be displayed in a correct form without deformation because the three-dimensional-shape information of object OB3 is calculated each time. Through the three-dimensional-shape measurement of object OB3, the model can be recognized clearly, and an image can be projected without deformation.

FIG. 28 shows that the arm member 3 is bent so that the image pickup section 14 of the image input-and-output apparatus 1 takes an image of the object or writing paper OB1 from the left in the front, in the first case of the model trace mode. When the image input-and-output apparatus 1 is positioned as shown in FIG. 28, the image projection section 13 also projects images such as a reference image and a comparison result information image onto writing paper OB1 from the left in the front.

The object imaging direction and the projection direction of the image input-and-output apparatus 1 can be changed by bending the arm member 3, and the efficiency of the work can be enhanced by selecting the optimum position for the work. Generally, many users are right-handed, so that an annoyance of the presence of the image input-and-output apparatus 1 can be suppressed by bending the arm member 3 to move the image input-and-output apparatus 1 to take and project images from the left in the front.

The imaging direction and the projection direction of the image input-and-output apparatus 1 are not limited to those shown in FIG. 28, which are the left in the front. The annoyance of the presence of the image input-and-output apparatus 1 in the work can be suppressed by making a movement in an opposite direction of the working direction in the top view of the object. For instance, if a left-handed user writes a hand on writing paper OB1 in the first case, described above, such a movement should be made that the image pickup section 14 takes an image and the image projection section 13 projects an image from the right in the front.

If the direction of imaging by the image pickup section 14 is not almost perpendicular to the surface of the object, a trapezoidal image is obtained, as shown in FIG. 28. It is preferable that the precision of the comparison result information be improved by correcting the trapezoidal image and obtaining a planar image equivalent to or corresponding to one taken in a nearly perpendicular direction.

If the comparison result information is obtained from a planar image in the model trace processing (S613) shown in FIG. 24, steps 2431 to 2434, which will be described below, should be carried out after the image of the object is taken in step S2414 and before the process of step S2415 starts.

More specifically, after the processing of step S2414 is completed, three-dimensional detection processing identical to the three-dimensional detection processing in FIG. 12(*a*) is executed (S2431). Then, three-dimensional coordinates (X, Y, Z) obtained as a result of the three-dimensional detection by the three-dimensional processing are stored in the external memory 27 (S2432). Original-posture calculation processing identical to the original-posture calculation processing in step S1907 in FIG. 19 is executed (S2433). Then, plane conversion processing identical to that performed in step S1908 in FIG. 18 is executed to obtain a planar image (S2434).

The planar image data of the object obtained in step S2434 should be judged in step S2417 by the work result judgment program stored in the work result judgment program storage section 37*l*.

After the image of the object onto which the comparison result information image is projected is taken in step S2423 of the model trace processing (S613) shown in FIG. 24 and before the processing of step S2424 starts, processes identical to those of steps S2431 to S2434 may be carried out to convert the taken image to a planar image. Then, the comparison result information can be saved as an image without deformation.

Because the taken image is converted to a planar image in the model trace processing, an error in comparison result information caused by deformation of the imaging data can be reduced and high-precision comparison result information can be obtained not only if the image is taken in a slanting direction but also if the object has a three-dimensional shape and consequently has a curved surface.

When the image projection section 13 does not project an image in a direction almost perpendicular to the surface of the object, the image projected onto the object has deformation. Some projected image cannot be recognized by the user. it is preferred that the distorted projection image be corrected so that the image can be projected without deformation.

An image can be projected without deformation irrespective of the projection direction in the model trace processing (S613) in FIG. 24 by executing projection image conversion processing (S2900), which will be described below, instead of step S902 in the projection processing (S2406, S2419) executed in the same way as the projection processing of step S806 in FIG. 8.

FIG. 29 is a flow chart of image conversion processing for no-deformation-image projection (S2900). The image conversion processing for no-deformation-image projection (S2900) converts the image displayed on the projection LCD 19 in accordance with the image information stored in the projection image storage section 37*k* to an image that can be projected onto the object without deformation.

In this processing, first, an area for the processing is allocated in the working area 37*m* of the RAM 37, and the variable of counter "q" used in the processing is initialized (q=0) (S2901).

A space of LCD spatial coordinates (lcdcx, lcdcy) is specified as a rectangular area for the converted no-deformation projection image (no-deformation image on a curved object), and the number of pixels Qa contained in the rectangular area is obtained (S2902).

The image information of the comparison result information image, reference information image, and the like stored in the projection image storage section 37*k* is placed at coordinates (ccdcx, ccdcy) on the ideal camera image (S2903).

The image information of each pixel of the no-deformation projection image is specified at corresponding LCD spatial coordinates (lcdcx, lcdcy) of the rectangular area by using three-dimensional coordinates (X, Y, Z) of a point on the surface of the object stored in the external memory 27 in step S2432.

More specifically, first, it is checked whether counter "q" reaches pixel count Qa (S2904). If counter "q" does not reach pixel count Qa (S2904: No), the LCD spatial coordinates (lcdcx, lcdcy) of the pixel corresponding to counter "q" are converted to coordinates (X, Y, Z) on the object stored in the external memory 27 (S2905).

The coordinates (X, Y, Z) on the object obtained through the conversion in step S2905 are converted to coordinates (ccdcx, ccdcy) on the ideal camera image (S2906).

The pixel information placed at the coordinates (ccdcx, ccdcy) obtained through the conversion in step S2906 is obtained, and the pixel information is written at the LCD spatial coordinates (lcdcx, lcdcy) corresponding to the value of counter "q" (S2907).

Counter "q" is incremented by "1" to execute the processing from step S2904 to step S2907 on the next pixel (S2908).

The processing from step S2904 to step S2908 is repeated until counter q reaches pixel count Qa (S2904: Yes), and the pixel information associated with the LCD spatial coordinates (lcdcx, lcdcy) of the specified rectangular area is transferred to the projection LCD driver 30 (S2909).

The processing area allocated to the working area 37*m* to execute the processing is de-allocated in step S2910, and the processing ends.

When the pixel information on the LCD spatial coordinates (lcdcx, lcdcy) is transferred to the projection LCD driver 30 in step S2909, the projection LCD 19 displays the image to be projected onto the deformed and curved surface without deformation. Accordingly, the image is projected onto the object without deformation.

When the image conversion processing for no-deformation-image projection (S2900) is executed, an image can be projected without deformation even not only if the image is projected in a slanting direction but also if the object has a three-dimensional shape and consequently has a curved surface. As a result, especially when a correction information image or an evaluation information image is projected as a comparison result information image, the user can correctly recognize the information.

FIGS. 30(*a*) and 30(*b*) are views illustrating a group of light-source lenses 50, as another example of the light-source lens 18 in the embodiment described earlier. FIG. 30(*a*) is a side view showing the light-source lenses 50, and FIG. 30(*b*) is a plan view showing the light-source lenses 50. Components identical to those described earlier will be denoted by the same symbols, and a description of the components will be omitted.

The light-source lens 18 in the embodiment described above includes convex aspheric lens sections 18*a* integrally arranged on the base 18*b*, aligned with the LEDs 17. In the case shown in FIGS. 30(*a*) and 30(*b*), bullet-shaped plastic lenses containing one LED 17 each are separately provided.

The separate light-source lenses 50 containing one LED 17 each allows each LED 17 and the corresponding light-source lens 50 to be positionally determined in one-to-one relationship. The relative position precision can be improved, and the direction of outgoing light can be aligned.

In contrast, when the entire lens array is positioned on the substrate 16, the direction of outgoing light can vary because of a positioning error occurring in die-bonding of the LEDs 17 or a difference in linear expansion coefficient between the lens array and the substrate.

Light coming from the LEDs 17 and projected onto the face of the projection LCD 19 is aligned to the normal to the face of the projection LCD 19 and can pass the diaphragm of the projection optical system 20 evenly. Accordingly, variations in illumination of the projected image can be suppressed, and a high-quality image can be projected as a result. The LED 17 contained in each light-source lens 50 is mounted to the substrate 16 through an electrode 51 having a lead and a reflector.

A frame-shaped elastic fixture member 52 is disposed around one group of light-source lenses 50 and binds the light-source lenses 50 into a certain direction. The fixture member 52 is made from a resinous material such as rubber, plastics, or the like.

Because the light-source lenses 50 are separately formed for the LEDs 17, it is hard to dispose them so that the angles of optical axes formed by the convex tips of the light-source lenses 50 are correctly aligned to the projection LCD 19.

In the case shown in FIGS. 30(*a*) and 30(*b*), the fixture member 52 surrounds one group of light-source lenses 50 to bring the outer surfaces of the light-source lenses 50 into contact one another and to bring the light-source lenses 50 into such positions that the optical axis of each light-source lens 50 meets the projection LCD 19 at a correct angle. This configuration allows each light-source lens 50 to project almost perpendicular light onto the projection LCD 19. Because the evenly perpendicular light can be projected onto the face of the projection LCD 19 and can pass the diaphragm of the projection lens evenly, variations in illumination of the projected image can be suppressed. A higher-quality image can be projected.

The fixture member 52 may have certain rigidity predetermined for a certain size. Alternatively, the fixture member 52 may be formed by an elastic material to bring the light-source lenses 50 into certain positions with the elasticity.

FIGS. 31(*a*) and 31(*b*) are views illustrating a fixture member 60, as another example different from the fixture member 52 for bringing the light-source lenses 50 into certain positions as shown in FIGS. 30(*a*) and 30(*b*). FIG. 31(*a*) is a perspective view showing a fixed state of the light-source lenses 50, and FIG. 31(*b*) is a partial section view of the state. Components identical to those described earlier will be denoted by the same symbols, and a description of the components will be omitted.

The fixture member 60 is formed as a flat plate having a through hole 60*a* conically shaped along the outer surface of each light-source lens 50 in its sectional view. Each light-source lens 50 is fixed when it is inserted into the through hole 60*a*.

An elastic exertion plate 61 is inserted between the fixture member 60 and the substrate 16, and an elastic O-ring 62 is disposed between the exertion plate 61 and the bottom of each light-source lens 50 in such a manner that the ring encircles the electrode 51.

The LED 17 contained in the light-source lens 50 is mounted to the substrate 16 through the electrode 51 passing through the through hole made in the exertion plate 61 and the substrate 16.

The fixture member 60 fixes each light-source lens 50 in the corresponding through hole 60*a* having a cross-sectional shape along the outer surface of the lens, so that the optical axis of the light-source lens 50 can be directed to the projection LCD 19 at a correct angle more definitely than when the fixture member 52, described above, is used.

In the assembly process, the LEDs 17 can be fixed to correct positions by a force exerted by the O-rings 62.

A shock that can occur when the apparatus 1 is transported or the like can be absorbed by the elasticity of the O-ring 62. Accordingly, misalignment of the light-source lenses 50 due to the shock, disabling the light-source lenses 50 to direct perpendicular light onto the projection LCD 19, can be avoided.

In the above embodiment, the process of step S2402 in the model trace processing shown in FIG. 24 can be associated with a reference information acquisition means. The projection processing in step S2406 and step S2419 in the model trace processing shown in FIG. 24 can be associated with a reference information projecting means.

The process of step S2417 in the model trace processing shown in FIG. 24 can be associated with a comparison result information acquisition means. The projection processing in step S2419 in the model trace processing shown in FIG. 24 can be associated with a comparison result projecting means.

The processes of steps S2431 to S2432, described above, can be associated with a three-dimensional-information generation means. The processes of steps S2433 to S2434, described above, can be associated with a planar image correction means. The no-deformation-projection image conversion processing shown in FIG. 29 can be associated with a spatial modulation control means.

The present invention has been described in accordance with the embodiment, but the present invention is not limited to the embodiment. A variety of improvements and modifications are possible within the scope of the present invention.

For example, in the present embodiment, a planar image is obtained and displayed in the planar image mode, but a commonly-known OCR function may be incorporated to read a planar image. In that case, text on the planar image can be read with higher precision than when the curved document is read by the OCR function.

In step S1501 of FIG. 15 of the embodiment, all luminance images including a change in brightness are extracted and provisional CCDY values are obtained for all the images, but all the luminance images do not need to be extracted always. One or more images should be extracted, but the number of images is not limited. If the number of images to be extracted is reduced, the boundary coordinates can be obtained quickly.

In step S1507 of FIG. 15 of the embodiment, a weighed average of fCCDY[i] is obtained. In step S1607 of FIG. 16, values are averaged by using a polynomial approximate expression of efCCDY[i]. The average of the values can be obtained in other methods. A simple average of the values may be obtained. The median value of the values may be obtained. An approximate expression of the values may be calculated to specify a position detected by the approximate expression as a boundary coordinate. A statistical calculation may also be made.

For instance, in the three-dimensional-shape detection processing in the planar image mode in the embodiment, striped pattern light formed of a plurality of types of a series of alternate light and dark patterns is projected to detect the three-dimensional shape of original P. Different pattern light may be used to detect the three-dimensional shape.

For instance, the three-dimensional shape of a curved original may be easily detected by projecting two slit lights 70 and 71 from the image projection section 13, as shown in FIG. 32. In that case, the three-dimensional shape can be detected faster by just the two images, in comparison with when eight pattern lights are projected.

If the reference information of a single process of work consists of the reference information of a plurality of stages, the comparison result information images obtained in the individual stages and the reference information images of the corresponding stages may be projected sequentially and continuously like a moving picture in step S2419 of the model trace processing, described with reference to FIG. 24. For instance, in a single process of writing a hand in calligraphy, if the reference information consists of model information of each stroke in writing in the first case of the model trace mode, the comparison result information of hand M1 may be divided in accordance with the order of making strokes in writing hand M1 and projected together with the model information image of the corresponding stroke, sequentially and continuously like a moving picture. Consequently, similarities and differences between the user's work and the reference information can be recognized clearly.

In one embodiment of the present invention, the image input-and-output apparatus may include a light source means for emitting light, a spatial modulation means for performing spatial modulation of light emitted from the light source means and outputting image signal light, a projection optical system for projecting the image signal light output from the spatial modulation means in a projection direction, and a reference information acquisition means for obtaining reference information of the object to be photographed by the imaging means. In that case, the projecting means may include a reference information projecting means for outputting image signal light from the spatial modulation means, in accordance with the reference information obtained by the reference information acquisition means, and projecting the output image signal light onto the object or an image-projectable plane in the projection direction by means of the projection optical system.

In this configuration, an image of the reference information of the object to be photographed by the imaging apparatus is projected on the object or an image-projectable plane in the projection direction. Therefore, when an image corresponding to reference information is projected onto the object after the user of the image input-and-output apparatus performs some work on the object, for instance, the user can clearly recognize any difference between the work and the reference information. If the work includes a problem with respect to the reference information, the solution can be correctly recognized.

In one embodiment of the present invention, the image input-and-output apparatus may further include a comparison result information acquisition means for comparing the reference information obtained by the reference information acquisition means and the written information recognized by the recognizing means and obtaining the result of comparison as comparison result information. In that case, the projecting means may include a comparison result information projecting means for outputting image signal light based on the comparison result information obtained by the comparison result information acquisition means from the spatial modulation means and projecting the output image signal light onto the object or an image-projectable plane in the projection direction by means of the projection optical system.

In this configuration, an image corresponding to information of a result of comparison between the object to be photographed by the imaging apparatus and the reference information of the object is projected onto the object or an image-projectable plane in the projection direction, together with the image corresponding to the reference information. Therefore, when an image corresponding to the result of comparison between the work done and the reference information is projected onto the object together with the image corresponding to the reference information after the user of the image input-and-output apparatus performs some work on the object, for instance, the user can clearly recognize any difference between the work and the reference information. If the work includes a problem with respect to the reference information, the solution can be correctly recognized.

In one embodiment of the present invention, the image input-and-output apparatus may include a light source means for emitting light, a spatial modulation means for performing spatial modulation of light emitted from the light source means and outputting image signal light, a projection optical system for projecting the image signal light output from the spatial modulation means toward a projection plane, a reference information acquisition means for obtaining reference information of the object to be photographed by the imaging means, and a comparison result information acquisition means for comparing the reference information obtained by the reference information acquisition means and the written information recognized by the recognizing means and obtaining the comparison result as comparison result information. In that case, the projecting means may include a comparison result information projecting means for outputting image signal light based on the comparison result information obtained by the comparison result information acquisition means, from the spatial modulation means, and projecting the output image signal light onto the object or an image-projectable plane in the projection direction by means of the projection optical system.

In this configuration, an image corresponding to information of a result of comparison between the object to be photographed by the imaging apparatus and the reference information of the object is projected onto the object or an image-projectable plane in the projection direction, together with the image corresponding to the reference information. Therefore, when the image corresponding to the result of comparison between the work done and the reference information is projected onto the object after the user of the image input-and-output apparatus performs some work on the object, for instance, the user can clearly recognize any difference between the work and the reference information. Consequently, if the work includes a problem with respect to the reference information, the solution can be correctly recognized.

In one embodiment of the present invention, the three-dimensional-shape detecting means may include a three-dimensional-information generation means for generating three-dimensional information of the object or an image-projectable plane in the projection direction, on the basis of the imaging data of the image signal light taken by the imaging means when the image signal light has a certain pattern shape and the image signal light is projected onto the object or the image-projectable plane in the projection direction by the projection optical system. In that case, the image input-and-output apparatus may further include a planar image correction means for correcting the imaging data of the object obtained by the imaging means to be equal to imaging data of the object positioned in a space containing the projection direction, taken by the imaging means in the direction almost perpendicular to the surface of the object, in accordance with the three-dimensional information of the object or the image-projectable plane in the projection direction, generated by the three-dimensional-information generation means. The comparison result information acquisition means may obtain the comparison result information by using the written information recognized by the recognizing means in accordance with the imaging data corrected by the planar image correction means.

In this configuration, the imaging data of the object is corrected to be equal to the imaging data of an image taken in a nearly perpendicular direction with respect to the surface of the object, in accordance with the tree-dimensional shape of the object or image-projectable plane in the projection direction, and the corrected image data is used for comparison with the reference information. Accordingly, a decrease in detection precision of the comparison result caused by the deformation of the imaging data can be suppressed.

In one embodiment of the present invention, the image input-and-output apparatus may include a spatial modulation control means for controlling the spatial modulation means in accordance with the three-dimensional information generated by the three-dimensional information generation means so that the reference information projecting means or the comparison result information projecting means projects image signal light without deformation onto the object or an image-projectable plane in the projection direction.

In this configuration, an image corresponding to the reference information and an image corresponding to the comparison result information are projected onto the object or an image-projectable plane in the projection direction, in accordance with the three-dimensional shape of the object or the image-projectable plane in the projection direction. Accordingly, the contents of the projected image can be recognized without being deeply affected by the deformation.

In one embodiment of the present invention, the reference information can be the information of a model of the object.

In this configuration, since the reference information is model information for the object, the result of comparison with reference to the model information can be provided.

In one embodiment of the present information, the reference information can be model information of a process of work including one or more stages. The comparison result information acquisition means may be configured to obtain comparison result information by comparing imaging data of the object in at least one stage of the work and the model information corresponding to the stage after the imaging data is taken by the imaging means. The comparison result information projecting means may be configured to project the comparison result information onto the object or the image-projectable plane in the projection direction by means of the comparison result information acquisition means.

In this configuration, an image corresponding to information obtained as the result of comparison with the model information is projected in each stage of a single process of work, and a result of comparison with reference to the model information can be provided in each stage.

In one embodiment of the present invention, the projecting means may include a reference information projecting means for projecting the model information of each stage onto the object or an image-projectable plane in the projection direction, together with the comparison result information of the corresponding stage projected onto the object by the comparison result information projecting means.

In this configuration, an image corresponding to the information of the result of comparison with the model information in each stage of the process of work is projected together with the model information of the corresponding stage, so that the result of comparison based on the model information can be more clearly provided in each stage.

In one embodiment of the present invention, the comparison result information may be correction information of the object with respect to the reference information.

In this configuration, the comparison result information is the correction information of the object with respect to the reference information, and a method of solving a problem corresponding to any difference from the reference information can be clearly recognized.

In one embodiment of the present information, the comparison result information may be evaluation information of the object with respect to the reference information.

In this configuration, the comparison result information is the evaluation information of the object with respect to the reference information, and an evaluation based on the reference information can be clearly recognized.

In one embodiment of the present invention, the image input-and-output apparatus may include a movable means that can move a projection section which includes the light source means, the spatial modulation means, and the projection optical system, and an imaging section which includes the imaging means and is integrally provided with the projection section, as the object is moved.

In this configuration, since the projection section which includes the light source means, the spatial modulation means, and the projection optical system, and the imaging section which includes the imaging means and is integrally provided with the projection section can be moved by the movable means as the object is moved, the imaging direction and the projection direction can be changed as needed. For instance, when work is performed on the object, the influence of the work on the imaging direction and the projection direction can be reduced.

In one embodiment of the present invention, the movable means may be able to move the projection section and the imaging section, so that the projection of the image signal light onto the object by the projecting means and the imaging of the object by the imaging means can be made in an direction opposite to the direction of the work performed on the object, in the top view.

In this configuration, since the movable means can move the projection section and the imaging section to perform imaging and projection in a direction opposite to the direction of the work performed on the object in the top view, the influence of the work on the imaging direction and the projection direction can be reduced.

In one embodiment of the present invention, the movable means may be able to move the projection section and the imaging section so that the projecting means projects the image signal light onto the object and the imaging means takes an image of the object from the left in the front with respect to the person working on the object.

In this configuration, the movable means can move the projection section and the imaging section so that projection and imaging are performed from the left in the front of the person working on the object. Especially when a right-handed person works, the influence of the work on the imaging direction and the projection direction can be reduced.

Second Embodiment

An image input-and-output apparatus according to a second embodiment will be described below. The image input-and-output apparatus of the second embodiment differs from the image input-and-output apparatus 1 of the first embodiment in that a function is changed in or a new function is added to the processor 15. The image input-and-output apparatus of the second embodiment has the same hardware configuration as the image input-and-output apparatus 1 of the first embodiment. Therefore, characteristic parts of functions of the image input-and-output apparatus of the second embodiment will be described. In the description of the image input-and-output apparatus of the second embodiment, figures used for describing the first embodiment will be referenced when needed. In the description, components of the second embodiment equivalent to those in the first embodiment will be denoted by the same reference symbols. In the description below, the image input-and-output apparatus of the second embodiment will be denoted as an image input-and-output apparatus 1B (see FIG. 33).

(Entire Structure)

The image input-and-output apparatus 1B has a variety of modes such as a digital camera mode for implementing a digital camera function, a webcam mode for implementing a web camera function, a 3D image mode for obtaining a 3D image by detecting a three-dimensional shape, a planar image mode for obtaining a planar image of a curved original, a grading mode for performing right-or-wrong assessment of answers, serving as written information written on an answer sheet, and score calculation and for projecting an assessment result and the like, and a postal information mode for performing right-or-wrong assessment of a postal number or an address, serving as written information written on a postcard or the like and for projecting an assessment result.

In the present embodiment, a mode changeover switch 9 is a switch for setting the digital camera mode, webcam mode, 3D image mode, planar image mode, grading mode, postal information mode, off mode, or any other mode.

FIG. 33 is a block diagram of the image input-and-output apparatus 1B. The image input-and-output apparatus 1B has a processor 15B corresponding to the processor 15 of the first embodiment. As clearly understood from FIG. 33, the processor 15B has the same basic functions as the processor 15 of the first embodiment. Distinctive functions of the processor 15B will be described below.

A ROM 36 includes a camera control program 36*a*, a pattern light imaging program 36*b*, a luminance image generation program 36*c*, a code image generation program 36*d*, a code boundary extraction program 36*e*, a lens aberration correction program 36*f*, a triangulation calculation program 36*g*, an original-posture calculation program 36*h*, a plane conversion program 36*i*, a designated-area recognizing program 36*j*, a written-information recognizing program 36*k*, a reference-information extracting program 36*l*, a right-or-wrong assessment program 36*m*, a score calculating program 36*n*, a projection-image generating program 36*o*, and a reference-information storage section 36*p*.

The designated-area recognizing program 36*j* is a program for recognizing an area that the user designates in the object to be photographed, in the grading mode or postal information mode. The designated-area recognizing program 36*j* detects, in captured images obtained in moving-picture image acquisition, the trajectory of a user's finger on the object and recognizes the area circumscribed by that trajectory.

The written-information recognizing program 36*k* is a program for recognizing written information, including text or graphics, written on the object, from a captured image of the object, is configured of a known OCR (Optical Character Reader) program. Specifically, in the grading mode, the written-information recognizing program 36*k* recognizes an answer written on an answer sheet, serving as the object, and in the postal information mode, it recognizes an address or postal number written on a postcard, serving as the object.

The reference-information extracting program 36*l* is a program for extracting, from reference information stored in the reference-information storage section 36*p*, reference information corresponding to the written information recognized by the written-information recognizing program 36*k*. Specifically, in the grading mode, the reference-information extracting program 36*l* extracts a model answer corresponding to the recognized answer, and in the postal information mode, it extracts a postal number corresponding to the recognized address.

The right-or-wrong assessment program 36*m* is a program for assessing whether or not the written information recognized by the written-information recognizing program 36*k* matches the reference information extracted by the reference-information extracting program 36*l*, or for assessing whether it is possible to assess whether or not that written information and reference information match. Specifically, the right-or-wrong assessment program 36*m* assesses whether or not the answer recognized in the grading mode matches the extracted model answer, assesses whether or not the postal number recognized in the postal information mode matches the postal number extracted on the basis of the address information, or recognizes the answer, postal number and so forth serving as the written information and assesses whether or not right-or-wrong assessment is possible for that recognized written information.

The score calculating program 36*n* is a program for calculating a score based on the counting result in a number-of-circles counter 37*m*B, described later, in the grading mode.

The projection-image generating program 36*o* is a program for generating a projection image for projecting the assessment result of the right-or-wrong assessment program 36*m*, the score calculated by the score calculating program 36*n*, and so forth at a predetermined position on the object with a predetermined shape.

The reference-information storage section 36*p* stores a grading database which stores, in association with each other, the position of each answer field and a model answer thereof for the answer sheet used in the grading mode and a postal-information database which stores, in association with each other, each address and the postal number used in the postal information mode.

In this case, the grading database and postal-information database are stored in the reference-information storage section 36*p*; however, it is also possible to configure the system such that these databases are stored in an external apparatus that is separate from this apparatus, and predetermined reference information is extracted from the databases stored in that external apparatus by wireless communication means or wired communication means, including the antenna 11 and the RF driver 24.

A RAM 37 includes an image-with-pattern-light storage section 37*a*, an image-without-pattern-light storage section 37*b*, a luminance image storage section 37*c*, a code image storage section 37*d*, a code boundary coordinate storage section 37*e*, an ID storage section 37*f*, an aberration correction coordinate storage section 37*g*, a three-dimensional coordinate storage section 37*h*, an original-posture calculation result storage section 37*i*, a plane conversion result storage section 37*j*, a projection image storage section 37*k*, a pointing-coordinates storage section 37*l*B, a number-of-circles (number of "○" s) counter 37*m*B, and a working area 37*n*B, assigned as storage areas.

The projection-image storage section 37*k* stores a projection image generated by the projection-image generating program 36*o*. The pointing-coordinates storage section 37*l*B stores fingertip coordinates which the user designates on the object in the grading mode or the postal-information mode. The number-of-circles counter 37*m*B counts the number of "○" symbols projected in the grading mode, and stores the total. The working area 37*n*B stores data used temporarily for the computation in the CPU 15.

(Main Processing)

FIG. 34 is a flow chart of main processing. In the main processing shown in FIG. 34, a series of processes from S601 to S611 is the same as in the first embodiment. In the main processing of the second embodiment, when it is determined in S610 that the planar image mode is not selected (S610: No), it is determined whether the mode changeover switch 9 selects the grading mode (S612B). If the grading mode is selected (S612B: Yes), grading processing, which will be described later, starts (S613B).

If the grading mode is not selected (S612B: No), it is determined whether the mode changeover switch 9 selects the postal information mode (S614B). If the postal information mode is selected (S614B: Yes), postal information processing, which will be described later, starts (S615B).

If the postal information mode is not selected (S614B: No), it is determined whether the mode changeover switch 9 selects the off mode (S616B). If the off mode is not selected (S616B: No), the processing from step S603 is repeated. If it is determined that the off mode is selected (S616B: Yes), the processing ends.

(First Case in Grading Mode)

Next, the grading mode according to a first case will be described with reference to FIGS. 35 to 39. In the description, it is assumed that the original P serving as the above-described object to be photographed is formatted as an answer sheet P in FIGS. 35 to 39.

The grading mode of this first case is a mode for automatically grading all answers written on the answer sheet P at once and for projecting the grading results or the like onto the answer sheet. FIG. 35 is a diagram for explaining the layout of the answer sheet P. FIG. 36 is a diagram showing the grading results or the like being projected onto the answer sheet P.

As shown in FIG. 35, on the answer sheet P are printed a score field T at the top right thereof; individual question statements M1 etc. for questions 1 to 10, which are arranged from top to bottom at the central part; and answer fields K1 etc. for the questions, to the right and below the question statement M1 etc.

Answers are written in the answer field K1 etc. by the respondent before the grading mode is selected: "equilateral triangle" is in the answer field K1 corresponding to question 1, "y=ax" is in the answer field K2 corresponding to question 2, and the answer field K10 corresponding to question 10 is "no answer", indicating that no answer is written there.

When this answer sheet P is placed within the imaging area of the image input-and-output apparatus 1 and the mode changeover switch 9 is set to the grading mode, the image input-and-output apparatus 1 captures an image of the answer sheet P, and from that imaging data, it recognizes all of the answer fields K1 etc. based on position information for the answer fields K1 etc. stored in the reference-information storage section 36*p*. Then, it recognizes the answer written in each answer field, extracts a model answer stored in association with each answer field K1, and assesses whether or not that extracted model answer matches the recognized answer.

As a result, if the answer written by the respondent matches the model answer, as shown in FIG. 36, a symbol "○" is projected onto the answer field K1 as information indicating that they match. If they do not match, a symbol "X" is projected onto the answer field K2 as information indicating that they do not match, and the extracted model answer "$y=ax^2+b$" is projected to the left of the answer field K2. If the answer field is "no answer", an "X" symbol is projected onto the answer field K10, and the extracted model answer "x=16" is projected to the left of the answer field K10.

Once the image input-and-output apparatus 1 has counted the number of projected "○" symbols in the number-of-circles counter 37*m*B and completed the right-or-wrong assessment for each question, it calculates the score using the score-calculating program 36*n* based on the count result in the number-of-circles counter 37*m*B and projects that calculated score "80" onto the score field T.

FIG. 37 is a flow chart of the grading processing (S613B in FIG. 34). In this processing, first, a high-resolution setting is transmitted to the CCD 22 (S2501), and a viewfinder image is displayed on the LCD monitor 10 (S2502).

Next, the release button 8 is scanned (S2503), and it is determined whether or not the release button 8 is half pressed (S2504). If the release button 8 is not half pressed (S2504: No), the processing from S2503 is repeated; if it is half pressed (S2504: Yes), the autofocus (AF) and autoexposure (AE) functions are initiated to adjust the focus, aperture, and shutter speed (S2505).

Then, the release button is scanned again (S2505*a*), and it is determined whether or not the release button 8 is fully pressed (S2506). If it is not fully pressed (S2506: No), the processing from S2503, described above, is repeated.

Conversely, if it is fully pressed (S2506: Yes), it is determined whether or not the flash mode is active (S2507). If the flash mode is active (S2507: Yes), the flash 7 is fired (S2508) and an image is acquired (S2509). On the other hand, if the flash mode is not active (S2507: No), an image is acquired without firing the flash 7 (S2509).

Next, three-dimensional shape detection processing which is identical to the three-dimensional shape detection processing described above (S1006 in FIG. 10) is carried out to detect the three-dimensional shape of the object (S2510).

Next, original-posture calculation processing which is identical to the original-posture calculation processing described above (S1907 in FIG. 19) is carried out to calculate the position L, angle θ, and curvature $\phi(x)$ of the answer sheet P with respect to the image input-and-output apparatus 1 as posture parameters of the answer sheet P, based on the three-dimensional shape detection result (S2511).

Next, plane conversion processing which is identical to the plane conversion processing described above (S1908 in FIG. 19) is carried out to generate a flattened planar image (S2512), and the planar image obtained by this plane conversion processing is stored in the external memory 27 (S2513).

Next, in assessment processing to be described later (S2514), right-or-wrong assessment for each answer written on the answer sheet P, score calculation, and so on are carried out, and the results thereof are projected. Finally, it is determined whether the mode changeover switch 9 is unchanged (S2515). If, as a result, it is unchanged (S2515: Yes), the processing from S2501 is repeated; if it has changed (S2515: No), the processing ends.

FIG. 38 is a flow chart of the assessment processing described above (S2514 in FIG. 37). In this assessment processing, first, in the planar image stored in the external memory 27 in S2513 in FIG. 37, the layout of the answer sheet P is analyzed to recognize the positions on the answer sheet P of all answer fields printed on the answer sheet P(S2601).

Each answer field is recognized based on the position information of each answer field in the grading database stored in the reference-information storage section 36*p*. Because the position of each answer field on the answer sheet P is recognized in the planar image, it is possible to more accurately determine the position of each answer field compared with the processing without using a planar image.

For example, as shown in FIG. 35, if the answer sheet P is bound like a booklet and image capturing is carried out while the answer sheet P is curved, when each answer field is recognized from the captured image which is captured in that curved state, there is a risk of not being able to accurately recognize each answer field because the shapes of the answer fields are deformed in various ways, depending on the degree of curvature.

On the other hand, because a planar image, formed by flattening the captured image of the curved answer sheet P in the plane conversion processing (S2512 in FIG. 37), is used in the present case, deformation in the shape of each answer field is corrected, and therefore, the answer fields can be accurately recognized.

Next, the number-of-circles counter 37*m*B is initialized (="0") (S2602), and the projection-image storage section 37*k* is cleared (S2602*a*). Then, from among the answer fields recognized in S2601, for one answer field, the answer written in that answer field is recognized by the written-information recognizing program 36*k* (S2603), and it is determined whether or not right-or-wrong assessment is possible for that recognized answer (S2604).

When the answer written in the answer field is recognized, since the recognition is performed for the planar image, where deformation of the answer text is also corrected, it is possible to improve the recognition accuracy of the written-information recognizing program 36*k*.

When, as a result of the right-or-wrong assessment, it is determined that the right-or-wrong assessment is possible (S2604: Yes), a model answer serving as reference information corresponding to that answer field is extracted from the grading database stored in the reference-information storage section 36*p* (S2605).

Then, it is determined whether or not the recognized answer and the extracted model answer match, in other words, whether the recognized answer is correct (S2606). If, as a result, the answer is correct (matches) (S2606: Yes), "1" is added to the number-of-circles counter 37*m*B (S2607), a projection image for projecting a "○" symbol is generated by the projection-image generating program 36*o*, and that projection image is written in the projection-image storage section 37*k*.

In contrast, if it is determined that the right-or-wrong assessment is impossible (for example, if no answer is written or if there are characters which cannot be recognized) (S2604: No), or if the recognized answer does not match the extracted model answer, that is, if it is incorrect (S2606: No), a projection image for projecting an "X" symbol and the "model answer" is generated by the projection-image generating program 36*o*, and that projection image is written in the projection-image storage section 37*k* (S2609).

The projection images generated in S2608 and S2609 are set so that the "○" symbol or the "X" symbol is superimposed on the corresponding answer field, and so that the "model answer" is positioned to the left of the corresponding answer field, by using image conversion processing for no-deformation projection, which is to be explained later with a flow chart in FIG. 39. Therefore, the user can understand at a glance the assessment result and model answer corresponding to the answer.

In S2604, by determining whether or not the right-or-wrong assessment is possible for the recognized answer, when the answer field contains no answer or when there are characters which cannot be recognized, for example, it is not possible to recognize the answer with the written-information recognizing program 36*k*. In such an event, however, by determining that the right-or-wrong assessment is impossible (S2604: No) and projecting the "X" symbol and the "model answer", it is possible to recognize the "model answer" even if, for example, there is no answer and so on.

Next, it is determined whether or not the right-or-wrong assessment is completed for the answers written in all answer fields recognized in S2601, and if it is not completed (S2611: No), the processing from S2603 is repeated.

In contrast, if it is completed (S2611: Yes), the score is calculated by the score-calculating program 36*n* based on the counting result in the number-of-circles counter 37*m*B (S2612), a projection image for projecting the score is generated, and that projection image is written into the projection-image storage section 37*k* (S2613).

When the processing up to S2613 is completed, the projection images written into the projection-image storage section 37*k* in S2608, S2609, and S2613 are projected all together (S2614), whereupon the processing ends.

Thus, according to the grading mode of the first case, it is possible to recognize, all at once, all of the assessment result information and the score written on the answer sheet P. In addition, because the "○" symbols or the "X" symbols and "model answers" are projected onto the answer sheet P as a projection image, rather than being printed on a separate sheet of paper from the answer sheet, as is performed conventionally, it is possible to carry out the grading procedure without needlessly consuming paper.

FIG. 39 is a flow chart of image conversion processing for no-deformation-image projection. The image conversion processing for no-deformation-image projection generates projection images for projecting "○" symbols, "X" symbols, "model answers", the "score", and the like to be projected in the processes of S2608, S2609, and S2613 in FIG. 38, at predetermined positions in the answer sheet P with predetermined forms.

In this processing, first, an area for the processing is allocated in the working area 37*n*B of the RAM 37, and the variable of counter "q" used in the processing is initialized (q=0) (S2701).

A memory area corresponding to a space of LCD spatial coordinates (lcdcx, lcdcy) is secured and specified in the working area 37*n*B of the RAM 37 as a rectangular area for the converted no-deformation projection image (no-deformation image on a curved object), and the number of pixels Qa contained in the rectangular area is obtained (S2702).

Each pixel value of the image information of "○" symbols, "X" symbols, "model answers", the "score", and the like stored in the projection image storage section 37*k* is placed at each pixel in the rectangular area (this rectangular area is also secured in the working area 37*n*B of the RAM 37) in the ideal camera image coordinate system (ccdcx, ccdcy) (S2703).

With the use of expressions (6) to (9), described above, three-dimensional coordinates (X, Y, Z) corresponding to each pixel on the LCD spatial coordinates (lcdcx, lcdcy) constituting the specified rectangular area, on the surface of the object stored in the three-dimensional coordinate storage section 37*h* are obtained, and further expressions (1) to (5) are used to obtain (ccdcx, ccdcy) to calculate and specify the pixel information of each pixel in the no-deformation-projection image.

More specifically, first, it is checked whether counter "q" reaches pixel count Qa (S2704). If counter "q" does not reach pixel count Qa (S2704: No), the LCD spatial coordinates (lcdcx, lcdcy) of the pixel corresponding to counter "q" are converted to coordinates (X, Y, Z) on the object stored in the working area 37*n*B by using expressions (6) to (9) (S2705).

The coordinates (X, Y, Z) on the object obtained through the conversion in step S2705 are converted to coordinates (ccdcx, ccdcy) on the ideal camera image by using the expressions obtained to calculate (ccdcx, ccdcy) from expressions (1) to (5) (S2706).

The pixel information placed at the coordinates (ccdcx, ccdcy) obtained through the conversion in step S2706 is obtained, and the pixel information is written at the LCD spatial coordinates (lcdcx, lcdcy) corresponding to the value of counter "q" (S2707).

Counter "q" is incremented by "1" to execute the processing from step S2704 to step S2707 on the next pixel (S2708).

The processing from step S2704 to step S2708 is repeated until counter "q" reaches pixel count Qa (S2704: Yes), and the pixel information associated with the LCD spatial coordinates (lcdcx, lcdcy) of the specified rectangular area is transferred to the projection LCD driver 30 (S2709).

The processing area allocated to the working area 37*n*B in step S2701 to execute the processing is de-allocated (S2710), and the processing ends.

When the pixel information on the LCD spatial coordinates (lcdcx, lcdcy) is transferred to the projection LCD driver 30 in step S2709, the projection LCD 19 displays the image to be projected onto the deformed and curved surface without deformation. Accordingly, the image is projected onto the object without deformation.

When the image conversion processing for no-deformation-image projection is executed, an image can be projected without deformation even not only if the image is projected in a slanting direction but also if the object has a three-dimensional shape and consequently has a curved surface. As a result, even when a "○" symbol or the like is projected, the user can correctly recognize the information.

In the above-described case, in the case described for images, conversion to a projection image which is not deformed when viewed from the image projection section 14 is made. It is also possible to convert to a projection image which is not deformed when viewed from a desired point. Also in that case, expressions (6) to (9) converted to have parameters for a desired viewpoint needs to be used.

(Second Case in Grading Mode)

Next, a second case of the grading mode will be described with reference to FIGS. 40 to 42. Whereas the grading mode in the first case grades all answers on the answer sheet P at once, the grading mode in the second case differs in that the user designates the answer to be assessed as right or wrong and the right-or-wrong assessment is carried out for that designated answer.

Whereas the grading mode in the first case counts the number of projected "○" symbols using the number-of-circles counter 37*m*B and calculates the score based on the count result, the grading mode in this second case differs in that the user writes a "○" symbol or the like directly on the answer sheet according to a "○" symbol or the like projected, an image of the answer sheet on which that "○" symbol or the like is written is acquired, and the number of "○" symbols is counted from the acquired image to calculate the score.

FIG. 40 is a diagram for explaining a user operating method. FIG. 41 is a diagram showing grading results and so on projected on the answer sheet. Since the answer sheet P to be graded is identical to the answer sheet P described above, a description of that answer sheet P is thus omitted.

In the grading mode in this second case, when the answer sheet P is disposed within the image capturing region of the image input-and-output apparatus 1, and the mode changeover switch 9 is set to the grading mode, three instruction marks are projected at the bottom of the answer sheet P from the image input-and-output apparatus 1, as shown in FIG. 40.

These three instruction marks are, in order from the left, a designation-completed mark 64, a next mark 65, and a grading mark 66. The image input-and-output apparatus 1 is configured to execute operations specified corresponding to the respective marks when the user points with his or her finger 63 to the instruction marks projected on the answer sheet P.

The designation-completed mark 64 is a mark for instructing that designation of an answer to be assessed as right or wrong is completed. The next mark 65 is a mark for instructing right-or-wrong assessment for another answer. The grading mark 66 is a mark for instructing calculation of the score.

When these instruction marks are projected, the user moves his or her finger so as to encircle the periphery of the answer field containing the answer that should be assessed as right or wrong, and then selects the designation-completed mark 64.

When projecting the instruction marks, the image input-and-output apparatus 1 starts acquiring moving images and detects the motion of the user's finger to recognize the answer field which the user designated. More specifically, it obtains the difference between two successively acquired moving images and recognizes the answer field which the user designated, from the trajectory made by the fingertip.

Then, once the answer field is recognized, the model answer stored in association with that answer field is extracted from the reference-information storage section 36*p*, the answer written in that answer field is recognized, and it is assessed whether or not the recognized answer matches the extracted model answer.

As a result of that assessment, in the same way as described above, a "○" symbol, or an "X" symbol and the "model answer" are projected corresponding to the designated answer, as shown in FIG. 41. In the grading mode of this second case, the user writes a "○" symbol or the like directly on the answer sheet based on the projected "○" symbol or the like.

For example, when the answer is determined by the written-information recognizing program 36*k* to be wrong or to be unable to be recognized because the answer is illegible, even though it is actually correct, an "X" symbol is projected as the assessment result; however, if the user can determine that the answer is correct, he or she corrects the projected "X" symbol to enter an "○" symbol directly on the answer sheet P.

To require right-or-wrong assessment for the next answer, the user first selects the next mark 65, moves his or her finger so as to circumscribe the periphery of the answer field containing the next answer to be assessed as right or wrong, and then selects the designation-completed mark 64. Thus, in the same way as described above, right-or-wrong assessment is carried out for the answer written in that designated answer field, and the assessment result is projected.

Thus, the user continues to designate an answer to be assessed as right or wrong. When he or she selects the grading mark 66 after the right-or-wrong assessment is completed for all answers written on the answer sheet P, the image inputand-output apparatus 1 acquires an image of the answer sheet on which the "○" symbols and so on are entered by the user, recognizes the "○" symbols from the acquired image, calculates the score based on the number of "○" symbols, and projects the score on the score field T.

FIG. 42 is a flow chart showing assessment processing (S2514 in FIG. 37) in the grading mode of the second case. The grading mode of the first case and the grading mode of the second case use different assessment processing (S2514 in FIG. 37) in the grading processing flow chart shown in FIG. 37, and the other processing is the same. Therefore, the assessment processing will be described and a description of the other processing will be omitted.

In the assessment processing (S2514 in FIG. 37) in the grading mode of the second case, a low-resolution setting is transmitted to the CCD 22 (S3001) to switch the resolution of the CCD 22 from high resolution to low resolution, the instruction marks are projected (S3002), and moving image acquisition commences (S3003).

When these instruction marks are projected, the user moves his or her finger 63 so as to encircle the answer field containing the answer required to be assessed as right or wrong in the answer sheet P. The pointing coordinates thereof are detected (S3004). More specifically, the difference between two successive acquired images is obtained and the fingertip coordinates extracted from that difference image are detected.

To request the user operation, the system may be configured so that a predetermined message, for example, "Please circle the answer field containing an answer to be assessed as right or wrong.", is projected onto the answer sheet P at the same time as projecting the instruction marks. With this message, it is possible to easily understand the operating procedure, even for a user who is not familiar with the operating procedure.

Then, it is determined whether or not the user has selected the designation-completed mark 64 (S3005). If the designation-completed mark 64 has not been selected (S3005: No), the detected pointing coordinates are stored in the pointing-coordinates storage section 37*l*B (S3006), and the processing from S3004 is repeated.

In contrast, if the designation-completed mark 64 has been selected (S3005: Yes), the projection-image storage section 37*k* is cleared (S3006*a*), and thereafter, the designated answer field is recognized based on the fingertip coordinates stored in the fingertip-coordinates storage section 37*l*B (S3007).

Next, the recognized answer field is identified in the planar image stored in the external memory 27 in S2513 in FIG. 37 (S3008), the answer written in the identified answer field is recognized (S3009), and it is determined whether or not right-or-wrong assessment is possible for the recognized answer (S3010).

If, as a result, it is determined that right-or-wrong assessment is possible (S3010: Yes), a model answer associated with the identified answer field is extracted from the grading database stored in the reference-information storage section 36*p* (S3011).

Then, it is determined whether or not the recognized answer and the extracted model answer match, in other words, whether or not the recognized answer is correct (S3012).

If, as a result, it is correct (match) (S3013: Yes), a projection image for projecting a "○" symbol is generated, and that projection image is written into the projection-image storage section 37*k* (S3013).

In contrast, for example, if the answer field is "no answer" or if there are unrecognizable characters in the answer, it is determined that right-or-wrong assessment for the recognized answer is impossible (S3010: No). If the recognized answer does not match the extracted model answer, in other words, if it is incorrect (S3012: No), a projection image for projecting an "X" symbol and the "model answer" is generated, and that projection image is written in the projection-image storage section 37*k* (S3014). Then, the projection images generated and written in the projection-image storage section 37*k* in S3013 and S3014 are projected by projecting means (S3015). Thus, the user can recognize the assessment result for the designated answer field. The user directly writes a "○" symbol or an "X" symbol on the answer sheet P based on that projected assessment result information.

Next, it is determined whether or not the user requests right-or-wrong assessment of another answer (S3016). In other words, it is determined whether or not the next mark 65 has been selected. If right-or-wrong assessment is requested for another answer (S3016: Yes), the processing from S3004 is repeated and, in the same way as described above, right-or-wrong assessment is carried out for the other answer, and the assessment result information therefor is projected.

The grading mode of the first case projects the assessment results all together after completing all right-or-wrong assessments. In contrast, in the grading mode of the second case, because right-or-wrong assessment is carried out and the assessment result thereof is projected, each time, only for the answer field which the user requests, it is advantageous when, for example, it is desired to recognize each model answer in a one-question-to-one-answer manner.

On the other hand, if it is not required (S3016: No), it is determined whether or not grading is requested (S3017). In other words, it is determined whether or not the grading mark 66 has been selected. If the grading mark 66 has been selected (S3017: Yes), an image of the answer sheet P is acquired in the still-image mode (S3018), the number of "○" symbols written by the user is calculated from the acquired image by the written-information recognizing program 36*k* (S3019), and the score is calculated based on the number of recognized "○" symbols (S3020).

Then, a projection image for projecting the calculated score is generated and that projection image is written into the projection-image storage section 37*k* (S3021); the projection image is then projected (S3022), whereupon the processing ends. If the grading mark 66 has not been selected (S3017: No), the processing ends without performing grading.

According to the grading mode of the second case, because the score is calculated based on information which the user writes directly on the answer sheet P, it is possible to prevent the score from being calculated based on the wrong assessment result caused an erroneous recognition by the written-information recognizing means 36*k*.

Furthermore, in the above example, it is described that the user designates the answer field to be assessed as right or wrong. However, instead of the user designating the answer field to be assessed as right or wrong, it is also possible to automatically switch the answer field to be assessed as right or wrong in sequence each time the next mark 65 is selected (for example, when the answer fields are arranged in two columns at the left and right, the sequence is from top to bottom at the left side, and then from top to bottom at the right side).

(Postal Information Mode)

Next, the postal information mode will be described with reference to FIGS. 43 to 46. The postal information mode is a mode in which, for example, it is assessed whether or not an address or postal number written on a postcard H or the like is written correctly and that assessment result is projected. FIG.

43 is a diagram showing a user operating procedure in the postal information mode. FIGS. 44 and 45 are diagrams showing projection of assessment results.

In this case, as shown in FIG. 43, for a postcard H containing the characters "Shizuoka-ken, Hamamatsu-shi, Ryuuzenjichou XXX Banchi" as the address, "Mr. Tokkyo Tarou" as the recipient, and "430 0924" as the postal number, it is assessed whether or not the postal number is written correctly corresponding to that address, and the result of that assessment is projected.

When this postcard H is placed within the image-acquisition region of the image input-and-output apparatus 1 and the mode changeover switch 9 is set to the postal information mode, three classifying marks are projected at the bottom of the postcard H from the image input-and-output apparatus 1, as shown in FIG. 43.

The three classifying marks are, in order from the left, a basis information mark 69, an assessment information mark 70, and an input-completed mark 71. The image input-and-output apparatus 1 is configured to execute the operation specified corresponding to each mark when the mark is pointed to with the finger 63.

The basis information mark 69 is a mark for instructing recognition of basis information in order to identify reference information which is set in advance in association with the basis information. The assessment information mark 70 is a mark for instructing recognition of assessment information to be assessed as right or wrong. The input-completed mark 71 is a mark for instructing completion of inputting the basis information and the assessment information.

For example, as in this case, to assess whether or not the postal number is correct corresponding to the address written on a postcard H, after selecting the basis information mark 69, the user moves his or her finger 63 to circumscribe "Shizuoka-ken, Hamamatsu-Shi, Ryuuzenjichou XXX Banchi", and then selects the input-completed mark 71.

The image input-and-output apparatus 1 recognizes, as basis information, the address written in that area circumscribed by the finger and extracts the postal number, serving as reference information, which is set in advance in the postal database in the reference-information storage section 36*p* in association with the address serving as the basis information.

Once inputting of basis information is completed, the user selects the assessment information mark 70, then moves his or her finger 63 so as to circumscribe a postal-number field U, and then selects the input-completed mark 71.

At this point, the image input-and-output apparatus 1 recognizes, as assessment information, the postal number written in the postal-number field U circumscribed by the finger and assesses whether or not the recognized postal number serving as the assessment information matches the postal number, serving as the reference information, extracted on the basis of the basis information.

If, as a result, they match, a "○" symbol serving as information indicating a match is projected so as to be superimposed on the postal number field U, as shown in FIG. 44. If they do not match, an "X" symbol is projected so as to be superimposed on the postal number field U, and the postal number "430-0925" serving as reference information is projected below the postal number field U, as shown in FIG. 45. Although an illustration thereof is omitted, if the postal number is not written in the postal number field U or if, despite being written, the characters are illegible, the text "assessment impossible" is projected below the postal number field U.

FIG. 46 is a flow chart of the postal information processing (S615B in FIG. 34). In this processing, a high-resolution setting is first transmitted to the CCD 22 (S3401), and a viewfinder image is displayed on the LCD monitor 10 (S3402).

Next, the release button 8 is scanned (S3403), and it is determined whether or not the release button 8 is half pressed (S3404). If the release button 8 is not half pressed (S3404: No), the processing from S3403 is repeated, and if it is half pressed (S3404: Yes), the autofocus (AF) and autoexposure (AE) functions are initiated to adjust the focus, aperture, and shutter speed (S3405).

Then, the release button is scanned again (S3405*a*), and it is determined whether or not the release button 8 is fully pressed (S3406). If it is not fully pressed (S3406: No), the processing from S3404 described above is repeated.

On the other hand, if it is fully pressed (S3406: Yes), it is determine whether or not the flash mode is activated (S3407). If the flash mode is activated (S3407: Yes), the flash 7 is fired (S3408) and an image is taken (S3409). If the flash mode is not activated (S3407: No), an image is taken without firing the flash 7 (S3409).

Next, three-dimensional shape-detection processing which is identical to the three-dimensional shape-detection processing described above (S1006 in FIG. 10) is performed to detect the three-dimensional shape of the postcard H, serving as the object (S3410).

Next, original-posture calculation processing which is identical to the original-posture calculation processing described above (S1907 in FIG. 19) is carried out to calculate, as posture parameters of the postcard H, the position L, angle θ, and curvature $\phi(x)$ of the postcard H with respect to the image input-and-output apparatus 1 based on the results of the three-dimensional shape detection (S3411).

Next, plane conversion processing which is identical to the plane conversion processing described above (S1908 in FIG. 19) is carried out to generate a flattened planar image (S3412), and the planar image obtained by this plane conversion processing is stored in the external memory 27 (S3413).

Next, a low-resolution setting is transmitted to the CCD 22 (S3414) to change the resolution setting of the CCD 22 from high resolution to low resolution, the classifying marks are projected (S3415), and moving image acquisition is started (S3416).

Next, it is determined whether or not the basis information is input (S3417). More specifically, it is determined whether or not the basis information mark 69 is selected. If the basis information mark 69 has been selected (S3417: Yes), the area in which the basis information is written is circumscribed by the user with his or her finger 63, and the pointing coordinates thereof are detected (S3418).

Then, it is determined whether or not the user selects the input-completed mark 71 (S3419). If the input-completed mark 71 is not selected (S3419: No), the detected pointing coordinates are stored in the pointing-coordinates storage section 37*l*B (S3419), and the processing from S3417 is repeated.

On the other hand, when it is determined that the input-completed mark 71 is selected (S3419: Yes), the designated area designated by the user is recognized based on the fingertip coordinates stored in the fingertip-coordinates storage section 37*l*B (S3421).

Then, the recognized designated area is identified in the planar image stored in the external memory 27 in S3413 (S3422), the basis information written in the identified designated area is recognized (S3423), and it is determined whether or not right-or-wrong assessment is possible for the recognized basis information (S3423*a*).

If, as a result, it is determined that assessment is possible (S3423*a*: Yes), reference information corresponding to the recognized basis information is extracted from the postal database in the reference-information storage section 36*p* (S3424).

Next, it is determined whether or not assessment information is input (S3425). Specifically, it is determined whether or not the assessment information mark 70 is selected. When the assessment information mark 70 is selected (S3425: Yes), the area in which the assessment information is written is circumscribed by the user with his or her finger 63, and the pointing coordinates thereof are detected (S3426). Then, it is determined whether or not the user selects the input-completed mark 71 (S3427). If, as a result, the input-completed mark 71 is not selected (S3427: No), the detected pointing coordinates are stored in the pointing-coordinates storage section 37*l*B (S3428), and the processing from S3426 is repeated.

On the other hand, if it is determined that the input-completed mark 71 is selected (S3427: Yes), after the projection-image storage section 37*k* is cleared (S3428*a*), the designated designated area is recognized based on the fingertip coordinates stored in the fingertip-coordinates storage section 37*l*B (S3429).

Next, the recognized designated area is identified in the planar image stored in the external memory 27 in S3414 (S3430), and the assessment information written in the identified designated area is recognized (S3431).

Then, it is determined whether or not right-or-wrong assessment is possible for the recognized assessment information (S3432). If it is determined that right-or-wrong assessment is possible (S3432: Yes), it is determined whether or not the recognized assessment information matches the extracted reference information, in other words, whether or not the assessment information is correct (S3433). If, as a result, it is correct (S3433: Yes), a projection image for projecting a "○" symbol is generated, and that projection image is written into the projection-image storage section 37*k* (S3434).

On the other hand, if it is determined that right-or-wrong assessment for the recognized basis information is impossible in the processing in S3423*a* (S3423*a*: No), or if it is determined that right-or-wrong assessment for the recognized assessment information is impossible in the processing in S3432 (S3432: No), a projection image with the message "assessment impossible" is generated, and that projection image is written into the projection-image storage section 37*k* (S3431*a*).

In S3433, if the recognized assessment information does not match the extracted reference information, in other words, if it is not correct (S3433: No), a projection image for projecting an "X" symbol and the "reference information" is generated, and that projection image is written into the projection-image storage section 37*k* (S3435).

The projection image generated and stored in the projection-image storage section in S3434, S3431*a*, or S3435 is projected temporarily (S3436).

Finally, it is determined whether the mode changeover switch 9 is unchanged (S3437). If, as a result, it is unchanged (S3437: Yes), the processing from S3401 is repeated again; if it has changed (S3437: No), the processing ends.

Thus, according to this postal information mode, it is possible to easily determine whether or not the postal number corresponding to the address written on the postcard H is correct. It is also possible to easily obtain the correct postal number corresponding to the address by leaving the postal number field blank.

The inputting of an address as basis information was described above. However, if a postal number is input as basis information and an address is input as assessment information, it is possible to easily determine whether or not the address input as the assessment information correctly corresponds to the address identified on the basis of the postal number serving as the basis information.

In the above-described embodiment, the process of S2603 in FIG. 38, the process of S3009 in FIG. 42, and the process of S3431 in FIG. 46 can be associated with written-information recognizing means. The process of S2606 in FIG. 38, the process of S3012 in FIG. 42, and the process of S3433 in FIG. 46 can be associated with first determining means. The process of S2604 in FIG. 38, the process of S3010 in FIG. 42, and the processes of S3423*a* and S3432 in FIG. 46 can be associated with second determining means.

The process of S2612 in FIG. 38 and the process of S3020 in FIG. 42 can be associated with calculating means. The processes of S3007 and S3008 in FIG. 42 and the processes of S3430 and S3431 in FIG. 46 can be associated with detecting means. The process of S2611 in FIG. 38 can be associated with third determining means. The processes of S2608, S2609, and S2613 in FIG. 38, the processes of S3013, S3014, and S3021 in FIG. 42, and the processes of S3434, S3435, and S3431*a* in FIG. 46 can be associated with projection-position control means.

The processes of S2510 and S2511 in FIG. 37, and the processes of S3410 and S3411 in FIG. 46 can be associated with three-dimensional information detecting means. The processes of S2608, S2609, and S2613 in FIG. 38, the processes of S3013, S3014, and S3021 in FIG. 42, and the processes of S3434, S3435, and S3431*a* in FIG. 46 can be associated with projection-form control means. The process of S2512 in FIG. 37 and the process of S3412 in FIG. 46 can be associated with planar imaging data generating means.

Although the embodiment has been described, the present invention is not limited to the present embodiment. It can readily be inferred that various improvements and modifications are possible so long as they do not depart from the scope of the invention.

For example, in the grading mode described above, if the recognized answer and the extracted model answer do not match or if right-or-wrong assessment is not possible, the "model answer" is projected. However, the system may still be configured so as to project the "model answer" even if right-or-wrong assessment is possible and the recognized answer and the extracted model answer match.

In that event, by projecting the "model answer" even if a "○" symbol indicating that the answer is correct is projected, despite being wrong, due to erroneous recognition by the written-information recognizing program 36*k*, it is possible for the user to confirm that the assessment is wrong.

In the above-mentioned grading mode, the "score" is calculated based on the number of "○" symbols as an evaluation parameter related to the "○" symbols, which indicate a match. However, the evaluation parameter related to the "○" symbols is not limited to a score. For example, three evaluation levels "A", "B", and "C" corresponding to the different numbers of "○" symbols may be defined to project one of those evaluations "A", "B", and "C" according to the counted number of "○" symbols.

In the above-mentioned postal information mode, the address written on the postcard H is input as the basis information, the postal number is input as the assessment information, and it is assessed based on the address whether or not the postal number is correct.

However, by storing, in the reference-information storage section 36*o*, an address database in which names, addresses, postal numbers, telephone numbers, fax numbers, and email addresses are associated with each other; inputting any of a name, address, postal number, telephone number, fax number, and email address written on the object as basis information; and inputting other information as assessment information, it is possible to determine based on this basis information whether or not the assessment information is correct.

In the first case described above, all answer fields are graded together, and in the second case, an answer which the user specifies is graded. However, the grading method is not limited to such an event; the system may be configured so as to automatically grade in sequence from question 1. For example, the system may be configured such that question 1 is graded first, followed by a determination as to whether or not the user selects the next mark 65 in FIG. 40; if it is not selected, grading is stopped, whereas if it is selected, question 2 is automatically graded next.

In one embodiment of the present invention, the imaging means may be configured so as to acquire an image of the object, on which written information, including text and graphics, is written, to obtain first imaging data. In addition, the recognizing means may include written-information recognizing means for recognizing the written information from the first imaging data obtained by the imaging means. In such case, the image input-and-output apparatus may further include first storage means for storing reference information which is set in advance and first determining means for determining whether the reference information stored in the first storage means and the written information recognized by the written-information recognizing means match. Further, the projecting means may be configured so as to project assessment result information indicating the results of the determination carried out by the first determining means.

According to this configuration, the assessment result information indicating the assessment result, that is, whether the written information and the reference information match, is projected by the projecting means. Therefore, by confirming the assessment result information which is projected by the projecting means, it is possible to confirm the assessment result, that is, whether the written information and the reference information match.

For example, if an answer which the respondent writes on the answer sheet, serving as the object, is defined as written information, the model answer corresponding to that answer is defined as reference information, and a "○" symbol indicating that the answer and the model answer match is defined as assessment result information, the user of this apparatus can recognize that the answer is correct by confirming that the "○" symbol is projected from the projecting means.

Thus, the assessment result information is projected as a projection image by the projecting means, instead of being printed on a separate sheet of paper from the object, as in the conventional approach. Therefore, an advantage is given in that it is possible to easily confirm the assessment result information without needlessly consuming paper.

In one embodiment of the present invention, the first determining means may determine whether or not the reference information stored in the first storage means and the written information recognized by the written-information recognizing means match. When a match is determined by the first determining means, the projecting means may project, as the assessment result information, match information indicating that the written information and the reference information match; when no match is determined by the first determining means, it may project, as the assessment result information, no-match information indicating that the written information and the reference information do not match.

According to this configuration, when the written information and the reference information match, the projecting means projects the match information indicating a match, and when they do not match, it projects the no-match information indicating that there is no match. Therefore, compared with a situation in which the match information is projected only in the event of a match or the no-match information is projected only in the event of no match, it is possible to more clearly confirm whether or not the written information and the reference information match.

For example, by projecting a "○" symbol as the match information and a "X" symbol as the no-match information, it is possible to clearly confirm whether or not the written information and the reference information match.

In one embodiment of the present invention, if it is determined by the first determining means that the reference information stored in the first storage means and the written information recognized by the written-information recognizing means do not match, the projecting means may be configured so as to project the reference information corresponding to that written information as part of the no-match information.

According to this configuration, when it is determined that the reference information and the written information do not match, the projecting means projects the reference information corresponding to the written information as part of the no-match information. Therefore, it is possible to confirm the reference information corresponding to the written information.

For example, if an answer, serving as written information, which the respondent writes on the answer sheet, serving as the object, is "A", and the model answer serving as reference information is "B", as well as an "X" symbol indicating that the two do not match, by projecting a "B" character, which is the model answer, it is possible to confirm the model answer, as well as the fact that the answer is incorrect.

In one embodiment of the present invention, the image input-and-output apparatus may include a second determining means for determining whether or not it is possible to determine, using the first determining means, whether or not the reference information stored in the first storage means and the written information recognized by the written-information recognizing means match. In such a case, the projecting means may be configured so as to project determination-impossible information indicating that determination is impossible when it is determined by the second determining means that determination is impossible.

According to this configuration, when it is determined by the second determining means that it is not possible to determine whether or not the written information and the reference information match, the projecting means projects determination-impossible information indicating that determination is impossible. Therefore, it is possible to confirm that it is not possible to determine whether or not the written information and the reference information match.

For example, when no answer is in the answer field on the answer sheet serving as the object or when the answer is illegible, despite being written, it is not possible to recognize that there is no answer or that the answer is illegible using the written-information recognizing means. In such a case, however, it is determined by the second determining means that determination is impossible, and the projecting means projects the text "determination not possible" or a symbol, shape or the like indicating "determination not possible" as the determination-impossible information. Therefore, it is possible to confirm that determinations impossible due to the fact that there is no answer or that the answer is illegible.

In one embodiment of the present invention, the projecting means may be configured to project, as part of the determination-impossible information, the reference information corresponding to the written information when it is determined by the second determining means that determination is impossible.

According to this configuration, when it is determined by the second determining means that it is impossible to determine whether or not the written information and the reference information match, the projecting means projects the reference information corresponding to that written information as part of the determination-impossible information. Therefore, it is possible to confirm the reference information corresponding to that written information even though it is not possible to determine whether the written information and the reference information match.

For example, if the answer field on the answer sheet serving as the object contains no answer, or if the answer is illegible despite being written, and the model answer serving as the reference information is “A”, it is not possible for the written-information recognizing means to recognize that there is no answer or that the answer is illegible. In such a case, however, it is determined by the second determining means that determination is impossible, and the projecting means projects the character “A”, which is the model answer serving as the reference information. Therefore, even though it is not possible to determine whether or not the answer and the model answer match because there is no answer or the answer is illegible, it is still possible to confirm the model answer.

In one embodiment of the present invention, the image input-and-output apparatus may include a calculating means for calculating an evaluation parameter indicating an evaluation related to the match information projected by the projecting means. In such a case, the projecting means may project an evaluation parameter calculated by the calculating means.

According to this configuration, because the projecting means projects the evaluation parameter, indicating the evaluation related to the match information, calculated by the calculating means, an advantage is given in that it is possible to confirm the evaluation parameter without calculating it.

For example, by calculating a score from the ratio of the number of match information items to the number determined by the first determining means using the calculating means and projecting, with the projecting means, that score as an evaluation parameter indicating evaluation related to the match information, it is possible to confirm the score without calculating it oneself.

In one embodiment of the present invention, the image input-and-output apparatus may include counting means for counting the number of match information items projected by the projecting means. The calculating means may be configured so as to calculate an evaluation parameter, which is related to the match information, based on the number of match information items counted by counting means.

According to this configuration, because the calculating means calculates the evaluation parameter based on the number of match information items counted by the counting means, an advantage is given in that it is possible to calculate the evaluation parameter related to the number of match information items.

In one embodiment of the present invention, the imaging means may be configured to acquire an image of the object when corresponding information is written which corresponds to the match information written on the object by the user based on the assessment result information projected by the projecting means, and to obtain it as second imaging data. In such a case, the written-information recognizing means may recognize the corresponding information from that second imaging data. Also, the counting means may be configured so as to count the number of corresponding information items recognized by the written-information recognizing means as the number of match information items projected by the projecting means.

According to this configuration, the counting means counts, as the number of match information items, the number of corresponding information items corresponding to the match information written by the user on the object, based on the assessment result information. Therefore, it is possible to reflect the user’s determination of whether the written information and the match information match, based on the assessment result information projected by the projecting means, and it is possible to count more accurately compared with the case where the number of match information items projected by the projecting means is counted directly.

For example, if the written information is recognized as wrongly written information by the written-information recognizing means because the written information written on the object is illegible, even if the written information and the reference information actually match, it is recognized that they do not match and are thus not counted in the number of match information items. The user can count more accurately by confirming the assessment result information, correcting projected result information which is wrong, writing the corresponding information corresponding to the match information on the object, and counting the number of corresponding information items which the user writes.

In one embodiment of the present invention, the image input-and-output apparatus may include detecting means for detecting a designated area designated by the user from the first imaging data obtained by the imaging means. In such a case, the written-information recognizing means may recognize written information identified based on the designated area detected by the detecting means.

According to this configuration, because the written information recognized by the written-information recognizing means is identified based on the designated area designated by the user, it is possible for the user to specify the written information recognized in the written-information recognizing means. Therefore, an advantage is given in that it is possible to recognize in the written-information recognizing means only the written information requested by the user from among the written information written on the object, and it is thus possible to confirm the assessment result information related to the recognized written information.

In one embodiment of the present invention, the image input-and-output apparatus may include second storage means for storing information projected from the projecting means according to the assessment result of the first determining means or the second determining means, and third determining means for determining whether or not a predetermined number of determinations by the first determining means have been completed. In such a case, the projecting means may be configured to project information stored in the second storage means all together after it is determined by the third determining means that the determinations by the first determining means have been completed.

According to this configuration, because the projecting means projects the information stored in the second storage means all together after it is determined by the third determining means that the determinations by the first determining means have been completed, it is possible to confirm all assessment results at the completion point of the predetermined number of determinations by the first determining means. Therefore, an advantage is given in that it is possible to quickly and efficiently confirm the assessment results compared with a case where the assessment result is projected each time the determination is completed.

In one embodiment of the present invention, the second storage means may store an evaluation parameter calculated by the calculating means. In such a case, the projecting means may be configured so as project the information stored in the second storage means all together when it is determined by the third determining means that the determinations by the first determining means have been completed and after the evaluation parameter calculated by the calculating means has been stored in the second storage means.

According to this configuration, the projecting means projects the information stored in the second storage means all together when it is determined by the third determining means that the determinations by the first determining means have been completed and after the evaluation parameter calculated by the calculating means has been stored in the second storage means. Therefore, an advantage is given in that, in addition to all of the assessment results, it is possible to confirm the evaluation parameter at a time.

In one embodiment of the present invention, the projecting means may be configured so as to project the information projected from the projecting means one by one according to the assessment results, each time it is determined that one determination has been completed by the first determining means or each time it is determined by the second determining means that determination is impossible.

According to this configuration, the projecting means projects the information projected from the projecting means one by one according to the assessment results, each time it is determined that one determination by the first determining means has been completed or each time it is determined by the second determining means that determination is impossible. Therefore, this configuration is beneficial in cases where, for example, the assessment results are confirmed in a one-question-to-one-answer manner.

In one embodiment of the present invention, the image input-and-output apparatus may include projection-position control means for controlling the projecting means so that the assessment result information projected by the projecting means is projected on the object, close to the written information corresponding to that assessment result.

According to this configuration, because the assessment result projected by the projecting means is controlled so as to be projected onto the object, close to the written information corresponding to that assessment result, an advantage is given in that it is possible to easily associate, in a visual manner, the written information with the assessment result information corresponding to that written information.

In one embodiment of the present invention, the projecting means may project a pattern of light on the object to be photographed, and an image of the object may be acquired by the imaging means while the pattern of light is being projected from the projecting means onto the object to obtain third imaging data. In such a case, the image input-and-output apparatus may include three-dimensional information detecting means for detecting three-dimensional information related to the three-dimensional shape of the object based on the third imaging data obtained by the imaging means.

According to this configuration, because the three-dimensional information detecting means for detecting three-dimensional information related to the three-dimensional shape of the object based on the third imaging data obtained by the imaging means is provided, an advantage is given in that it is possible to detect the three-dimensional information related to the three-dimensional shape of the object.

In one embodiment of the present invention, the image input-and-output apparatus may include a projection-form control means for controlling the form of the assessment result information projected onto the object by the projecting means, based on the three-dimensional information detected by three-dimensional information detecting means.

According to this configuration, because the form of the assessment result information projected onto the object by the projecting means is controlled so as to have a form according to the shape of the object, an advantage is given in that it is possible to read the assessment result information projected onto the object accurately in terms of position and shape and with a sense of naturalness.

In one embodiment of the present invention, the image input-and-output apparatus may include a planar-imaging-data generating means for generating planar imaging data, in which the surface of the object is developed onto a plane, from the first imaging data obtained by the imaging means, based on the three-dimensional information detected by the three-dimensional information detecting means. In such a case, the written-information recognizing means may recognize the written information from the planar imaging data generated by the planar-imaging-data generating means.

According to this configuration, because the written-information recognizing means recognizes the written information from the planar imaging data generated by the planar-imaging-data generating means, an advantage is given in that it is possible to improve the written-information recognition accuracy of the written-information recognizing means.

For example, when written information written on a curved object to be photographed is recognized from imaging data obtained from the object, the recognized written information is also curved. However, when written information written on a curved object to be photographed is recognized from planar imaging data formed by developing the curved surface of the object onto a plane, the recognized written information is planar. Therefore, it is possible to improve the written-information recognition accuracy of the written-information recognizing means.

In one embodiment of the present invention, the projecting means may include a plurality of semiconductor light-emitting elements for emitting light, a spatial modulator device for outputting image-signal light formed by subjecting the light output from the plurality of semiconductor light-emitting elements to spatial modulation, and a projection optical system for projecting the image-signal light output from the spatial modulator device towards a projection plane. The plurality of semiconductor light-emitting elements may be disposed in a staggered arrangement on a substrate supporting the plurality of semiconductor light-emitting elements.

According to this configuration, because the plurality of semiconductor light-emitting elements are disposed in a staggered arrangement on the substrate supporting the plurality of light-emitting elements, it is possible to compensate for luminance variations between neighboring semiconductor light-emitting elements by the row of semiconductor light-emitting elements in front or behind. Therefore, it is possible to minimize luminance variations at the spatial modulator device. Thus, an advantage is given in that it is possible to irradiate the spatial modulator device with substantially uniform light, which allows a high-quality projection image to be projected.

In one embodiment of the present invention, the plurality of semiconductor light-emitting elements may be disposed such that the distance between one of the semiconductor light-emitting elements and any semiconductor light-emitting element around the one of the semiconductor light-emitting elements is defined so as to be equal to or less than the full-width at half-maximum of the illuminance distribution formed at the spatial modulator device by the light emitted from one of the semiconductor light-emitting elements.

According to this configuration, because the distance between one of the semiconductor light-emitting elements and any semiconductor light-emitting element in a vicinity of the one of the semiconductor light-emitting elements is defined so as to be equal to or less than the full-width at half-maximum of the illuminance distribution formed at the spatial modulator device by the light emitted from one of the semiconductor light-emitting elements, an advantage is given in that it is possible to reduce the drop in illuminance between the one of the semiconductor light-emitting elements and any semiconductor light-emitting element around that one.

In one embodiment of the present invention, the plurality of semiconductor light-emitting elements may be configured to all emit light of the same color.

According to this configuration, because the plurality of semiconductor light-emitting elements are all configured to emit light of the same color, correction of chromatic aberrations produced when emission light of a plurality of colors is emitted in the projecting means need not be considered, and it is not necessary to employ a complicated achromatic lens for correcting chromatic aberrations. Therefore, an advantage is given in that it is possible to provide a projecting means with a simple surface structure configuration and formed of low-cost materials.

In one embodiment of the present invention, the plurality of semiconductor light-emitting elements may be light-emitting diodes, and the emission colors emitted therefrom may all be amber.

According to this configuration, because the emission colors emitted from the plurality of light-emitting diodes are all amber, it is possible to increase the efficiency of converting electricity to light (electro-optic conversion efficiency), compared with cases where other colors are emitted. Therefore, an advantage is given in that it is possible to drive them with low electrical power consumption, thus saving electricity and extending their life.

Third Embodiment

An image input-and-output apparatus according to a third embodiment will be described below. The image input-and-output apparatus of the third embodiment differs from the image input-and-output apparatus 1 of the first embodiment in that a function is changed in or a new function is added to the processor 15. The image input-and-output apparatus of the third embodiment has the same hardware configuration as the image input-and-output apparatus 1 of the first embodiment. Therefore, characteristic parts of functions of the image input-and-output apparatus of the third embodiment will be described. In the description of the image input-and-output apparatus of the third embodiment, figures used for describing the first embodiment will be referenced when needed. In the description, components of the third embodiment equivalent to those in the first embodiment will be denoted by the same reference symbols. In the description below, the image input-and-output apparatus of the third embodiment will be denoted as an image input-and-output apparatus 1C (see FIG. 47).

(Entire Structure)

The image input-and-output apparatus 1C has a variety of modes such as a digital camera mode for implementing a digital camera function, a webcam mode for implementing a web camera function, a 3D image mode for obtaining a 3D image by detecting a three-dimensional shape, a planar image mode for obtaining a planar image of a curved original, a dictionary information mode for obtaining translation information, correction information, or kana-reading information of text information written in the original P, and a postal information mode for obtaining the address from a postal number or to obtain the postal number from an address.

In the present embodiment, a mode changeover switch 9 is a switch for setting the digital camera mode, webcam mode, 3D image mode, planar image mode, dictionary information mode, postal information mode, off mode, or any other mode.

FIG. 47 is an electrical block diagram of the image input-and-output apparatus 1C. The image input-and-output apparatus 1C has a processor 15C corresponding to the processor 15 of the first embodiment. As clearly understood from FIG. 47, the processor 15C has the same basic functions as the processor 15 of the first embodiment. Distinctive functions of the processor 15C will be described below.

A ROM 36 includes a camera control program 36*a*, a pattern light imaging program 36*b*, a luminance image generation program 36*c*, a code image generation program 36*d*, a code boundary extraction program 36*e*, a lens aberration correction program 36*f*, a triangulation calculation program 36*g*, an original-posture calculation program 36*h*, a plane conversion program 36*i*, a detection-area recognizing program 36*j*, a text-information recognizing program 36*k*C, a reference-information extracting program 36*l*C, a projection-image generating program 36*m*C, and a reference-information storage section 36*n*C.

In order to designate text information for which the user wishes to obtain dictionary information (meaning information, translation information, and pronunciation information), postal-number information, or address information as related information in the dictionary information mode or the postal information mode, the detection-area recognizing program 36*j*C is used for detecting an area where the text information is circumscribed.

The text-information recognizing program 36*k*C is a program used in the dictionary information mode or the postal information mode for recognizing the text information in the detection area detected by the detection-area recognizing program 36*j*C.

The related-information extraction program 36*l*C is a program used in the dictionary information mode or the postal information mode for extracting from the related information stored in the related-information storage section 36*n*C dictionary information etc. serving as related information concerning the text information recognized by the text-information recognizing program 36*k*C.

The projection-image generating program 36*m*C is a program for generating a projection image for projecting, at a predetermined position on the original P and with a predetermined form, the related information extracted by the related-information extracting program 36*l*C.

In the dictionary information mode or the postal information mode, the related-information storage section 36*n*C stores the dictionary information (meaning information, translation information, and pronunciation information), postal-number information, or address information projected as the related information so as to be associated with the text information.

Although the related information is stored in the related-information storage section 36*n*C in this embodiment, the present invention is not limited to this configuration. For example, the system may be configured such that the related information is stored in a database in an external device separate from the image input-and-output apparatus 1C, and this image input-and-output apparatus 1C obtains the related information from the database of the external device. In such a case, predetermined related information is extracted from the external device via wireless communication means or wired communication means, including the antenna 11 and the RF driver 24. Alternatively, the image input-and-output apparatus 1C may be configured so as to be connectable to the Internet to obtain predetermined related information via the Internet.

A RAM 37 includes an image-with-pattern-light storage section 37*a*, an image-without-pattern-light storage section 37*b*, a luminance image storage section 37*c*, a code image storage section 37*d*, a code boundary coordinate storage section 37*e*, an ID storage section 37*f*, an aberration correction coordinate storage section 37*g*, a three-dimensional coordinate storage section 37*h*, an original-posture calculation result storage section 37*i*, a plane conversion result storage section 37*j*, a projection image storage section 37*k*, a pointing-coordinates storage section 37*l*C, and a working area 37*m*C, assigned as storage areas.

The pointing-coordinates storage section 37*l*C stores the coordinates of the tip of the index finger, which the user uses to designate, in the dictionary information mode or the postal information mode. The detection area which the user designates is determined from the trajectory of the coordinates of the tip of the index finger. The working area 37*m*C stores data used temporarily for calculations in the CPU 15.

(Main Processing)

FIG. 48 is a flow chart of main processing. In the main processing shown in FIG. 48, a series of processes from S601 to S611 is the same as in the first embodiment. In the main processing of the third embodiment, when it is determined in S610 that the planar image mode is not selected (S610: No), it is determined whether the mode changeover switch 9 selects the dictionary information mode (S612C). If the dictionary information mode is selected (S612C: Yes), dictionary information processing, which will be described later, starts (S613C).

If the dictionary information mode is not selected (S612C: No), it is determined whether the mode changeover switch 9 selects the postal information mode (S614C). If the postal information mode is selected (S614C: Yes), postal information processing, which will be described later, starts (S615C).

If the postal information mode is not selected (S614C: No), it is determined whether the mode changeover switch 9 selects the off mode (S616C). If the off mode is not selected (S616C: No), the processing from step S603 is repeated. If it is determined that the off mode is selected (S616C: Yes), the processing ends.

(Dictionary Information Mode)

FIG. 49 is a diagram for explaining a user operation performed when translation information for the text information which the user specifies is projected in the dictionary information mode. The dictionary information mode is a mode in which translation information, correction information, and kana-reading information are projected onto the original P as the related information. In the dictionary information mode, a translation mark 64, a correction mark 65, a kana-reading mark 66, and an area mark 67 are projected at the bottom of the original P from the image input-and-output apparatus 1C.

The translation mark 64 is a mark for instructing projection of translation information related to the text information, as related information; the correction mark 65 is a mark for instructing projection of correction information related to the text information, as related information; the kana-reading mark 66 is a mark for instructing projection of kana-reading information related to the text information, as related information; and the area mark 67 is a mark for instructing designation of the text information.

When it is desired to obtain translation information for specific text information from among the text information written on the original P, first, the user designates the area mark 67 with his or her index finger 63, and then selects specific text information (in this example, "Ich mochte ihn ganz gem") for which he or she desires to obtain translation information.

This selection is carried out, for example, by the user circumscribing on the original P, using his or her index finger 63, the text information for which he or she wishes to obtain translation information, in the order indicated by arrows A, B, C, and D. After selecting the text information, the user designates the area mark 67 again. Designating this area mark 67 completes selection of the text information. Then, the user moves his or her index finger 63 to the translation mark 64.

During this time, the image input-and-output apparatus 1C performs moving-image acquisition and detects the motion of the index finger 63 by using difference information between individual acquired frame images to recognize the mark which the user designates or the detection area (a one-dot chain line in the figure) which the user designates. The text information inside the specified detection area is recognized by the text-information recognizing program 36*k*C. Then, translation information corresponding to the recognized text information is extracted from the database stored in the related-information storage section 36*n*C, and that extracted translation information is projected.

FIG. 50 is a diagram showing translation information being projected from the image input-and-output apparatus 1C. As described above, when the translation information ("私は彼が大好きだった")

corresponding to the selected text information ("Ich mochte ihn ganz gern") is extracted from the related-information storage section 36*n*C, the image input-and-output apparatus 1C highlights the text information ("Ich mochte ihn ganz gern") included in the detection area and projects the translation information thereof in a vicinity of the text information which the user designates (in this example, immediately below that text information), as shown in the figure.

Therefore the translation information

"私は彼が大好きだった"

can be easily associated with the text information "Ich mochte ihn ganz gern" in a visual manner. Because the text information "Ich mochte ihn ganz gern" is highlighted, it is possible to distinguish the designated text information from other text information to clearly recognize it. Because the translation information projected onto the original P is projected according to the shape of the original P, the user can read the translation information on the original P with a sense of naturalness. Also, because the translation information is projected only for the text information which the user designates from among the text information written on the original P, compared with a case where translation information is projected for all text information written on the original P, it is possible to quickly project only the essential translation information.

FIG. 51 is a diagram for explaining a user operation performed when translation information for all of the text information written on the original P is projected all together. In this case, the user selects only the translation mark 64, without selecting the area mark 67 or designating specific text information from among the text information on the original P, contrary to the above description.

The image input-and-output apparatus 1C then recognizes all of the text information written on the original P using the text-information recognizing program 36*k*C, extracts the translation information corresponding to the recognized text information from the database stored in the related-information storage section 36*n*C, and projects that extracted translation information all together.

FIG. 52 is a diagram showing translation information being projected all together from the image input-and-output apparatus 1C. As described above, when the translation information for all of the text information written on the original P is extracted, the image input-and-output apparatus 1C projects that translation information in a vicinity of the corresponding text information (in this example, immediately below the text information), as shown in the figure. Therefore, with the simple operation of designating the translation mark 64, the user can recognize, all together, the translation information for the text information written on the original P.

FIG. 53 is a diagram for explaining a user operation performed when correction information for the text information which the user specifies is projected in the dictionary information mode.

In this case, the user first designates the area mark 67 using his or her index finger 63, and then selects specific text information (in this example, "This is a pencl") for which he or she wishes to obtain correction information. This selection is performed by circumscribing the text information for which correction information is to be obtained, in the same way as described above. After selecting the text information, the user designates the area mark 67 again, and then designates the correction mark 65.

During this time, the image input-and-output apparatus 2 performs moving-image acquisition to detect the motion of the index finger 63, and recognizes the mark which the user designates or the detection area (a one-dot chain line in the figure) which the user designates, in the same way as described above. The text information inside the specified detection area is recognized by the text-information recognizing program 36*k*C. Then, correction information corresponding to the recognized text information is extracted from the database stored in the related-information storage section 36*n*C, and that extracted correction information is projected.

FIG. 54 is a diagram showing correction information being projected from the image input-and-output apparatus 1C. As described above, when correction information ("pencil", "Pennal", and "pence") corresponding to the recognized text information ("This is a pencl") is extracted from the related-information storage section 36*n*C, the image input-and-output apparatus 1C highlights the word "pencl" for which the correction information is detected from among the text information included in the detection area and projects the correction information thereof immediately below the text information, as shown in the figure. Therefore, the user can recognize a wrong word from the text information which he or she designates and can also understand the correct text information from the correction information.

FIG. 55 is a diagram for explaining a user operation performed when kana-reading information for the text information which the user specifies is projected in the dictionary information mode.

In this case, the user first designates the area mark 67 with his or her index finger 63 and then selects specific text information (in this example, kanji-characters 63*z*) for which he or she wishes to obtain kana-reading information. This selection is performed by circumscribing the text information for which kana-reading information is to be obtained, in the same way as described above. After selecting the text information, the user designates the area mark 67 again and then designates the kana-reading mark 66.

During this time, the image input-and-output apparatus 1C performs moving image acquisition to detect the motion of the index finger 63, and recognizes the mark which the user designates or the detection area (a one-dot chain line in the figure) which the user designates, in the same way as described above. The text information in the specified detection area is recognized by the text-information recognizing program 36*k*C. Then, kana-reading information corresponding to the recognized text information is extracted from the database stored in the related-information storage section 36*n*C, and that extracted kana-reading information is projected.

FIG. 56 is a diagram showing kana-reading information being projected from the image input-and-output apparatus 1C. As described above, when the kana-reading information ("がしんしょうたん") corresponding to the recognized text information (kanji-characters 63*z*) is extracted from the related-information storage section 36*n*C, the image input-and-output apparatus 1C highlights the text (i.e., the kanji-characters 63*z*) included in the detection area and projects the kana-reading information thereof immediately above the text information, as shown in the figure. Therefore, the user can recognize the kana-reading information related to the text information which he or she designated.

FIG. 57 is a flow chart of the dictionary-information processing (S613C in FIG. 48). In this processing, first, a high-resolution setting is transmitted to the CCD 22 (S3101), and a viewfinder image is displayed on the LCD monitor 10 (S3102).

Next, the release button 8 is scanned (S3103), and it is determined whether or not the release button 8 is half pressed (S3104). If the release button 8 is not half pressed (S3104: No), the processing from S3103 is repeated; if it is half-pressed (S3104: Yes), the autofocus (AF) and autoexposure (AE) functions are initiated to adjust the focus, aperture, and shutter speed (S3105).

The release button is then scanned again (S3105*a*), and it is determined whether or not the release button 8 is fully pressed (S3106). If it is not fully pressed (S3106: No), the processing from S3103, described above, is repeated.

If it is fully pressed (S3106: Yes), it is determined whether or not the flash mode is active (S3107). If the flash mode is active (S3107: Yes), the flash 7 is fired (S3108) and an image is taken (S3109). If the flash mode is not active (S3107: No), an image is taken without firing the flash 7 (S3109).

Next, three-dimensional-shape detection processing identical to the three-dimensional-shape detection processing described above (S1006 in FIG. 10) is carried out to detect the three-dimensional shape of the object (S3110).

Next, original-posture calculation processing identical to the original-posture calculation processing described above (S11907 in FIG. 19) is performed; based on the results of the three-dimensional shape detection, the position L, the angle $\theta$, and the curvature $\phi(X)$ of the original P with respect to the image input-and-output apparatus 1 are calculated as posture parameters of the original P(S3111).

Then, plane-conversion processing identical to the plane-conversion processing described above (S1908 in FIG. 19) is carried out to generate a flattened planar image (S3312), and the planar image obtained by this plane-conversion processing is stored in the external memory 27 (S3113).

Next, a high-resolution setting is transmitted to the CCD 22 (S3114) to switch the resolution of the CCD 22 from high resolution to low resolution.

Next, dictionary-information classifying marks (the translation mark 64, the correction mark 65, the kana-reading mark 66, and the area mark 67) are projected (S3115), and moving-image acquisition is commenced (S3116). In other words, the motion of the index finger 63 is detected using difference information between individual acquired frame images of the captured moving images.

The system may be configured so as to project onto the original P a predetermined message related to the user operation at the same time as projecting the dictionary-information classifying marks. With this message, it is possible to easily understand the operating method, even for a user who is not familiar with the operating method.

Upon commencing moving-image acquisition (S3116), the pointing-coordinates storage section 37*l*C is initialized (S3117), and it is determined whether or not the area mark 67 is designated (S3118). If, as a result, it is determined that the area mark 67 is designated (S3118: Yes), the designated pointing coordinates are detected, and the detected coordinates are stored in the pointing-coordinates storage section 37*l*C(S3119).

Then, it is determined whether or not the area mark 67 is designated again (S3120). If it is determined that the area mark 67 is designated again (S3120: Yes), the designated area is set as the detection area (S3121), based on the pointing coordinates stored in the pointing-coordinates storage section 37*l*C in S3119. If it is determined that the area mark 67 is not designated in the determination in S3120 (S3120: No), the processing from S3119 is repeated again.

Thus, once the area (detection area) which the user designates on the original P is set, next it is determined whether or not any of the translation mark 64, the correction mark 65, and the kana-reading mark 66, projected in S3115, is designated (S3122). If any of the marks is designated (S3122: Yes), the processing proceeds to the process of S3125, to be described later. If none of the marks is designated (S3122: No), the process of S3122 is repeated.

If it is determined in the process of S3118 that the area mark 67 is not designated (S3118: No), it is determined whether or not any of the translation mark 64, the correction mark 65, and the kana-reading mark 66, projected in S3115, is designated (S3123). If any of the marks are designated (S3123: Yes), the entire original P is set as the detection area (S3124), and the processing proceeds to the process of S3125, to be described later. If none of the marks is designated in the process of S3123 (S3123: No), the processing from S3118 is repeated.

When the detection area and the information (translation information, correction information, or kana-reading information) to be extracted as related information are selected, the text information in the detection area is recognized (S3125) by the text-information recognizing program 36*k*C from the detection area on the planar image formed in S3112.

Because the text information on the planar image is recognized in this way, it is possible to recognize the text information with the original posture of the text information on the planar image even when, for example, the original P is curved and an image of that curved original P is acquired at an angle. Therefore, it is possible to improve the text-information recognition accuracy of the text-information recognizing program 36*k*C.

Next, one of the translation information, the correction information, and the kana-reading information corresponding to the recognized text information is extracted from the related-information storage section 36*n*C (S3126), and no-deformation-projection image conversion processing is carried out on the extracted text information (S3127).

This processing is processing executed by the projection-image generating program 36*m*C to generate a projection image for projecting the extracted translation information and so on at a predetermined position on the original P and with a predetermined form. The generated projection image is stored in the projection-image storage section 37*k*.

Next, by performing projection processing (S3128) identical to the projection processing described above (S806 in FIG. 8), the translation information and so on related to the text information desired by the user is projected as a projection image at a predetermined position on the original and with a predetermined form.

Finally, it is determined whether or not the mode changeover switch 9 is unchanged (S3129). If, as a result, it has not changed (S3129: Yes), the processing from S3102 is repeated again; if it has changed (S3129: No), the processing ends.

FIG. 58 is a flow chart of image conversion processing for no-deformation-image projection. The image conversion processing for no-deformation-image projection generates projection images for projecting translation information and the like to be projected in the process of S3127 in FIG. 57, at predetermined position in the original P with a predetermined form.

In this processing, first, an area for the processing is allocated in the working area 37*n* of the RAM 37, and the variable of counter "q" used in the processing is initialized (q=0) (S3201). More specifically, an area (area not shown) corresponding to the CCD area is secured in the RAM 37, and bit-map information of the text string indicating a translation information or the like is written in the area.

A memory area corresponding to a space of LCD spatial coordinates (lcdcx, lcdcy) is secured and specified in the working area 37*n* of the RAM 37 as a rectangular area for the converted no-deformation projection image (no-deformation image on a curved object), and the number of pixels Qa contained in the rectangular area is obtained (S3202).

Each pixel value of the image information of translation information and the like stored in the projection image storage section 37*k* is placed at each pixel in the rectangular area (this rectangular area is also secured in the working area 37*n* of the RAM 37) in the ideal camera image coordinate system (ccdcx, ccdcy) (S3203).

With the use of expressions (6) to (9), described above, three-dimensional coordinates (X, Y, Z) corresponding to each pixel on the LCD spatial coordinates (lcdcx, lcdcy) constituting the specified rectangular area, on the surface of the object stored in the three-dimensional coordinate storage section 37*h* are obtained, and further expressions (1) to (5) are used to obtain (ccdcx, ccdcy) to calculate and specify the pixel information of each pixel in the no-deformation-projection image.

More specifically, first, it is checked whether counter "q" reaches pixel count Qa (S3204). If counter "q" does not reach pixel count Qa (S3204: No), the LCD spatial coordinates (lcdcx, lcdcy) of the pixel corresponding to counter "q" are converted to coordinates (X, Y, Z) on the object stored in the working area 37*n* by using expressions (6) to (9) (S3205).

The coordinates (X, Y, Z) on the object obtained through the conversion in step S3205 are converted to coordinates (ccdcx, ccdcy) on the ideal camera image by using the expressions obtained to calculate (ccdcx, ccdcy) from expressions (1) to (5) (S3206).

The pixel information placed at the coordinates (ccdcx, ccdcy) obtained through the conversion in step S3206 is obtained, and the pixel information is written at the LCD spatial coordinates (lcdcx, lcdcy) corresponding to the value of counter "q" (S3207).

Counter "q" is incremented by "1" to execute the processing from step S3204 to step S3207 on the next pixel (S3208).

The processing from step S3204 to step S3208 is repeated until counter "q" reaches pixel count Qa (S3204: Yes), and the pixel information associated with the LCD spatial coordinates (lcdcx, lcdcy) of the specified rectangular area is transferred to the projection LCD driver 30 (S3209).

The processing area allocated to the working area 37*n* in step S3201 to execute the processing is de-allocated (S3210), and the processing ends.

When the pixel information on the LCD spatial coordinates (lcdcx, lcdcy) is transferred to the projection LCD driver 30 in step S3209, the projection LCD 19 displays the image to be projected onto the deformed and curved surface without deformation. Accordingly, the image is projected onto the object without deformation.

When the image conversion processing for no-deformation-image projection is executed, an image can be projected without deformation even not only if the image is projected in a slanting direction but also if the object has a three-dimensional shape and consequently has a curved surface. As a result, even when translation information or the like is projected, the user can correctly recognize the information.

In the above-described case, in the case described for images, conversion to a projection image which is not deformed when viewed from the image projection section 14 is made. It is also possible to convert to a projection image which is not deformed when viewed from a desired point. Also in that case, expressions (6) to (9) converted to have parameters for a desired viewpoint needs to be used.

(Postal Information Mode)

FIG. 59 is a diagram for explaining a user operation performed when the postal number for an address which the user specifies is projected as related information in the postal information mode. The postal-number information mode is a mode in which address information and postal-number information are projected onto the original P as related information. In the postal information mode, an address mark 68, a postal-number mark 69, and an area mark 70 are projected at the bottom of the original P from the image input-and-output apparatus 1C.

The address mark 68 is a mark for instructing projection of an address as related information, the postal-number mark 69 is a mark for instructing projection of a postal number as related information, and the area mark 70 is a mark for instructing designation of text information.

When the user wishes to obtain postal-number information for an address written on a postcard serving as the original P, the user first designates the area mark 70 with his or her index finger 63 and then selects the address (in this example, "Shizuoka-ken, Hamamatsu-shi, Ryuuzenjichou XXX Banchi"). This selection is performed by circumscribing the address for which the postal number is to be obtained, in the same way as described above. After designating the address, the user designates the area mark 67 again and then designates the postal-number mark 69.

During this time, the image input-and-output apparatus 1C performs moving-image acquisition to detect the motion of the index finger 63, and recognizes the mark which the user designates or the detection area (one-dot chain line in the figure) which the user designates, in the same way as described above. The address in the specified detection area is recognized by the text-information recognizing program 36*k*C. Then, the postal number corresponding to the recognized address is extracted from the database stored in the related-information storage section 36*n*C, and that extracted postal-number is projected.

FIG. 60 is a diagram showing a postal number being projected from the image input-and-output apparatus 1C. As described above, when the postal number ("430-0924") corresponding to the recognized address ("Shizuoka-ken, Hamamatsu-Shi, Ryuuzenjichou XXX Banchi") is extracted from the related-information storage section 36*n*C, the image input-and-output apparatus 1C highlights the address "Shizuoka-ken, Hamamatsu-shi, Ryuuzenjichou XXX Banchi" included in the detection area and projects the postal number thereof immediately above the address, as shown in the figure. Therefore, the user can easily obtain the postal number from the address.

In FIGS. 59 and 60, an address is designated and a postal number is projected as related information. However, it is also possible to designate a postal number and to project an address as related information.

If the address of the recipient and the address of a sender are written on a postcard, when it is desired to project the postal numbers for both addresses, it is possible to recognize the address of the recipient and the address of the sender written on the postcard serving as the original P and to project the postal numbers for both addresses together by designating the postal-number mark 69 without designating the area mark 70.

FIG. 61 is a flow chart of the postal-information processing (S615C in FIG. 48). In this processing, a high-resolution setting is first transmitted to the CCD 22 (S3501), and a viewfinder image is displayed on the LCD monitor 10 (S3502).

Next, the release button 8 is scanned (S3503), and it is determined whether or not the release button 8 is half pressed (S3504). If the release button 8 is not half pressed (S3504: No), the processing from S3503 is repeated; if it is half pressed (S3504: Yes), the autofocus (AF) and autoexposure (AE) functions are initiated to adjust the focus, aperture, and shutter speed (S3505).

Then, the release button is scanned again (S3505*a*), and it is determined whether or not the release button 8 is fully pressed (S3506). If it is not fully pressed (S3506: No), the processing from S3505, described above, is repeated.

If it is fully pressed (S3506: Yes), it is determined whether or not the flash mode is active (S3507). If the flash mode is active (S3507: Yes), the flash 7 is fired (S3508) and an image is taken (S3509). If the flash mode is not active (S3507: No), an image is taken without firing the flash 7 (S3509).

Next, three-dimensional-shape detection processing identical to the three-dimensional-shape detection processing described above (S1006 in FIG. 10) is carried out to detect the three-dimensional shape of the object (S3510).

Next, original-posture calculation processing identical to the original-posture calculation processing described above (S1907 in FIG. 19) is performed; based on the results of the three-dimensional shape detection, the position L, the angle θ, and the curvature $\phi(X)$ of the original P with respect to the image input apparatus 1 are calculated as posture parameters of the original P (S3511).

Next, plane-conversion processing identical to the plane-conversion processing described above (S1908 in FIG. 19) is carried out to generate a flattened planar image (S3512), and the planar image obtained by this plane-conversion processing is stored in the external memory 27 (S3513).

Next, a high-resolution setting is transmitted to the CCD 22 (S3514) to change the resolution setting of the CCD 22 from high resolution to low resolution.

Next, postal-information classifying marks (the address mark 68, the postal-number mark 69, and the area mark 70) are projected (S3515), and moving-image acquisition is commenced (S3516). The motion of the index finger 63 is detected using difference information between individual frame images of the captured moving images.

Once the moving-image acquisition starts (S3516), the pointing-coordinates storage section 37*l*C is initialized (S3517), and it is determined whether or not the area mark 70 is designated (S3518). If, as a result, it is determined that the area mark 70 is designated (S3518: Yes), the designated pointing coordinates are detected, and the detected pointing coordinates are stored in the pointing-coordinates storage section 37*l*C (S3519).

Then, it is determined whether or not the area mark 70 is designated again (S3520). If it is determined that the area mark 70 is designated again (S3520: Yes), the designated area is set as the detection area (S3521) based on the pointing coordinates stored in the pointing-coordinates storage section 37*l*C in S3519. If it is determined in the determination in S3520 that the area mark 70 is not designated (S3520: No), the processing from S3519 is repeated again.

When the area (detection area) which the user designates on the original P is set, next it is determined whether or not any of the address mark 68 and the postal-number mark 69, projected in S3515, is designated (S3522). If any of the marks is designated (S3522: Yes), the processing proceeds to the process of S3524, described later; if none of the marks is designated (S3522: No), the process of S3522 is repeated.

If it is determined in the process of S3518 that the area mark 70 is not designated (S3518: No), it is determined whether or not any of the address mark 68 and the postal-number mark 69, projected in S3515, is designated (S3523). If any of the marks is designated (S3523: Yes), the entire original P is set as the detection area (S3523*a*), and the processing proceeds to the process of S3524, described later. In the process of S3523, if none of the marks is designated (S3523: No), the processing from S3518 is repeated.

When the detection area and the information (address information or postal-number information) to be extracted as related information are selected, the text information inside the detection area is recognized (S3524) by the text-information recognizing program 36*k*C from the detection area on the planar image generated in S3512.

Next, either the postal number or the address corresponding to the recognized text information is extracted from the related-information storage section 36*n*C (S3525), and no-deformation-projection image conversion processing is carried out on that extracted text information (S3526).

Next, projection processing identical to the projection processing described above (S806 in FIG. 8) is performed (S3527) to project, as a projection image, the postal number and so on related to the text information desired by the user at a predetermined position of the postcard serving as the original P and with a predetermined form.

Finally, it is determined whether or not the mode changeover switch 9 is unchanged (S3528). If, as a result, it is unchanged (S3528: Yes), the processing from S3502 is repeated again; if it has changed (S3528: No), the processing ends.

In the embodiment described above, the process of S3109 in FIG. 57 and the process of S3509 in FIG. 61 can be associated with imaging means. The process of S3125 in FIG. 57 and the process of S3524 in FIG. 61 can be associated with written-information recognizing means. The process of S3128 in FIG. 57 and the process of S3527 in FIG. 61 can be associated with projecting means.

The process of S3126 in FIG. 57 and the process of S3525 in FIG. 61 can be associated with related-information extracting means. The process of S3127 in FIG. 57 and the process of S3526 in FIG. 61 can be associated with projection-position setting means. The process of S3124 in FIG. 57 and the process of S3523*a* in FIG. 61 can be associated with first specifying means.

The process of S3121 in FIG. 57 and the process of S3521 in FIG. 61 can be associated with second specifying means. The process of S3119 in FIG. 57 and the process of S3519 in FIG. 61 can be associated with designated-area detecting means. The process of S3110 in FIG. 57 and the process of S3510 in FIG. 61 can be associated with three-dimensional-information detecting means (three-dimensional-shape detecting means) for obtaining three-dimensional information related to the three-dimensional shape of the object. The process of S3127 in FIG. 57 and the process of S3526 in FIG. 61 can be associated with transformation-related-information setting means. The process of S3112 in FIG. 57 and the process of S3512 in FIG. 61 can be associated with planar-imaging-data generating means.

As described above, according to the image input-and-output apparatus of the third embodiment, the written information displayed on the object, included in imaging data related to the object, is recognized by the written-information recognizing means and related information which is related to the written information is projected by the projecting means. Therefore, the correspondence between the written information and the related information is displayed so as to be easily understood by the user from the projected projection image. For example, if the written information is German and it is desired to obtain its Japanese translation, by projecting translation information as the related information which is related to the written information, an advantage is given in that it is possible to present it in an easy-to-understand manner by directly projecting the Japanese translation for that German in a vicinity of the German text on the original.

Although the present invention is described based on the embodiment, the present invention is not limited to the cases described above. It can readily be conceived that various improvements and modifications are possible so long as they do not depart from the scope of the invention.

For example, in one case described above, translation information, correction information, or kana-reading information is projected for the text information written on the original P. However, the system is not limited to projecting these types of information; it may be configured such that meaning information, radical information, stroke-count information, and so on are projected.

The system may be configured such that, when the information written on the original P is, for example, graphics information and a certain animal graphic is displayed, related information which is related to that animal, including information about the main habitat, diet, size and so on, is projected. In such a case, it is possible to easily obtain related information without consulting a dictionary or the like, in the same way as in the present case.

In the postal information mode described above, an address or postal number written on a postcard serving as the original P is recognized, and a postal number for the address or an address for the postal number is projected as related information. However, it is also possible, for example, to store in the related-information storage section 36*n*C an address database in which names, addresses, postal numbers, telephone numbers, fax numbers, and email addresses are associated with each other; to recognize any of a name, address, postal number, telephone number, fax number, and email address written on the original P; and to project other information related to that recognized information as the related information.

In the postal information mode described above, a postal number is projected immediately above the address as related information. However, the position at which the postal number is projected is not limited to such a position; it may be projected in a postal-number field on the postcard. In such a case, by tracing over the projected postal number, it is possible to write the postal number without making a mistake. It is also possible to achieve the same thing when an address is projected as related information, and it is thus possible to neatly and accurately write the address by following the form of the projected letters.

In the present case, the text information for which the user requires translation information, correction information, and so on is designated by the user circumscribing that text information with his or her finger. However, the method of designating the text information is not limited to this method. For example, the system may be configured such that the finger moves in a straight line along the bottom of the required text information, and the text information above that straight line portion is recognized as being the text information which the user designates.

The position at which the related information is projected may also be immediately below or immediately above the text information, beside it, and so forth. The system may be configured to include means for detecting a blank space on the original P, using luminance data of the acquired image formed by acquiring an image of the original P, and to project the related information in that blank space. In such a case, it is possible to clearly show the projected related information to the user.

It is also possible to incorporate a microphone in the image input-and-output apparatus 1C and to determine the end of text information selection based on the user's voice, for example, whether or not the user speaks "terminate text information selection".

The related information is not limited to information stored in the translation-information storage section 36*n*C in the ROM 36. The system may be configured to connect to an external PC or the Internet via the RF driver and antenna 11, and to use related information located outside the image input-and-output apparatus 1.

In one embodiment of the present invention, the image input-and-output apparatus may further include related-information storage means in which related information corresponding to the written information is stored in advance, and related-information extracting means for extracting the related information from the related-information storage means according to the written information recognized by the recognizing means.

According to this configuration, the related information which is related to the written information recognized by the recognizing means is extracted from the related-information storage means in which it is stored in advance in association with the written information. Therefore, an advantage is given in that it is possible to quickly extract related information and to obtain the related information in a trouble-free manner.

In one embodiment of the present invention, the image input-and-output apparatus may include projection-position setting means for setting the projection position of the related information projected by the projecting means so as to be close to the written information corresponding to that related information.

According to this configuration, because the related information projected by the projecting means is projected close to the written information, an advantage is given in that it is possible to easily and visually associate the written information with the related information.

In one embodiment of the present invention, the projection-position setting means may set the projection position of each item of related information corresponding to different items of written information so as to be close to each item of written information corresponding to each item of related information.

According to this configuration, because the projection-position setting means sets the projection position of each item of related information corresponding to different items of written information so as to be close to each item of written information corresponding to each item of related information, it is possible to easily understand the related information corresponding to the different items of written information.

In one embodiment of the present invention, the image input-and-output apparatus may further include first specifying means for setting the written information to be recognized in the recognizing means, to all of the written information included in the imaging data. In such a case, the projecting means may be configured to project related information corresponding to the written information specified by the first specifying means.

According to this configuration, all of the written information included in the imaging data is specified by the first specifying means and the imaging means projects related information which is related to the written information specified by the first specifying means. Therefore, when it is desired to obtain related information for all of the written information included in the imaging data, it is possible to easily obtain the related information for all of the written information included in the imaging data without needing to specify that written information one-by-one.

In one embodiment of the present invention, the image input-and-output apparatus may include second specifying means for setting the written information to be recognized in the recognizing means, to a part of the written information included in the imaging data. In such a case, the projecting means may project related information which is related to the written information specified by the second specifying means.

According to this configuration, a part of the written information included in the imaging data is specified by the second specifying means, and the imaging means projects related information which is related to the written information specified by the second specifying means. Therefore, an advantage is given in that it is possible to recognize, among all of the written information included in the imaging data, related information which is related only to the written information specified by the second specifying means. A further advantage is given in that it is possible to project the related information quickly because the amount of processing therefor is small compared with projecting related information which is related to all of the written information included in the imaging data.

In one embodiment of the present invention, the image input-and-output apparatus may further include designated-area detecting means for detecting a designated area which is designated on the object. In such a case, the second specifying means may be configured so as to specify the written information to be recognized in the recognizing means based on the designated area detected by the designated-area detecting means.

According to this configuration, because the written information to be recognized by the written-information recognizing means is specified based on the designated area designated on the object, an advantage is given in that it is possible to quickly project only the related information corresponding to the written information required by the user, even when a lot of written information is displayed on the object.

In one embodiment of the present invention, the projecting means may be configured so as to project an image which allows the designated area detected by the designated-area detecting means to be distinguished from the other parts of the object.

According to this configuration, because the projecting means projects an image which allows the designated area detected by the designated-area detecting means to be distinguished from the other parts of the object, it is possible to clearly distinguish between the designated area and the other parts, and the designated area can be clearly recognized.

In one embodiment of the present invention, the projecting means may be configured so as to project an area-designating image which allows the designated area detected by the designated-area detecting means to be distinguished from the other parts of the object, towards that designated area.

According to this configuration, because the projecting means projects, towards the designated area, an area-designating image which allows the designated area detected by the designated-area detecting means to be distinguished from the other parts of the object, an advantage is given in that the designated area can be recognized even more clearly.

In one embodiment of the present invention, the image input-and-output apparatus may further include transformation-related-information setting means for transforming the related information projected by the projecting means according to the shape of the object, based on three-dimensional information detected by the three-dimensional-shape detecting means.

According to this configuration, because the form of the related information projected by the projecting means is transformed by the transformation-related-information setting means according to the shape of the object, it is possible to make the form of the related information follow the shape of the object when the related information is projected onto the object. Therefore, an advantage is given in that it is possible to read the related information on the object with a sense of naturalness.

In one embodiment of the present invention, the image input-and-output apparatus may include planar-imaging-data generating means for generating planar imaging data which is formed by expanding onto a plane the three-dimensional shape formed by the surface of the object in the imaging data related to the object, based on the three-dimensional information detected by the three-dimensional-shape detecting means. In such a case, the recognizing means may recognize the written information from the imaging data generated by the planar-imaging-data generating means.

According to this configuration, the written-information recognizing means recognizes the written information from the planar-imaging data in which the three-dimensional shape formed by the surface of the object in the imaging data related to the object is located on a plane orthogonal to the optical axis of the imaging means. Therefore, an advantage is given in that it is possible to improve the written-information recognition accuracy of the written-information recognizing means.

For example, when an image of a curved object is taken or when an image of an object is taken at an angle, the written information on the object is acquired in a deformed fashion. In the planar imaging data, however, the written information displayed on the object is located on a plane orthogonal to the optical axis of the imaging means. Therefore, the written-information recognizing means can recognize the written information in its original posture. Accordingly, an advantage is given in that it is possible to improve the written-information recognition accuracy of the written-information recognizing means.

In one embodiment of the present invention, the related information may be any of dictionary information that includes meaning information, translation information, pronunciation information, and graphics information; correction information related to typographical errors and clerical errors in the written information; postal-number information; and address information.

According to this configuration, it is possible to easily obtain these types of information without consulting a dictionary, and address book, and so on.

In one embodiment of the present invention, the projecting means may include a plurality of semiconductor light-emitting elements for emitting light, a spatial modulator device for outputting image-signal light formed by subjecting the light emitted from the plurality of semiconductor light-emitting elements to spatial modulation, and a projecting optical system for projecting the image-signal light output from the spatial modulating device towards a projection plane. In such a case, the plurality of semiconductor light-emitting elements may be disposed in a staggered arrangement on a substrate supporting the plurality of semiconductor light-emitting elements.

According to this configuration, because the plurality of semiconductor light-emitting elements are disposed in a staggered arrangement on the substrate supporting the plurality of light-emitting elements, it is possible to compensate for luminance variations between neighboring semiconductor light-emitting elements by the row of semiconductor light-emitting elements in front or behind. Therefore, it is possible to minimize luminance variations at the spatial modulator device. Thus, an advantage is given in that it is possible to irradiate the spatial modulator device with substantially uniform light, which allows a high-quality projection image to be projected.

In one embodiment of the present invention, the distance between one of the semiconductor light-emitting elements and any semiconductor light-emitting element around the one of the semiconductor light-emitting elements may be defined so as to be equal to or less than the full-width at half-maximum of the luminance distribution formed at the spatial modulator device by the light emitted from one of the semiconductor light-emitting elements.

According to this configuration, it is possible to suppress a reduction in luminance between one of the semiconductor light-emitting elements and any semiconductor light-emitting element around it.

In one embodiment of the present invention, the plurality of semiconductor light-emitting elements may all emit light of the same color.

According to this configuration, correction of chromatic aberrations produced when emission light of a plurality of colors is emitted need not be considered in the projecting means, and it is not necessary to employ a complicated achromatic lens for correcting chromatic aberrations. Therefore, an advantage is given in that it is possible to provide a projecting means having a simple surface structure and formed of low-cost materials.

In one embodiment of the present invention, the plurality of semiconductor light-emitting elements may be light-emitting diodes, and the emission colors emitted therefrom may all be amber.

According to this configuration, because the emission colors emitted from the plurality of light-emitting diodes are all amber, it is possible to increase the efficiency of converting electricity to light (electro-optic conversion efficiency), compared with cases where other colors are emitted. Therefore, an advantage is given in that it is possible to drive them with low electrical power consumption, thus saving electricity and extending their life.

Fourth Embodiment

An image input-and-output apparatus according to a fourth embodiment will be described below. The image input-and-output apparatus of the fourth embodiment differs from the image input-and-output apparatus 1C of the first embodiment in that a function is changed in or a new function is added to the processor 15. The image input-and-output apparatus of the fourth embodiment has the same hardware configuration as the image input-and-output apparatus 1C of the first embodiment. Therefore, characteristic parts of functions of the image input-and-output apparatus of the fourth embodiment will be described. In the description of the image input-and-output apparatus of the fourth embodiment, figures used for describing the first embodiment will be referenced when needed. In the description, components of the fourth embodiment equivalent to those in the first embodiment will be denoted by the same reference symbols. In the description below, the image input-and-output apparatus of the fourth embodiment will be denoted as an image input-and-output apparatus 1D (see FIG. 62).

(Entire Structure)

The image input-and-output apparatus 1D has a variety of modes such as a digital camera mode for implementing a digital camera function, a webcam mode for implementing a web camera function, a 3D image mode for obtaining a 3D image by detecting a three-dimensional shape, a planar image mode for obtaining a planar image of a curved original, a volume/weight measurement mode for measuring a volume or weight and for displaying a result thereof by projection, and a designate-point measurement mode for performing measurement in accordance with an input designated point and for displaying a result thereof by projection.

In the present embodiment, a mode changeover switch 9 is a switch for setting the digital camera mode, webcam mode, 3D image mode, planar image mode, volume/weight mode, designated-point measurement mode, off mode, or any other mode.

FIG. 62 is a block diagram of the image input-and-output apparatus 1D. The image input-and-output apparatus 1D has a processor 15D corresponding to the processor 15 of the first embodiment. As clearly understood from FIG. 62, the processor 15D has the same basic functions as the processor 15 of the first embodiment. Distinctive functions of the processor 15D will be described below.

A ROM 36 includes a camera control program 36*a*, a pattern light imaging program 36*b*, a luminance image generation program 36*c*, a code image generation program 36*d*, a code boundary extraction program 36*e*, a lens aberration correction program 36*f*, a triangulation calculation program 36*g*, an original-posture calculation program 36*h*, and a plane conversion program 36*i*.

A RAM 37 includes an image-with-pattern-light storage section 37*a*, an image-without-pattern-light storage section 37*b*, a luminance image storage section 37*c*, a code image storage section 37*d*, a code boundary coordinate storage section 37*e*, an ID storage section 37*f*, an aberration correction coordinate storage section 37*g*, a three-dimensional coordinate storage section 37*h*, an original-posture calculation result storage section 37*i*, a plane conversion result storage section 37*j*, a projection image storage section 37*k*, a work-content-information storage section 37*l*D, a three-dimensional-information storage section 37*m*D, a pointing-coordinates input section 37*n*D, and a working area 37*o*D, assigned as storage areas.

The work-content-information storage section 37*l*D stores work content information indicating a work content in the volume/weight measurement mode. The three-dimensional-information storage section 37*m*D stores three-dimensional information obtained in the volume/weight measurement mode or the designated-point measurement mode. The pointing-coordinates input section 37*n*D stores a designated point designated by pointing by the user, in the designated-point measurement mode. The working area 37*o*D stores data temporarily used for calculations in the CPU 15.

(Main Processing)

FIG. 63 is a flow chart of main processing. In the main processing shown in FIG. 63, a series of processes from S601 to S611 is the same as in the first embodiment. In the main processing of the fourth embodiment, when it is determined in S610 that the planar image mode is not selected (S610: No), it is determined whether the mode changeover switch 9 selects the volume/weight measurement mode (S612D). If the volume/weight measurement mode is selected (S612D: Yes), volume/weight measurement processing, which will be described later, starts (S613D).

If the volume/weight measurement mode is not selected (S612D: No), it is determined whether the mode changeover switch 9 selects the designated-point measurement mode (S614D). If the designated-point measurement mode is selected (S614D: Yes), designated-point measurement processing, which will be described later, starts (S615D).

If the designated-point measurement mode is not selected (S614D: No), it is determined whether the mode changeover switch 9 selects the off mode (S612D). If the off mode is not selected (S612D: No), the processing from step S603 is repeated. If it is determined that the off mode is selected (S612D: Yes), the processing ends.

(First Case in Volume/Weight Measurement Mode)

Next, a first case in a volume/weight measurement mode, which is one of the operation modes in the image input-and-output apparatus ID, will be described with reference to FIGS. 64 to 68. This volume/weight measurement mode is a mode in which the volume or weight of an object to be photographed is measured according to work-content information and the measurement information obtained as a result is projected.

FIG. 64 is a flow chart of the volume/weight measurement processing (S613 of FIG. 63) to be carried out in this volume/weight measurement mode. In this volume/weight measurement processing, measurement according to work content, such as volume measurement and weight measurement, is carried out using a three-dimensional-shape detection result of the object, and an image based on the measurement result is projected.

In this processing, a high-resolution setting signal is first transmitted to a CCD 22 (S2301). With this, a high-quality pickup image can be provided for a user.

Next, work-content information is received via an antenna 11 (S2302) and is then stored in the received work-content-information storage section 37*l*D (S2303). "Work-content information" refers to information indicating a work content specified by the user, such as dividing a meat loaf into pieces of the same volume or the same weight and cutting a particular shape out of a wood piece. When the specified work content is work which requires acquisition of weight information or weight distribution information of the object, the work-content information includes density data of the object.

Next, a viewfinder image (image in the visible range through a viewfinder 6) is displayed on an LCD monitor 10 (S2304). Therefore, the user can confirm a pickup image (imaging area) by checking the image displayed on the LCD monitor 10, instead of looking through the viewfinder 6, before acquiring an actual image.

Next, a release button 8 is scanned (S2305*a*) to determine whether the release button 8 is half-pressed (S2305*b*). When the release button 8 is half-pressed (S2305*b*: Yes), autofocus (AF) and autoexposure (AE) functions are activated to adjust the focus, aperture, and shutter speed (S2305*c*). When the release button 8 is not half-pressed (S2305*b*: No), the processing from S2305*a* is repeated.

Next, the release button 8 is scanned again (S2305*d*) to determine whether the release button 8 is full-pressed (S2305*e*). When the release button 8 is full-pressed (S2305*e*: Yes), it is determined whether a flash mode is active (S2309).

When the flash mode is active as a result of the process of S2309 (S2309: Yes), a flash 7 is fired (S2310) to take an image (S2311). When the release button 8 is not full-pressed in the determination of S2305*e* (S2305*e*: No), the processing from S2305*a* is repeated.

On the other hand, when the flash mode is not on (S2309: No), photography is performed without projecting the flash 7 (S2310). When the release button 8 is not full-pressed in the determination of S2308 (S2305*e*: No), the processes from S2305*a* are repeated.

Next, three-dimensional-shape detection processing identical to the three-dimensional-shape detection processing of S1006 in FIG. 10 is performed to detect the three-dimensional shape of the object (S2312).

Next, as a result of three-dimensional-shape detection in the three-dimensional-shape detection processing (S2312), the three-dimensional coordinates (X, Y, Z) of each measurement vertex in the real space are stored in the three-dimensional-information storage section 37*m*D (S2313).

Next, based on the three-dimensional-shape detection result, measurement according to the work-content information stored in the work-content-information storage section 37*l*D is performed, measurement information as a result of the measurement is generated, and projection information based on the measurement information is generated (S2314). "Projection information based on measurement information" refers to information that is projected upon the object or in the projection direction by no-deformation-image projection processing (S2316), to be described later, according to the measurement information. This "projection information based on measurement information" includes, as examples, text information or graphic information corresponding to the measurement information and work-instruction information, such as a cutting line, a cutting-process line, and cutting-depth information according to the work-content information.

In the process of S2314, when the work-content information indicates work information which does not require measurement information, instruction information according to the work-content information stored in the work-content-information storage section 37*l*D may be generated based on the three-dimensional-shape detection result to generate projection information based on the instruction information.

Next, a measurement result image corresponding to the projection information based on the measurement information is stored in the projection image storage section 37*k* (S2315), and no-deformation-projection image conversion processing (S2316) is carried out to correct the measurement result image stored in the projection image storage section 37*k* so that the measurement result image stored in the projection image storage section 37*k* is projected upon the object or in the projection direction as a no-deformation image, regardless of the deformation of an object surface or the projection direction of the image projection section 13. This no-deformation-projection image conversion processing (S2316) will be described later.

Next, projection processing identical to the projection processing of S806 in FIG. 8 is carried out (S2317). Thus, the measurement result image is projected as a no-deformation image upon a surface of the object or in the projection direction. When a no-deformation measurement result image is projected on a surface of the object or in the projection direction in this projection processing (S2317), the user carries out work according to this measurement result image. For example, when the measurement result image is a cutting line dividing the object into substantially equal volumes, cutting according to the cutting line is carried out.

Next, it is determined whether ending of the work on the object has been instructed (S2318). This ending of work is recognized by detecting an operation of a work-end button (not shown in the figure) provided for the image input-and-output apparatus 1D or a work-end signal received from an external network via the antenna 11.

When ending of the work has not been instructed as a result of determination in the process of S2316 (S2316: No), the process of S2316 is repeated. On the other hand, when ending of the work has been instructed (S2316: Yes), a light source driver 29 is controlled to be turned off (S2317), and an LED array 17A is turned off with an electrical signal from the light source driver 29 (S2318). Therefore, the image projected in the imaging area 100 disappears.

Next, it is determined whether the mode changeover switch 9 is unchanged (S2319). When the mode changeover switch 9 is unchanged (S2319: Yes), the processing from S2302 is repeated. For example, when the work-content information indicates work of cutting one loaf of meat into substantially equal volumes in a meat process line, the processing is repeatedly carried out from S2302 to S2319 for each meat loaf.

On the other hand, when the mode changeover switch 9 is changed as a result of determination in the process of S2319 (S2319: No), the processing is ends.

FIG. 65 is a flow chart of image conversion processing for no-deformation-image projection (S2316 in FIG. 64). The image conversion processing for no-deformation-image projection (S2316) converts the image displayed on the projection LCD 19 in accordance with the image information, such as measurement-result information, stored in the projection image storage section 37*k* to an image that can be projected onto the object or in the projection direction without deformation.

In this processing, first, an area for the processing is allocated in the working area 37*o*D of the RAM 37, and the variable of counter "q" used in the processing is initialized (q=0) (S2401_C).

A space of LCD spatial coordinates (lcdcx, lcdcy) is specified as a rectangular area for the converted no-deformation projection image (no-deformation image on a curved object), and the number of pixels Qa contained in the rectangular area is obtained (S2402_C).

The image information, such as measurement-result information, stored in the projection image storage section 37*k* is placed at coordinates (ccdcx, ccdcy) on the ideal camera image (S2403_C).

The image information of each pixel of the no-deformation projection image is specified at corresponding LCD spatial coordinates (lcdcx, lcdcy) of the specified rectangular area by using three-dimensional coordinates (X, Y, Z) of a point on the surface of the object stored in the three-dimensional-shape-coordinate storage section 37*h* in step S2311, described above.

More specifically, first, it is checked whether counter "q" reaches pixel count Qa (S2404_C). If counter "q" does not reach pixel count Qa (S2404_C: No), the LCD spatial coordinates (lcdcx, lcdcy) of the pixel corresponding to counter "q" are converted to coordinates (X, Y, Z) on the object stored in the external memory 27 (2405_C).

The coordinates (X, Y, Z) on the object obtained through the conversion in step S2405_C are converted to coordinates (ccdcx, ccdcy) on the ideal camera image (S2406_C).

The pixel information placed at the coordinates (ccdcx, ccdcy) obtained through the conversion in step S2406_C is obtained, and the pixel information is written at the LCD spatial coordinates (lcdcx, lcdcy) corresponding to the value of counter "q" (S2407_C).

Counter "q" is incremented by "1" to execute the processing from step S2404_C to step S2407_C, described above, on the next pixel (S2408_C).

The processing from step S2404_C to step S2408_C is repeated until counter "q" reaches pixel count Qa (S2404_C: Yes), and the pixel information associated with the LCD spatial coordinates (lcdcx, lcdcy) of the specified rectangular area is stored in the projection-image storage section 37*k* (S2409_C).

The processing area allocated to the working area 37*o*D to execute the processing is de-allocated in step S2401_C, and the processing ends.

When the pixel information on the LCD spatial coordinates (lcdcx, lcdcy) is stored in the projection-image storage section 37*k* in step S2409_C, the projection LCD 19 displays the image to be projected onto the deformed and curved surface without deformation in the projection processing (S2317) following this no-deformation-projection image conversion processing (S2316). Accordingly, the image is projected onto the object or in the projection direction without deformation.

When the image conversion processing for no-deformation-image projection (S2316) is executed, a measurement-result image can be projected without deformation even not only if the image is projected in a slanting direction but also if the object has a three-dimensional shape and consequently has a curved surface. As a result, in work for cutting an object into substantially equal volumes, for example, cutting instruction lines can be projected at accurate positions on the object.

FIG. 66 is a diagram illustrating the first case in the volume/weight measurement processing mode. In the first case of this volume/weight measurement processing mode, the work of cutting a meat loaf, serving as a workpiece W1, transported by a conveyer 200 into substantially equal volumes is carried out in the meat process line.

In FIG. 66, striped pattern light formed of alternate light and dark patterns for detecting the three-dimensional shape of the meat loaf is projected from the image projection section 13 of the image input-and-output apparatus 1D upon the workpiece W1 disposed in the imaging area 100 in order to cut the meat loaf, serving as the workpiece W1, transported by the conveyer 200 into substantially equal volumes in the meat process line. FIG. 66 corresponds to a part of the processing carried out in the above-described three-dimensional-shape detection processing (S2312).

The imaging area 100 also corresponds to an image-projectable plane, that is, an image projection plane, in the projection direction by the image projection section 14 of the image input-and-output apparatus 1D. Here, a frame indicating the boundary of this imaging area 100 may be projected from a projection LCD 19 as a projection image. By showing the boundary of the imaging area 100, the user can clearly identify an area in which image acquisition is possible.

Furthermore, in the first case of the volume/weight measurement processing mode shown in FIG. 66, one side of a base 4 of the image input-and-output apparatus 1D is short so as not to interfere with transportation by the conveyer 200.

FIG. 67 is a diagram depicting a measurement result image projected as a result of the process of S2317 in the above-described volume/weight measurement processing. When the image input-and-output apparatus ID receives work-content information related to work of dividing the workpiece W1 into four pieces of substantially equal volumes, volume information is acquired as measurement information by the process of S2312 based on the three-dimensional-shape result generated by the process of S2312, and furthermore, information about cutting lines dividing the workpiece W1 into four pieces of substantially equal volumes is generated as projection information based on the volume information. Consequently, the generated cutting-line information is projected upon the workpiece W1 as a measurement result image R1 formed of three lines, as shown in FIG. 67. When the user cuts the workpiece W1 based on this measurement result image R1, the workpiece W1 can be divided into four pieces of substantially equal volumes.

When the workpiece W1 is to be cut based on the measurement result image R1, the image input-and-output apparatus 1D may be provided with cutting means such as a cutter to automatically cut the workpiece W1. In that case, instead of projecting the measurement result image R1, the workpiece W1 may be cut automatically by the cutting means based on the information about the cutting lines generated by the process of S2310. This increases the efficiency in cutting the workpiece.

In this FIG. 67, the work of cutting the workpiece W1 into four pieces of substantially equal volumes has been described. When the image input-and-output apparatus 1D receives work-content information related to work of cutting the workpiece W1 into a plurality of pieces of substantially equal weights, a measurement result image R1 for dividing the workpiece W1 into pieces of substantially equal weights is projected upon the workpiece W1. For the work of dividing the workpiece W1 into a plurality of pieces of substantially equal weights, the work-content information includes density information or density distribution information of the workpiece W1. In this case, in the process of S2314, when volume information is acquired based on the three-dimensional-shape result generated by the process of S2312, the density information or density distribution information is integrated with the volume, so that weight information or weight distribution information is acquired as measurement information. Thereafter, information about a cutting line dividing the workpiece W1 into the plurality of pieces of substantially equal weights is generated as projection information based on the weight information or weight distribution information.

In addition, when the image input-and-output apparatus 1D receives, as work-content information, that a part of a certain weight or a certain volume of the workpiece W1 is obtained, measurement information according to the work is acquired in the process of S2312 based on the three-dimensional-shape result generated by the process of S2310, so that the measurement result image R1 based on the measurement information can be projected upon the workpiece W1.

As described above, measurement information, such as volume information or weight information regarding the workpiece W1, is obtained based on the three-dimensional shape information of the workpiece W1, according to the work content, and work-instruction information, such as a cutting line, is projected directly upon the workpiece W1 as a measurement result image based on the measurement information. This allows the user to carry out the work accurately and efficiently.

(Second Case in Volume/Weight Measurement Mode)

FIG. 68 is a diagram illustrating a second case of the above-described volume/weight measurement mode. In this second case, work of cutting a wood piece, serving as a workpiece W2, disposed in the imaging area 100 to have a particular shape is carried out.

FIG. 68 shows cutting-depth information images R2*a* to R2*c* and a cutting-process-line image R3 being projected as measurement result images, as a result of the process of S2315 in the above-described volume/weight measurement processing. When the image input-and-output apparatus 1D receives work-content information related to the work of cutting the workpiece W2 to have a particular shape, information about a cut-out portion necessary to obtain the desired shape is acquired as measurement information by the process of S2314 based on the three-dimensional-shape result generated by the process of S2312. Thereafter, cutting-depth information specifying a cutting depth of the workpiece W2 to be cut and information about a cutting-process line specifying a predetermined cutting process (for example, rounding a corner) are generated as projection information based on the acquired measurement information. Consequently, the generated cutting-depth information and information about the cutting-process line are projected upon the workpiece W2 as the cutting-depth information images R2*a* to R2*c* and the cutting-process-line image R3, respectively, as shown in FIG. 68.

In the cutting-depth information images R2*a* to R2*c*, the size of each cross mark indicates the cutting depth. For example, in FIG. 68, the cutting-depth information images R2*a*, which are the smallest cross marks, instruct to cut the projected portions with the lowest depths. The cross marks become larger at the cutting-depth information images R2*b* and even larger at the cutting-depth information images R2*c*, instructing to cut the projected portions with higher cutting depths in that order.

In addition, the cutting process information image R3 is an image corresponding to the information about a cutting-process line generated as a result of the process of S2312, that is, an image for instructing a predetermined cutting process (for example, rounding a corner).

When the user carries out cutting according to these cutting-depth information images R2*a* to R2*c* and the cutting process instruction line R3, the workpiece W2 can be cut into the desired shape. Since the cutting-depth information images R2*a* to R2*c* and the cutting process instruction line R3 are projected directly upon the workpiece W2, the work can be carried out efficiently.

As described above, according to this volume/weight measurement mode, various measurements based on the three-dimensional information are carried out according to work-content information, and images corresponding to the measurement results are projected upon or near the workpiece, serving as the object. Therefore, the user can visually identify the desired measurement information accurately and easily.

In addition, the volume information, weight distribution information, and weight information of the workpiece, serving as the object, can be obtained as measurement information based on the three-dimensional information, and furthermore, a work-instruction line, for example, for dividing the workpiece into pieces of substantially equal volumes or weights based on the volume information, weight distribution information, and weight information can be projected upon the workpiece. Therefore, the work just needs to be carried out based on the work-instruction line projected upon the workpiece, which allows the work to be achieved accurately and efficiently.

(Designated-Point Measurement Mode)

A designated-point measurement mode, which is one of the operating modes of the image input-and-output apparatus 1D, will be described next with reference to FIGS. 69 to 71. This designated-point measurement mode is a mode which enables measurement of a point, line segment, or area formed by at least one point designated with a finger or a pointer.

FIG. 69 is a diagram for explaining this designated-point measurement mode. As one example in the designated-point measurement mode, FIG. 69 shows the measurement of the length between two points indicated by a user's finger, that is, "2-point distance measurement", for a component serving as a workpiece W3 disposed in the imaging area 100.

In this designated-point measurement mode, as shown in FIG. 69, measurement instructing buttons B1 to B3 and an input-completed button B4 are projected at a predetermined position in the imaging area 100 (at the bottom of the imaging area 100 in FIG. 69). The measurement instructing buttons B1 to B3 are buttons for instructing execution of measurements associated with the respective buttons; they are input when indicated by a user's finger, and the corresponding measurements are executed.

The measurement instructing button B1 is for instructing "3D input". When this measurement instructing button B1 is selected, a three-dimensional shape is measured by designated-point measurement processing which is described later, and a three-dimensional image of the workpiece W3 is projected as a measurement-result image thereof.

The measurement instructing button B2 is for instructing "2-point distance measurement". When this measurement instructing button B2 is selected, the distance between two points designated by indicating it with a fingertip or the like is measured based on the results of the three-dimensional shape detection, and the measurement-result image thereof is projected on the workpiece W3 or the imaging area 100. FIG. 69 illustrates an example in which "2-point distance measurement", corresponding to a selection button image B2, is selected. As shown in FIG. 69, the distance between two points, namely a point on the workpiece W3 which is indicated with a right hand 300*a* and a point on the workpiece W3 which is indicated with a right hand 300*b* that has moved from the position of the right hand 300*a*, is measured, and a measurement-result image R4 thereof is projected on the workpiece W3.

The measurement-result image R4 shown in FIG. 69 is a value indicating the distance between the two points. By projecting a measurement image as text information in this way, the user can easily recognize that information.

The measurement instructing button B3 is for instructing "height measurement". When this measurement instructing button B3 is selected, the height of a position designated by indicating with a fingertip or the like from the surface on which the workpiece W3 is disposed is measured, and text information or the like indicating the height with a value is projected onto the workpiece W3 or the imaging area 100 as a measurement-result image.

The selection-completed instructing button B4 is used to finish inputting the designated points with the fingertip, when the "2-point distance measurement" and the "height measurement" described above is executed, and is selected by indicating it with a fingertip or the like.

FIG. 70 is a flow chart of the designated-point measurement processing (S615D in FIG. 63) executed in this designated-point measurement mode. This designated-point measurement processing executes the measurement selected using the selection button images B1 to B4 described above, using the results of the three-dimensional shape detection of the object, and projects an image based on the measurement result.

In this processing, first, a low-resolution moving-image setting signal is transmitted to the CCD 22 (S2901_D). Since low-resolution moving-image data is used, the amount of computation is low, and the processing can thus be performed quickly.

Next, a designated-point-measurement-mode initial-screen image is stored in the projection-image storage section 37*k* (S2902_D). The image data for this designated-point-measurement-mode initial-screen image is stored in advance in an unillustrated area of the ROM37.

Next, a viewfinder image is displayed on the LCD monitor 10 (S2903_D), and then projection processing identical to the projection processing S806 in FIG. 8 is carried out (S2904_D). When the designated-point-measurement-mode initial-screen image is projected as the result of the processing in S2904_D, the selection button images B1 to B4 are projected at the predetermined positions in the imaging area 100 (see FIG. 69).

Next, well-known autofocus (AF) and autoexposure functions are initiated to adjust the focus, aperture, and shutter speed (S2905_D). Then, images in the imaging area 100 are taken at predetermined intervals and the difference between each pair of pixels at the same position in two successive sets of imaging data is taken to check the generated images to obtain pointing coordinates, which are the coordinates indicated with the fingertip (S2096_D). To determine the pointing coordinates indicated by the fingertip or the like, it is possible to use the method described in Japanese Unexamined Patent Application Publication No. Hei-7-168949, for example.

Next, it is determined whether or not the pointing coordinates obtained in S2906_D indicate one of the measurement instructing buttons B1 to B3 (S2907_D). If they do not indicate any of the measurement instructing buttons B1 to B3 (S2907_D: No), the processes from S2906_D to S2907_D are repeated. If they indicate any of the measurement instructing buttons B1 to B3 (S2907_D: Yes), moving-image acquisition is stopped (S2908_D), and measurement-information generating processing for obtaining measurement information is executed (S2909_D). This measurement-information generating processing (S2909_D) is described later.

After the measurement-information generating processing is executed (S2909_D), the release button 8 is re-scanned (S2910_D), and it is determined whether or not the release button 8 is fully pressed (S2911_D). If it is not fully pressed (S2911_D: No), the process of S2911_D is repeated. If it is fully pressed (S2911_D: Yes), it is determined whether the flash mode is active (S2912_D). If the flash mode is active (S2912_D: Yes), the flash 7 is fired (S2913_D), and an image is acquired in the imaging area 100 (S2914_D). If the flash mode is not active (S2912_D: No), an image is acquired without firing the flash 7 (S2914_D). Before determining that the release button 8 is fully pressed in the process of S2911_D, it is assumed that the half-pressed state of the release button is detected, and the autofocus (AF) and autoexposure (AE) functions are initiated to adjust the focus, aperture, and shutter speed.

Although details will be described later, after the measurement-information generating processing is executed (S2909_D), an image based on the measurement information generated according to the instruction/measurement instructing buttons B1 to B3 selected by the user is projected inside the imaging area 100. Therefore, the image based on that measurement information is acquired in the process of S2914_D. Accordingly, it is possible to store the projected image based on the measurement information as acquired image data.

Next, the acquired image acquired in the process of S2914_D is sent from the CCD 22 to the cache memory 28 (S2915_D), and the acquired image sent to the cache memory 28 is stored in the external memory 27 (S2916_D). Thus, it is possible to save as images various kinds of measurement information obtained as a result of the measurements corresponding to the kinds of measurement instructing buttons.

Next, the light-source driver 29 is controlled so as to be turned off (S2917_D), and the LED array 17A is turned off based on an electrical signal from the light-source driver 29 (S2918_D). Therefore, the image etc. projected in the imaging area 100 disappears.

Next, it is determined whether the mode changeover switch 9 is unchanged (S2919_D). If the mode changeover switch 9 is unchanged (S2919_D: Yes), the processing returns to the process of S2901_D, and the processes from S2901_D to S2919_D are repeated. If it is determined that the mode changeover switch 9 has changed as a result of the determination in the process of S2919_D (S2919_D: No), the processing ends.

FIG. 71 is a flow chart of the measurement-information generating processing described above (S2909_D in FIG. 70). This measurement-information generating processing (S2909_D) is processing for generating measurement information according to the instruction/measurement instructing buttons B1 to B3 selected by the user.

In this processing, first, a high-resolution setting signal is transmitted to the CCD 22 (S3001_D).

Next, the release button 8 is scanned (S3002*a*_D), and it is determined whether or not the release button 8 is half pressed (S3002*b*_D). If it is half pressed (S3002*b*_D: Yes), the autofocus (AF) and autoexposure (AE) functions are initiated to adjust the focus, aperture, and shutter speed (S3002*c*_D). If it is not half pressed (S3002*b*_D: No), the processing from S3002*a*_D is repeated.

Next, the release button 8 is scanned again (S3002*d*_D), and it is determined whether or not the release button 8 is fully pressed (S3002*e*_D). If it is fully pressed (S3002*e*_D: Yes), it is determined whether or not the flash mode is active (S3006_D).

If, as a result of the determination in the process of S3006_D, the flash mode is active (S3006_D: Yes), the flash 7 is fired (S3007_D), and an image is taken (S3008_D). If it is not fully pressed in the determination in S3002*e*_D (S3002*e*_D: No), the processing from S3002*a*_D is repeated.

If the flash mode is not active (S3006_D: No), an image is taken without firing the flash 7 (S3008_D). If it is not fully pressed in the determination in S3002*e*_D (S3002*e*_D: No), the processing from S3002*a* D is repeated.

Next, three-dimensional-shape detection processing identical to the three-dimensional-shape detection processing in S1006 in FIG. 10 is performed to detect the three-dimensional shape of the object (S3009_D).

Next, three-dimensional coordinates (X, Y, Z) in the real space for each measurement vertex are stored in the three-dimensional-information storage section 37*m* as results of the three-dimensional shape detection in the three-dimensional-shape detection processing (S3009_D).

Next, it is determined for which of the measurement instructing buttons B1 to B3 the selected was confirmed in the process of S2907_D in FIG. 70 (S3011_D), and thereafter, processing is performed according to the type of the selected measurement instructing button B1, B2, or B3.

When it is confirmed, as a result of the determination in the process of S3011_D, that the measurement instructing button B2 or B3 was selected (S3011_D: 2-point distance measurement or height measurement), measurement corresponding to the type of the selected measurement instructing button, projection of the measurement result thereof, and so on are performed by executing indicated-by-pointing-area measurement processing (S3012_D), which is described later. After executing this indicated-by-pointing-area measurement processing (S3012_D), the processing ends.

If, as a result of the determination in the process of S3011_D, it is confirmed that the measurement instructing button B1 was selected (S3011_D: 3D input), the results of the three-dimensional shape detection stored in the three-dimensional-information storage section 37*m* as results of the process of S3010_D are stored in the external memory 27 (S3013_D), and the results of that three-dimensional-shape detection are displayed on the LCD monitor 10 (S3014_D). The results of the three-dimensional shape detection are displayed as a collection of three-dimensional coordinates (X, Y, Z) in the real space for each measurement vertex.

Next, stored (S3015_D) in the projection-image storage section 37*k* is a three-dimensional shape-detection-result image, which is a three-dimensional image (3D CG image) in which the measurement vertexes, that is, the results of the three-dimensional shape detection, are connected to make polygons and their surfaces are displayed. Projection processing identical to the projection processing in S806 in FIG. 8 is then performed (S3016_D). In this case, as described above with reference to FIG. 18, by using the inverse function of the equation for converting the coordinates on the projection LCD 19 to three-dimensional spatial coordinates to determine the coordinates on the projection LCD 19 for the obtained three-dimensional coordinates, it is possible to project the three-dimensional shape result coordinates onto the projection plane. After the process of S3016_D, the processing ends.

FIG. 72 is a flow chart of the indicated-by-pointing-area measurement processing described above (S3012_D in FIG. 71). This indicated-by-pointing-area measurement processing (S3012_D) is processing for measuring a point, line segment, or area formed by at least one point designated with the finger or pointer, and for projecting the measurement image thereof onto the object or in the projection direction.

In this processing, a low-resolution moving-image setting signal is first transmitted to the CCD 22 (S3101). Because low-resolution moving-image data is used, the amount of computation is reduced, and the processing can thus be performed quickly.

Next, the well-known autofocus (AF) and autoexposure (AE) functions are initiated to adjust the focus, aperture, and shutter speed (S3102_D). Thereafter, in the same way as in the process of S2906_D (FIG. 70) described above, images are taken in the imaging area 100 at predetermined intervals and the difference between each pair of pixels at the same position in two successive sets of imaging data is taken to check the generated images to obtain pointing coordinates, which are the coordinates indicated by the fingertip (S3103_D).

Next, it is determined whether or not the pointing coordinates obtained in S3103_D indicate the selection-completed instructing button B4 (S3104_D). If the selection-completed instructing button B4 is not indicated (S3104_D: No), the pointing coordinates are stored in the pointing-coordinates storage section 37*n* (S3105_D), and the processing returns to the process of S3104_D. If the selection-completed instructing button B4 is indicated (S3104_D: Yes), moving-image acquisition is stopped (S3106_D).

The positions indicated by a pointing member, such as a user's finger, at different points in time are photographed in the processes from S3103_D to S3105_D described above, the trajectory indicated by that pointing member is obtained.

Next, measurement information is generated according to the type of the selected measurement instructing button and the pointing coordinates stored in the pointing-coordinates storage section 37*n* (S3107_D). In the process of S3107_D, for example, for "2-point distance measurement", which corresponds to the measurement instructing button B2, the distance between the two points is measured based on the pointing coordinates of the two points stored in the pointing-coordinates storage section 37*n*D and the results of the three-dimensional shape detection stored in the three-dimensional-shape coordinates storage section 37*m*D.

Next, a measurement result image based on the measurement information is stored in the projection-image storage section 37*k* (S3108_D), no-deformation-projection image conversion processing identical to that in S2316 in FIG. 64 described above is executed (S3109_D), and then projection processing identical to the projection processing S806 in FIG. 8 is performed (S3110_D). Accordingly, the measurement result image stored in the projection-image storage section 37*k* is projected onto the object or in the projection direction as a no-deformation image independent of the deformation of the object or the projection direction of the image projection section 13. Then, after the process of S3110_D, the processing ends.

In the process of in S3107_D described above, for "height measurement", corresponding to the measurement instructing button B3, the height of the pointed position (in other words, the pointing coordinates of one point stored in the pointing-coordinates storage section 37*n*D) from the plane of the imaging area 100 is measured based on the pointing coordinates of the point stored in the pointing-coordinates storage section 37*n*D and the results of the three-dimensional shape detection stored in the three-dimensional-shape coordinates storage section 37*m*D.

As the next-area measurement processing (S3012_D) in the designated-point measurement mode, only "two-point-distance measurement" for measuring the distance between two points indicated by pointing and "height measurement" for measuring the height of the position of the point indicated by pointing from the plane of the imaging area 100 have been described in the present case. However, the system may be configured so that the surface area, volume, weight etc. of a region circumscribed by the finger trajectory indicated by the user's finger are obtained as measurement information.

As described above, according to the designated-point measurement mode, it is possible to obtain measurement information based on three-dimensional information for a point, line segment, or area designated by the trajectory of a pointing member, such as a user's finger, a pen, or a pointer. Because various images based on the measurement information are projected on the workpiece, serving as the object, or close to the workpiece, the user can recognize desired measurement information easily and without error.

In addition, the point, line segment, or area for which measurement information is desired is designated by continuously acquiring the trajectory of the pointing member, such as a user's finger, a pen, or a pointer. Therefore, it is possible to easily obtain the measurement information which the user desires, and it is possible to easily input the designated point.

The arm member 3 in the image input-and-output apparatus 1D can be bent into any shape, as described above, enabling the image-acquisition head 2, which includes the image projection section 13 and the image pickup section 14, to be directed toward any position. Therefore, in the volume/weight measurement mode and the designated-point measurement mode, described above, by setting the image-acquisition direction and the projection direction in directions such that the work causes no obstruction, the risk of obstruction in the image-acquisition direction and the projection direction due to that work is reduced, which allows the work to be made more efficient. For example, when the user's dominant arm is the right arm, it is difficult for the work to be obstructed when imaging and projection are performed from the front left, which is an advantage.

In the embodiment described above, the processing S3009_D in the measurement-information generating processing in FIG. 71 can be associated with three-dimensional-information generating means. The process of S3107_D in the indicated-by-pointing information generating processing in FIG. 72 can be associated with measurement means.

The processes from S3103_D to S3105_D in the indicated-by-pointing information generating processing in FIG. 72 can be associated with designated-point inputting means.

The process of S2302 in the volume/weight measurement processing shown in FIG. 64 can be associated with density-information acquisition means.

The process of S2312 in the volume/weight measurement processing shown in FIG. 64 can be associated with three-dimensional-information generating means. The process of S2314 in the volume/weight measurement processing shown in FIG. 64 can be associated with instruction-information generating means.

The no-deformation-projection image conversion processing shown in FIG. 65 can be associated with spatial modulation control means.

Although the present invention has been described according to the present embodiment, the present invention is not limited to the present embodiment. It can readily be inferred that various improvements and modifications are possible so long as they do not depart from the scope of the invention.

The system may be configured such that measurement information obtained by the process of S2314 can be stored in the external memory 27 in the volume/weight measurement processing (FIG. 64) in the present case. The system may be configured such that an image projected onto the workpiece, serving as the object, is taken after the projection processing in step S2317.

The system may be configured such that the measurement information obtained in the process of S3107_D in the indicated-by-pointing-area measurement processing (FIG. 72) in the case described above is stored in the external memory 27. Accordingly, it is possible to transmit the obtained measurement information from the external memory 27 to an external interface by wireless communication and to use it in an external device.

In one embodiment of the present invention, the image input-and-output apparatus may further include light-source means for emitting light; spatial modulating means for outputting image-signal light formed by subjecting the light emitted from the light-source means to spatial modulation; three-dimensional-information generating means for, when image-signal light having a predetermined pattern is projected by the projecting means onto the object or onto an image-projectable plane in the projection direction, generating three-dimensional information of the object or the image-projectable plane in the projection direction according to the object information recognized by the recognizing means; and measurement means for measuring the object based on the three-dimensional information generated by the three-dimensional-information generating means and designated information generated from imaging data formed when the imaging means takes an image of a designated condition applied to the object. In this configuration, the image-signal light corresponding to the measurement data obtained from the measurement by the measurement means is output by the spatial modulating means, and the output image-signal light is projected by the projecting means onto the object or onto the image-projectable plane in the projection direction.

According to this configuration, the three-dimensional information for the object is obtained and the imaging data indicating the designated condition applied to the object is also obtained to perform measurement based on the imaging data and the three-dimensional information, and an image corresponding to the measurement information which results from that measurement is projected onto the object or onto the image-projectable plane in the projection direction. For example, when the designated condition designates a predetermined area or predetermined line segment designated by the user on the object, and measurement of the object is carried out for that designated area or line segment, measurement information corresponding to the area or line segment desired by the user is projected onto the object or close to the object. Therefore, user convenience is realized, and the measurement information can easily be recognized by the user.

In one embodiment of the present invention, the image input-and-output apparatus may include designated-point inputting means for inputting a designated point on the object. In such a case, the measurement means may carry out measurement of the object at a point, line segment, or area formed by at least one designated point which is input by the designated-point inputting means.

According to this configuration, by inputting at least one designated point, measurement of the object is carried out for the point, line segment, or area formed by that designated point, and an image corresponding to the measurement information resulting from that measurement is projected onto the object or onto the image-projectable plane in the projection direction. Because the measurement information is input merely by designating the required point, line segment, or area, an advantage is given in that it is possible to easily obtain the desired measurement information.

In one embodiment of the present invention, the designated-point inputting means may be configured so that images of the pointing member for indicating the designated point on the object are acquired by the imaging means at different points in time and the designated point is input based on the imaging data thereof.

According to this configuration, because the designated point is input based on the imaging data formed by acquiring, at different points in time, images of the pointing member for indicating the designated point, it is possible to input the designated point by continuously acquiring the trajectory of a user's fingertip, for example. Therefore, an advantage is given in that it is easy to input a designated point for which measurement information is desired, thus realizing user convenience.

In one embodiment of the present invention, the measurement means may be configured to measure volume information of the object, based on the three-dimensional information generated by the three-dimensional-information generating means. In such a case, the image-signal light projected by the projecting means onto the object or onto the image-projectable plane in the projection direction may be instruction information corresponding to the volume information.

According to this configuration, volume information of the object is measured based on the three-dimensional information of the object, and the instruction information corresponding to that volume information is projected onto the object etc. For example, when the object is to be divided into substantially equal volumes, lines for dividing the object into substantially equal volumes are projected as instruction information; or when density information for the object is to be referred to, instruction information corresponding to the weight of a predetermined volume in the object is projected. Therefore, an advantage is given in that the work can be made more efficient and the labor involved can be reduced accordingly.

In one embodiment of the present invention, the image input-and-output apparatus may include density-information acquisition means for obtaining density information of the object. In such a case, the measurement means may be configured to measure weight-distribution information of the object based on the three-dimensional information generated by the three-dimensional-information generating means and the density information obtained by the density-information acquisition means. The image-signal light projected by the projecting means onto the object or onto the image-projectable plane in the projection direction may be instruction information corresponding to the weight-distribution information.

According to this configuration, the weight-distribution information of the object is measured based on the three-dimensional information of the object and the density information of the object, and the instruction information corresponding to that weight-distribution information is projected onto the object etc. Therefore, for example, when the object is to be divided into substantially equal weights, lines for dividing the object into substantially equal weights are projected as instruction information, or instruction information corresponding to the weight-distribution information of a predetermined area of the object is projected. Consequently, an advantage is given in that the work can be made more efficient and the labor involved can be reduced accordingly.

In one embodiment of the present invention, the image input-and-output apparatus may further include light-source means for emitting light; spatial modulating means for outputting image-signal light formed by subjecting the light output from the light-source means to spatial modulation; three-dimensional-information generating means for, when image-signal light having a predetermined pattern is projected by the projecting means onto the object or onto an image-projectable plane in the projection direction, generating three-dimensional information of the object or the image-projectable plane in the projection direction based on the object information recognized by the recognizing means; and instruction-information generating means for generating instruction information for the object based on the three-dimensional information generated by the three-dimensional-information generating means. In this configuration, image-signal light based on the instruction information generated by the instruction-information generating means is output by the spatial modulating means, and the output image-signal light is projected onto the object or onto the image-projectable plane in the projection direction.

According to this configuration, the instruction information is generated based on the obtained three-dimensional information for the object, and an image corresponding to that instruction information is projected onto the object or onto the image-projectable plane in the projection direction. For example, because cutting information for dividing the object into substantially equal volumes is projected onto the object etc. as instruction information based on the three-dimensional information of the object, an advantage is given in that user convenience is realized, and the user can easily recognize that instruction information.

In one embodiment of the present invention, the image input-and-output apparatus may include spatial-light-modulation control means for controlling the spatial modulation means based on the three-dimensional information generated by the three-dimensional-information generating means so that no-deformation image-signal light is projected onto the object or onto the image-projectable plane in the projection direction.

According to this configuration, the image corresponding to the obtained measurement information is projected as a no-deformation image onto the object or onto the image-projectable plane in the projection direction, based on the three-dimensional shape of the object and the image-projectable plane in the projection direction. Therefore, an advantage is given in that an image corresponding to the measurement information and the instruction information can be accurately projected due to the projected image being deformed. For example, by projecting lines for partitioning the object into substantially equal volumes at the correct positions, it is possible to accurately divide the object into substantially equal volumes.

In one embodiment of the present invention, the image-signal light projected by the projecting means onto the object or onto the image-projectable plane in the projection direction may be text information related to the measurement information or the instruction information.

According to this configuration, text information related to the measurement information or the instruction information is projected onto the object or onto the image-projectable plane in the projection direction. Therefore, when the length of a predetermined line segment is measured, for example, that measurement value is projected as text information. An advantage is given in that the information can be easily recognized.

In one embodiment of the present invention, the image-signal light projected by the projecting means onto the object or onto the image-projectable plane in the projection direction may be graphical information based on the measurement information or the instruction information.

According to this configuration, graphical information related to the measurement information or the instruction information is projected onto the object or onto the image-projectable plane in the projection direction. Therefore, when a three-dimensional figure having a desired shape is taken from the object, for example, graphical information related to the three-dimensional figure is projected. Consequently, an advantage is given in that the work can be made more efficient and the labor involved can be reduced accordingly.

In one embodiment of the present invention, the image-signal light projected by the projecting means onto the object or onto the image-projectable plane in the projection direction may be a work-instruction line based on the measurement information or the instruction information.

According to this configuration, because the work-instruction line based on the measurement information or the instruction information is projected onto the object etc., an advantage is given in that the work can be made more efficient and the labor involved can be reduced accordingly.

In one embodiment of the present invention, the image-signal light projected by the projecting means onto the object or onto the image-projectable plane in the projection direction may be work-instruction information for dividing the object into substantially equal volumes or substantially equal weights according to the volume information or weight-distribution information of the object, measured by the measurement means, or it may be work-instruction information generated as instruction information by the instruction-information generating means, for dividing the object into substantially equal volumes or substantially equal weights.

According to this configuration, when it is necessary to perform work for dividing a single body, serving as the object to be photographed, into substantially equal volumes or substantially equal weights, for example, an advantage is given in that the work can be made more efficient and the labor involved can be reduced accordingly.

In one embodiment of the present invention, the work-instruction information may be a cutting-instruction line.

According to this configuration, a cutting-instruction line for separating the object into substantially equal volumes or substantially equal weights is projected onto the object as work-instruction information. Therefore, when it is necessary to perform work for cutting a single object, serving as the object, to separate it into units of substantially equal volumes or substantially equal weights, an advantage is given in that the work can be made more efficient and the labor involved can be reduced accordingly.

In one embodiment of the present invention, the image input-and-output apparatus may include cutting means for cutting the object along the cutting-instruction line.

According to this configuration, because cutting is performed by the cutting means along the projected cutting-instruction line, an advantage is given in that the work can be made more efficient and the labor involved can be reduced accordingly.

In one embodiment of the present invention, the image input-and-output apparatus may include movable means which is capable of moving the relative positions of a projection unit which has the light-source means, the spatial modulating means, and the projecting means; an imaging unit which has the imaging means and which is disposed integrally with the projection unit; and the object.

According to this configuration, the projection unit, which includes the light-source means, the spatial modulating means, and the projecting means, and the imaging unit, which includes the imaging means and which is disposed integrally with the projection unit, are configured such that the positions thereof can be moved relative to the object. Therefore, for example, when work is performed on the object, an advantage is given in that the risk of the imaging direction and the projection direction being obstructed by that work can be reduced, thus allowing the work to be made more efficient.

In one embodiment of the present invention, the projecting means may project image-signal light based on the measurement information or the instruction information after the image signal having the predetermined pattern is turned off.

According to this configuration, an image having the predetermined pattern is projected, and after that image is turned off, an image based on the measurement information or the instruction information is projected. In other words, three-dimensional information is obtained based on the image having the predetermined pattern; then, measurement information or instruction information is obtained based on that three-dimensional information, and that measurement information or instruction information is projected after the image having the predetermined pattern is turned off. Therefore, an advantage is given in that it is possible to simultaneously perform three-dimensional shape determination and measurement of the object, which allows the work to be made more efficient.

In one embodiment of the present invention, the imaging means may be configured to acquire an image of the object or the image-projectable plane in the projection direction, on which the image-signal light based on the measurement information or the instruction information is projected by the projecting means, to obtain imaging data thereof.

According to this configuration, because an image of the measurement information or the instruction information projected onto the object or the image-projectable plane in the projection direction is taken to obtain imaging data thereof, an advantage is given in that the measurement information or the instruction information can be retained as a record.

Fifth Embodiment

An image input-and-output apparatus according to a fifth embodiment will be described below. The image input-and-output apparatus of the fifth embodiment differs from the image input-and-output apparatus 1 of the first embodiment in that a function is changed in or a new function is added to the processor 15. The image input-and-output apparatus of the fifth embodiment has the same hardware configuration as the image input-and-output apparatus 1 of the first embodiment. Therefore, characteristic parts of functions of the image input-and-output apparatus of the fifth embodiment will be described. In the description of the image input-and-output apparatus of the fifth embodiment, figures used for describing the first embodiment will be referenced when needed. In the description, components of the fifth embodiment equivalent to those in the first embodiment will be denoted by the same reference symbols. In the description below, the image input-and-output apparatus of the fifth embodiment will be denoted as an image input-and-output apparatus 1E (see FIG. 73).

(Entire Structure)

The image input-and-output apparatus BE has a variety of modes such as a digital camera mode for implementing a digital camera function, a webcam mode for implementing a web camera function, a 3D image mode for obtaining a 3D image by detecting a three-dimensional shape, a planar image mode for obtaining a planar image of a curved original, and a database search mode for searching a database in accordance with three-dimensional information of an object and for projecting a search result.

In the present embodiment, the mode changeover switch 9 is a switch for setting the digital camera mode, webcam mode, 3D image mode, planar image mode, database search mode, off mode, or any other mode.

FIG. 73 is a block diagram of the image input-and-output apparatus 1E. The image input-and-output apparatus 1E has a processor 15E corresponding to the processor 15 of the first embodiment. As clearly understood from FIG. 73, the processor 15E has the same basic functions as the processor 15 of the first embodiment. Distinctive functions of the processor 15E will be described below.

A ROM 36 includes a camera control program 36*a*, a pattern light imaging program 36*b*, a luminance image generation program 36*c*, a code image generation program 36*d*, a code boundary extraction program 36*e*, a lens aberration correction program 36*f*, a triangulation calculation program 36*g*, an original-posture calculation program 36_h_, a plane conversion program 36_i_, an object-image extracting program 36_j_E, a database search program 36_k_E, and a related-information generating program 361E.

An object image extraction program 36_j_E is a program for cutting, for each object having a solid shape, an image surrounded by the contour of the object in taken image data, out of the taken image data based on a three-dimensional shape to extract two-dimensional information.

Here, "two-dimensional information" refers to information (hereinafter, referred to as an object image) formed, for example, of the shape of contour of an object; the color information (texture) of an object surface; and information about physical properties of the object surface, such as the reflectance, color, and surface roughness, in two-dimensional taken image data, where the information is extracted for each object from the two-dimensional taken image data.

A database search program 36_k_E is a program for searching a database stored in, for example, a server communicably connected to the image input-and-output apparatus 1E via a communication network or a personal computer connected to the image input-and-output apparatus 1E via an RF interface, to acquire related information about an object.

A related-information generation program 36_l_E is a program for generating projection image information for providing a user with related information about an object acquired from the database based on the related information. More specifically, when the related-information generation program 361E acquires related information about each object, it generates projection image information so that, for example, a character string indicating the related information is displayed as a projection image upon or near the object.

A RAM 37 includes an image-with-pattern-light storage section 37_a_, an image-without-pattern-light storage section 37_b_, a luminance image storage section 37_c_, a code image storage section 37_d_, a code boundary coordinate storage section 37_e_, an ID storage section 37_f_, an aberration correction coordinate storage section 37_g_, a three-dimensional coordinate storage section 37_h_, an original-posture calculation result storage section 37_i_, a plane conversion result storage section 37_j_, a projection image storage section 37_k_, an object-image storage section 37_l_E, a combined-image storage section 37_m_E, and a working area 37_n_E, assigned as storage areas.

An object image storage section 37_l_E stores an object image, obtained by cutting, for each object, an image surrounded by the contour of the object in two-dimensional taken image data, out of the taken image data based on the three-dimensional information stored in a three-dimensional-coordinate storage section 37_h_. A composite image storage section 37_m_E stores a composite image obtained by pasting the object image of each object on polygon information for the object, where measurement vertexes serving as a three-dimensional-shape detection result are connected to make polygons and their surfaces are displayed.

A working area 37_n_E stores data which is temporarily used for computation by a CPU 15.

(Main Processing)

FIG. 74 is a flow chart of main processing. In the main processing shown in FIG. 74, a series of processes from S601 to S611 is the same as in the first embodiment. In the main processing of the fifth embodiment, when it is determined in S610 that the planar image mode is not selected (S610: No), it is determined whether the mode changeover switch 9 selects the database search mode (S612E). If the database search mode is selected (S612E: Yes), database search processing, which will be described later, starts (S613E).

If the database search mode is not selected (S612E: No), it is determined whether the mode changeover switch 9 selects the off mode (S614E). If the off mode is not selected (S614E: No), the processing from step S603 is repeated. If it is determined that the off mode is selected (S614E: Yes), the processing ends.

(Database Search Mode)

A database search mode, which is one of the operation modes in the image input-and-output apparatus 1E, will be described next with reference to FIGS. 75 to 80. In this database search mode, an object image of an object is acquired based on three-dimensional information of the object and a database is searched based on the object image to project, for example, a character string indicating related information about the object, obtained as a search result.

FIG. 75 is a diagram showing character strings indicating related information about objects, as a search result, being projected upon or near the objects in the database search mode.

In FIG. 75, parts OB1 and OB2 serving as objects are disposed in an imaging area 100, which is an area on a projection plane where image acquisition is possible with an image pickup section 14 of the image input-and-output apparatus 1E, and character strings indicating the names and an attribute serving as related information, acquired by searching the database, are projected upon or near the parts OB1 and OB2 from an image projection section 13 of the image input-and-output apparatus 1E.

This imaging area 100 also corresponds to an image-projectable plane, that is, an image projection plane in the projection direction by the image projection section 14 of the image input-and-output apparatus 1E. A frame indicating the boundary of this imaging area 100 may be projected from a projection LCD 19 as a projection image. By showing the boundary of the imaging area 100, the user can clearly identify the area, where image acquisition is possible.

FIG. 76 is a system block diagram depicting the relationship between the image input-and-output apparatus 1E and a database accumulation apparatus, such as a server or a personal computer, for storing a database used in the database search mode. As shown in FIG. 76, the image input-and-output apparatus 1E according to this embodiment is communicably connected to an external personal computer 101 for storing a database via an antenna 11. Furthermore, the image input-and-output apparatus 1E is communicably connected to a server 102 for accumulating the database and web pages via the Internet 103, serving as a communication network.

An object image and a polygon image used in the database search mode will be described with reference to FIGS. 77(_a_) to 77(_c_). FIG. 77(_a_) is a diagram depicting a two-dimensional taken image (two-dimensional-image information) of objects. FIG. 77(_b_) is a diagram depicting a polygon image (information indicating three-dimensional shapes among three-dimensional information) where measurement vertexes, serving as a three-dimensional-shape detection result, are connected to make polygons and their surfaces are displayed. FIG. 77(_c_) is a diagram depicting an object image obtained by cutting only an area included in the contour of each object determined as a solid, out of the two-dimensional taken image data shown in FIG. 77(_a_) based on the three-dimensional-shape detection result.

As shown in FIG. 77(_a_) to FIG. 77(_c_), an object image is an image obtained by cutting only a portion having a solid shape separable from the background, out of two-dimensional taken image data. Therefore, even if the taken image data includes an image as the background of an object having a solid shape, an object image exhibiting two-dimensional information, such as color information, pattern, and reflectance of a surface of the object and a plane shape of the object, can be acquired by extracting an area surrounded by the contour of the object, having the solid shape, separated from the background image. Furthermore, even if a plurality of objects is present, an object image for each object can be extracted.

FIG. 78 is a flow chart illustrating a first case of database search processing (S613E in FIG. 74) which is carried out in this database search mode. In the database search processing, an object image is acquired based on the three-dimensional information of an object and a database is searched based on the object image to project a search result as an image.

In this processing, first, a high-resolution setting signal is transmitted to a CCD 22 (S2501_E). As a result, a high-quality pickup image can be acquired.

Next, a viewfinder image (image in the visible range through a viewfinder 6) is displayed on an LCD monitor 10 (S2502_E). Therefore, the user can confirm a pickup image (imaging area) by checking the image displayed on the LCD monitor 10, instead of looking through the viewfinder 6, before taking an actual image.

Next, a release button 8 is scanned (S2503_E) to determine whether the release button 8 is half-pressed (S2504_E). When the release button 8 is half-pressed (S2504_E: Yes), autofocus (AF) and autoexposure (AE) functions are activated to adjust the focus, aperture, and shutter speed (S2505_E). When the release button 8 is not half-pressed (S2504_E: No), the processing from S2503_E is repeated.

Next, the release button 8 is scanned again (S2506_E) to determine whether the release button 8 is full-pressed (S2507_E). When the release button 8 is full-pressed (S2507_E: Yes), it is determined whether a flash mode is active (S2508_E).

When the flash mode is on as a result (S2508_E: Yes), a flash 7 is fired (S2509_E) and an image is taken (S2510_E). When the flash mode is not active (S2509_E: No), an image is taken without firing the flash 7 (S2510_E) to acquire two-dimensional pickup image data (refer to FIG. 77(*a*)).

Next, processing identical to the three-dimensional-shape detection processing of S1006 in FIG. 10 is performed (S2511) to detect the three-dimensional shape of the object.

Subsequently, based on the three-dimensional-shape detection result acquired in the process of S2511_E, object images (refer to FIG. 77(*c*)) are extracted from the two-dimensional pickup image data acquired in the process of S2510_E (S2512_E).

Next, based on each of the object images extracted in the process of S2512_E, the database stored in the personal computer 101 or the server 102 is searched to acquire related information, such as the names and an attribute corresponding to the object, as a search result (S2513_E). In this related-information search processing, for example, the correlation between an image obtained by rotating, shifting and magnifying, by the ratio of similitude, the object image and data accumulated in the database is calculated to acquire the same or highly similar data, as a search result. Since this related-information search processing is carried out for each object image, even if images of a plurality of objects are captured at the same time in the process of S2510_E, a search result for each object can be obtained.

In addition, this related-information search processing may use a color distribution and a luminance histogram acquired based on an object image as indices and calculate the correlation between these indices and data accumulated in the database to acquire the same or similar data, as a search result.

Furthermore, as described above, this related-information search processing may acquire, as a search result, specific data selected as matching or similar to an object image or indexes acquired based on the object image, and data having a name or an attribute similar to the specific data.

Subsequently, based on the related information acquired by the processing of S2513, projection image information is generated so that a character string indicating the related information is projected upon or near the object and the projection image information is stored in the projection image storage section 37*k* (S2514_E).

Next, projection processing identical to the projection processing of S806 in FIG. 8 is carried out (S2515_E). In the projection processing of S2515_E, the projection image information generated based on the related information has been stored in the projection image storage section 37*k*, and thus the character string, indicating the related information, is projected upon or near the object (refer to FIG. 75).

Therefore, since the database stored in the personal computer 101 or the server 102 is searched for related information about the object based on the three-dimensional information of the object and the found related information is projected, the user can automatically acquire the related information about the object. In addition, since an object image that excludes, for example, the background of a plane on which the object is disposed is extracted based on the three-dimensional information of the object and related information is searched for based on that object image, a search can be made for related information about the object with high accuracy, compared with a case where a search is made for related information based on data not counting the solid information.

FIG. 79 is a flow chart illustrating a second case of the above-described database search processing. In the second case, the same processes as those in the first case are denoted with the same reference symbols, and thus a description thereof is omitted.

As shown in FIG. 79, in the second case of the database search processing, when related information is acquired in the related-information search processing (S2513_E), the related information is output (S2513*a*_E) and a search is made through web pages (display contents) on the Internet 103 by a search engine with the related information as a key word (S2513*b*_E). Projection image information is generated such that a character string (information about the display content) indicating the URL (Uniform Resource Locator) information of the web page obtained as a search result is projected, for example, close to the object and is then stored in the projection image storage section 37*k* (S2513*c*_E).

For example, when an apple is placed in the imaging area 100 as an object, the object name "apple" is acquired as related information of the object in the related-information search processing (S2510_E).

In the first case of the database search processing, a series of characters "apple" indicating the object name acquired as related information are projected upon or near the object (apple). On the other hand, in the second case, a search is made through web pages by a search engine with the series of characters "apple" indicating related information as a key word, and the character string indicating the URL information of the resultant web page is projected by the image projection section 13.

As described above, according to the second case of the database search processing, a search is made through web pages based on related information acquired by database search and a character string indicating the URL information of the resultant web page is output. Therefore, the user can automatically learn information about the web page that is found based on, for example, the name of the object whose image is captured.

FIG. 80 is a flow chart illustrating a third case of the above-described database search processing. In the third case, the same processes as those in the first case are denoted with the same reference symbols, and thus a description thereof is omitted.

As shown in FIG. 80, in the third case of the database search processing, when an object image (FIG. 77(*c*)) is extracted in the process of S2512_E, the object image is pasted on a polygon image (FIG. 77(*b*)) to generate a composite image, which is then stored in the composite image storage section 37*m*E (S2512*a*_E).

Then, in related-information search processing, the correlation between an image obtained by rotating, shifting, and magnifying, by the ratio of similitude, the composite image and data accumulated in the database is calculated to acquire the same or highly similar data as a search result (S2513_E).

According to the third case of this database search processing, related information about the object can be acquired with higher accuracy based on color information, pattern, and reflectance of the object surface and the plane shape of the object obtained from the object image and a solid shape of the object surface obtained from the polygon image.

A search is made for related information based on an object image (refer to FIG. 77(*c*)) in the first and second cases, whereas a search is made based on an object image and a polygon image (refer to FIG. 77(*b*)) in the third case. However, conditions for searching for related information are not limited to these ones.

For example, in order to acquire related information, the related-information search processing of S2513_E, described in the database search processing of FIGS. 78, 79, and 80, may calculate the correlation between three-dimensional information, such as the three-dimensional coordinates (X, Y, Z) of an object, unevenness information of an object surface, curved-surface information, and reflected-light distribution information, and data accumulated in the database to search for the same or highly similar data. Alternatively, the correlation with data accumulated in the database may be calculated based on two-dimensional pickup data (refer to FIG. 77(*a*)) and a polygon image (refer to FIG. 77(*c*)) to search for the same or highly similar data. Furthermore, the correlation with data accumulated in the database may be calculated based on, for example, only a polygon image to make a search. With this, the process of extracting an object image (the process of S2512_E in FIGS. 78, 79, and 80) can be omitted.

Although a search is made for related information of each object in the related-information search processing of S2513_E, described in the database search processing of FIGS. 78, 79, and 80, a search may also be made for related information of at least a particular object.

In the first case, the second case, and the third case of the database search processing, when the projection direction by the image projection section 13 is a direction other than directions substantially perpendicular to the object surface, an image projected upon the object is deformed, which may cause a projection image unrecognizable to the user to be generated in some cases. For this reason, it is preferable that such a deformed projection image be corrected so as to be projected as a no-deformation projection image.

When a no-deformation projection image is to be projected regardless of the solid shape of the projection plane in the database search processing (S613E) shown in FIGS. 78, 79, and 80, projection image conversion processing (S2900_E) to be described later is carried out instead of the process of S902 in the projection processing (S2511_E) which is carried out in the same manner as the projection processing of S806 in FIG. 8.

FIG. 81 is a flow chart of image conversion processing for no-deformation-image projection (S2900_E). The image conversion processing for no-deformation-image projection (S2900_E) converts the image displayed on the projection LCD 19 in accordance with the image information stored in the projection-image storage section 37*k* to an image that can be projected to the object without deformation.

In this processing, first, an area for the processing is allocated in the working area 37*n*E of the RAM 37, and the variable of counter "q" used in the processing is initialized (q=0) (S2901_E).

A memory area corresponding to a space of LCD spatial coordinates (lcdcx, lcdcy) is secured and specified in the working area 37*n*E of the RAM 37 as a rectangular area for the converted no-deformation projection image (no-deformation image on a curved object), and the number of pixels Qa contained in the rectangular area is obtained (S2902_E).

Each pixel value of the image information for projecting a character string indicating related information, a character string indicating URL information, or the like, stored in the projection image storage section 37*k* is placed at each pixel in the ideal camera image coordinate system (ccdcx, ccdcy) (S2903_E).

With the use of expressions (6) to (9), described above, three-dimensional coordinates (X, Y, Z) corresponding to each pixel on the LCD spatial coordinates (lcdcx, lcdcy) constituting the specified rectangular area, on the surface of the object stored in the three-dimensional coordinate storage section 37*h* are obtained, and further expressions (1) to (5) are used to obtain (ccdcx, ccdcy) to calculate and specify the pixel information of each pixel in the no-deformation-projection image.

More specifically, first, it is checked whether counter "q" reaches pixel count Qa (S2904_E). If counter "q" does not reach pixel count Qa (S2904_E: No), the LCD spatial coordinates (lcdcx, lcdcy) of the pixel corresponding to counter "q" are converted to coordinates (X, Y, Z) on the object stored in the working area 37*n*E by using expressions (6) to (9) (S2905_E).

The coordinates (X, Y, Z) on the object obtained through the conversion in step S2905_E are converted to coordinates (ccdcx, ccdcy) on the ideal camera image by using the expressions obtained to calculate (ccdcx, ccdcy) from expressions (1) to (5) (S2906_E).

The pixel information placed at the coordinates (ccdcx, ccdcy) obtained through the conversion in step S2906_E is obtained, and the pixel information is written at the LCD spatial coordinates (lcdcx, lcdcy) corresponding to the value of counter "q" (S2907_E).

Counter "q" is incremented by "1" to execute the processing from step S2904_E to step S2907_E on the next pixel (S2908_E).

The processing from step S2904_E to step S2908_E is repeated until counter "q" reaches pixel count Qa (S2904_E: Yes), and the pixel information associated with the LCD spatial coordinates (lcdcx, lcdcy) of the specified rectangular area is transferred to the projection LCD driver 30 (S2909_E).

The processing area allocated to the working area 37*n*E in step S2901_E to execute the processing is de-allocated (S2910_E), and the processing ends.

When the pixel information on the LCD spatial coordinates (lcdcx, lcdcy) is transferred to the projection LCD driver 30 in step S2909_E, the projection LCD 19 displays the image to be projected onto the deformed and curved surface without deformation. Accordingly, the image is projected onto the object without deformation.

When the image conversion processing for no-deformation-image projection (S2900_E) is executed, an image can be projected without deformation even not only if the image is projected in a slanting direction but also if the object has a three-dimensional shape and consequently has a curved surface. As a result, especially when a character string indicating related information or a character string indicating URL information is projected, the user can correctly recognize the information.

Although the user's viewpoint is placed at the position of the image pickup section 14 in the above-described case, the user's viewpoint can be placed at any position. In that case, expressions (1) to (5) need to be modified to be suited to a case where the principal point position (FIG. 18) of the imaging optical system 21, corresponding to the viewpoint, is shifted to a desired three-dimensional space and used.

In the above-described embodiment, the process of S2511_E in the database search processing of FIGS. 78, 79, and 80 can be associated with three-dimensional-information detection means. The process of S2513_E in the database search processing of FIGS. 78, 79, and 80 can be associated with related-information search means. The process of S2515_E in the database search processing of FIGS. 78 and 80 and the process of S2513*a*_E in the database search processing of FIG. 79 can be associated with related-information output means.

The process of S2512_E in FIGS. 78 and 79 can be associated with object-image extraction means. The process of S2512_E in FIG. 80 can be associated with object-image extraction means.

The process of S2513*b*_E in FIG. 79 can be associated with display-content search means. The process of S2515_E in FIG. 79 can be associated with display-content output means.

Although the present invention has been described based on the present embodiment, the present invention is not limited to the present embodiment, and it is easily inferred that various improvements and modifications are possible within the scope of the present invention.

In the process of S2515_E in the database search processing described with reference to FIG. 79, URL information is projected as a web-page search result based on related information of an object. A web page itself or the number of hits in the search operation may be projected.

In the process of S2515_E in the database search processing described with reference to FIGS. 78, 79, and 80, a database search result and a web page search result are output by projection. These search results may be output, for example, to a personal computer communicably connected to the image input-and-output apparatus 1E or may be output by displaying them on the LCD monitor 10.

In addition, the database used in the database search processing described with reference to FIGS. 78, 79, and 80 is stored in the personal computer 101 or the server 102. Such a database may be stored in the ROM 36 built in the image input-and-output apparatus 1E or a storage device (data accumulation means), such as the external memory 27, detachably connected to the image input-and-output apparatus.

In one embodiment of the present invention, the image input-and-output apparatus may further include light source unit for emitting light; space modulation unit for applying space modulation to the light emitted from the light source unit and outputting image signal light; related-information search unit for searching external data accumulation unit communicably connected to the image input-and-output apparatus via communication unit or data accumulation unit built in the image input-and-output apparatus for related information about the object based on the three-dimensional information detected by the three-dimensional-shape detection unit; and related-information output unit for outputting the related information found by the related-information search unit.

According to such a configuration, the external data accumulation unit communicably connected to the image input-and-output apparatus via communication unit or the data accumulation unit built in the image input-and-output apparatus is searched for related information about the object based on the three-dimensional information detected by the three-dimensional-shape detection unit, and the related information is output. This gives an advantage such that the user can automatically acquire related information about the object. Here, "three-dimensional information" refers to coordinate information of (X, Y, Z), a polygon image generated based on the coordinate information, curved-surface information of an object surface, unevenness information, reflected-light distribution information, surface roughness, etc. Therefore, a search can be made for related information about an object with high accuracy to output the related information, compared with a case where a search is made for related information based on two-dimensional pickup data, such as a taken image.

In one embodiment of the present invention, the related-information search unit may search for related information about the object based on information indicating the three-dimensional shape of the object from among the three-dimensional information detected by the three-dimensional-shape detection unit.

According to such a configuration, a search is made by the related-information search unit for related information about the object based on information indicating the three-dimensional shape of the object from among the three-dimensional information detected by the three-dimensional-shape detection unit. This gives an advantage such that a search can be made for related information about an object with high accuracy, compared with a case where a search is made for related information based on two-dimensional pickup data, such as a taken image. Here, "information indicating a three-dimensional shape" refers to information indicating a solid shape of an object, such as a polygon image or surface roughness of an object surface. In other words, since a search is made for related information about an object with the solid shape of the object taken into consideration, search accuracy is increased.

In one embodiment of the present invention, the related-information search unit may search for related information about the object based on information indicating the three-dimensional shape of the object from among the three-dimensional information detected by the three-dimensional-shape detection unit and the pickup data acquired by the imaging unit.

According to such a configuration, a search is made by the related-information search unit for related information about the object based on information indicating the three-dimensional shape of the object from among the three-dimensional information detected by the three-dimensional-shape detection unit and the pickup data acquired by the imaging unit. This gives an advantage such that a search can be made for related information about the object with higher accuracy. Here, "pickup data" refers, for example, to two-dimensional-image information indicating reflectance and color information, and "information indicating a three-dimensional shape" refers, for example, to information indicating a solid shape of an object, such as a polygon image or surface roughness of an object surface. Therefore, according to such an image input-and-output apparatus, a search can be made with higher accuracy based on the two-dimensional-image information and the solid shape.

In one embodiment of the present invention, when pickup data is acquired by taking images of a plurality of objects at the same time by the imaging unit, the related-information search unit may search for related information of each of at least particular objects from among the plurality of objects whose images have been taken by the imaging unit.

According to such a configuration, when pickup data is acquired by taking images of a plurality of objects at the same time by the imaging unit, a search is made for related information of each of at least particular objects from among the plurality of objects whose images have been taken by the imaging unit. This gives an advantage such that even if images of a plurality of objects are captured by the imaging unit at the same time, related information about each of at least particular objects can be acquired with a simple operation. In addition, since a search is made for each object, an advantage is given such that the search accuracy is further increased.

In one embodiment of the present invention, the image input-and-output apparatus may include object-image extraction unit for extracting two-dimensional-image information of an object part having a solid shape separable from the background from among pickup data acquired by the imaging unit based on the three-dimensional information detected by the three-dimensional-shape detection unit. In that case, the related-information search unit may search for related information about the object based on the two-dimensional-image information extracted by the object-image extraction unit.

According to such a configuration, two-dimensional-image information of an object part having a solid shape separable from the background from among pickup data acquired by the imaging unit is extracted based on the three-dimensional information detected by the three-dimensional-shape detection unit, and a search is made for related information about the object based on the extracted two-dimensional-image information. This gives an advantage such that the user can automatically acquire related information about the object, having the solid shape. For example, when an image of an object having a solid shape is captured with the object disposed on a patterned surface, pickup data having an image on the background of the object is acquired. Even in such a case, a search can be made for related information about the object.

In one embodiment of the present invention, the image input-and-output apparatus may include object-image extraction unit for extracting two-dimensional-image information of an object part having a solid shape separable from the background from among pickup data acquired by the imaging unit based on the three-dimensional information detected by the three-dimensional-shape detection unit. In that case, the related-information search unit may search for related information about the object, having the solid shape, based on the three-dimensional information detected by the three-dimensional-shape detection unit and the two-dimensional-image information extracted by the object-image extraction unit.

According to such a configuration, two-dimensional-image information of an object part having a solid shape separable from the background from among pickup data acquired by the imaging unit is extracted based on the three-dimensional information detected by the three-dimensional-shape detection unit, and a search is made for related information about the object, having the solid shape, based on the two-dimensional-image information and the three-dimensional information. This gives an advantage such that the user can automatically acquire related information about the object, having the solid shape. For example, when an image of an object having a solid shape is captured with the object disposed on a patterned surface, pickup data having an image on the background of the object is acquired. Even in such a case, a search can be made for related information about the object. In addition, a search is made based on two-dimensional-image information of an object part having a solid shape separable from the background, that is, two-dimensional-image information such as color information, reflectance, or a plane shape of the object part and three-dimensional information of the object. This gives an advantage such that a search is made for related information about the object with high accuracy.

In one embodiment of the present invention, the related-information search unit may search for related information based on information indicating the three-dimensional shape of the object from among the three-dimensional information detected by the three-dimensional-shape detection unit and two-dimensional-image information extracted by the object-image extraction unit.

According to such a configuration, a search is made for related information based on information indicating the three-dimensional shape of the object from among the three-dimensional information detected by the three-dimensional-shape detection unit and two-dimensional-image information extracted by the object-image extraction unit. Therefore, a search can be made for related information about the object with higher accuracy. Here, "information indicating the three-dimensional shape" refers to information indicating the solid shape of an object, such as a polygon image or surface roughness of an object surface. Therefore, according to such an image input-and-output apparatus, a more highly accurate search can be made based on two-dimensional-image information such as a plane shape, color information, or reflectance of an object part and the solid shape of the object.

In one embodiment of the present invention, when pickup data is acquired by taking images of a plurality of objects at the same time by the imaging unit, the object-image extraction unit may extract two-dimensional-image information of the object part from each of at least particular objects from among the plurality of objects whose images have been captured by the imaging unit. In addition, the related-information search unit may search for related information about each object based on the two-dimensional-image information extracted by the object-image extraction unit.

According to such a configuration, two-dimensional-image information of the object part from each of at least particular objects from among the plurality of objects whose images have been captured by the imaging unit at the same time is extracted, and a search is made for related information about each object based on the extracted two-dimensional-image information. This gives an advantage such that even if images of a plurality of objects are taken by the imaging unit at the same time, a search can be made for related information with high accuracy based on the two-dimensional-image information extracted from each object.

In one embodiment of the present invention, the related information output by the related-information output unit may include at least one of the name and an attribute of the object.

According to such a configuration, at least one of the name and an attribute of the object is output as related information. This gives an advantage such that the user can automatically acquire the name or an attribute of the object. Here, an attribute includes, for example, a price, a model number, and a delivery destination.

In one embodiment of the present invention, the related-information output unit may output image signal light based on the related information found by the related-information search unit, using the space modulation unit, and project the output image signal light by the projecting unit upon the object or an image-projectable plane in the projection direction.

According to such a configuration, image signal light based on the related information found by the related-information search unit is output by the space modulation unit, and the output image signal light is projected upon the object or an image-projectable plane in the projection direction. This gives an advantage such that the user can acquire related information by visually recognizing the projection image projected with the image signal light.

In one embodiment of the present invention, the image input-and-output apparatus may include display-content search unit for searching for a display content via a network based on the related information found by the related-information search unit; and display-content output unit for outputting information about the display content found by the display-content search unit.

According to such a configuration, a search is made for a display content via a network based on the related information found by the related-information search unit, and information about the display content searched for is output. This gives an advantage such that the user can automatically acquire information about the display content obtained by a further network search based on the related information acquired by the search operation. Here, “display content” corresponds to information resources (documents and images) searchable via a network, such as web pages open on the Internet, and “information about display content” corresponds to the address of the display content, such as the URL of a web page, and the display content itself.

In one embodiment of the present invention, the display-content output unit may output image signal light based on information about the display content found by the display-content search unit, by means of the space modulation unit, and project the output image signal light by the projecting unit upon the object or an image-projectable plane in the projection direction.

According to such a configuration, image signal light based on information about the display content is output by the space modulation unit, and the output image signal light is projected by the projecting unit. This gives an advantage such that the user can acquire the information about the display content by visually recognizing the projection image projected with the image signal light.

What is claimed is:

1. An image input-and-output apparatus, comprising:

an imaging unit that takes an image of an object to be photographed to obtain imaging data;

a three-dimensional-shape detection unit that projects pattern light to the object, takes an image of the object by the imaging unit, and detects the three-dimensional shape of the object;

a recognizing unit that recognizes object information from the imaging data obtained by the imaging unit, the object information is written information on the object detected by the three-dimensional-shape detection unit; and a light source that emits light;

a spatial modulation unit that performs spatial modulation of light emitted from the light source and outputs image signal light;

a reference-information acquisition unit that obtains reference information of the object to be photographed by the imaging unit;

a comparison-result-information acquisition unit that compares the reference information obtained by the reference-information acquisition unit and the written information recognized by the recognizing unit, and obtains the result of the comparison between the reference information and the written information as comparison result information;

a projection optical system that projects the image signal light output from the spatial modulation unit in a projection direction; and a projecting unit that projects related information related to the object information recognized by the recognizing unit, the projecting unit comprising:

a reference-information projecting unit that outputs image signal light based on the reference information obtained by the reference-information acquisition unit, through the spatial modulation unit, and projects the output image signal light onto the object or onto an image-projectable plane in the projection direction through the projection optical system, and a comparison-result-information projecting unit that outputs image signal light based on the comparison result information obtained by the comparison-result-information acquisition unit, through the spatial modulation unit and projects the output image signal light onto the object or onto an image-projectable plane in the projection direction through the projection optical system.

2. An image input-and-output apparatus, comprising:

an imaging unit that takes an image of an object to be photographed to obtain imaging data;

a three-dimensional-shape detection unit that projects pattern light to the object, takes an image of the object by the imaging unit, and detects the three-dimensional shape of the object;

a recognizing unit that recognizes object information from the imaging data obtained by the imaging unit, the object information is written information on the object detected by the three-dimensional-shape detection unit;

a light source that emits light;

a spatial modulation unit that performs spatial modulation of light emitted from the light source and outputs image signal light;

a projection optical system for projecting the image signal light output from the spatial modulation unit toward a projection plane;

a reference-information acquisition unit that obtains reference information related to the object to be photographed by the imaging unit;

a comparison-result-information acquisition unit that compares the reference information obtained by the reference-information acquisition unit and the written information recognized by the recognizing unit, and obtains the comparison result as comparison result information, and a projecting unit that projects related information related to the object information recognized by the recognizing unit, the projecting unit comprises: a comparison-result-information projecting unit that outputs image signal light based on the comparison result information obtained by the comparison-result-information acquisition unit, through the spatial modulation unit, and projects the output image signal light onto the object or onto an image-projectable plane in the projection direction through the projection optical system.

3. The image input-and-output apparatus according to claim 2, wherein the three-dimensional-shape detection unit comprises:

a three-dimensional-information generation unit that generates three-dimensional information of the object or an image-projectable plane in the projection direction, on the basis of the imaging data of the image signal light taken by the imaging unit when the image signal light has a predetermined pattern shape and the image signal light is projected onto the object or onto the image-projectable plane in the projection direction by the projection optical system, wherein the image input-and-output apparatus comprises:

a plane-image correction unit that corrects the imaging data of the object obtained by the imaging unit to be equal to imaging data of the object positioned in a space containing the projection direction, taken by the imaging unit in a direction almost perpendicular to a surface of the object, in accordance with the three-dimensional information of the object or the image-projectable plane in the projection direction, generated by the three-dimensional-information generation unit, and wherein the comparison-result-information acquisition unit obtains the comparison result information by using the written information recognized by the recognizing unit in accordance with the imaging data corrected by the plane-image correction unit.

4. The image input-and-output apparatus according to claim 3, further comprising:

a spatial modulation control unit that controls the spatial modulation unit in accordance with the three-dimensional information generated by the three-dimensional-information generation unit such that the reference-information projecting unit or the comparison-result-information projecting unit projects image signal light without deformation onto the object or onto an image-projectable plane in the projection direction.

5. The image input-and-output apparatus according to claim claim 2, wherein the reference information is information of a model of the object.

6. The image input-and-output apparatus according to claim 2, wherein the reference information is model information of a process of work formed of one or more stages;

the comparison-result-information acquisition unit obtains the comparison result information by comparing imaging data of the object in at least one stage of the work and the model information corresponding to the stage after the imaging data is taken by the imaging unit; and the comparison-result-information projecting unit projects the comparison result information onto the object or the image-projectable plane in the projection direction through the comparison-result-information acquisition unit.

7. The image input-and-output apparatus according to claim 6, wherein the projecting unit comprises:

a reference-information projecting unit that projects the model information of each stage onto the object or an image-projectable plane in the projection direction, together with the comparison result information of the corresponding stage projected onto the object by the comparison-result-information projecting unit.

8. The image input-and-output apparatus according to claim 2, wherein the comparison result information is correction information of the object with respect to the reference information.

9. The image input-and-output apparatus according to claim 2, wherein the comparison result information is evaluation information of the object with respect to the reference information.

10. The image input-and-output apparatus according to claim 2, further comprising a movable unit capable of moving a projection section which includes the light source, the spatial modulation unit, and the projection optical system, and an imaging section which includes the imaging unit and which is integrally provided with the projection section, as the object is moved.

11. The image input-and-output apparatus according to claim 10, wherein the movable unit can move the projection section and the imaging section, such that the projection of the image signal light onto the object by the projecting unit and the imaging of the object by the imaging unit can be made in the direction opposite to the direction of the work performed on the object, in the top view.

12. The image input-and-output apparatus according to claim 10, wherein the movable unit can move the projection section and the imaging section such that the projecting unit projects the image signal light onto the object and the imaging unit takes an image of the object from the left in the front with respect to a person working on the object.

13. An image input-and-output apparatus comprising:

an imaging unit that takes an image of an object to be photographed to obtain imaging data;

a three-dimensional-shape detection unit that projects pattern light to the object, takes an image of the object by the imaging unit, and detects the three-dimensional shape of the object;

a recognizing unit that recognizes object information from the imaging data obtained by the imaging unit, the object information is written information on the object detected by the three-dimensional-shape detection unit;

a projecting unit that projects related information related to the object information recognized by the recognizing unit;

a first storage unit that stores reference information which is set in advance; and a first determining unit that determines whether the reference information stored in the first storage unit and the written information recognized by the written-information recognizing unit match, the first determining unit determines whether or not the reference information stored in the first storage unit and the written information recognized by the written-information recognizing unit match, wherein when a match is determined by the first determining unit, the projecting unit projects, as the assessment result information, match information indicating that the written information and the reference information match, and wherein when no match is determined by the first determining unit, the projecting unit projects, as the assessment result information, no-match information indicating that the written information and the reference information do not match; and a calculating unit that calculates an evaluation parameter indicating an evaluation related to the match information projected by the projecting unit, wherein the imaging unit obtains an image of the object, on which written information, including text and graphics, is written, to obtain first imaging data, the recognizing unit comprises a written-information recognizing unit that recognizes the written information from the first imaging data obtained by the imaging unit, the projecting unit projects assessment result information indicating the result of the determination carried out by the first determining unit, and the projecting unit projects the evaluation parameter calculated by the calculating unit.

14. The image input-and-output apparatus according to claim 13, wherein, if it is determined by the first determining unit that the reference information stored in the first storage unit and the written information recognized by the written-information recognizing unit do not match, the projecting unit projects the reference information corresponding to that written information as a part of the no-match information.

15. The image input-and-output apparatus according to claim 13, further comprising a second determining unit that determines whether or not the first determining unit is able to determine whether or not the reference information stored in the first storage unit and the written information recognized by the written-information recognizing unit match, and wherein, when it is determined by the second determining unit that the first determining unit is not able to determine whether or not the reference information stored in the first storage unit and the written information recognized by the written-information recognizing unit match, the projecting unit projects determination-impossible information indicating that the determination is impossible.

16. The image input-and-output apparatus according to claim 15, wherein, if it is determined by the second determining unit that the first determining unit is not able to determine whether or not the reference information stored in the first storage unit and the written information recognized by the written-information recognizing unit match, the projecting unit projects, as part of the determination-impossible information, the reference information corresponding to the written information.

17. The image input-and-output apparatus according to claim 13, further comprising a counting unit that counts the number of match information items projected by the projecting unit, and wherein the calculating unit calculates the evaluation parameter, which is related to the match information, based on the number of match information items counted by counting unit.

18. The image input-and-output apparatus according to claim 17, wherein the imaging unit acquires an image of the object when corresponding information is written which corresponds to the match information written on the object by the user based on the assessment result information projected by the projecting unit, and obtains the image as second imaging data;

the written-information recognizing unit recognizes the corresponding information from that second imaging data; and the counting unit counts the number of corresponding information items recognized by the written-information recognizing unit as the number of match information items projected by the projecting unit.

19. The image input-and-output apparatus according to claim 13, further comprising a detection unit that detects a designated area designated by the user from the first imaging data obtained by the imaging unit, and wherein the written-information recognizing unit recognize written information identified based on the designated area detected by the detection unit.

20. An image input-and-output apparatus, comprising:

an imaging unit that takes an image of an object to be photographed to obtain imaging data;

a three-dimensional-shape detection unit that projects pattern light to the object, takes an image of the object by the imaging unit, and detects the three-dimensional shape of the object;

a recognizing unit that recognizes object information from the imaging data obtained by the imaging unit, the object information is written information on the object detected by the three-dimensional-shape detection unit;

a projecting unit that projects related information related to the object information recognized by the recognizing unit;

a first storage unit that stores reference information which is set in advance; and a first determining unit that determines whether the reference information stored in the first storage unit and the written information recognized by the written-information recognizing unit match;

a second storage unit that stores information projected from the projecting unit in accordance with the assessment result of the first determining unit or the second determining unit; and a third determining unit that determines whether or not a predetermined number of determinations by the first determining unit have been completed, wherein the imaging unit obtains an image of the object, on which written information, including text and graphics, is written, to obtain first imaging data, the recognizing unit comprises written-information recognizing unit that recognizes the written information from the first imaging data obtained by the imaging unit, and the projecting unit projects information stored in the second storage unit all together after it is determined by the third determining unit that the determinations by the first determining unit have been completed.

21. The image input-and-output apparatus according to claim 20, wherein the second storage unit also stores the evaluation parameter calculated by the calculating unit; and the projecting unit projects the information stored in the second storage unit all together when it is determined by the third determining unit that the determinations by the first determining unit have been completed and after the evaluation parameter calculated by the calculating unit has been stored in the second storage unit.

22. The image input-and-output apparatus according to claim 20, wherein the projecting unit projects the information projected from the projecting unit one by one in accordance with the assessment results, each time it is determined that one determination has been completed by the first determining unit or each time it is determined by the second determining unit that determination is impossible.

23. The image input-and-output apparatus according to claim 20, further comprising a projection-position control unit that controls the projecting unit such that the assessment result information projected by the projecting unit is projected on the object, close to the written information corresponding to that assessment result.

24. The image input-and-output apparatus according to claim 20, wherein the projecting unit projects pattern light on the object;

an image of the object is acquired by the imaging unit while the pattern light is being projected from the projecting unit onto the object to obtain the image as third imaging data; and the image input-and-output apparatus comprises a three-dimensional information detecting unit that detects three-dimensional information related to the three-dimensional shape of the object based on the third imaging data obtained by the imaging unit.

25. The image input-and-output apparatus according to claim 24, further comprising a projection-form control unit that controls the form of the assessment result information projected onto the object by the projecting unit, based on the three-dimensional information detected by three-dimensional information detecting unit.

26. The image input-and-output apparatus according to claim 24, further comprising a planar-imaging-data generating unit that generates planar imaging data in which the surface of the object is developed onto a plane, from the first imaging data obtained by the imaging unit, based on the three-dimensional information detected by the three-dimensional information detecting unit, and wherein the written-information recognizing unit recognizes the written information from the planar imaging data generated by the planar-imaging-data generating unit.

27. The image input-and-output apparatus according to claim 20, wherein the projecting unit comprises a plurality of semiconductor light-emitting elements for emitting light, a spatial modulator device for outputting image-signal light formed by subjecting the light output from the plurality of semiconductor light-emitting elements to spatial modulation, and a projection optical system for projecting the image-signal light output from the spatial modulator device towards a projection plane; and the plurality of semiconductor light-emitting elements is disposed in a staggered arrangement on a substrate supporting the plurality of semiconductor light-emitting elements.

28. The image input-and-output apparatus according to claim 27, wherein the plurality of semiconductor light-emitting elements is disposed such that the distance between one of the semiconductor light-emitting elements and any semiconductor light-emitting element around the one of the semiconductor light-emitting elements is defined so as to be equal to or less than the full-width at half-maximum of the illuminance distribution formed at the spatial modulator device by the light emitted from one of the semiconductor light-emitting elements.

29. The image input-and-output apparatus according to claim 27, wherein the plurality of semiconductor light-emitting elements is configured to all emit light of the same color.

30. The image input-and-output apparatus according to claim 29, wherein the plurality of semiconductor light-emitting elements is light-emitting diodes, and the emission colors emitted therefrom is all amber.

31. The image input-and-output apparatus according to claim 2, further comprising:

a related-information storage unit in which related information corresponding to the written information is stored in advance; and a related-information extracting unit that extracts the related information from the related-information storage unit in accordance with the written information recognized by the recognizing unit.

32. The image input-and-output apparatus according to claim 2, further comprising a projection-position setting unit that sets the projection position of the related information projected by the projecting unit so as to be close to the written information corresponding to that related information.

33. The image input-and-output apparatus according to claim 32, wherein the projection-position setting unit sets the projection position of an item of related information corresponding to each different item of written information so as to be close to the different item of written information corresponding to the item of related information.

34. The image input-and-output apparatus according to claim 2, further comprising a first specifying unit that sets the written information to be recognized by the recognizing unit, to all of the written information included in the imaging data, wherein the projecting unit projects related information corresponding to the written information specified by the first specifying unit.

35. The image input-and-output apparatus according to claim 2, further comprising a second specifying unit that sets the written information to be recognized by the recognizing unit, to a part of the written information included in the imaging data, wherein the projecting unit projects related information related to the written information specified by the second specifying unit.

36. The image input-and-output apparatus according to claim 35, further comprising a designated-area detecting unit that detects a designated area designated on the object, wherein the second specifying unit specifies the written information to be recognized by the recognizing unit, based on the designated area detected by the designated-area detecting unit.

37. The image input-and-output apparatus according to claim 36, wherein the projecting unit projects an image which allows the designated area detected by the designated-area detecting unit to be distinguished from the other parts on the object.

38. The image input-and-output apparatus according to claim 37, wherein the projecting unit projects an area-designating image which allows the designated area detected by the designated-area detecting unit to be distinguished from the other parts on the object, towards that designated area.

39. The image input-and-output apparatus according to claim 2, further comprising a transformation-related-information setting unit that transforms the related information projected by the projecting unit according to the shape of the object, based on the three-dimensional information detected by the three-dimensional-shape detection unit.

40. The image input-and-output apparatus according to claim 39, further comprising a planar-imaging-data generating unit that generates planar imaging data which is formed by expanding onto a plane the three-dimensional shape formed by the surface of the object in the imaging data related to the object, based on the three-dimensional information detected by the three-dimensional-shape detection unit, and wherein the recognizing unit recognizes the written information from the imaging data generated by the planar-imaging-data generating unit.

41. The image input-and-output apparatus according to claim 2, wherein the related information is any of dictionary information that includes meaning information, translation information, pronunciation information, and graphics information; correction information related to a typographical error or a clerical error in the written information; postal-number information; and address information.

42. The image input-and-output apparatus according to claim 2, wherein the projecting unit comprises a plurality of semiconductor light-emitting elements for emitting light, a spatial modulator device for outputting image-signal light formed by subjecting the light emitted from the plurality of semiconductor light-emitting elements to spatial modulation, and a projecting optical system for projecting the image-signal light output from the spatial modulating device towards a projection plane; and the plurality of semiconductor light-emitting elements is disposed in a staggered arrangement on a substrate supporting the plurality of semiconductor light-emitting elements.

43. The image input-and-output apparatus according to claim 42, wherein the distance between one of the semiconductor light-emitting elements and any semiconductor light-emitting element around the one of the semiconductor light-emitting elements is defined so as to be equal to or less than the full-width at half-maximum of the luminance distribution formed at the spatial modulator device by the light emitted from one of the semiconductor light-emitting elements.

44. The image input-and-output apparatus according to claim 42, wherein the plurality of semiconductor light-emitting elements all emits light of the same color.

45. The image input-and-output apparatus according to claim 44, wherein the plurality of semiconductor light-emitting elements is light-emitting diodes; and the emission colors emitted therefrom are all amber.

46. An image input-and-output apparatus, comprising:

an imaging unit that takes an image of an object to be photographed to obtain imaging data a three-dimensional-shape detection unit that projects pattern light to the object, takes an image of the object by the imaging unit, and detects the three-dimensional shape of the object a recognizing unit that recognizes object information from the imaging data obtained by the imaging unit, the object information is three-dimensional information of the entire object, detected by the three-dimensional-shape detection unit;

a projecting unit that projects related information related to the object information recognized by the recognizing unit;

a light-source that emits light;

a spatial modulating unit that outputs image-signal light formed by subjecting the light emitted from the light source to spatial modulation;

a three-dimensional-information generating unit that, when image-signal light having a predetermined pattern is projected by the projecting unit onto the object or onto an image-projectable plane in a projection direction, generates three-dimensional information of the object or the image-projectable plane in the projection direction in accordance with the object information recognized by the recognizing unit; and a measurement unit that measures the object based on the three-dimensional information generated by the three-dimensional-information generating unit and designated information generated from imaging data obtained when the imaging unit takes an image of a designated condition applied to the object, wherein image-signal light corresponding to measurement information obtained from the measurement by the measurement unit is output by the spatial modulating unit, and the output image-signal light is projected by the projecting unit onto the object or onto the image-projectable plane in the projection direction.

47. The image input-and-output apparatus according to claim 46, further comprising a designated-point inputting unit that inputs a designated point on the object, and wherein the measurement unit carries out measurement of the object at a point, line segment, or area formed by at least one designated point which is input by the designated-point inputting unit.

48. The image input-and-output apparatus according to claim 47, wherein the imaging unit takes images of a pointing member for indicating the designated point on the object at different points in time, and the designated-point inputting unit inputs the designated point based on the imaging data thereof.

49. The image input-and-output apparatus according to claim 46, wherein the measurement unit measures volume information of the object based on the three-dimensional information generated by the three-dimensional-information generating unit, and the image-signal light projected by the projecting unit onto the object or onto the image-projectable plane in the projection direction is instruction information corresponding to the volume information.

50. The image input-and-output apparatus according to claim 46, further comprising a density-information acquisition unit that obtains density information of the object, wherein:

the measurement unit measures weight-distribution information of the object based on the three-dimensional information generated by the three-dimensional-information generating unit and the density information obtained by the density-information acquisition unit; and the image-signal light projected by the projecting unit onto the object or onto the image-projectable plane in the projection direction is instruction information corresponding to the weight-distribution information.

51. The image input-and-output apparatus according to claim 46, wherein the image-signal light projected by the projecting unit onto the object or onto the image-projectable plane in the projection direction is text information related to the measurement information.

52. The image input-and-output apparatus according to claim 51, wherein the image-signal light projected by the projecting unit onto the object or onto the image-projectable plane in the projection direction is graphical information related to the measurement information.

53. The image input-and-output apparatus according to claim 51, wherein the image-signal light projected by the projecting unit onto the object or onto the image-projectable plane in the projection direction is a work instruction line based on the measurement information.

54. The image input-and-output apparatus according to claim 46, wherein the image-signal light projected by the projecting unit onto the object or onto the image-projectable plane in the projection direction is a work instruction line for dividing the object into substantially equal volumes or substantially equal weights in accordance with the volume information or the weight distribution information of the object, measured by the measurement unit.

55. The image input-and-output apparatus according to claim 54, wherein the work instruction line is a cutting instruction line.

56. The image input-and-output apparatus according to claim 55, further comprising a cutting unit that cuts the object in accordance with the cutting instruction line.

57. The image input-and-output apparatus according to claim 46, further comprising a movable unit capable of moving a projection section which includes the light source, the spatial modulation unit, and the projecting unit; an imaging section which includes the imaging unit and which is integrally provided with the projection section; and the object in terms of their mutual relative positions.

58. The image input-and-output apparatus according to claim 46, wherein the projecting unit turns off the image signal light having the predetermined pattern shape, and then, projects the image signal light based on the measurement information.

59. The image input-and-output apparatus according to claim 46, wherein the imaging unit takes an image of the object or the image-projectable plane in the projection direction to which the projecting unit projects the image signal light based on the measurement information, and obtains the imaging data thereof.

60. An image input-and-output apparatus, comprising:

an imaging unit that takes an image of an object to be photographed to obtain imaging data;

a three-dimensional-shape detection unit that projects pattern light to the object, takes an image of the object by the imaging unit, and detects the three-dimensional shape of the object a recognizing unit that recognizes object information from the imaging data obtained by the imaging unit, the object information is three-dimensional information of the entire object, detected by the three-dimensional-shape detection unit;

a projecting unit that projects related information related to the object information recognized by the recognizing unit;

a light-source that emits light;

a spatial modulating unit that outputs image-signal light formed by subjecting the light output from the light source to spatial modulation;

a three-dimensional-information generating unit that, when image-signal light having a predetermined pattern is projected by the projecting unit onto the object or onto an image-projectable plane in the projection direction, generates three-dimensional information of the object or the image-projectable plane in the projection direction based on the object information recognized by the recognizing unit; and an instruction-information generating unit that generates instruction information for the object based on the three-dimensional information generated by the three-dimensional-information generating unit, and wherein image-signal light based on the instruction information generated by the instruction-information generating unit is output by the spatial modulating unit; and the output image-signal light is projected by the projecting unit onto the object or onto the image-projectable plane in the projection direction.

61. The image input-and-output apparatus according to claim 60, further comprising a spatial-light-modulation control unit that controls the spatial modulation unit in accordance with the three-dimensional information generated by the three-dimensional-information generating unit such that no-deformation image-signal light is projected by the projecting unit onto the object or onto the image-projectable plane in the projection direction.

62. The image input-and-output apparatus according to claim 60, wherein the image-signal light projected by the projecting unit onto the object or onto the image-projectable plane in the projection direction is text information related to the instruction information.

63. The image input-and-output apparatus according to claim 60, wherein the image-signal light projected by the projecting unit onto the object or onto the image-projectable plane in the projection direction is graphical information based on the instruction information.

64. The image input-and-output apparatus according to claim 60, wherein the image-signal light projected by the projecting unit onto the object or onto the image-projectable plane in the projection direction is a work-instruction line based on the instruction information.

65. The image input-and-output apparatus according to claim 60, wherein the image-signal light projected by the projecting unit onto the object or onto the image-projectable plane in the projection direction is work-instruction information for dividing the object into substantially equal volumes or substantially equal weights, the work-instruction information being generated as instruction information by the instruction-information generating unit.

66. The image input-and-output apparatus according to claim 65, wherein the work-instruction information is a cutting-instruction line.

67. The image input-and-output apparatus according to claim 66, further comprising a cutting unit that cuts the object along the cutting-instruction line.

68. The image input-and-output apparatus according to claim 60, further comprising a movable unit capable of moving a projection section which includes the light source, the spatial modulation unit, and the projecting unit; an imaging section which includes the imaging unit and which is integrally provided with the projection section; and the object in terms of their mutual relative positions.

69. The image input-and-output apparatus according to claim 60 wherein the projecting unit turns off the image signal light having the predetermined pattern shape, and then, projects the image signal light based on the instruction information.

70. The image input-and-output apparatus according to claim 60, wherein the imaging unit takes an image of the object or the image-projectable plane in the projection direction to which the projecting unit projects the image signal light based on the instruction information, and obtains the imaging data thereof.

71. An image input-and-output apparatus, comprising:

an imaging unit that takes an image of an object to be photographed to obtain imaging data;

a three-dimensional-shape detection unit that projects pattern light to the object, takes an image of the object by the imaging unit, and detects the three-dimensional shape of the object a recognizing unit that recognizes object information from the imaging data obtained by the imaging unit, the object information is three-dimensional information of the entire object, detected by the three-dimensional-shape detection unit;

a projecting unit that projects related information related to the object information recognized by the recognizing unit;

a light source that emits light;

a space modulation unit that applies space modulation to the light emitted from the light source and outputting image signal light;

a related-information search unit that searches an external data accumulation unit communicably connected to the image input-and-output apparatus via a communication unit or a data accumulation unit built in the image input-and-output apparatus, for related information about the object based on the three-dimensional information detected by the three-dimensional-shape detection unit; and a related-information output unit that outputs the related information found by the related-information search unit.

72. The image input-and-output apparatus according to claim 71, wherein the related-information search unit searches for the related information about the object based on information indicating the three-dimensional shape of the object from among the three-dimensional information detected by the three-dimensional-shape detection unit.

73. The image input-and-output apparatus according to claim 71, wherein the related-information search unit searches for the related information about the object based on information indicating the three-dimensional shape of the object from among the three-dimensional information detected by the three-dimensional-shape detection unit and the imaging data acquired by the imaging unit.

74. The image input-and-output apparatus according to claim 71, wherein, when imaging data is acquired by taking images of a plurality of objects at the same time by the imaging unit, the related-information search unit searches for related information of each of at least particular objects from among the plurality of objects whose images have been taken by the imaging unit.

75. The image input-and-output apparatus according to claim 71, further comprising an object-image extraction unit that extracts two-dimensional-image information of an object part having a solid shape separable from the background from among imaging data acquired by the imaging unit in accordance with the three-dimensional information detected by the three-dimensional-shape detection unit, wherein the related-information search unit searches for the related information about the object in accordance with the two-dimensional-image information extracted by the object-image extraction unit.

76. The image input-and-output apparatus according to claim 71, further comprising an object-image extraction unit that extracts two-dimensional-image information of an object part having a solid shape separable from the background from among imaging data acquired by the imaging unit in accordance with the three-dimensional information detected by the three-dimensional-shape detection unit, wherein the related-information search unit searches for related information about the object, having the solid shape, based on the three-dimensional information detected by the three-dimensional-shape detection unit and the two-dimensional-image information extracted by the object-image extraction unit.

77. The image input-and-output apparatus according to claim 76, wherein the related-information search unit searches for related information in accordance with information indicating the three-dimensional shape of the object from among the three-dimensional information detected by the three-dimensional-shape detection unit and the two-dimensional-image information extracted by the object-image extraction unit.

78. The image input-and-output apparatus according to claim 75, wherein, when imaging data is acquired by taking images of a plurality of objects at the same time by the imaging unit, the object-image extraction unit extracts two-dimensional-image information of the object part for each of at least particular objects from among the plurality of objects whose images have been captured by the imaging unit, and the related-information search unit searches for related information about each object in accordance with the two-dimensional-image information extracted by the object-image extraction unit.

79. The image input-and-output apparatus according to claim 71, wherein the related information output by the related-information output unit comprises at least one of the name and an attribute of the object.

80. The image input-and-output apparatus according to claim 71, wherein the related-information output unit outputs image signal light based on the related information found by the related-information search unit, through the space modulation unit, and projects the output image signal light through the projecting unit upon the object or an image-projectable plane in the projection direction.

81. The image input-and-output apparatus according to claim 71, further comprising:

a display-content search unit that searches for a display content via a network in accordance with the related information found by the related-information search unit; and a display-content output unit that outputs information about the display content found by the display-content search unit.

82. The image input-and-output apparatus according to claim 81, wherein the display-content output unit outputs image signal light based on information about the display content found by the display-content search unit, through the space modulation unit, and projects the output image signal light through the projecting unit upon the object or an image-projectable plane in the projection direction.

* * * * *